United States Patent
Dai et al.

(10) Patent No.: US 12,488,954 B2
(45) Date of Patent: Dec. 2, 2025

(54) RELAY HAVING A PRESSURE RELIEF VALVE ASSEMBLY

(71) Applicant: Xiamen Hongfa Electric Power Controls Co., Ltd., Xiamen (CN)

(72) Inventors: Wenguang Dai, Xiamen (CN); Meng Wang, Xiamen (CN); Yaosheng Hong, Xiamen (CN); Martin Kämper, Xiamen (CN); Songsheng Chen, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 102 days.

(21) Appl. No.: 18/136,451

(22) Filed: Apr. 19, 2023

(65) Prior Publication Data

US 2023/0335360 A1    Oct. 19, 2023

(30) Foreign Application Priority Data

Apr. 19, 2022   (CN) .......................... 202210412654.X
Apr. 19, 2022   (CN) .......................... 202210412655.4
(Continued)

(51) Int. Cl.
*H01H 50/04*   (2006.01)
*H01H 50/02*   (2006.01)
(Continued)

(52) U.S. Cl.
CPC ........ *H01H 50/041* (2013.01); *H01H 50/023* (2013.01); *H01H 50/20* (2013.01);
(Continued)

(58) Field of Classification Search
CPC .... H01H 50/041; H01H 50/023; H01H 50/20; H01H 50/36; H01H 50/60;
(Continued)

(56) References Cited

U.S. PATENT DOCUMENTS 7,911,301 B2 * 3/2011 Yano ..................... H01H 50/443
                                                    335/131
9,728,360 B2 * 8/2017 Birner .................... H01H 50/04
(Continued)

FOREIGN PATENT DOCUMENTS

CN        202067730 U    12/2011
CN        204155861 U     2/2015
(Continued)

OTHER PUBLICATIONS

Chinese Office Action for corresponding application 202210412654. X; Report dated Jul. 23, 2025.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A relay of the present disclosure includes an insulation cover, a first yoke plate, a contact assembly, a driving assembly and a pressure relief valve assembly. The first yoke plate is connected with the insulation cover and encloses a contact chamber with the insulation cover. The first yoke plate is provided with a pressure relief hole. The driving assembly is connected with the movable contact piece and configured to drive the movable contact piece move. The pressure relief valve assembly is arranged on the first yoke plate and configured to close the pressure relief hole when a gas pressure in the contact chamber is less than a threshold and configured to be broken to open the pressure relief hole when the gas pressure in the contact chamber is greater than or equal to the threshold.

23 Claims, 57 Drawing Sheets

(30) Foreign Application Priority Data

| Apr. 19, 2022 | (CN) | 202220909170.1 |
| Apr. 19, 2022 | (CN) | 202220909856.0 |
| Apr. 19, 2022 | (CN) | 202220910258.5 |

(51) Int. Cl.
  *H01H 50/20* (2006.01)
  *H01H 50/36* (2006.01)
  *H01H 50/60* (2006.01)

(52) U.S. Cl.
  CPC ............ *H01H 50/36* (2013.01); *H01H 50/60* (2013.01); *H01H 2050/025* (2013.01)

(58) Field of Classification Search
  CPC ........... H01H 2050/025; H01H 50/026; H01H 51/065; H01H 9/043; H01H 9/047
  USPC .................................................................. 335/2
  See application file for complete search history.

(56) References Cited

U.S. PATENT DOCUMENTS

| 9,865,419 | B2 | 1/2018 | Blackmon et al. | |
| 10,790,106 | B2* | 9/2020 | Lee | H01H 1/2083 |
| 11,476,068 | B2* | 10/2022 | Mori | H01H 50/12 |
| 11,640,889 | B2* | 5/2023 | Miyake | H01H 50/60 335/2 |
| 2012/0256714 | A1 | 10/2012 | Hartmann et al. | |
| 2016/0181038 | A1* | 6/2016 | Shimizu | H01H 50/42 335/165 |
| 2016/0365210 | A1* | 12/2016 | Blackmon | H01H 51/29 |
| 2017/0069450 | A1 | 3/2017 | Birner et al. | |
| 2019/0122844 | A1* | 4/2019 | Minowa | H01H 50/58 |
| 2019/0148095 | A1* | 5/2019 | Minowa | H01H 50/14 335/185 |
| 2020/0176208 | A1* | 6/2020 | Mori | H01H 50/60 |
| 2020/0373111 | A1* | 11/2020 | Zhong | H01H 50/02 |
| 2022/0013316 | A1* | 1/2022 | Zhong | H01H 50/40 |
| 2022/0028641 | A1* | 1/2022 | Yamagata | H01H 50/045 |
| 2023/0005687 | A1* | 1/2023 | Katakami | H01H 49/00 |
| 2023/0170172 | A1* | 6/2023 | Tsutsumi | H01H 50/541 335/151 |
| 2023/0178318 | A1* | 6/2023 | Zhong | H01H 50/14 335/185 |
| 2023/0178319 | A1* | 6/2023 | Zhong | H01H 50/14 335/196 |
| 2023/0335360 | A1 | 10/2023 | Dai et al. | |
| 2023/0335364 | A1* | 10/2023 | Horie | H01H 9/443 |
| 2023/0395347 | A1* | 12/2023 | Zhong | H01H 50/541 |
| 2024/0006139 | A1* | 1/2024 | Zhong | H01H 50/22 |
| 2024/0128038 | A1* | 4/2024 | Dai | H01H 1/54 |
| 2024/0145198 | A1* | 5/2024 | Minowa | H01H 50/44 |
| 2024/0177956 | A1* | 5/2024 | Zhong | H01H 50/28 |
| 2024/0312744 | A1* | 9/2024 | Dai | H01H 9/446 |
| 2024/0312746 | A1* | 9/2024 | Dai | H01H 50/546 |
| 2024/0347298 | A1* | 10/2024 | Dai | H01H 50/021 |
| 2024/0347299 | A1* | 10/2024 | Zhong | H01H 50/60 |
| 2024/0347300 | A1* | 10/2024 | Dai | H01H 50/14 |

FOREIGN PATENT DOCUMENTS

| CN | 206301740 U | 7/2017 |
| CN | 107424868 A | 12/2017 |
| CN | 111192795 A | 5/2020 |
| CN | 211788705 U | 10/2020 |
| CN | 212136359 U | 12/2020 |
| CN | 112509870 A | 3/2021 |
| CN | 217158052 U | 8/2022 |
| CN | 217158065 U | 8/2022 |
| CN | 115472997 A | 12/2022 |
| CN | 308559366 A | 4/2024 |
| CN | 223052063 U | 7/2025 |
| EP | 3146553 B1 | 7/2019 |
| JP | H1040791 A | 2/1998 |
| JP | 2002042625 A | 2/2002 |
| JP | 2003100189 A | 4/2003 |
| JP | 2012151070 A | 8/2012 |
| JP | 2016072023 A | 5/2016 |
| JP | 2017117678 A | 6/2017 |

OTHER PUBLICATIONS

Chinese Office Action for corresponding application 202210412655.4; Report dated Jul. 22, 2025.
Chinese Office Action for corresponding application 202530158083.6; Report dated Sep. 25, 2025.
International Search Report for corresponding application PCT/CN2025/107489 filed Jul. 8, 2025; Report dated Sep. 22, 2025.

* cited by examiner

RELAY HAVING A PRESSURE RELIEF VALVE ASSEMBLY

CROSS-REFERENCE TO RELATED APPLICATIONS

This application is based on and claims priority to the Chinese application No. 202210412654.X, 202220909170.1, 202220909856.0, 202220910258.5, 202210412655.4, all filed on Apr. 19, 2022, the entire contents of which are incorporated herein by reference.

TECHNICAL FIELD

The present disclosure relates to the technical field of relays, in particular to a relay with a pressure relief valve assembly.

BACKGROUND

With increasing mileage for new energy vehicles, requirement for high-voltage DC relays is getting higher and higher. For example, under normal circumstances, it is required for the high-voltage DC relay to reduce heat loss, and when a battery pack is short-circuited, it is required for the relay to withstand high short-circuit current and high voltage because of its large battery capacity. If there is a large short-circuit load, contacts of high-voltage DC relay can bounce off due to electric repulsion generated by the short-circuit current, and then arcing of the contacts occur. Both the short-circuit current and voltage of the load are very high, which may cause a severe ignition between the contacts instantaneously.

It is required to ensure the reliability of contact resistance of the contacts, contact systems of a large amount of high-voltage DC relays are sealed by contact sealing cavities, and some of which are also filled with gases such as hydrogen or nitrogen with a certain pressure to assist in extinguishing the arc.

However, in a working process of the relays in related technology, when the contact system is at a moment of the short circuit of a large current or an overload brake, the sealed cavity of the contact is prone to explode.

SUMMARY

The relay according to the embodiment of the present disclosure includes an insulation cover, a first yoke plate, a contact assembly, a driving assembly and a pressure relief valve assembly. The first yoke plate is connected with the insulation cover and encloses a contact chamber with the insulation cover, and the first yoke plate is provided with a pressure relief hole that penetrates through two opposite side surfaces of the first yoke plate along a thickness direction and is communicated with the contact chamber. The contact assembly includes a pair of stationary contact leading-out terminals and a movable contact piece, and the stationary contact leading-out terminals are arranged on the insulation cover, one end of each of the stationary contact leading-out terminals protrudes into the contact chamber, and the movable contact piece is located in the contact chamber. The driving assembly is connected with the movable contact piece and configured to drive the movable contact piece to move, so that two ends of the movable contact piece are respectively contacted with or separated from the pair of stationary contact leading-out terminals. The pressure relief valve assembly is arranged on the first yoke plate and configured to close the pressure relief hole when a gas pressure in the contact chamber is less than a threshold and configured to be broken to open the pressure relief hole when the gas pressure in the contact chamber is greater than or equal to the threshold.

According to some embodiments of the present disclosure, the pressure relief valve assembly includes a valve plate that is integrally arranged at the pressure relief hole of the first yoke plate for closing or opening the pressure relief hole.

According to some embodiments of the present disclosure, the first yoke plate has a first side surface and a second side surface that are oppositely arranged, and the valve plate has a first side surface and a second side surface that are oppositely arranged. The first side surface of the first yoke plate is connected with the insulation cover, and the first side surface of the valve plate is connected with a wall of the pressure relief hole, and the second side surface of the valve plate is flush with the second side surface of the first yoke plate.

According to some embodiments of the present disclosure, the pressure relief valve assembly includes a valve plate that is separately arranged from the first yoke plate and arranged at the pressure relief hole for closing or opening the pressure relief hole.

According to some embodiments of the present disclosure, the first yoke plate has a first side surface connected with the insulation cover, and the first side surface is provided with a sink that is communicated with the pressure relief hole.

The valve plate is provided with a first side surface and is arranged in the sink, and the first side surface of the valve plate is flush with the first side surface of the first yoke plate.

According to some embodiments of the present disclosure, the pressure relief valve assembly further includes a transition part, through which the valve plate is connected to the first yoke plate.

According to some embodiments of the present disclosure, the pressure relief valve assembly further includes a protective cover which is connected to the first yoke plate and is arranged at a surface of the valve plate; and the protective cover is provided with a vent hole.

According to some embodiments of the present disclosure, there is also an exhaust passage between the driving assembly and the first yoke plate, and the exhaust passage is communicated with the pressure relief hole.

According to some embodiments of the present disclosure, the driving assembly includes:
an electromagnet unit arranged at a first yoke plate side away from the insulation cover, wherein the electromagnet unit and the first yoke plate form the exhaust passage; and
a pushing unit connected with the electromagnet unit actuated.

According to some embodiments of the present disclosure, the electromagnet unit includes:
a bobbin in a hollow tubular shape and forming the exhaust passage with the first yoke plate; and
a coil surrounding the bobbin.

According to some embodiments of the present disclosure, the exhaust passage is provided on the first yoke plate and/or the bobbin.

According to some embodiments of the present disclosure, the relay further includes a metal cover, wherein the metal cover is connected to the first yoke plate and encloses a driving chamber with the first yoke plate; and the first yoke plate has a through hole, through which the contact chamber is communicated with the driving chamber; and the metal cover is set inside the bobbin, and the pushing unit is movably arranged in the driving chamber and connected with the movable contact piece through the through hole.

According to some embodiments of the present disclosure, the electromagnet unit further includes:

a static iron core fixedly arranged in the metal cover, and a portion of the static iron core protrudes into the through hole, wherein the static iron core is provided with a first perforation, and the first perforation is arranged corresponding to the through hole, into which the pushing unit passes through;

a movable iron core movably arranged in the metal cover and arranged opposite to the static iron core, wherein the movable iron core is connected with the pushing unit to be attracted by the static iron core when the coil is powered on; and a first elastic member arranged between the static iron core and the movable iron core, and is configured for resetting the movable iron core when the coil is powered off.

According to some embodiments of the present disclosure, a gas flow direction of the exhaust passage is perpendicular to an axis of the pressure relief hole.

According to some embodiments of the present disclosure, the relay further includes a shell with a hollow chamber; the insulation cover, the first yoke plate, the driving assembly and the pressure relief valve assembly are all located in the hollow chamber.

According to some embodiments of the present disclosure, the shell includes:

a first housing; and a second housing detachably connected with the first housing, wherein the first housing and/or the second housing are provided with an exhaust structure, and the exhaust structure is communicated with the hollow chamber.

According to some embodiments of the present disclosure, the exhaust structure includes a gap formed between the first housing and the second housing.

According to some embodiments of the present disclosure, the exhaust structure includes an exhaust hole and/or an exhaust cover and/or an exhaust grid.

According to some embodiments of the present disclosure, the hollow chamber is communicated with an outside of the housing.

According to some embodiments of the present disclosure, the insulation cover includes:

a ceramic cover, on which the stationary contact leading-out terminals are arranged; and a connector, one end of which is connected with an opening edge of the ceramic cover, and the other end of which is connected with the first yoke plate.

According to some embodiments of the present disclosure, a structural strength of the pressure relief valve assembly is less than that of the contact chamber.

DETAILED DESCRIPTION

Now, the exemplary implementations will be described more completely with reference to the accompanying drawings. However, the exemplary implementations can be implemented in various forms and should not be construed as limiting the implementations as set forth herein. Instead, these implementations are provided so that the present disclosure will be thorough and complete, and concept of the exemplary implementation will be fully conveyed to a skilled person in the art. Same reference numbers denote the same or similar structures in the figures, and thus the detailed description thereof will be omitted.

As described in the background, there is a security risk that the contact sealed cavity is prone to explode when the contact system of the relay in the related art is at a moment of large current short circuit or overload break. In the research, an inventor of the present disclosure found that an intense arcing of the contact in the sealed cavity high temperature occurs such that a high temperature is generated instantly in the sealed cavity, and then gas pressure in the sealed cavity of the contact suddenly rises, and once the gas pressure intensity in the sealed cavity of the contact is greater than a strength of the components or the strength at a joint of the sealed cavity of the contact, the sealed cavity of the contact of the relay can easily explode.

Figure 1:
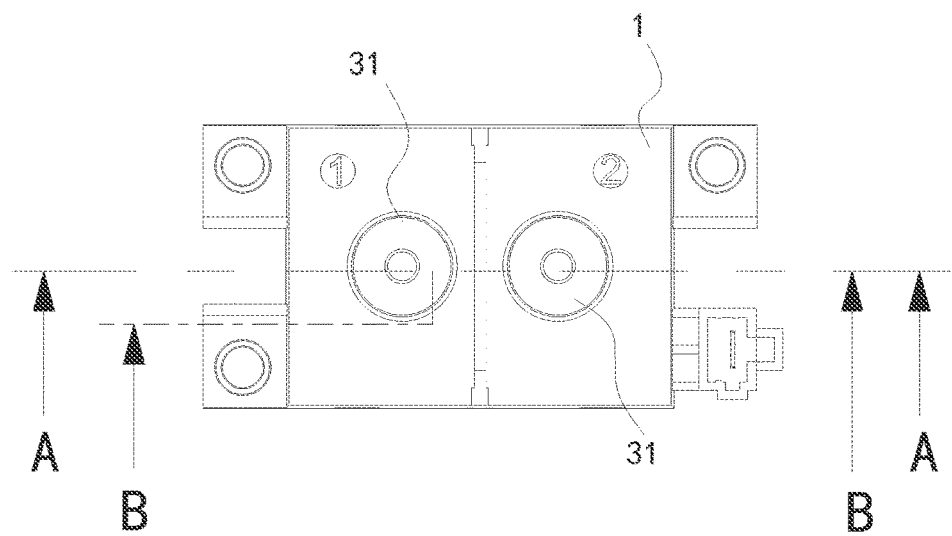
FIG. 1 shows a top view of a relay according to an embodiment of the present disclosure.
Figure 2:
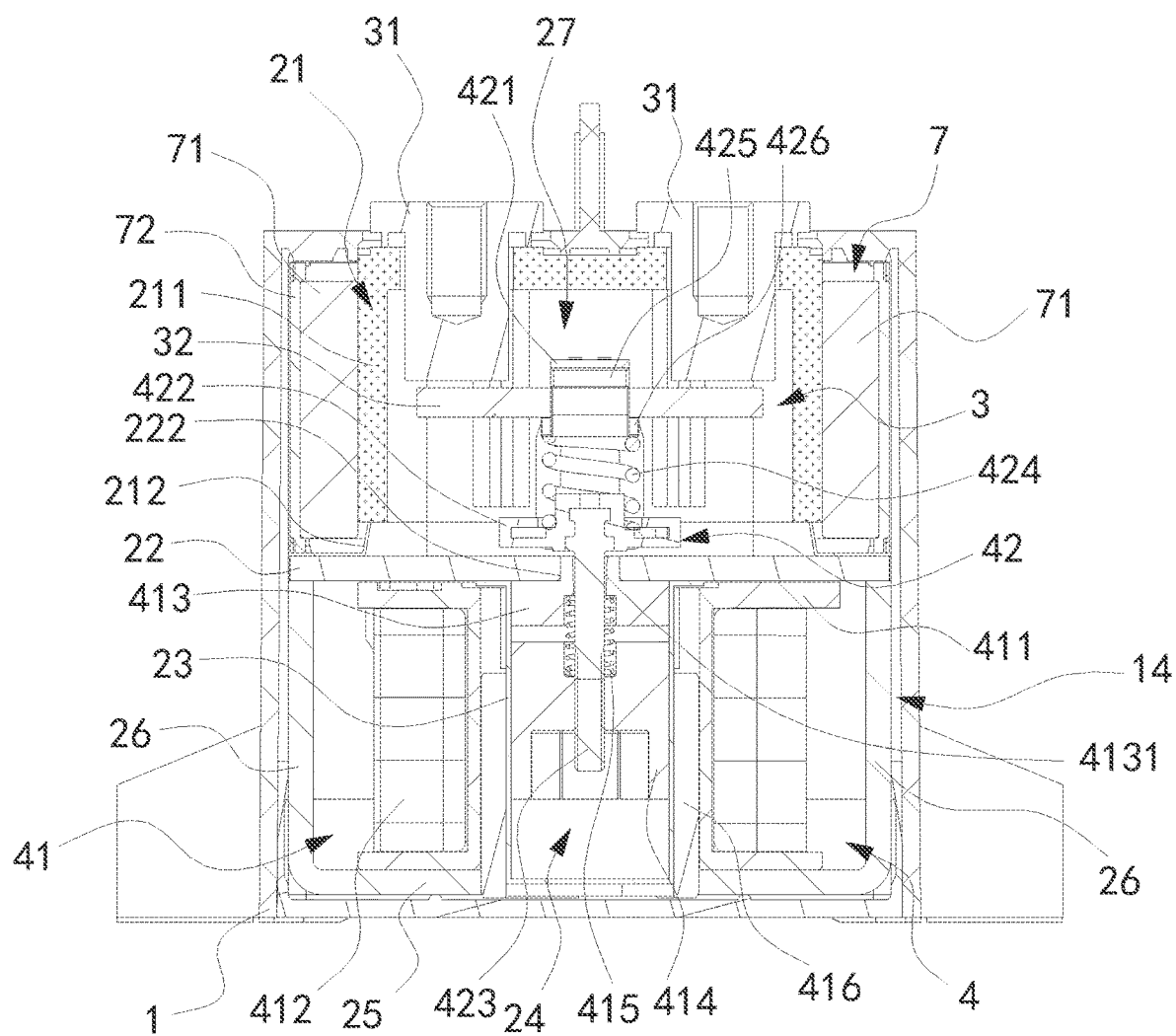
FIG. 2 shows a sectional view taken along line A-A in FIG. 1.
Figure 3:
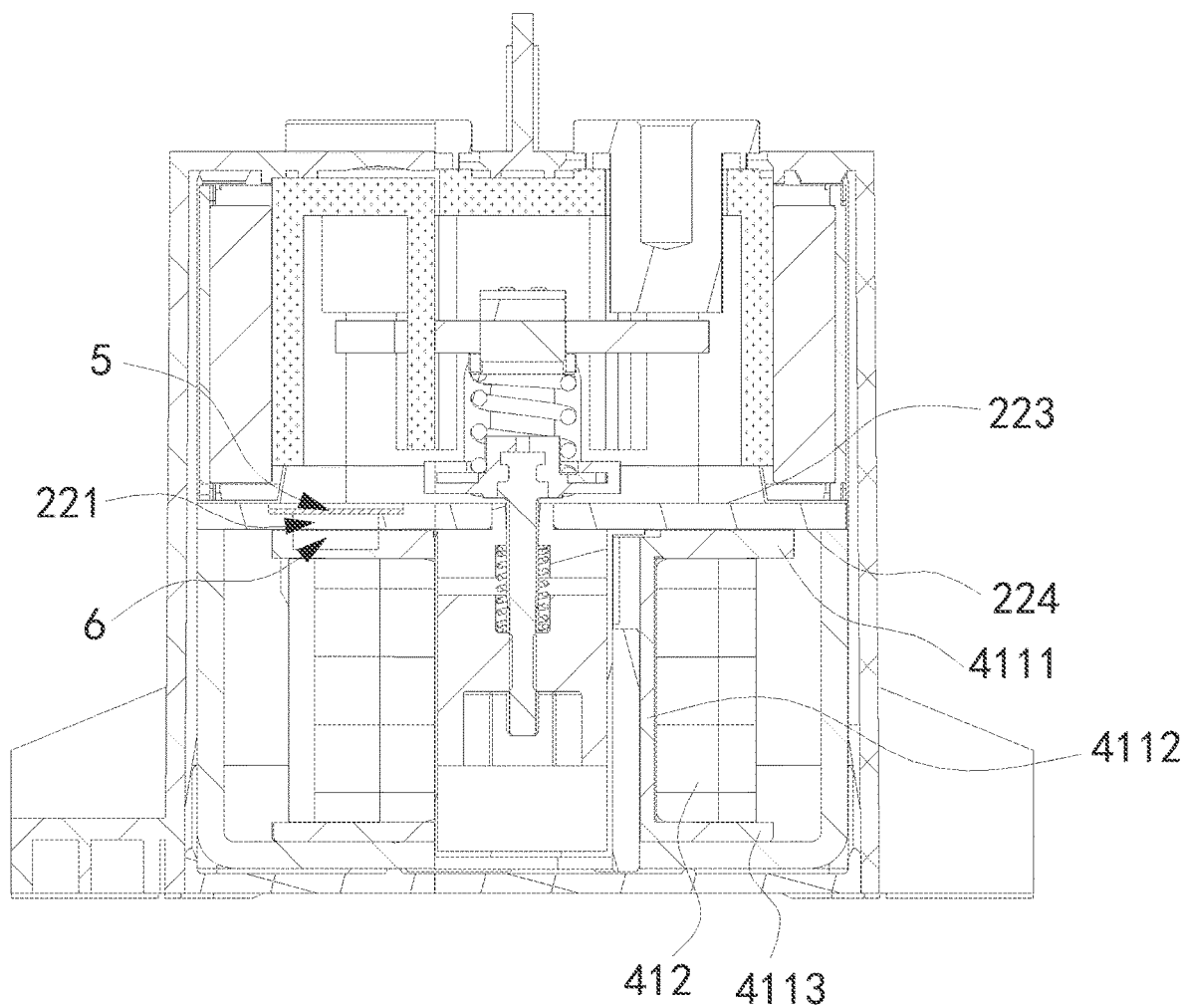
FIG. 3 shows a sectional view taken along line B-B in FIG. 1.
Figure 4:
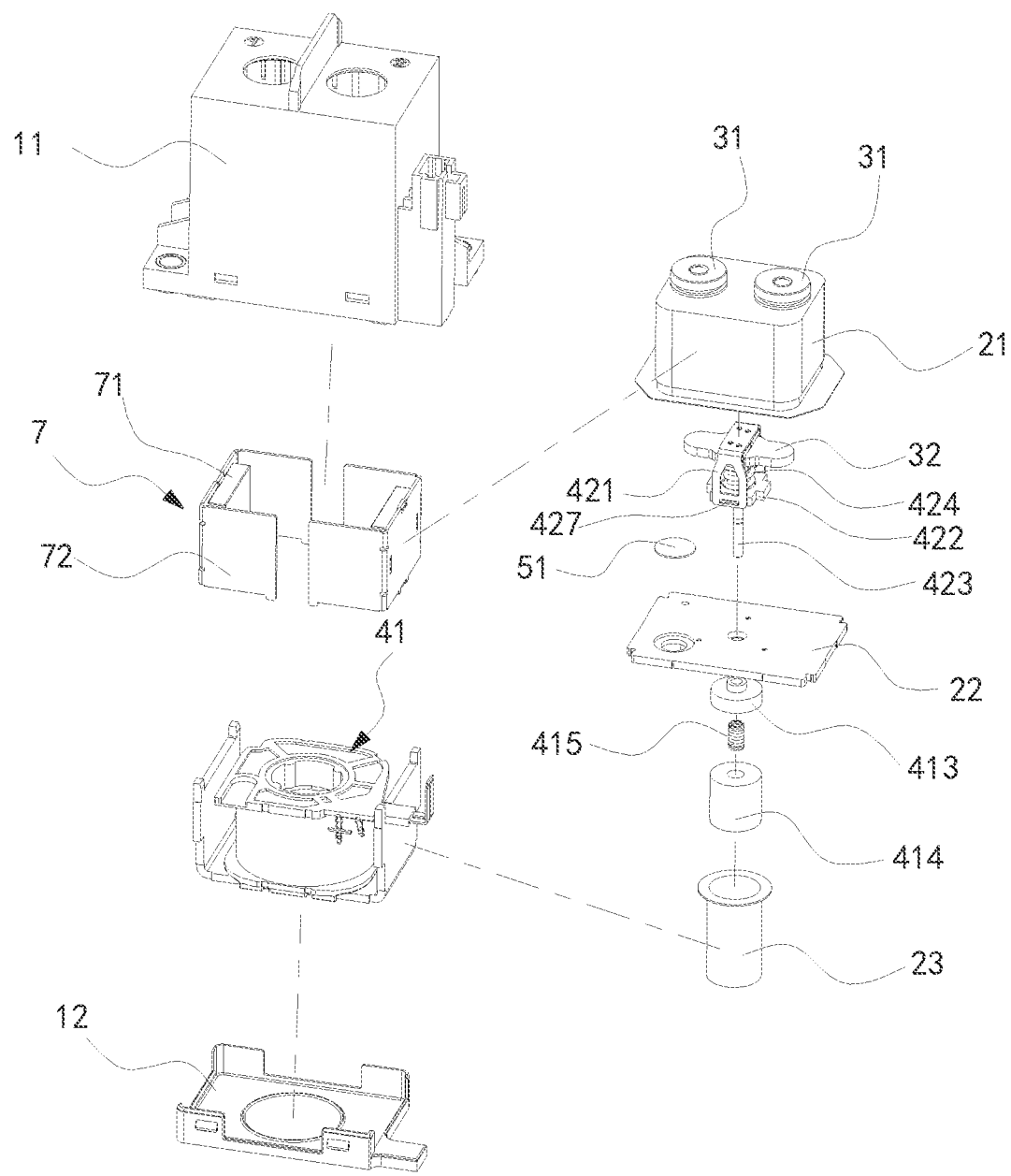
FIG. 4 is an exploded schematic view of the relay according to the embodiment of the present disclosure.

As shown in FIGS. 1 to 4, FIG. 1 shows a top view of a relay according to an embodiment of the present disclosure. FIG. 2 shows a sectional view taken along a line A-A in FIG. 1. FIG. 3 shows a sectional view taken along a line B-B in FIG. 1. FIG. 4 is an exploded schematic view of the relay according to the embodiment of the present disclosure.

The relay according to the embodiment of the present disclosure includes a shell 1, an insulation cover 21, a first yoke plate 22, a contact assembly 3, a driving assembly 4 and a pressure relief valve assembly 5. The shell 1 has a hollow chamber 14 which communicates with an outside of the shell 1. The insulation cover 21 is arranged in the hollow chamber 14. The first yoke plate 22 is connected to the insulation cover 21 and forms a contact chamber 27 with the insulation cover 21. The first yoke plate 22 has a pressure relief hole 221 which penetrates through two opposite sides of the first yoke plate 22 in a thickness direction, and the contact chamber 27 communicates with the hollow chamber 14 through the pressure relief hole 221. The contact assembly 3 includes a stationary contact leading-out terminal 31 and a movable contact piece 32. The stationary contact leading-out terminal 31 is arranged on the insulation cover 21. The stationary contact leading-out terminal 31 has one end extending into an interior of the contact chamber 27, and the other end exposed to an outer surface of the shell 1. The driving assembly 4 is arranged in the hollow chamber 14, and is connected with the movable contact piece 32 for driving the movable contact piece 32 move, so that both ends of the movable contact piece 32 are respectively contacted with or separated from the stationary contact leading-out terminal 31. The pressure relief valve assembly 5 is arranged on the first yoke plate 22 to close the pressure relief hole 221 when a gas pressure in the contact chamber 27 is less than a threshold, and the pressure relief valve assembly is broken to open the pressure relief hole 221 when the gas pressure in the contact chamber 27 is greater than or equal to a threshold. It can be understood that when the pressure relief valve assembly 5 closes the pressure relief hole 221, the airtightness of the contact chamber 27 can be maintained and the normal operation of the relay can be ensured. Of course, in other embodiments, when the pressure relief valve assembly 5 closes the pressure relief hole 221, the contact chamber 27 is not completely sealed, as long as it is guaranteed the relay can work normally.

In the relay according to the embodiment of the present disclosure, a pressure relief valve assembly 5 is arranged on the first yoke plate 22 to close or open the pressure relief hole 221. When the contact assembly 3 is in a normal working state, a gas pressure intensity in the contact chamber 27 is less than the threshold, so that the pressure relief valve assembly 5 is not broken by the gas pressure in the contact chamber 27, and is maintained in a state which the pressure relief hole 221 is closed such that the contact chamber 27 can still be sealed. When the contact assembly 3 is in an abnormal working state, the gas pressure intensity in the contact chamber 27 is greater than or equal to the threshold, so that the pressure relief valve assembly 5 is broken by the gas pressure in the contact chamber 27, and thus the contact chamber 27 communicates with the hollow chamber 14 of the shell 1 through the pressure relief hole 221, and then the gas pressure in the contact chamber 27 can be released to the hollow chamber 14 through the pressure relief hole 221, and finally released to the outside of the shell 1. That is to say, in the abnormal working state, during the process that the gas pressure intensity in the contact chamber 27 gradually rises, the gas pressure may first break through the pressure relief valve assembly 5, and then the rapidly increased gas pressure may be released through the pressure relief hole 221, so that the gas pressure in the contact chamber 27 cannot continue to rise, and cannot reach a structural strength of the contact chamber 27, and thereby avoiding the explosion of the contact chamber 27. In the normal working state, the gas pressure in the contact chamber 27 may not break through the pressure relief valve assembly 5, so the pressure relief valve assembly 5 can perform a function of sealing the pressure relief hole 221.

In addition, the pressure relief valve assembly 5 is arranged on the first yoke plate 22. Since a wall of the contact chamber 27 includes the first yoke plate 22, the pressure relief valve assembly 5 can be directly impacted by the gas inside the contact chamber 27. When the contact assembly 3 is in an abnormal working state, the generated high-temperature gas can directly break through the pressure relief valve assembly 5, so that the gas in the contact chamber 27 can be quickly released from the pressure relief hole 221 timely.

It could be understood that the term "normal working state" refers to that the current of the relay is under a rated working condition, and the term "abnormal working state" refers to that the contact assembly 3 is at a moment of a large current short circuit or at a moment of an overload breaking. In addition, the pressure as represented by the term "threshold" is slightly greater than the gas pressure intensity in the contact chamber 27 when the relay is in the normal working state. The threshold can also be adjusted according to different types of the relays, but cannot be greater than the structural strength of the contact chamber 27.

That is to say, when the relay is in a normal working state, the pressure in the contact chamber cannot reach the threshold, so that the pressure relief valve assembly 5 cannot be broken. When the relay is in an abnormal working state, the pressure in the contact chamber is greater than or equal to the threshold, and the pressure relief valve assembly 5 is broken by the gas.

In one embodiment, the structural strength of the pressure relief valve assembly 5 is less than that of the contact chamber 27. As such, when the relay is in an abnormal working state and the pressure of the gas in the contact chamber rises gradually, the pressure relief valve assembly 5 can be broken by the gas prior to the contact chamber 27.

It can be understood that the structural strength of the pressure relief valve assembly 5 is less than that of the contact chamber 27, which can be achieved by different materials and/or different structures. For example, when the pressure relief valve assembly 5 and the wall of the contact chamber 27 have the same material, the thickness of the pressure relief valve assembly 5 may be designed to be thin and smaller than the wall of the contact chamber 27, so that the gas with gradually rising temperature may preferentially break through the pressure relief valve assembly 5. Of course, in the case that the pressure relief valve assembly 5 and the wall of the contact chamber 27 have the same thickness, the pressure relief valve assembly 5 may be made of ceramic, and the contact chamber 27 may be made of metal, so that the pressure relief valve assembly 5 may be broken first. Alternatively, the pressure relief valve assembly 5 is thin and made of ceramic, and the wall of the contact chamber 27 is thick and made of metal. Of course, it is possible that the structural strength of the pressure relief valve assembly 5 is less than that of the contact chamber 27 in other suitable ways, which will not be listed here.

It can be understood that terms "include" and "have" in the embodiment of the present disclosure and any variations thereof are intended to be included non-exclusively. For example, process, method, system, product or equipment that includes a series of steps or units is not limited to the steps or units that have been listed, but optionally steps or units that are not listed are also included, or optionally other steps or components inherent to these processes, methods, products or equipment are also included.

It should be noted that the relay according to the embodiment of the present disclosure may not include the shell 1, but the insulation cover 21, the first yoke plate 22, the contact assembly 3, the driving assembly 4 and the pressure relief valve assembly 5 are assembled and then directly installed in application products, such as battery packs and electrical control boxes.

Further referring to FIGS. 2 to 4. In this embodiment, the contact assembly 3 includes two stationary contact leading-out terminals 31 respectively for current inflow and current outflow, and one movable contact piece 32. The movable contact piece 32 may be in a straight piece shape. Both ends of the movable contact piece 32 in the length direction may be in contact with the two stationary contact leading-out terminals 31 respectively under the action of the driving assembly 4 movable contact piece, so as to realize the connected load. The bottoms of the stationary contact leading-out terminals 31 serves as the stationary contacts, and both ends of the movable contact piece 32 in the length direction may serve as the movable contacts. The movable contacts at both ends of the movable contact piece 32 may protrude from other portions of the movable contact piece 32 or may be flush with other portions.

It can be understood that the stationary contacts may be integrally or separately arranged at the bottom of the stationary contact leading-out terminals 31, and the movable contact can be integrally or separately arranged at both ends of the movable contact piece 32 in the length direction.

Two stationary contact leading-out terminals 31 are arranged on the insulation cover 21, for example, at the top of the insulation cover 21. And, one end of each of the stationary contact leading-out terminals 31 extends into the interior of the contact chamber 27, and the other end thereof is exposed to the outer surface of the shell 1. One end of the stationary contact leading-out terminal 31 extending into the interior of the contact chamber 27 is used for contacting with the movable contact piece 32.

The relay also includes an arc extinguishing unit 7 that is arranged in the hollow chamber 14 of the shell 1, for extinguishing the arc of the contact assembly 3.

In this embodiment, the arc extinguishing unit 7 includes two arc-extinguishing magnets 71. The arc-extinguishing magnets 71 may be permanent magnets, and each of the arc-extinguishing magnets 71 may be a substantially rectangular shape. The two arc-extinguishing magnets 71 are respectively arranged on both sides of the insulation cover 21 and are oppositely arranged along a length direction of the movable contact piece 32.

As shown in FIG. 2, two arc-extinguishing magnets 71 are located on left and right sides of the insulation cover 21. In this embodiment, polarities of the mutually facing surfaces of the two arc-extinguishing magnets 71 are opposite to one another. That is, a left face of the arc-extinguishing magnet 71 located on the left side of the insulation cover 21 is S pole and the right face thereof is N pole, and a left face of the arc-extinguishing magnet 71 located on the right side of the insulation cover 21 is S pole and the right face thereof is N pole.

Of course, the polarities of the mutually facing surfaces of the two arc-extinguishing magnets 71 may also be designed to be the same, for example, the left face of the arc-extinguishing magnet 71 located on the left side of the insulation cover 21 is S pole and the right face thereof is N pole, and the left face of the arc-extinguishing magnet 71 located on the right side of the insulation cover 21 is N pole and the right face thereof is S pole.

As such, the two arc-extinguishing magnets 71 opposite to each other are arranged such that a magnetic field may be formed around the contact assembly 3. Therefore, an arc is generated between the stationary contact leading-out terminal 31 and the movable contact piece 32, may be elongated in a direction away from each other under the action of the magnetic field, thereby realizing the arc extinction.

The arc extinguishing unit 7 also includes two yoke clamps 72 arranged corresponding to the two arc-extinguishing magnets 71. Furthermore, the two yoke clamps 72 surround the insulation cover 21 and two arc-extinguishing magnets 71. Through the design that the yoke clamp 72 surrounds the arc-extinguishing magnet 71, it may be avoided that the magnetic field generated by the arc-extinguishing magnet 71 spreads outward, and affects the arc-extinguishing effect. The yoke clamp 72 is made of a soft magnetic material that may include, but are not limited to, iron, cobalt, nickel, and alloys thereof.

The relay also includes a metal cover 23 that is connected to the first yoke plate 22 and encloses a driving chamber 24 with the first yoke plate 22. The driving chamber 24 is configured to accommodate a static iron core 413 and a movable iron core 414, which will be described in detail below. The first yoke plate 22 has a through hole 222, through which the contact chamber 27 communicates with the driving chamber 24, and the contact chamber 27 forms a sealed chamber together with the driving chamber 24.

The insulation cover 21 is connected to one side of the first yoke plate 22, and both the pressure relief hole 221 and the through hole 222 are located within an orthographic projection range of the insulation cover 21 in the first yoke plate 22, that is, the insulation cover 21 covers the pressure relief hole 221 and the through hole 222 therein, so that both the pressure relief hole 221 and the through hole 222 communicate with the contact chamber 27 surrounded by the insulation cover 21 and the first yoke plate 22.

The metal cover 23 is connected to the other side of the first yoke plate 22, that is, the insulation cover 21 and the metal cover 23 are respectively arranged on two opposite sides of the first yoke plate 22 in a thickness direction. Moreover, the through hole 222 is located within an orthographic projection of the metal cover 23 in the first yoke plate 22, so that the through hole 222 communicates with the driving chamber 24.

Since the contact chamber 27 and the driving chamber 24 are communicated through the through hole 222, the gas in the contact chamber 27 may also be transferred into the driving chamber 24 through the through hole 222.

The insulation cover 21 may include a ceramic cover 211 and a connector 212, and two stationary contact leading-out terminals 31 are arranged on the ceramic cover 211. The ceramic cover 211 is connected with the first yoke plate 22 through the connector 212. Specifically, the connector 212 may be a metal part with an annular structure, such as iron-nickel alloy. One end of the connector 212 is connected to an opening edge of the ceramic cover 211, for example, by laser welding, brazing, resistance welding, gluing, etc., and the other end of the connector 212 is connected to the first yoke plate 22, by the same way of laser welding, brazing, resistance welding or gluing. A connector 212 is provided between the ceramic cover 211 and the first yoke plate 22, which can facilitate the connection between the ceramic cover 211 and the first yoke plate 22.

The driving assembly 4 includes an electromagnet unit 41 and a pushing unit 42. The electromagnet unit 41 is arranged on a side of the first yoke plate 22 facing away from the insulation cover 21 The pushing unit 42 is connected with the electromagnet unit 41 actuated. The pushing unit 42 is movably arranged in the driving chamber 24 and is connected with the movable contact piece 32 through the through hole 222.

When the electromagnet unit 41 is powered on, it may drive the pushing unit 42 move, and then drive the movable contact piece 32 move to contact with or separate from the stationary contact leading-out terminal 31.

The electromagnet unit 41 includes a bobbin 411, a coil 412, a static iron core 413 and a movable iron core 414. The bobbin 411 has a hollow cylindrical shape and is formed of an insulating material. The metal cover 23 is configured to be set inside the bobbin 411. The coil 412 surrounds the bobbin 411. The static iron core 413 is fixedly arranged in the metal cover 23, and a portion of the static iron core 413 may protrude into the through hole 222. The static iron core 413 has a first perforation 4131 which is arranged corresponding to the through hole 222 and penetrated for the pushing unit. The movable iron core 414 is movably arranged in the metal cover 23 and opposite to the static iron core 413. The movable iron core 414 is connected with the pushing unit 42 to be attracted by the static iron core 413 when the coil 412 is powered on. The movable iron core 414 and the pushing unit 42 may be connected by screwing, riveting, welding or other ways.

In this embodiment, the bobbin 411 is made of a resin material and includes a first flange part 4111, a hollow cylindrical part 4112 and a second flange part 4113. The first flange part 4111 and the second flange part 4113 are respectively arranged at both ends of the hollow cylindrical part 4112. An outer periphery of the hollow cylindrical part 4112 surrounds the coil 412. The metal cover 23 is set inside the hollow cylindrical part 4112.

The electromagnet unit 41 further includes a first elastic member 415. The first elastic member 415 is located inside the metal cover 23 and arranged between the static iron core 413 and the movable iron core 414, for resetting the movable iron core 414 when the coil 412 is powered off. The first elastic member 415 may be a spring and sleeved outside the pushing unit 42.

Further referring to FIGS. 2 to 4, the relay further includes a second yoke plate 25 and a pair of third yoke plates 26. The second yoke plate 25 is arranged opposite to the first yoke plate 22, and the bobbin 411 is interposed between the first yoke plate 22 and the second yoke plate 25, that is, the first yoke plate 22 is connected to the first flange part 4111 of the bobbin 411, and the second yoke plate 25 is connected to the second flange part 4113 of the bobbin 411.

The pair of third yoke plates 26 are respectively arranged at both ends of the second yoke plate 25 along a length direction of the movable contact piece 32, and extend toward the first yoke plate 22, and are connected to both ends of the first yoke plate 22 along the length direction of the movable contact piece 32.

As such, the first yoke plate 22, the second yoke plate 25 and the pair of third yoke plates 26 surround the coil 412.

It can be understood that the second yoke plate 25 and the pair of third yoke plates 26 may be an integral structure, for example, molded by bending them. The first yoke plate 22, the second yoke plate 25 and the pair of third yoke plates 26 which are integrally formed may be a separated structure.

The relay further includes a magnetic bush 416. The magnetic sleeve 416 may be made of a soft magnetic material which may include but not limited to iron, cobalt, nickel, and alloys thereof. The magnetic sleeve 416 is arranged in a gap formed between an inner circumferential surface of the lower end of the hollow cylindrical part 4112 of the bobbin 411 and an outer circumferential surface of the metal cover 23, so that the first yoke plate 22, the second yoke plate 25, the pair of third yoke plates 26, the static iron core 413, the movable iron core 414 and the magnetic sleeve 416 form a magnetic circuit together.

As shown in FIGS. 2 and 4, the pushing unit 42 includes a U-shaped bracket 421, a base 422, a fixed piece 427, a push rod 423, a second elastic member 424, a first magnet 425 and a second magnet 426. The first magnet 425 is fixedly connected with the U-shaped bracket 421, and the first magnet 425 is arranged on a top inner wall face of the U-shaped bracket 421. The second magnet 426 is fixedly connected with the movable contact piece 32. The base 422, the fixed piece 427 and the upper part of the push rod 423 may be formed by integrated injection molding.

The bottom of the U-shaped bracket 421 is fixedly connected with the fixed piece 427. The U-shaped bracket 421 and the base 422 form a frame structure, and the movable contact piece 32, the first magnet 425 and the second magnet 426 are installed in the frame structure surrounded by the U-shaped bracket 421 and the base 422. Moreover, the second elastic member 424 is also arranged in the frame structure surrounded by the U-shaped bracket 421 and the base 422. One end of the second elastic member 424 abuts against the base 422, and the other end of the second elastic member abuts against the movable contact piece 32. The second elastic member 424 may provide an elastic force, such that the movable contact piece 32 and the second magnetizer 426 have a trend far away from the base 422 and close to the first magnet 425. The push rod 423 passes through the through hole 222 of the first yoke plate 22 and the first perforation 4131 of the static iron core 413, and one end of the push rod 423 is fixedly connected with the base 422, and the other end of the push rod 423 is fixedly connected with the movable iron core 414.

It can be understood that the second elastic member 424 may be a spring. The first magnet 425 and the second magnet 426 may be made of soft magnetic materials, such as iron, cobalt, nickel, and alloys thereof.

When the push rod 423 does not move upward, a top face of the movable contact piece 32 abuts against the first magnet 425 under the action of the second elastic member 424. When the coil 412 is energized to drive the push rod 423 to move upward, the two ends of the movable contact piece 32 are respectively in contact with the two stationary contact leading-out terminals 31. Subsequently, the push rod 423 continues to move upward, and the first magnet 425 also continues to move upward with the push rod 423. However, the movable contact piece 32 has been in contact with the two stationary contact leading-out terminals 31, so that the movable contact piece 32 may not continue to move upward, achieving the over-travel of the contacts. The second elastic member provides contact pressure, and a certain gap is formed between the bottom face of the first magnet 425 and the top face of the movable contact piece 32, so that there is a magnetic gap between the first magnet 425 and the second magnet 426.

Figure 5:
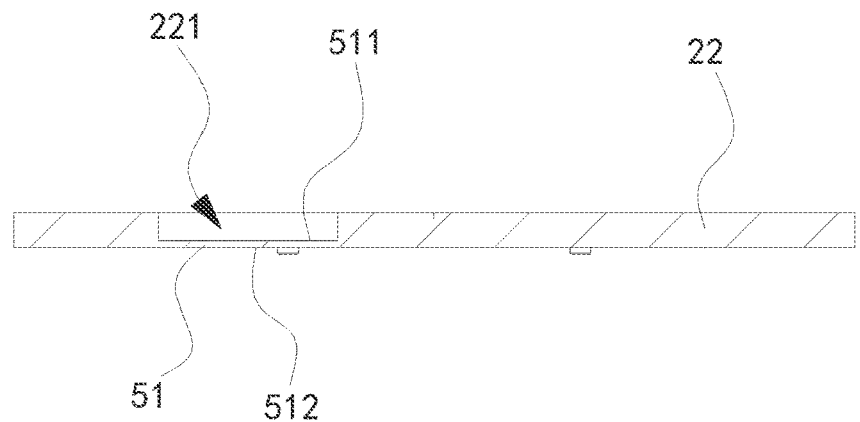
FIG. 5 is a sectional view of a pressure relief valve assembly and a first yoke plate according to the first embodiment of the present disclosure.

As shown in FIG. 5, it shows a sectional view of a pressure relief valve assembly 5 and a first yoke plate 22 according to the first embodiment of the present disclosure. The pressure relief valve assembly 5 includes a valve plate 51, which is integrally provided at the pressure relief hole 221 of the first yoke plate 22, for closing or opening the pressure relief hole 221.

Specifically, a structural strength of the valve plate 51 is less than that of the contact chamber 27. When the contact assembly 3 is in an abnormal working state, the gas whose pressure rises sharply can first break through the valve plate 51 and then is discharged from the pressure relief hole 221 of the contact chamber 27, so that the gas pressure in the contact chamber 27 cannot continue to rise, and thus protect the contact chamber 27.

The first yoke plate 22 has a first side surface 223 and a second side surface 224 which are oppositely arranged, and the valve plate 51 has a first side surface 511 and a second side surface 512 which are oppositely arranged. The first side surface 223 is connected with the insulation cover 21, the first side surface 511 of the valve plate 51 is connected with a wall of the pressure relief hole 221, and the second side surface 512 is flush with the second side surface 224.

Of course, it can be understood that a positional relationship between the first yoke plate 22 and the two side surfaces of the valve plate 51 may also be as follows: the first side surface 511 of the valve plate 51 is flush with the first side surface 223 of the first yoke plate 22, and the second side surface 512 is connected with the wall of the pressure relief hole 221; alternatively, the first side surface 511 is spaced apart from the first side surface 223 by a certain distance, and the second side surface 512 is spaced apart from the second side surface 224 by a certain distance. That is, the both sides of the valve plate 51 are not aligned with the both sides of the first yoke plate 22.

Figure 6:
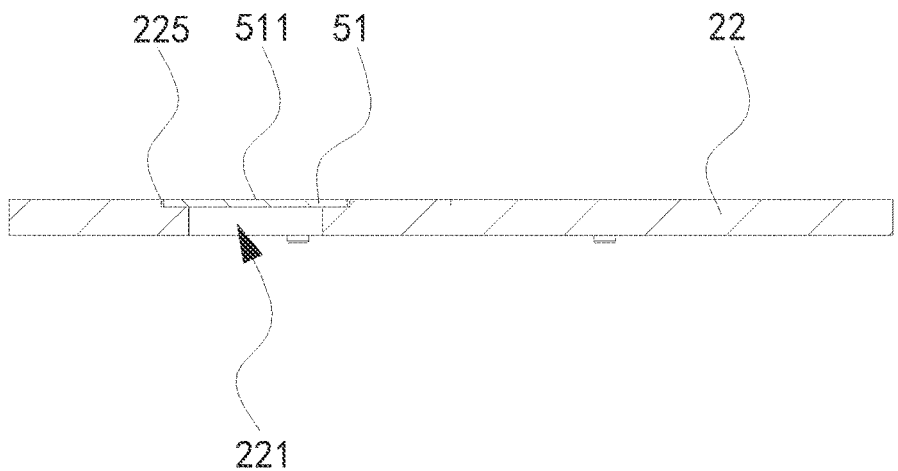
FIG. 6 is a sectional view of a pressure relief valve assembly and a first yoke plate according to the second embodiment of the present disclosure.

As shown in FIG. 6, it shows a sectional view of a pressure relief valve assembly 5 and a first yoke plate 22 according to the second embodiment of the present disclosure. The same portions between the second embodiment and the first embodiment are not repeated here, but the difference therebetween is that the pressure relief valve assembly 5 includes a valve plate 51, which is separately arranged from the first yoke plate 22 and is arranged at the pressure relief hole 221 of the first yoke plate 22 for closing or opening the pressure relief hole 221.

It can be understood that the valve plate 51 may be made of metallic materials or nonmetallic materials. The metal materials include, but are not limited to iron and nickel and their alloys, copper and its alloys, aluminum and its alloys, etc. The non-metallic materials include, but are not limited to ceramics, glass, and carbon fiber, etc.

It can be understood that the valve plate 51 may be connected with the first yoke plate 22 by laser welding, brazing, resistance welding, gluing, etc.

Further referring to FIG. 6, the first yoke plate 22 has a first side surface 223 that is connected with the insulation cover 21. The first side surface 223 is provided with a sink 225 that communicates with the pressure relief hole 221. The valve plate 51 has a first side surface 511, in which the valve plate 51 is arranged, and the first side surface 511 of the valve plate 51 is flush with the first side surface 223 of the first yoke plate 22. Of course, the first side surface 511 of the valve plate 51 may not be flush with the first side surface 223 of the first yoke plate 22.

Figure 7:
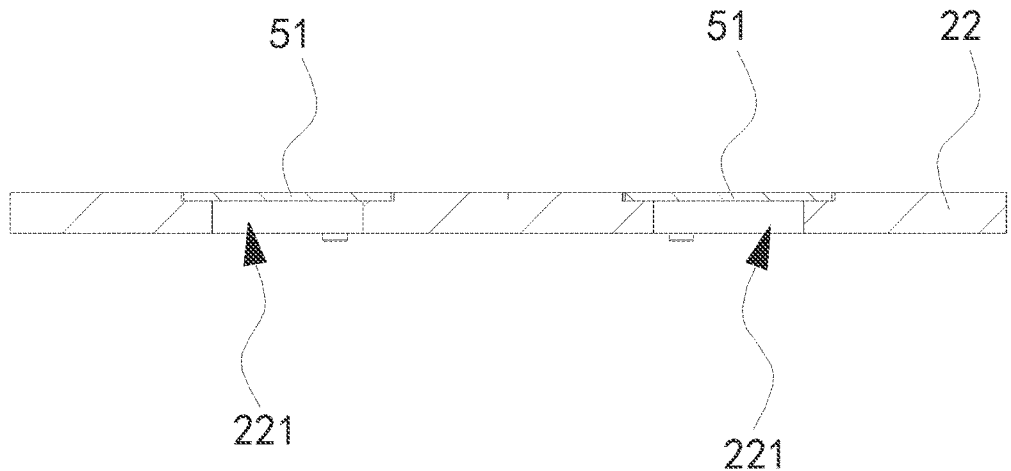
FIG. 7 is a sectional view of a pressure relief valve assembly and a first yoke plate according to the third embodiment of the present disclosure.

As shown in FIG. 7, it shows a sectional view of a pressure relief valve assembly 5 and a first yoke plate 22 according to the third embodiment of the present disclosure. The same portions between the third embodiment and the second embodiment will not be repeated, but the difference therebetween is that the first yoke plate 22 has a plurality of pressure relief holes 221, correspondingly, the relay includes a plurality of valve plates 51, and the plurality of valve plates 51 are correspondingly arranged at the plurality of pressure relief holes 221, respectively. Among them, the term "a plurality of" refers to two or more, unless otherwise explicitly defined.

Figure 8:
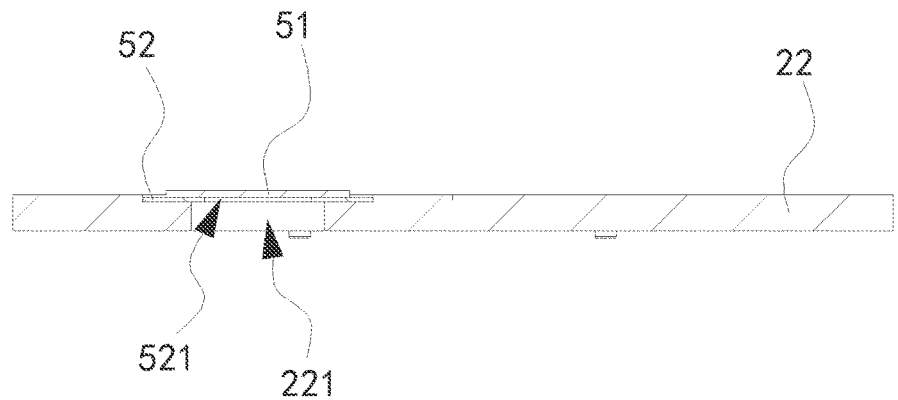
FIG. 8 is a sectional view of a relief valve assembly and a first yoke plate according to the fourth embodiment of the present disclosure.

As shown in FIG. 8, it shows a sectional view of a pressure relief valve assembly 5 and a first yoke plate 22 according to the fourth embodiment of the present disclosure. The same portions between the fourth embodiment and the above embodiments will not be repeated, but the difference therebetween is that the pressure relief valve assembly 5 further includes a transition part 52, and the valve plate 51 is connected to the first yoke plate 22 through the transition part 52.

In this embodiment, the transition part 52 may be a sheet. The transition part 52 is arranged in the sink 225, and the transition part 52 has a second perforation 521 provided in a thickness direction, and the second perforation 521 communicates with the pressure relief hole 221. The valve plate 51 is connected to the transition part 52 and covers the second perforation 521. In the normal working state, the valve plate 51 closes the second perforation 521 and the pressure relief hole 221, to maintain the sealed state of the contact chamber 27. In the abnormal working state, the valve plate 51 is broken by the gas, so that the contact chamber 27 communicates with the outside through the second perforation 521 and the pressure relief hole 221.

It can be understood that the valve plate 51 and the transition part 52 may be connected by laser welding, brazing, resistance welding, gluing, etc., and the transition part 52 and the first yoke plate 22 may be connected by laser welding, brazing, resistance welding, gluing, etc.

Figure 9:
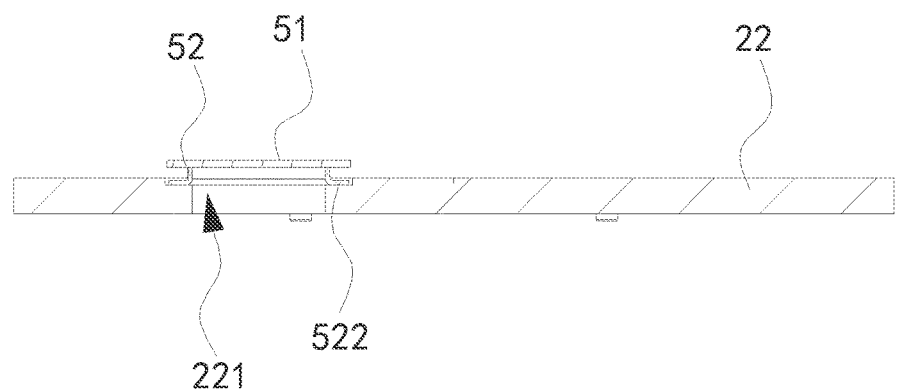
FIG. 9 is a sectional view of a pressure relief valve assembly and a first yoke plate according to the fifth embodiment of the present disclosure.

As shown in FIG. 9, it shows a sectional view of a pressure relief valve assembly 5 and a first yoke plate 22 according to the fifth embodiment of the present disclosure. The same portions between the fifth embodiment and the fourth embodiment will not be repeated, but the difference therebetween lies in the shape of the transition part 52 of the fifth embodiment.

Specifically, the transition part 52 of the fifth embodiment is generally cylindrical. One end of the transition part 52 is provided with a flange 522 which is protruding outward in a radial direction, and is connected with the first yoke plate 22 through the flange 522, the other end of the transition part 52 is connected with the valve plate 51. The cavity of the transition part 52 corresponds to the pressure relief hole 221 of the first yoke plate 22, and is covered by the valve plate 51.

The transition part 52 has a certain height so that the valve plate 51 protrudes from the surface of the first yoke plate 22.

Figure 10:
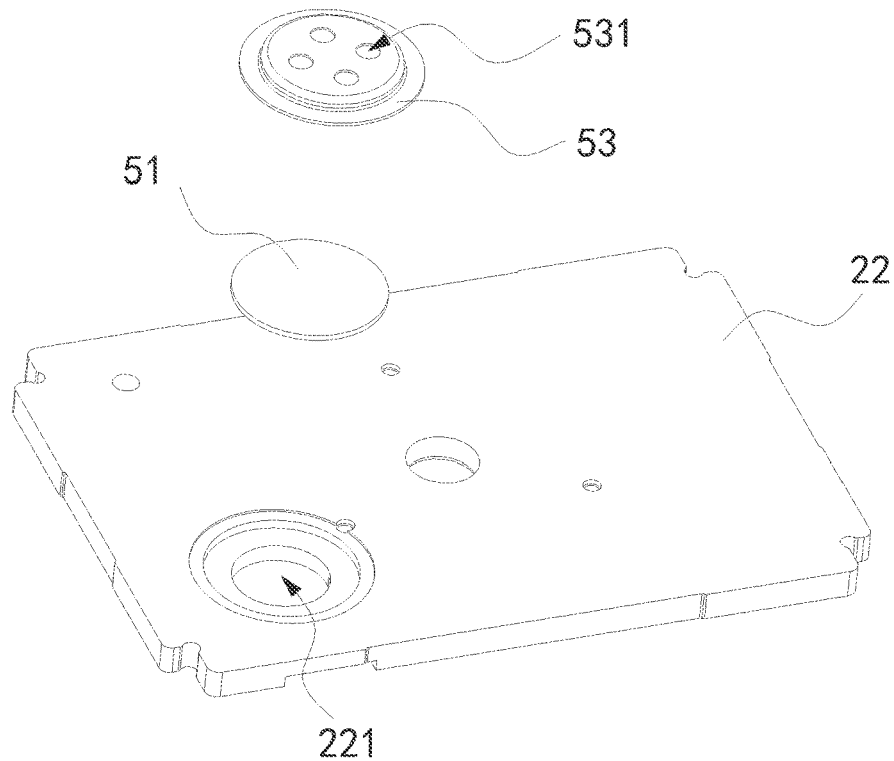
FIG. 10 is an exploded schematic view of a pressure relief valve assembly and a first yoke plate according to the sixth embodiment of the present disclosure.
Figure 11:
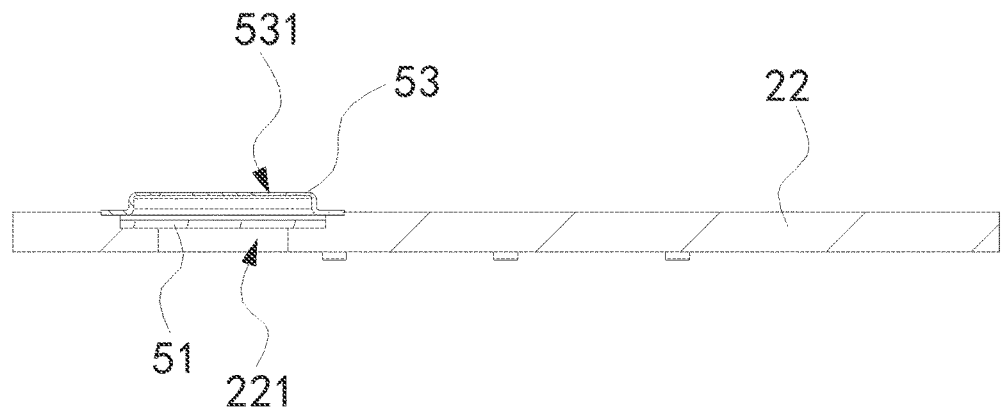
FIG. 11 shows a sectional view of the pressure relief valve assembly and the first yoke plate in FIG. 10 after being assembled.

As shown in FIGS. 10 and 11, FIG. 10 shows an exploded schematic view of the pressure relief valve assembly 5 and the first yoke plate 22 according to the sixth embodiment of the present disclosure. FIG. 11 shows a sectional view of the pressure relief valve assembly 5 and the first yoke plate 22 in FIG. 10 after being assembled. The same portions between the sixth embodiment and the above embodiments will not be repeated, but the differences therebetween are as follows:

The pressure relief valve assembly 5 further includes a protective cover 53, which is connected to the first yoke plate 22 and arranged above the valve plate 51. The protective cover 53 has a vent hole 531 through which the gas in the contact chamber 27 may act on the valve plate 51.

In this embodiment, by providing the protective cover 53 additionally, the gas can break through the valve plate 51 in the abnormal working state, and the valve plate 51 can be protected during the transportation or installation of the first yoke plate 22 so as to prevent the valve plate 51 from being punctured by foreign objects.

It can be understood that the protective cover 53 may be made of metallic materials or nonmetallic materials. The metal materials include, but are not limited to iron and nickel and their alloys, copper and its alloys, aluminum and its alloys, etc. the non-metallic materials include, but are not limited to ceramics, glass, carbon fiber, plastics, etc.

The protective cover 53 may be connected to the first yoke plate 22 by laser welding, brazing, resistance welding, gluing, and clamping, etc.

Figure 12:
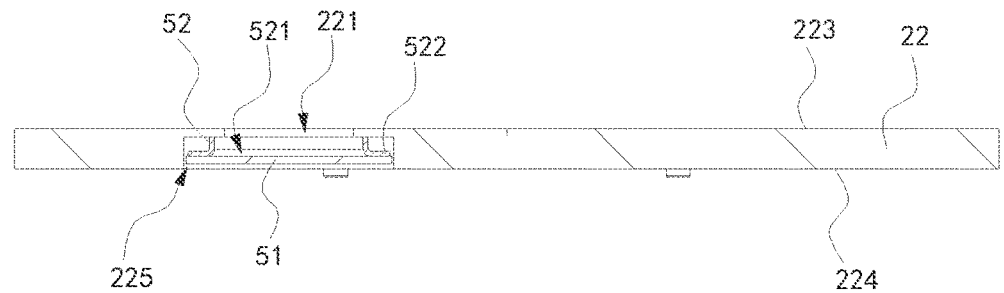
FIG. 12 is a sectional view of a pressure relief valve assembly and a first yoke plate according to the seventh embodiment of the present disclosure.

As shown in FIG. 12, it is a sectional view of a pressure relief valve assembly and a first yoke plate according to the seventh embodiment of the present disclosure. The same portions between the seventh embodiment and the above embodiments will not be repeated here, but the differences therebetween are as follows:

The sink 225 of the first yoke plate 22 is arranged at a side of the second side surface 224, and the transition part 52 is arranged in the sink 225 and connected with the first yoke plate 22. The valve plate 51 is connected with the transition part 52.

The transition part 52 is generally tubular, for example, cylindrical. One end of the transition part 52 is provided with a flange 522 which is protruding outward in a radial direction, and is connected with the first yoke plate 22 through the flange 522, the other end of the transition part 52 is connected with the valve plate 51.

The valve plate 51 may be accommodated in the sink 225, and a side surface of the valve plate 51 far away from the transition part 52 may be arranged in the sink 225, may be flush with the second side surface 224 of the first yoke plate 22, or may protrude from the second side surface 224 of the first yoke plate 22.

Figure 13:
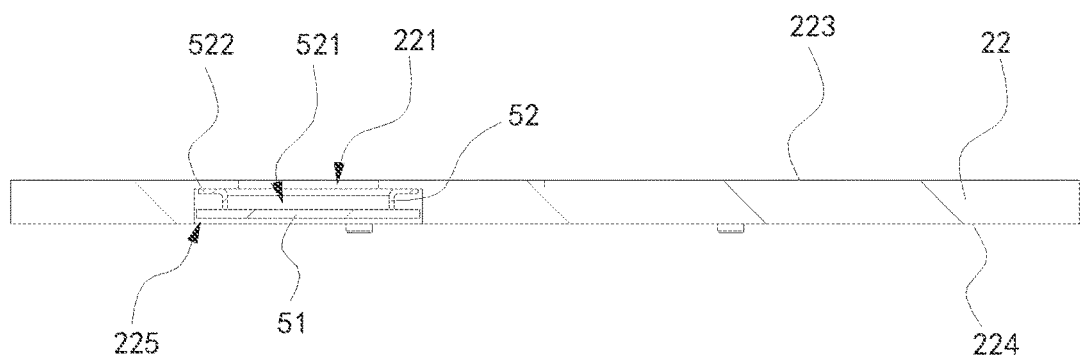
FIG. 13 is a sectional view of a pressure relief valve assembly and a first yoke plate according to the eighth embodiment of the present disclosure.

As shown in FIG. 13, it is a sectional view of a pressure relief valve assembly and a first yoke plate according to the eighth embodiment of the present disclosure. The same portions between the eighth embodiment and the above embodiments will not be repeated here, but the difference therebetween lies in the shape of the transition part 52.

Specifically, one end of the transition part 52 is connected to the first yoke plate 22 through the flange 522, and the other end of the transition part 52 is connected to the valve plate 51.

Figure 14:
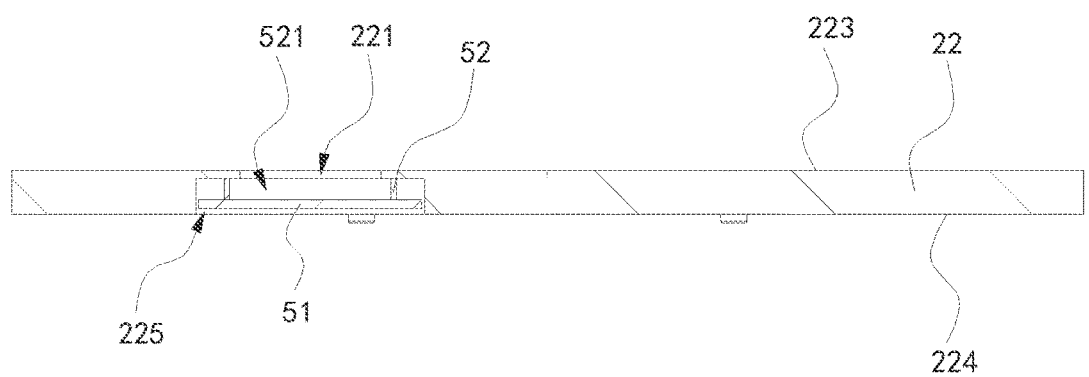
FIG. 14 is a sectional view of a pressure relief valve assembly and a first yoke plate according to the ninth embodiment of the present disclosure.

As shown in FIG. 14, it is a sectional view of a relief valve assembly and a first yoke plate according to the ninth embodiment of the present disclosure. The same portions between the ninth embodiment and the above embodiments will not be repeated here, but the difference thereof lies in the shape of the transition part 52.

Specifically, the transition part 52 has a straight tube structure without a flange. Two ends of the transition part 52 with a straight tube structure are respectively connected with the first yoke plate 22 and the valve plate 51.

It is worth mentioning that when the valve plate 51 and the first yoke plate 22 are separately arranged, the valve plate 51 may be arranged at the first side surface 223 of the first yoke plate 22 connected with the insulation cover 21 or at the second side surface 224 of the first yoke plate connected with the metal cover 23. When the valve plate 51 is arranged at the first side surface 223 of the first yoke plate 22, the first yoke plate 22 may provide a supporting force for the valve plate 51, and the gas pressure in the contact chamber may act on the first side surface 511 of the valve plate 51 to press the valve plate 51 against the first yoke plate 22. When the valve plate 51 is arranged at the second side surface 224 of the first yoke plate 22, as the first yoke plate 22 cannot provide a supporting force for the valve plate 51, there is a high requirement provided for the connection between the valve plate 51 and the first yoke plate 22.

Figure 15:
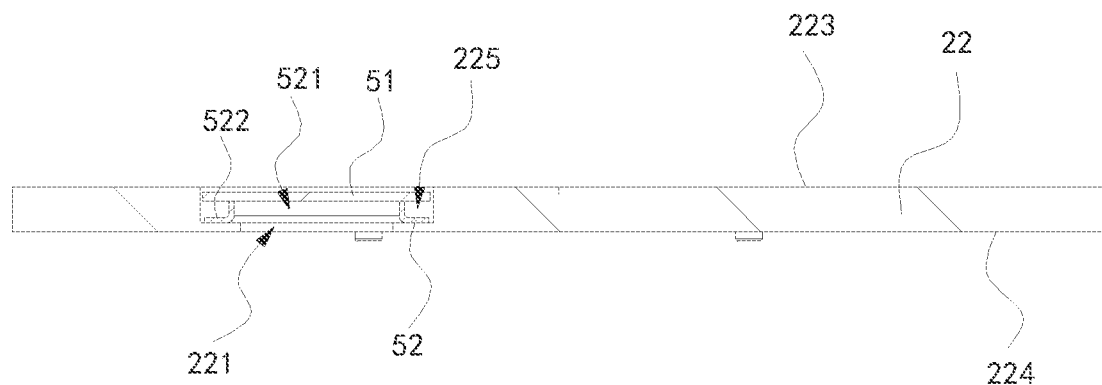
FIG. 15 is a sectional view of a pressure relief valve assembly and a first yoke plate according to the tenth embodiment of the present disclosure.

As shown in FIG. 15, it is a sectional view of a pressure relief valve assembly and a first yoke plate according to the tenth embodiment of the present disclosure. The same portions between the tenth embodiment and the above-mentioned fifth embodiment will not be repeated here, but the differences therebetween are as follows:

The sink 225 has a deeper depth, so that the first side surface 511 of the valve plate 51 is lower than the first side surface 223 of the first yoke plate 22 after the valve plate 51 is connected with the first yoke plate 22 through the transition part 52. That is, the valve plate 51 and the transition part 52 are completely accommodated in the sink 225.

Figure 16:
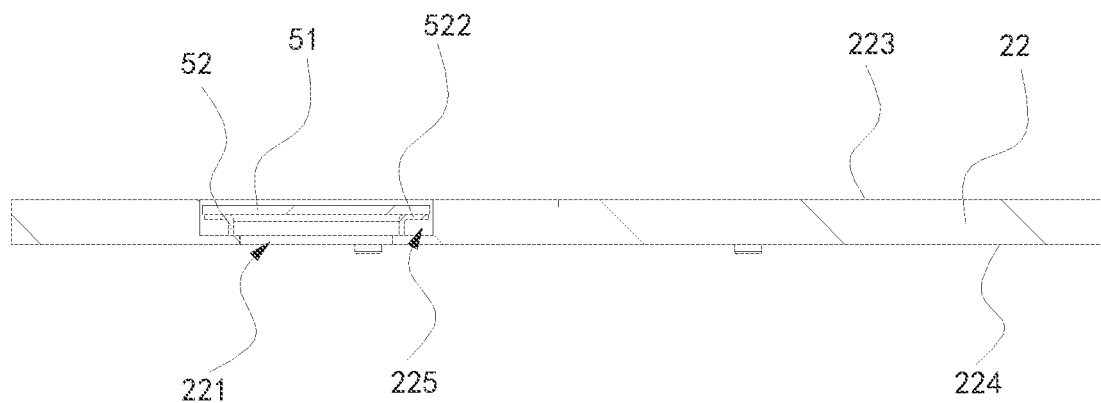
FIG. 16 is a sectional view of a pressure relief valve assembly and a first yoke plate according to the eleventh embodiment of the present disclosure.

As shown in FIG. 16, it is a sectional view of a pressure relief valve assembly and a first yoke plate according to the eleventh embodiment of the present disclosure. The same portions between the eleventh embodiment and the tenth embodiment will not be repeated here, but the difference therebetween is as follows:

One end of the transition part 52 is connected to the valve plate 51 through the flange 522, and the other end of the transition part 52 is connected to the first yoke plate 22.

Figure 17:
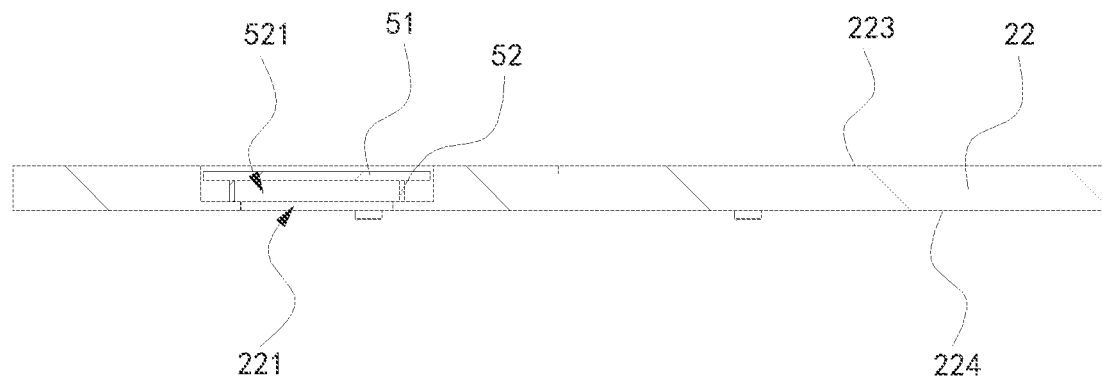
FIG. 17 is a sectional view of a pressure relief valve assembly and a first yoke plate according to the twelfth embodiment of the present disclosure.

As shown in FIG. 17, it is a sectional view of a pressure relief valve assembly and a first yoke plate according to the twelfth embodiment of the present disclosure. The same portions between the twelfth embodiment and the eleventh embodiment will not be repeated here, but the difference therebetween is as follows:

The transition part 52 has a straight tube structure without a flange. Two ends of the transition part 52 with the straight tube structure are respectively connected with the first yoke plate 22 and the valve plate 51.

Of course, it can be understood that in the seventh to twelfth embodiments as described above, the valve plate 51 may also be directly connected with the first yoke plate 22 without adopting the transition part 52.

Figure 18:
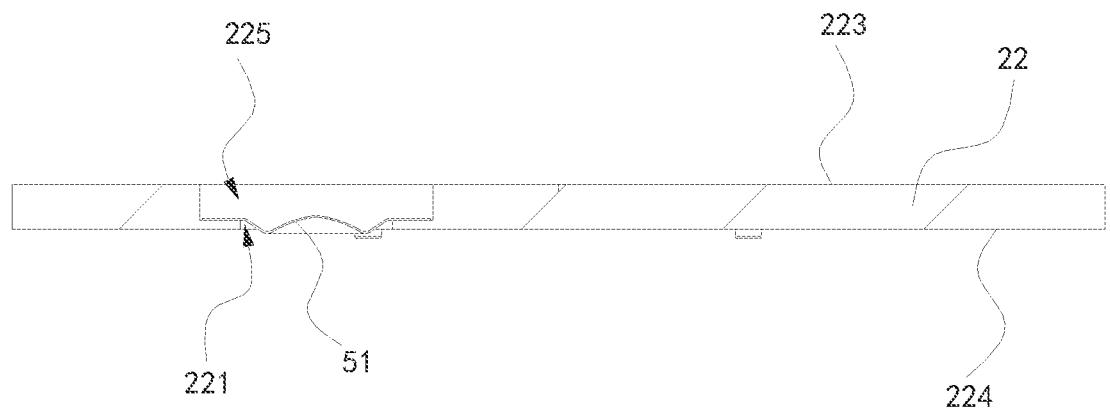
FIG. 18 is a sectional view of a pressure relief valve assembly and a first yoke plate according to the thirteenth embodiment of the present disclosure.

As shown in FIG. 18, it is a sectional view of a pressure relief valve assembly and a first yoke plate according to the thirteenth embodiment of the present disclosure. The same portions between the thirteenth embodiment and the above embodiments will not be repeated here, but the difference therebetween is that the two sides of the valve plate 51 are not plan, for example, they may be in a wavy or curved shape.

The valve plate 51 may be connected to the first yoke plate 22 through the transition part 52 or may be directly connected to the first yoke plate 22.

Figure 19:
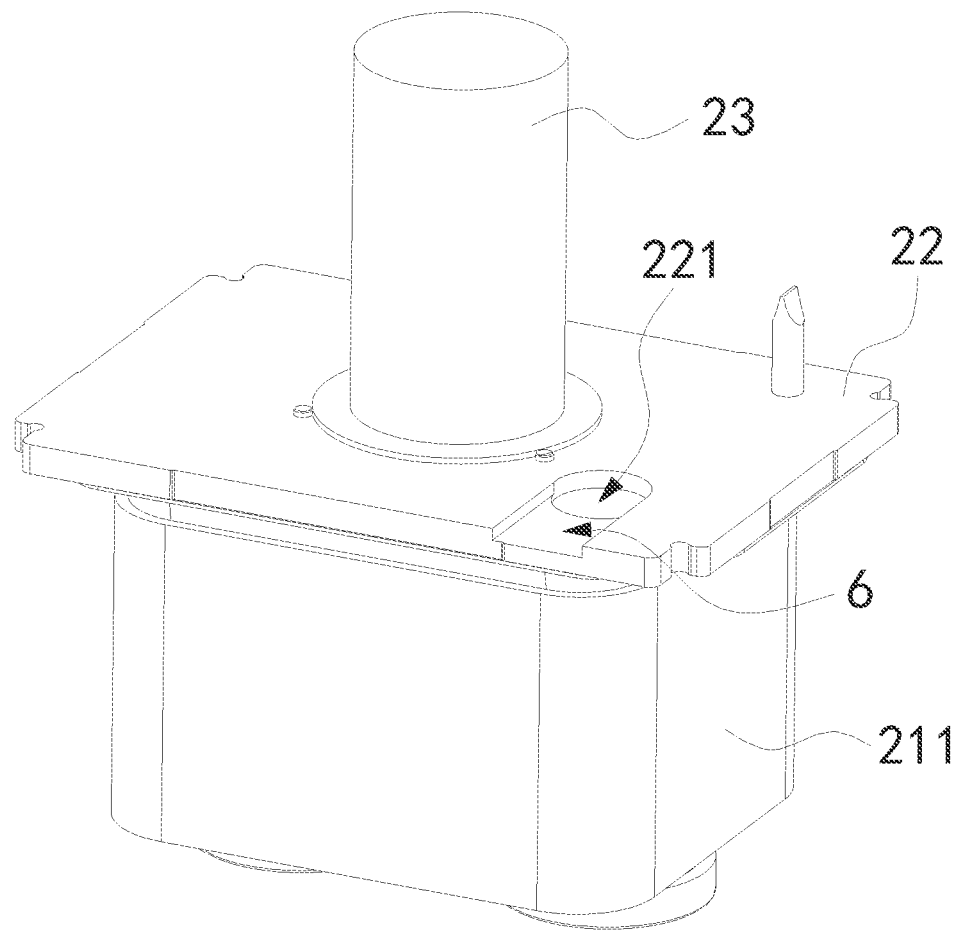
FIG. 19 is a schematic view showing that an exhaust passage according to an embodiment of the present disclosure is arranged on the first yoke plate.

As shown in FIG. 3 and FIG. 19, FIG. 3 shows a schematic view that an exhaust passage 6 according to the embodiment of the present disclosure is arranged on the bobbin 411, and FIG. 19 shows a schematic view that the exhaust passage 6 according to the embodiment of the present disclosure is arranged on the first yoke plate 22. The exhaust passage 6 is arranged between the driving assembly 4 and the first yoke plate 22, is communicated with the pressure relief hole 221 and the hollow chamber 14.

The exhaust passage 6 may have a function of acceleration of discharging the gas. In the abnormal working state, the gas in the contact chamber 27 may be quickly discharged through the pressure relief hole 221 and the exhaust passage 6, so that the gas pressure in the contact chamber 27 can be reduced within a minimum time to avoid the explosion.

In one embodiment, an air flow direction of the exhaust passage 6 is perpendicular to an axis of the pressure relief hole 221. In this way, the gas discharged from the pressure relief hole 221 may be directly injected to the inner wall face of the exhaust passage 6, thereby gradually reducing the gas pressure and preventing the shell 1 from being damaged by the excessive gas pressure.

The exhaust passage 6 is formed between the first yoke plate 22 and the bobbin 411. Specifically, the exhaust passage 6 may be formed between the first yoke plate 22 and the first flange part 4111.

It can be understood that the exhaust passage 6 may be arranged on the first yoke plate 22 and/or the bobbin 411. For example, as shown in FIG. 19, the exhaust passage 6 is arranged at a side of the first yoke plate 22 facing the bobbin 411; alternatively, as shown in FIGS. 3 and 4, the exhaust passage 6 is arranged at a side of the first flange part 4111 facing the first yoke plate 22; alternatively, the exhaust passage 6 is arranged at a side of the first yoke plate 22 facing the bobbin 411, and the exhaust passage 6 is arranged at a side of the first flange part 4111 facing the first yoke plate 22.

Figure 20:
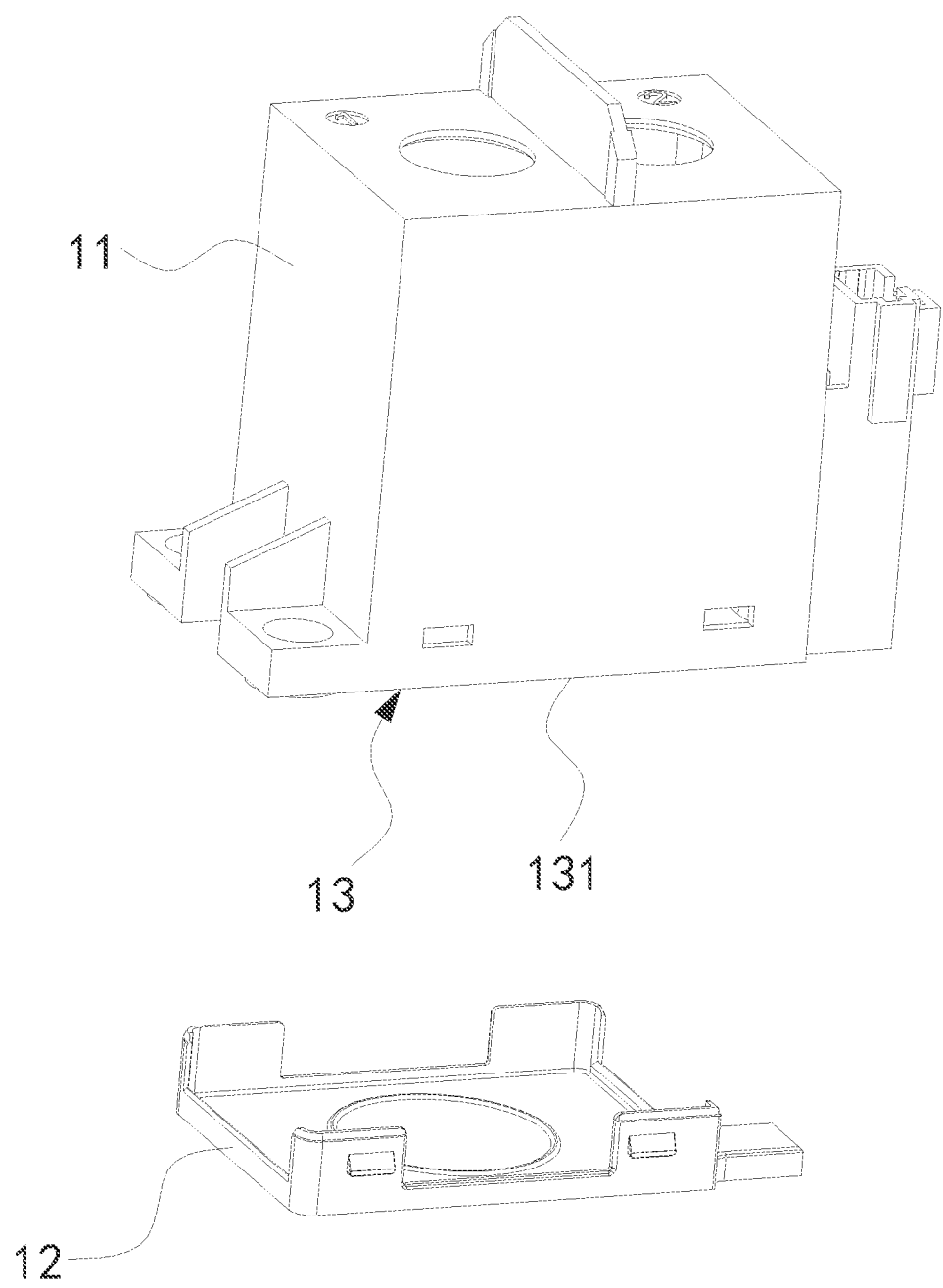
FIG. 20 is an exploded schematic view of a first embodiment of a shell of the present disclosure.

As shown in FIG. 20, it is an exploded schematic view of the first embodiment of the shell 1 of the present disclosure. The shell 1 according to the embodiment of the present disclosure includes a first housing 11 and a second housing 12, and the second housing 12 is detachably connected with the first housing 11; the first housing 11 and/or the second housing 12 are provided with an exhaust structure 13 that is communicated with the hollow chamber 14.

The exhaust structure 13 is configured such that the shell 1 according to the embodiment of the present disclosure is an unsealed structure, in which the gas may be discharged from the inside of the contact chamber 27 through the pressure relief hole 221, and then enter the hollow chamber 14 of the shell 1, and finally discharged to the outside of the shell 1 through the exhaust structure 13.

In addition, the shell 1 according to the embodiment of the present disclosure may also prevent the gas spatter generated in the contact chamber 27 from being directly discharged to the outside of the relay at the moment of being exhausted, so as to avoid polluting other electronic devices in the vicinity of the relay. The gas spatter is generated by the metal materials of the contact assembly 3 being ablated and volatilized at a high temperature by burning the arc.

Referring to FIG. 20, the exhaust structure 13 includes a gap 131 formed between the first housing 11 and the second housing 12. The gas is discharged from the relay through the gap 131 between the first housing 11 and the second housing 12.

In this embodiment, the gap 131 is located at the bottom of the shell 1.

Figure 21:
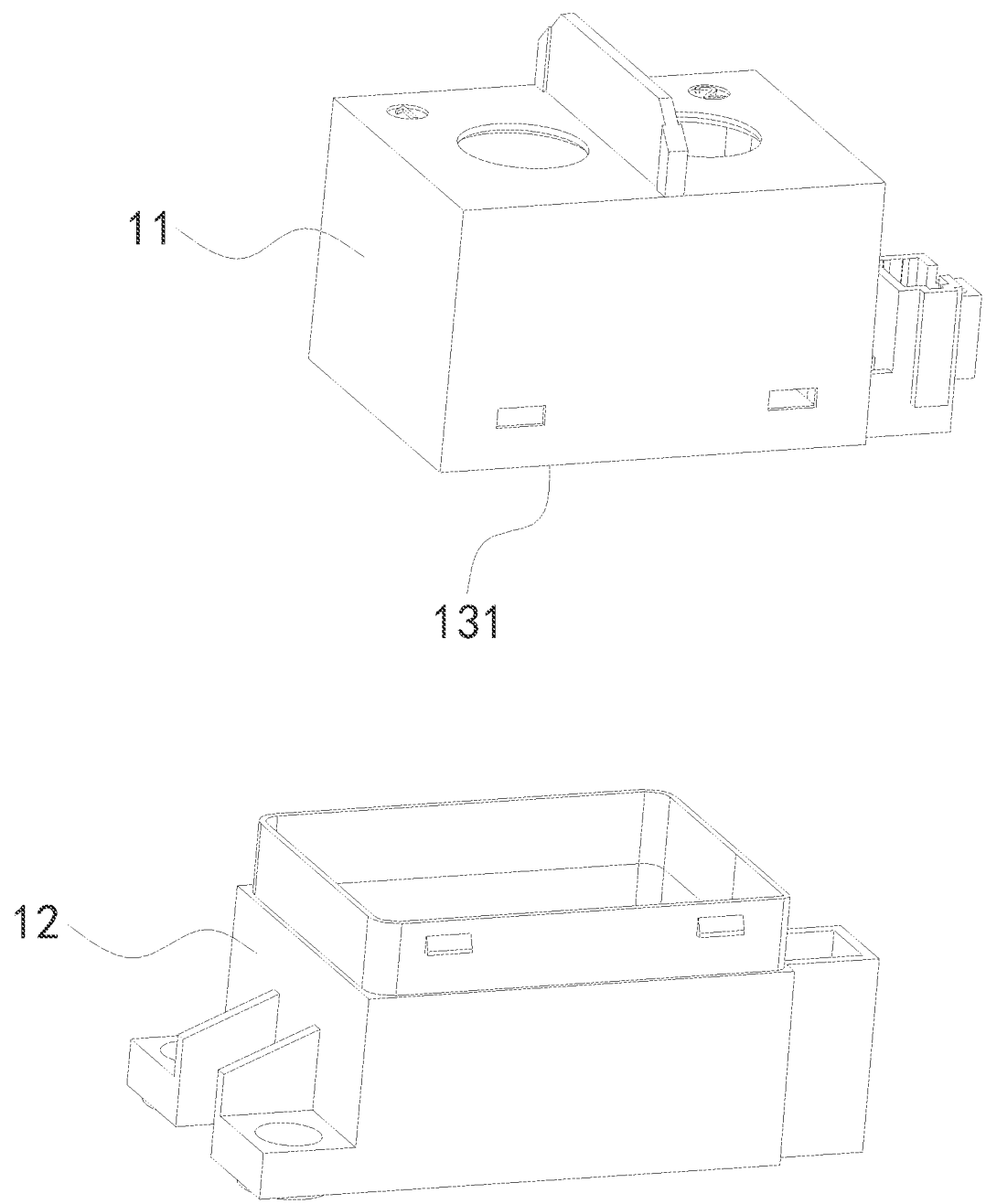
FIG. 21 is an exploded schematic view of a second embodiment of the shell of the present disclosure.

As shown in FIG. 21, it shows an exploded schematic view of the second embodiment of the shell 1 of the present disclosure. The same portions between the shell 1 of the second embodiment and the shell 1 of the first embodiment will not be repeated here, but the difference thereof is that the gap 131 is located in a middle area of the shell 1 in a height direction.

Figure 22:
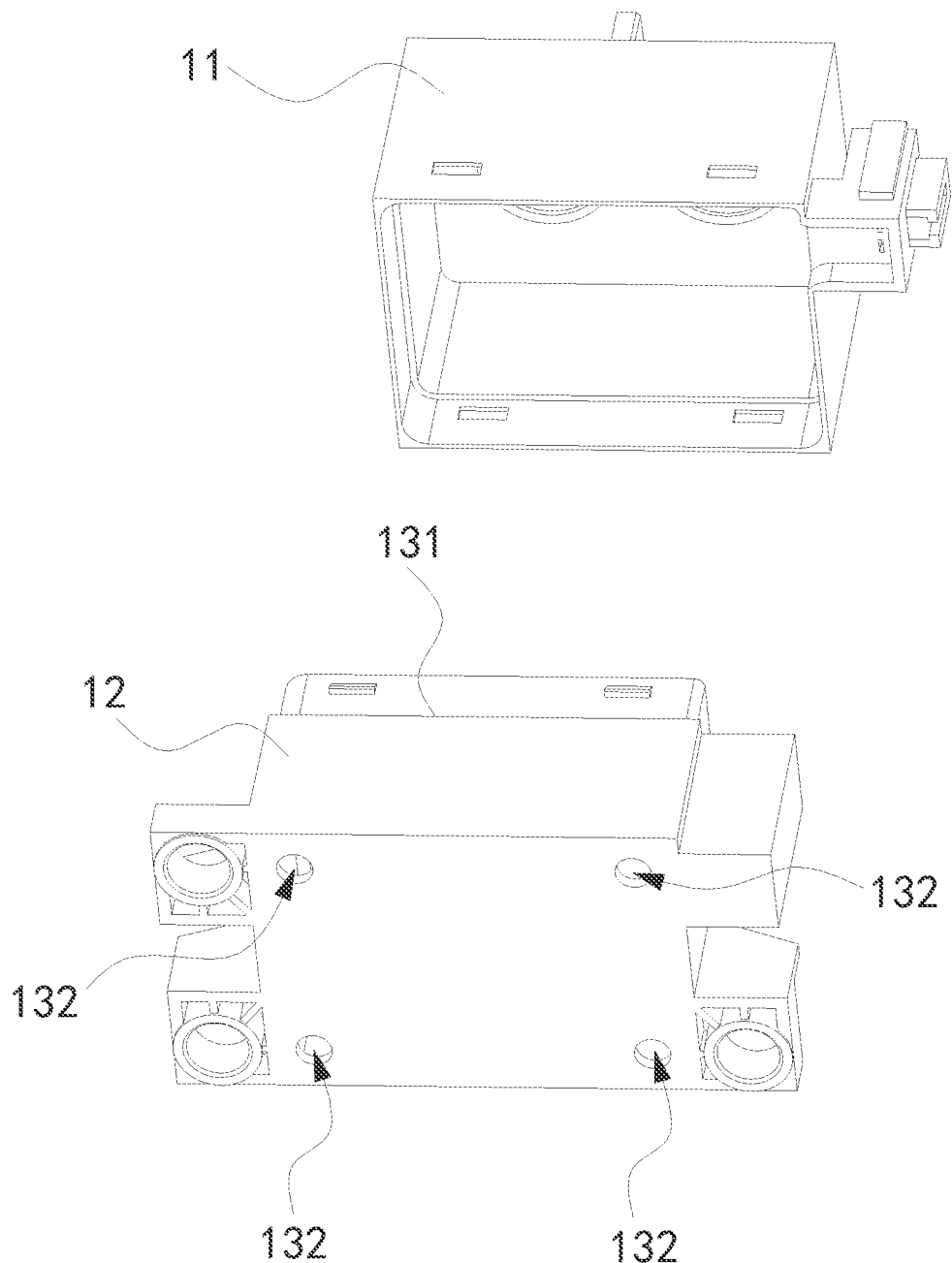
FIG. 22 is an exploded schematic view of a third embodiment of the shell of the present disclosure.

As shown in FIG. 22, it shows an exploded schematic view of a third embodiment of the shell 1 of the present disclosure. The same portions between the shell 1 of the third embodiment and the shell 1 of the second embodiment will not be repeated, but the difference thereof is that the exhaust structure 13 includes a gap 131 and an exhaust hole 132, and the gap 131 is formed in the middle area of the shell 1 in the height direction, and the exhaust hole 132 is formed in the second housing 12. The gas may be discharged from the relay through the gap 131 and the exhaust hole 132. Of course, the exhaust hole 132 may also be arranged in the first housing 11.

Figure 23:
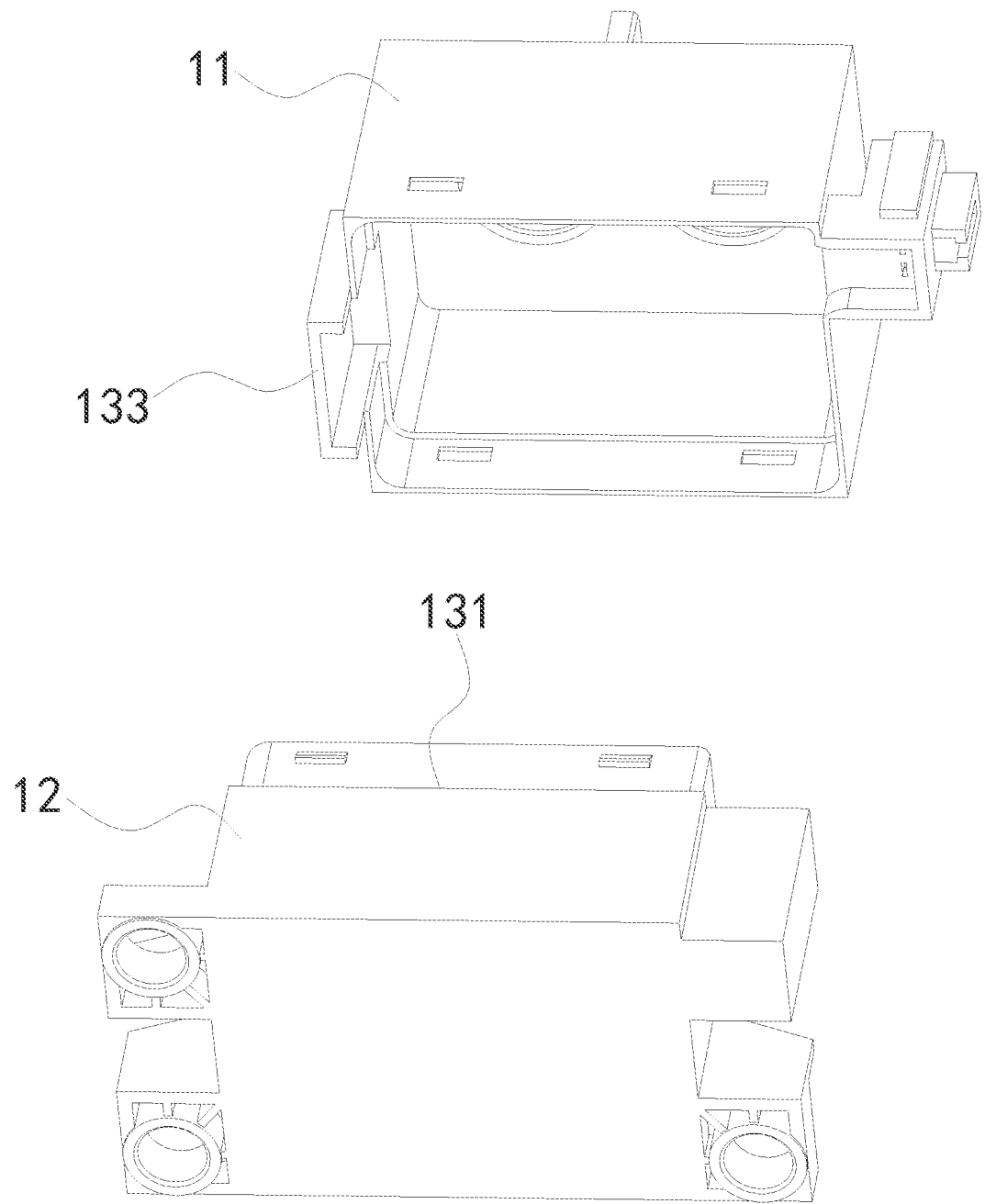
FIG. 23 is an exploded schematic view of a fourth embodiment of the shell of the present disclosure.

As shown in FIG. 23, it is an exploded schematic view of the fourth embodiment of the shell 1 of the present disclosure. The same portions between the shell 1 of the fourth embodiment and the shell 1 of the above-mentioned embodiments will not be repeated here, but the difference therebetween is that the exhaust structure 13 includes a gap 131 and an exhaust cover 133. The gap 131 is formed in the middle area of the shell 1 in the height direction, and the exhaust cover 133 is arranged on the first housing 11, and the opening of the exhaust cover 133 faces downward. In this way, the gas can be discharged from the relay through the gap 131 and the exhaust cover 133, and the gas discharged from the exhaust cover 133 is ejected downward without affecting other electronic devices in the vicinity of the relay.

Of course, the exhaust cover 133 may also be arranged on the second housing 12; alternatively, both the first housing 11 and the second housing 12 are provided with an exhaust cover 133.

Figure 24:
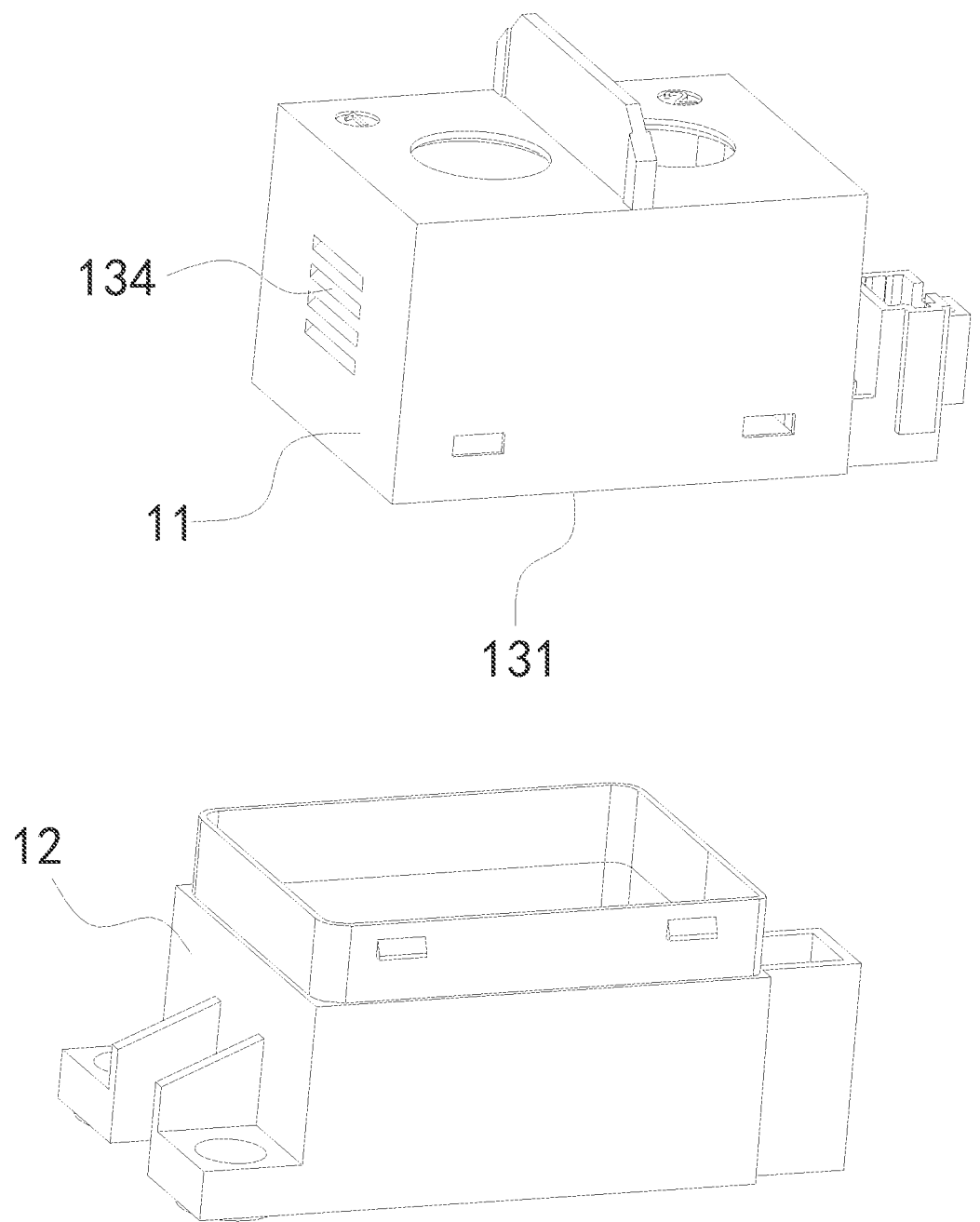
FIG. 24 is an exploded schematic view of a fifth embodiment of the shell of the present disclosure.

As shown in FIG. 24, it shows an exploded schematic view of a fifth embodiment of the shell 1 of the present disclosure. The same portions of the shell 1 of the fifth embodiment and the shell 1 of the above-mentioned embodiments will not be repeated here, but the difference thereof is that the exhaust structure 13 includes a gap 131 and an exhaust grid 134, and the gap 131 is formed in the middle area of the shell 1 in the height direction, and the exhaust grid 134 is arranged on the first housing 11. Of course, the exhaust grid 134 may also be arranged on the second housing 12, or both the first housing 11 and the second housing 12 are provided with the exhaust grid 134.

The gas may be discharged from the relay through the gap 131 and the exhaust grid 134. When the gas passes through the exhaust grid 134, the exhaust grid 134 can make the gas flow gentler, and prevent the discharged gas from affecting other electronic devices in the vicinity of the relay.

It can be understood that various embodiments/implementations provided by the present disclosure can be combined with each other without contradiction, and will not be exemplified here.

As above described, the relay according to the embodiment of the present disclosure at least include following advantages and beneficial effects.

According to the relay of the embodiment of the present disclosure, the pressure relief valve assembly 5 is arranged on the first yoke plate 22 to release overpressure gas, so as to ensure that the relay cannot explode and disintegrate the sealed cavity due to rapid expansion of the gas caused by the high temperature in the contact cavity 27 in the abnormal working states such as short circuit and overload breaking, and thereby increasing the reliability of the products.

Moreover, since the first yoke plate is in a flat plate shape, the pressure relief valve assembly is more easily molded on the first yoke plate. Furthermore, because the processing technology of the pressure relief valve assembly and the first yoke plate is simple, it is easy to control a sealing property of the connection between the first yoke plate and the pressure relief valve assembly, and to avoid a problem that the sealing property of the contact chamber is damaged due to the installation of the pressure relief valve assembly.

In addition, the shell 1 of the relay according to the embodiment of the present disclosure is designed to have a non-sealed structure, which can not only discharge the exhausted gas timely, but also prevent exhausted substances from polluting the other electronic devices.

Furthermore, referring to FIGS. 25-50, the embodiments of the present disclosure provide a sealed contact unit and an electrical component, which can improve safety, to solve a problem of easy explosion in the related art.

The sealed contact unit according to the embodiment of the present disclosure includes a sealed container, a contact assembly, and a pressure relief valve assembly. The sealed container includes a sealed chamber and a pressure relief hole that penetrates through a wall of the sealed container and is communicated with the sealed chamber. The contact assembly includes fixed contact parts and a movable contact part, and the movable contact part may be arranged in the sealed chamber and configured to be movable to contact with or separate from the fixed contact parts, such that the fixed contact parts and the movable contact part are electrically connected or disconnected. The pressure relief valve assembly is arranged on the wall of the sealed container to close the pressure relief hole when a gas pressure in the sealed container is less than a threshold and configured to be broken to open the pressure relief hole when the gas pressure in the sealed container is greater than or equal to the threshold.

According to some embodiments of the present disclosure, the pressure relief valve assembly includes a valve plate that is integrally arranged at the wall of the sealed container for closing or opening the pressure relief hole.

According to some embodiments of the present disclosure, the wall of the container has an inner wall face and an outer wall face, and the valve plate has a first side surface and a second side surface that are oppositely arranged.

The first side surface of the valve plate is connected with a wall of the pressure relief hole, and the second side surface of the valve plate is flush with the outer wall face.

According to some embodiments of the present disclosure, the pressure relief valve assembly includes a valve plate that is separately arranged from the wall of the container and arranged at the pressure relief hole for closing or opening the pressure relief hole.

According to some embodiments of the present disclosure, the wall of the container has an inner wall face and an outer wall face, and the valve plate is arranged on the inner wall face and/or the outer wall face.

According to some embodiments of the present disclosure, the pressure relief valve assembly further includes a transition part, through which the valve plate is connected to the wall of the container.

According to some embodiments of the present disclosure, the pressure relief valve assembly further includes a protective cover which is connected to the wall of the container and is arranged at an outer surface of the valve plate; and the protective cover is provided with a vent hole.

According to some embodiments of the present disclosure, a structural strength of the pressure relief valve assembly is less than a structural strength of the sealed container.

An electrical component according to an embodiment of the present disclosure includes the sealed contact unit as above described.

According to some embodiments of the present disclosure, the electrical component further includes a shell with a hollow chamber;

the sealed container of the sealed contact unit and the pressure relief valve assembly are all located in the hollow chamber.

According to some embodiments of the present disclosure, the shell includes:

a first housing; and a second housing detachably connected with the first housing, wherein the first housing and/or the second housing are provided with an exhaust structure, and the exhaust structure is communicated with the hollow chamber.

According to some embodiments of the present disclosure, the exhaust structure includes a gap formed between the first housing and the second housing.

According to some embodiments of the present disclosure, the exhaust structure includes an exhaust hole and/or an exhaust cover and/or an exhaust grid.

According to some embodiments of the present disclosure, the hollow chamber is communicated with an outside of the housing.

According to some embodiments of the present disclosure, the electrical component is a relay.

According to some embodiments of the present invention, the sealed container of the sealed contact unit includes:
- a first yoke plate that includes a first side surface and a second side surface oppositely arranged and a through hole that penetrates through the first side surface and the second side surface;
- an insulation cover connected to the first side surface and covering the through hole; and
- a metal cover connected to the second side surface and covering the through hole;
- wherein the insulation cover and/or the metal cover is provided with a pressure relief hole.

According to some embodiments of the present disclosure, the pressure relief valve assembly is arranged on the insulation cover, and the insulation cover includes:
- a ceramic cover, on which the fixed contact part is arranged; and
- a connector, one end of which is connected with an opening edge of the ceramic cover, and the other end of which is connected with the first side surface;
- wherein the ceramic cover and/or the connector is provided with a pressure relief hole.

According to some embodiments of the present disclosure, the ceramic cover includes:
- a top wall on which the fixed contact part is arranged;
- a first side wall, one end of which is connected to an edge of the top wall, and the other end of which extends to a direction of the first yoke plate, and which is connected with the connector;
- wherein the top wall and/or the first side wall is provided with the pressure relief hole.

According to some embodiments of the present disclosure, the pressure relief valve assembly is arranged on the metal cover. The metal cover includes:
- a bottom wall; and
- a second side wall, one end of which is connected to an edge of the bottom wall, and the other end of which extends to a direction of the first yoke plate, and which is connected with the second side surface;
- the pressure relief hole is arranged on the bottom wall.

One of the above embodiments of the present disclosure has at least the following advantages or beneficial effects:

In the sealed contact unit according to the embodiment of the present disclosure, the pressure relief valve assembly is arranged on the sealed container to release overpressure gas, so as to ensure that the sealed contact unit cannot explode and disintegrate the chamber due to the rapid expansion of the gas caused by a high temperature in the chamber in the abnormal working states such as short circuit and overload breaking, and thus the reliability of the products can be increased.

In addition, the shell of the electrical component according to the embodiment of the present disclosure is designed to have a non-sealed structure, which can release the discharged gas timely, but also prevent the discharged substances from polluting the other electronic devices.

As described in the background, there is a security risk that the contact sealed cavity is prone to explode when the contact system of the relay in the related art is at a moment of large current short circuit or overload break. In the research, an inventor of the present disclosure found that an intense arcing of the contact in the sealed cavity high temperature occurs such that a high temperature is generated instantly in the sealed cavity, and then gas pressure in the sealed cavity of the contact suddenly rises, and once the gas pressure intensity in the sealed cavity of the contact is greater than a strength of the components or the strength at a joint of the sealed cavity of the contact, the sealed cavity of the contact of the relay can easily explode.

The sealed contact unit according to the embodiment of the present disclosure includes a sealed container, a contact assembly, and a pressure relief valve assembly. The sealed container includes a sealed chamber and a pressure relief hole that penetrates through a wall of the sealed container and is communicated with the sealed chamber. The contact assembly includes fixed contact parts and a movable contact part, and the movable contact part may be arranged in the sealed chamber and configured to be movable to contact with or separate from the fixed contact part, such that the fixed contact parts and the movable contact part are electrically connected or disconnected. The pressure relief valve assembly is arranged on the wall of the sealed container to close the pressure relief hole when a gas pressure in the sealed container is less than a threshold and configured to be broken to open the pressure relief hole when the gas pressure in the sealed container is greater than or equal to the threshold.

It should be noted that the sealed contact unit of the present disclosure may be applied to electrical components, such as but not limited to relays, contactors, vacuum interrupters and the like, capable of implementing the contact or separation of the contacts. For the convenience of explanation, the description will be made as an example that the electrical component is the relay, but it should not be limited thereto.

Figure 25:
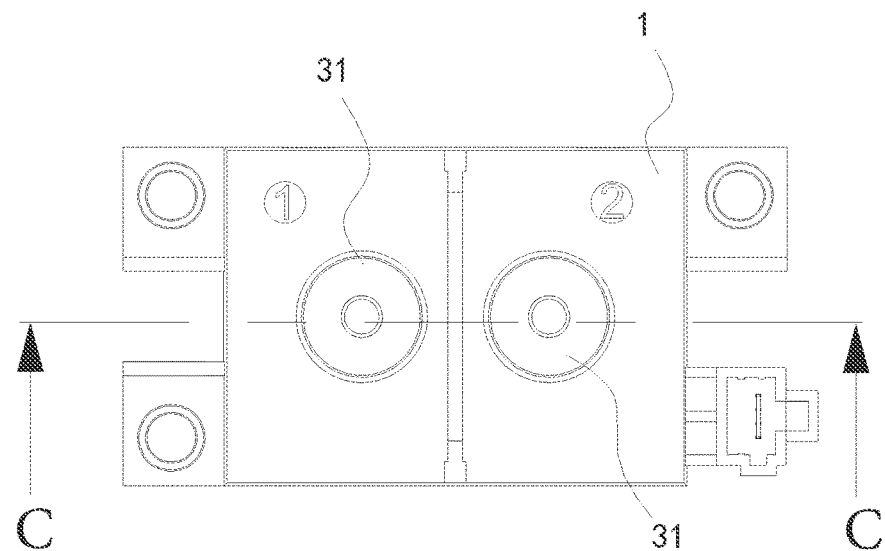
FIG. 25 shows a top view of a relay according to an embodiment of the present disclosure.
Figure 26:
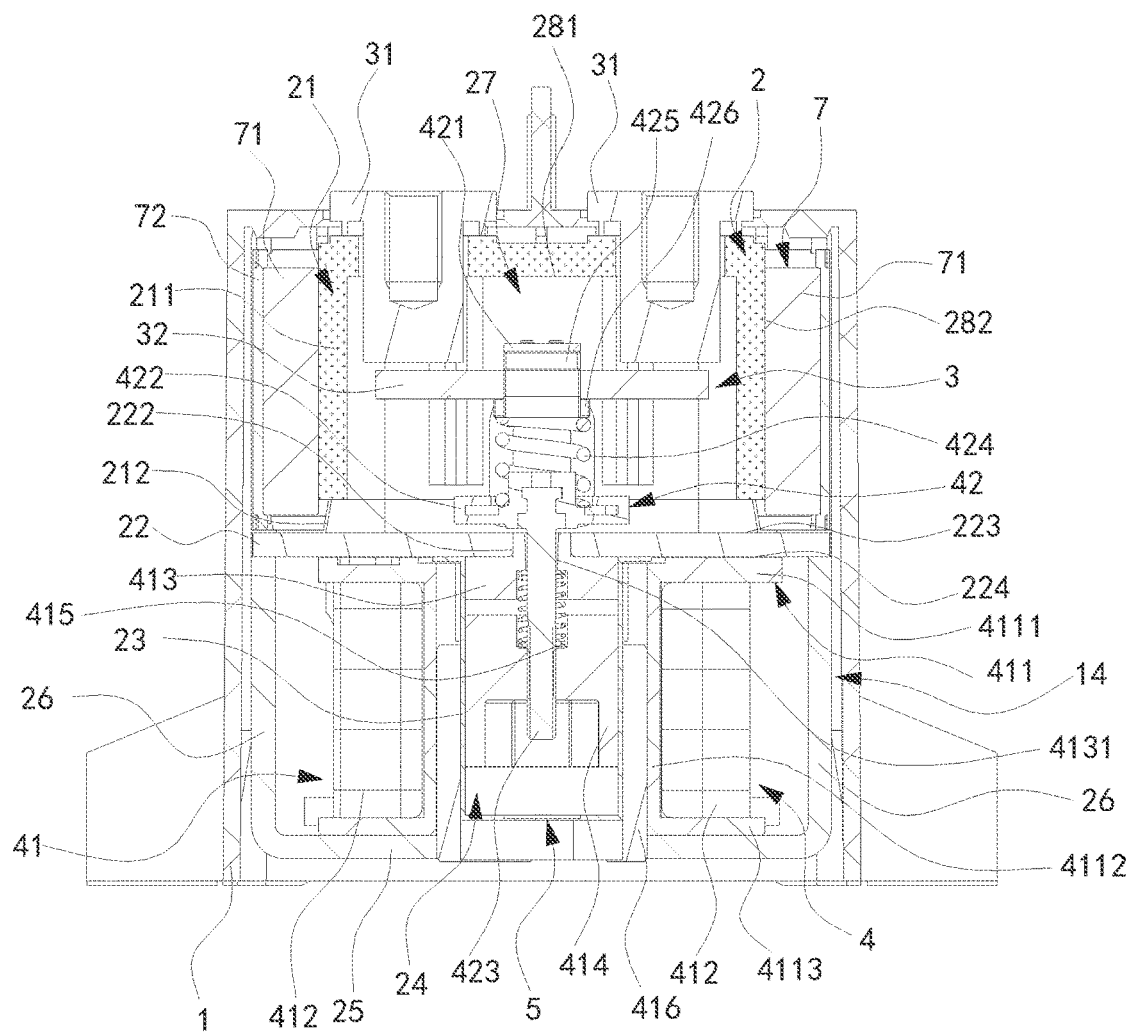
FIG. 26 shows a sectional view taken along line C-C in FIG. 25.

As shown in FIGS. 25 and 26, FIG. 25 shows a top view of a relay according to an embodiment of the present disclosure. FIG. 26 shows a sectional view taken along a line C-C in FIG. 25.

The relay according to the embodiment of the present disclosure includes a shell 1, a sealed container 2, a contact assembly 3, a driving assembly 4 and a pressure relief valve assembly 5. The shell 1 has a hollow chamber 14 which communicates with an outside of the shell 1. The sealed container 2 is arranged in the hollow chamber 14. The sealed container 2 has a sealed chamber and a pressure relief hole 221 which penetrates through a wall of the sealed container 2, and communicates with the hollow chamber 14 and the sealed chamber. The contact assembly 3 includes fixed contact parts 31 and a movable contact part 32. The fixed contact parts 31 are arranged on the wall of the container. Each of the fixed contact parts 31 has one end extending into the sealed chamber, and the other end exposed to an outer surface of the shell 1, and the movable contact part 32 is arranged in the sealed chamber. The driving assembly 4 is arranged in the hollow chamber 14, and is connected with the movable contact part 32 for driving the movable contact part 32 move, so that both ends of the movable contact part 32 are respectively contacted with or separated from the fixed contact part 31. The pressure relief valve assembly 5 is arranged on the wall of the sealed container 2 to close the pressure relief hole 221 when a gas pressure in the sealed chamber is less than a threshold, and the pressure relief valve assembly is broken to open the pressure relief hole 221 when the gas pressure in the sealed chamber is greater than or equal to a threshold. A structural strength of the pressure relief valve assembly 5 is less than that of the sealed container 2; in a normal working state, a maximum value of the gas pressure intensity in the sealed chamber is less than a structural strength of the pressure relief valve assembly 5; in an abnormal working state, a maximum value of the gas pressure intensity in the sealed chamber is greater than a structural strength of the pressure relief valve assembly 5. It can be understood that when the pressure relief valve assembly 5 closes the pressure relief hole 221, the airtightness of the sealed chamber can be maintained and the normal operation of the relay can be ensured.

In the relay according to the embodiment of the present disclosure, a pressure relief valve assembly 5 is arranged on the wall of the sealed container 2 to close or open the pressure relief hole 221. When the contact assembly 3 is in a normal working state, a gas pressure intensity in the sealed chamber is less than the threshold, so that the pressure relief valve assembly 5 is not broken by the gas pressure in the sealed chamber, and is maintained in a state which the pressure relief hole 221 is closed such that the sealed chamber can still be sealed. When the contact assembly 3 is in the abnormal working state, the gas pressure intensity in the sealed chamber is greater than or equal to the threshold, so that the pressure relief valve assembly 5 is broken by the gas pressure in the sealed chamber, and thus the sealed chamber is communicated with the hollow chamber 14 of the shell 1 through the pressure relief hole 221, and then the gas pressure in the sealed chamber can be released to the hollow chamber 14 through the pressure relief hole 221, and finally released to the outside of the shell 1. That is to say, in the abnormal working state, during the process that the gas pressure intensity in the sealed chamber gradually rises, the gas pressure may first break through the pressure relief valve assembly 5, and then the rapidly increased gas pressure may be released through the pressure relief hole 221, so that the gas pressure in the sealed chamber cannot continue to rise, and cannot reach a structural strength of the sealed chamber, and thereby avoiding the explosion of the sealed chamber. In the normal working state, the gas pressure in the sealed chamber may not break through the pressure relief valve assembly 5, so the pressure relief valve assembly 5 can perform a function of sealing the pressure relief hole 221.

It could be understood that a term "normal working state" refers to that the current of the relay is under a rated working condition, and the term "abnormal working state" refers to that the contact assembly 3 is at a moment of a large current short circuit or at a moment of an overload breaking. In addition, the pressure as represented by the term "threshold" is slightly greater than the gas pressure intensity in the sealed container 2 when the relay is in the normal working state. The threshold can also be adjusted according to different types of the relays, but cannot be greater than the structural strength of the sealed container 2.

That is to say, when the relay is in a normal working state, the pressure in the sealed container 2 cannot reach the threshold, so that the pressure relief valve assembly 5 cannot be broken. When the relay is in an abnormal working state, the pressure in the sealed container 2 is greater than or equal to the threshold, and the pressure relief valve assembly 5 is broken by the gas.

In one embodiment, the structural strength of the pressure relief valve assembly 5 is less than that of the sealed container 2. As such, when the relay is in an abnormal working state and the pressure of the gas in the sealed container 2 rises gradually, the pressure relief valve assembly 5 can be broken by the gas prior to the sealed container 2.

It can be understood that the structural strength of the pressure relief valve assembly 5 is less than that of the sealed container 2, which can be achieved by different materials and/or different structures. For example, when the pressure relief valve assembly 5 and the wall of the sealed container 2 have the same material, the thickness of the pressure relief valve assembly 5 may be designed to be thin and smaller than the wall of the sealed container 2, so that the gas with gradually rising temperature may preferentially break through the pressure relief valve assembly 5. Of course, in the case that the pressure relief valve assembly 5 and the wall of the sealed container 2 have the same thickness, the pressure relief valve assembly 5 may be made of ceramic, and the sealed container 2 may be made of metal, so that the pressure relief valve assembly 5 may be broken first. Alternatively, the pressure relief valve assembly 5 is thin and made of ceramic, and the wall of the sealed container 2 is thick and made of metal. Of course, it is possible that the structural strength of the pressure relief valve assembly 5 is less than that of the sealed container 2 in other suitable ways, which will not be listed here.

It can be understood that terms "include" and "have" in the embodiment of the present disclosure and any variations thereof are intended to be included non-exclusively. For example, process, method, system, product or equipment that includes a series of steps or units is not limited to the steps or units that have been listed, but optionally steps or units that are not listed are also included, or optionally other steps or components inherent to these processes, methods, products or equipment are also included.

It should be noted that the relay according to the embodiment of the present disclosure may not include the shell 1, but the sealed container 2, the contact assembly 3, the driving assembly 4 and the pressure relief valve assembly 5 are assembled and then directly installed in application products, such as battery packs and electrical control boxes.

Further referring to FIGS. 25 and 26, the contact assembly 3 includes two fixed contact parts 31 respectively for current inflow and current outflow, and one movable contact part 32. The movable contact part 32 may be in a straight piece shape. Both ends of the movable contact part 32 in the length direction may be in contact with the two fixed contact parts 31 respectively under the action of the driving assembly 4, such that the fixed contact parts 31 and the movable contact part 32 are electrically connected, and the disconnection occurs when the fixed contact parts 31 and the movable contact part 32 are separated. The bottoms of the fixed contact parts 31 serves as the stationary contacts, and both ends of the movable contact part 32 in the length direction may serve as the movable contacts. The movable contacts at both ends of the movable contact part 32 may protrude to the other portions of the movable contact part 32 or may be flush with the other portions.

It can be understood that the stationary contacts may be integrally or separately arranged at the bottom of the fixed contact parts 31, and the movable contact can be integrally or separately arranged at both ends of the movable contact part 32 in the length direction.

Two fixed contact parts 31 are arranged on the sealed container 2, for example, at the top of the sealed container 2. And, one end of each of the fixed contact parts 31 extends into the interior of the sealed chamber, and the other end thereof is exposed to the outer surface of the shell 1. One end of each of the fixed contact parts 31 extending into the interior of the sealed chamber is configured to contact with the movable contact part 32.

The relay also includes an arc extinguishing unit 7 that is arranged in the hollow chamber 14 of the shell 1, for extinguishing the arc of the contact assembly 3.

In this embodiment, the arc extinguishing unit 7 includes two arc-extinguishing magnets 71. The arc-extinguishing magnets 71 may be permanent magnets, and each of the arc-extinguishing magnets 71 may be a substantially rectangular shape. The two arc-extinguishing magnets 71 are respectively arranged on both sides of the sealed container 2 and are oppositely arranged along a length direction of the movable contact part 32.

As shown in FIG. 26, two arc-extinguishing magnets 71 are located on left and right sides of the sealed container 2. In this embodiment, polarities of the mutually facing surfaces of the two arc-extinguishing magnets 71 are opposite to one another. That is, a left face of the arc-extinguishing magnet 71 located on the left side of the sealed container 2 is S pole and the right face thereof is N pole, and a left face of the arc-extinguishing magnet 71 located on the right side of the sealed container 2 is S pole and the right face thereof is N pole.

Of course, the polarities of the mutually facing surfaces of the two arc-extinguishing magnets 71 may also be designed to be the same, for example, the left face of the arc-extinguishing magnet 71 located on the left side of the insulation cover 21 is S pole and the right face thereof is N pole, and the left face of the arc-extinguishing magnet 71 located on the right side of the insulation cover 21 is N pole and the right face thereof is S pole.

As such, the two arc-extinguishing magnets 71 opposite to each other are arranged such that a magnetic field may be formed around the contact assembly 3. Therefore, no matter which direction an arc generated between the fixed contact parts 31 and the movable contact part 32 faces toward, it may be elongated in a direction away from each other under the action of the magnetic field, thereby realizing the arc extinction.

The arc extinguishing unit 7 also includes two yoke clamps 72 arranged corresponding to the two arc-extinguishing magnets 71. Furthermore, the two yoke clamps 72 surround the sealed container 2 and two arc-extinguishing magnets 71. Through the design that the yoke clamp 72 surrounds the arc-extinguishing magnet 71, it may be avoided that the magnetic field generated by the arc-extinguishing magnet 71 spreads outward, and affects the arc-extinguishing effect. The yoke clamp 72 is made of a soft magnetic material that may include, but are not limited to, iron, cobalt, nickel, and alloys thereof.

The sealed container 2 includes a first yoke plate 22, an insulation cover 21 and a metal cover 23. The first yoke plate 22 is arranged in the hollow chamber 14 and includes a first side surface 223 and a second side surface 224 which are oppositely arranged, and a through hole 222 which penetrates through the first side surface 223 and the second side surface 224.

The insulation cover 21 is connected to the first side surface 223 and covers the through hole 222. The insulation cover 21 and the first yoke plate 22 enclose a contact chamber 27 which communicates with the through hole 222. The contact chamber is configured to accommodate the fixed contact parts 31 and the movable contact part 32.

The metal cover 23 is connected to the second side surface 224 and covers the through hole 222. The metal cover 23 and the first yoke plate 22 enclose a driving chamber 24 that is communicated with the through hole 222. The driving chamber 24 is configured to accommodate a static iron core 413 and a movable iron core 414, which will be described in detail below. The contact chamber 27 is communicated with the driving chamber 24 through the through hole 222, and the contact chamber 27 forms a sealed chamber together with the driving chamber 24.

The pressure relief valve assembly 5 may be arranged on the insulation cover 21, and arranged on the metal cover 23, alternatively both the insulation cover 21 and the metal cover 23 are provided with the pressure relief valve assembly 5.

The insulation cover 21 may include a ceramic cover 211 and a connector 212, and two fixed contact parts 31 are arranged on the ceramic cover 211. The ceramic cover 211 is connected with the first yoke plate 22 through the connector 212. Specifically, the connector 212 may have an annular structure. One end of the connector 212 is connected to an opening edge of the ceramic cover 211, for example, by laser welding, brazing, resistance welding, gluing, etc., and the other end of the connector 212 is connected to the first side surface 223 of the first yoke plate 22, by the same way of laser welding, brazing, resistance welding or gluing. A connector 212 is provided between the ceramic cover 211 and the first yoke plate 22, which can facilitate the connection between the ceramic cover 211 and the first yoke plate 22.

Further referring to FIG. 26, the driving assembly 4 includes an electromagnet unit 41 and a pushing unit 42. The electromagnet unit 41 is arranged on a side of the first yoke plate 22 facing away from the insulation cover 21. The pushing unit 42 is connected with the electromagnet unit 41 actuated. The pushing unit 42 is movably arranged in the driving chamber 24 and is connected with the movable contact part 32 through the through hole 222.

When the electromagnet unit 41 is powered on, it may drive the pushing unit 42 move, and then drive the movable contact part 32 move to contact with or separate from the fixed contact part 31.

The electromagnet unit 41 includes a bobbin 411, a coil 412, a static iron core 413 and a movable iron core 414. The bobbin 411 has a hollow cylindrical shape and is formed of an insulating material. The metal cover 23 is configured to be set inside the bobbin 411. The coil surrounds the bobbin 411. The static iron core 413 is fixedly arranged in the metal cover 23, and a portion of the static iron core 413 may protrude into the through hole 222. The static iron core 413 has a first perforation 4131 which is arranged corresponding to the through hole 222, and penetrated for the pushing unit 42. The movable iron core 414 is movably arranged in the metal cover 23 and opposite to the static iron core 413. The movable iron core 414 is connected with the pushing unit 42 to be attracted by the static iron core 413 when the coil is powered on. The movable iron core 414 and the pushing unit 42 may be connected by screwing, riveting, welding or other ways.

In this embodiment, the bobbin 411 is made of a resin material and includes a first flange part 4111, a hollow cylindrical part 4112 and a second flange part 4113. The first flange part 4111 and the second flange part 4113 are respectively arranged at both ends of the hollow cylindrical part 4112. An outer periphery of the hollow cylindrical part 4112 surrounds the coil 412. The metal cover 23 is set inside the hollow cylindrical part 4112.

The electromagnet unit 41 further includes a first elastic member 415. The first elastic member 415 is located inside the metal cover 23 and arranged between the static iron core 413 and the movable iron core 414, for resetting the movable iron core 414 when the coil is powered off. The first elastic member 415 may be a compression spring and sleeved outside the pushing unit 42.

The relay further includes a second yoke plate 25 and a pair of third yoke plates 26. The second yoke plate 25 is arranged opposite to the first yoke plate 22, and the bobbin 411 is interposed between the first yoke plate 22 and the second yoke plate 25, that is, the first yoke plate 22 is connected to the first flange part 4111 of the bobbin 411, and the second yoke plate 25 is connected to the second flange part 4113 of the bobbin 411.

The pair of third yoke plates 26 are respectively arranged at both ends of the second yoke plate 25 along a length direction of the movable contact part 32, and extend toward the first yoke plate 22, and are connected to both ends of the first yoke plate 22 along the length direction of the movable contact part 32.

As such, the first yoke plate 22, the second yoke plate 25 and the pair of third yoke plates 26 surround the coil 412.

It can be understood that the second yoke plate 25 and the pair of third yoke plates 26 may be an integral structure, for example, molded by bending them. The first yoke plate 22, the second yoke plate 25 and the pair of third yoke plates 26 which are integrally formed may be a separated structure.

The relay further includes a magnetic bush 416. The magnetic sleeve 416 may be made of a soft magnetic material which may include but not limited to iron, cobalt, nickel, and alloys thereof. The magnetic sleeve 416 is arranged in a gap formed between an inner circumferential surface of the lower end of the hollow cylindrical part 4112 of the bobbin 411 and an outer circumferential surface of the metal cover 23, so that the first yoke plate 22, the second yoke plate 25, the pair of third yoke plates 26, the static iron core 413, the movable iron core 414 and the magnetic sleeve 416 form a magnetic circuit together.

The pushing unit 42 includes a U-shaped bracket 421, a base 422, a fixed piece, a push rod 423, a second elastic member 424, a first magnet 425 and a second magnet 426. The first magnet 425 is fixedly connected with the U-shaped bracket 421, and the first magnet 425 is arranged on an inner side surface of the U-shaped bracket 421. The second magnet 426 is fixedly connected with the movable contact part 32. The base 422, the fixed piece and the upper part of the push rod 423 may be formed by integrated injection molding.

The bottom of the U-shaped bracket 421 is fixedly connected with the fixed piece. The U-shaped bracket 421 and the base 422 form a frame structure, and the movable contact part 32, the first magnet 425 and the second magnet 426 are installed in the frame structure surrounded by the U-shaped bracket 421 and the base 422. Moreover, the second elastic member 424 is also arranged in the frame structure surrounded by the U-shaped bracket 421 and the base 422. One end of the second elastic member 424 abuts against the base 422, and the other end of the second elastic member abuts against the movable contact part 32. The second elastic member 424 may provide an elastic force, such that the movable contact part 32 and the second magnetizer 426 have a trend far away from the base 422 and close to the first magnet 425. The push rod 423 passes through the through hole 222 of the first yoke plate 22 and the first perforation 4131 of the static iron core 413, and one end of the push rod 423 is fixedly connected with the base 422, and the other end of the push rod 423 is fixedly connected with the movable iron core 414.

It can be understood that the second elastic member 424 may be a compression spring. The first magnet 425 and the second magnet 426 may be made of soft magnetic materials, such as iron, cobalt, nickel, and alloys thereof.

When the push rod 423 does not move upward, a top face of the movable contact part 32 abuts against the first magnet 425 under the action of the second elastic member 424. When the coil 412 is energized to drive the push rod 423 to move upward, the two ends of the movable contact part 32 are respectively in contact with the two fixed contact parts 31. Subsequently, the push rod 423 continues to move upward, and the first magnet 425 also continues to move upward along with the push rod 423. However, the movable contact part 32 has been in contact with the two fixed contact parts 31, so that the movable contact part 32 may not continue to move upward for the over-travel of the contacts. Since the second elastic member provides an elastic force, and a certain gap is formed between the bottom face of the first magnet 425 and the top face of the movable contact part 32, so that there is a magnetic gap between the first magnet 425 and the second magnet 426.

Figure 27:
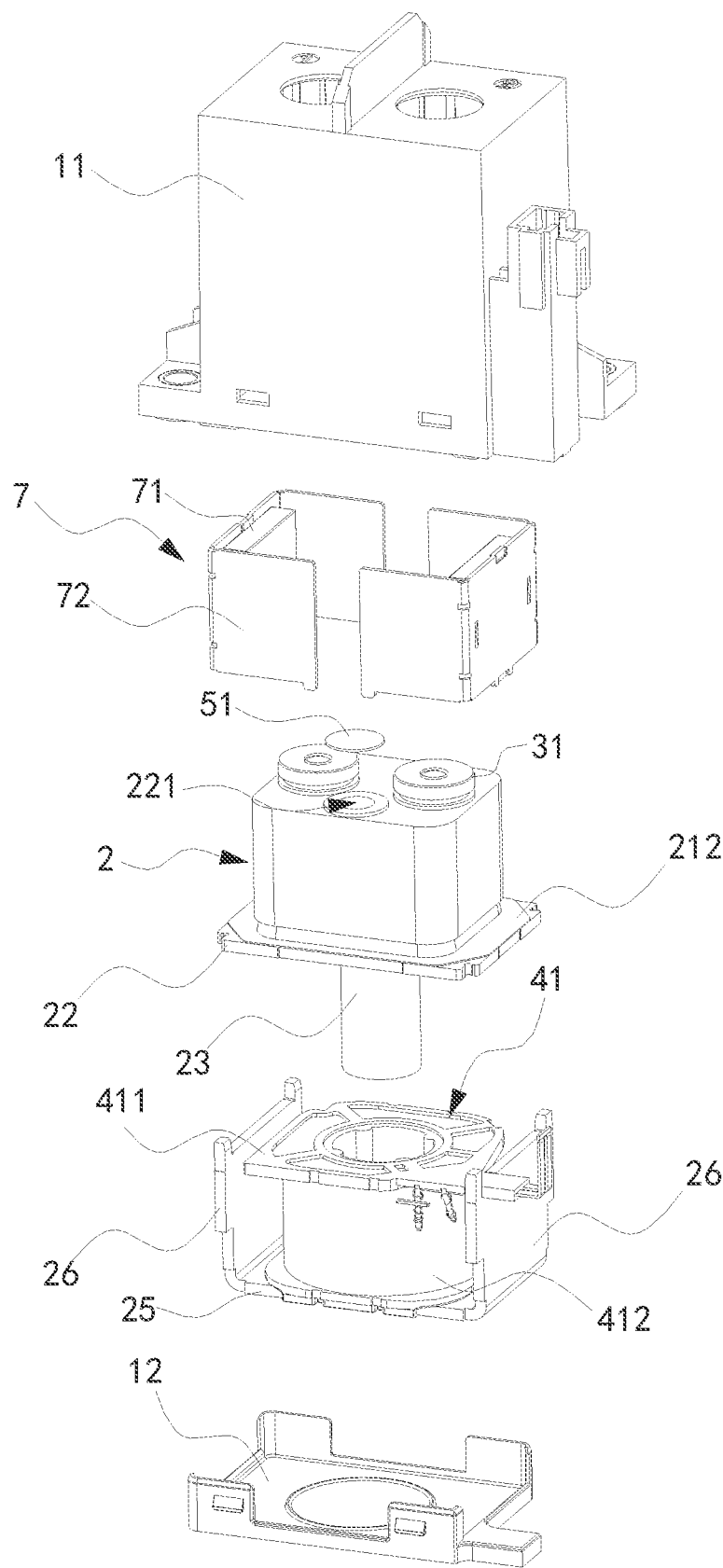
FIG. 27 is an exploded schematic view of the relay according to the embodiment of the present disclosure.

As shown in FIG. 27, it shows an exploded schematic view of a repay according to an embodiment of the present disclosure. In this embodiment, the pressure relief valve assembly 5 is arranged on the insulation cover 21. Specifically, the pressure relief valve assembly 5 is arranged on the ceramic cover 211.

In an embodiment, the pressure relief valve assembly 5 includes a valve plate 51. The valve plate 51 is separated from the sealed container 2 and is arranged on the wall of the container, for closing or opening the pressure relief hole 221. Specifically, the valve plate 51 is arranged on the ceramic cover 211.

A structural strength of the valve plate 51 is less than that of the sealed container 2. When the contact assembly 3 is in an abnormal working state, the gas whose pressure rises sharply can first break through the valve plate 51 and then discharged from the pressure relief hole 221 of the sealed chamber, so that the gas pressure in the sealed chamber cannot continue to rise, and thus protect the sealed chamber.

It can be understood that the valve plate 51 may be made of metallic materials or nonmetallic materials. The metal materials include, but are not limited to iron and nickel and their alloys, copper and its alloys, aluminum and its alloys, etc. The non-metallic materials include, but are not limited to ceramics, glass, and carbon fiber, etc.

Figure 28:
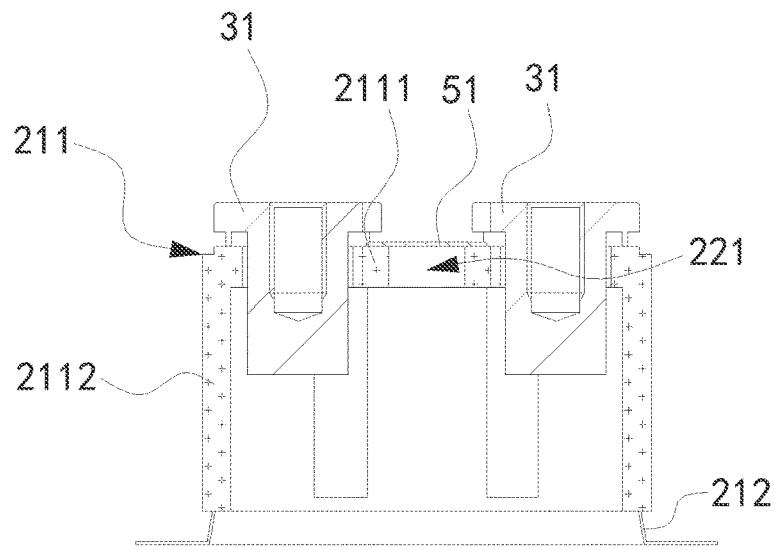
FIG. 28 is a sectional view of an insulation cover and a valve plate according to the first embodiment of the present disclosure after being assembled.

As shown in FIG. 28, it is a sectional view of an insulation cover 21 and a valve plate 51 according to the first embodiment of the present disclosure after being assembled. In this embodiment, the insulation cover 21 includes a ceramic cover 211 and a connector 212. The ceramic cover 211 includes a top wall 2111 and a first side wall 2112. The fixed contact part 31 is arranged on the top wall 2111, and the pressure relief hole 221 is arranged on the top wall 2111. One end of the first side wall 2112 is connected to an edge of the top wall 2111, and the other end of the first side wall 2112 extends toward a direction of the first yoke plate 22. And the first side wall is connected to the connector 212. The valve plate 51 is arranged on the top wall 2111 and covers the pressure relief hole 221.

It can be understood that the valve plate 51 may be arranged at an inner wall face of the ceramic cover 211, and arranged at an outer wall face of the ceramic cover 211.

It can be understood that the valve plate 51 may be connected with the first side wall 2112 of the ceramic cover 211 by laser welding, brazing, resistance welding, gluing, etc.

There is an advantage of arranging the valve plate 51 on the ceramic cover 211 in that the ceramic has characteristics of high strength and hardness, which provides a stable and reliable base for the valve plate 51, so that the valve plate 51 cannot be easily strained due to the deformation of the ceramic cover 211, to prevent the early failure of the valve plate 51.

Figure 29:
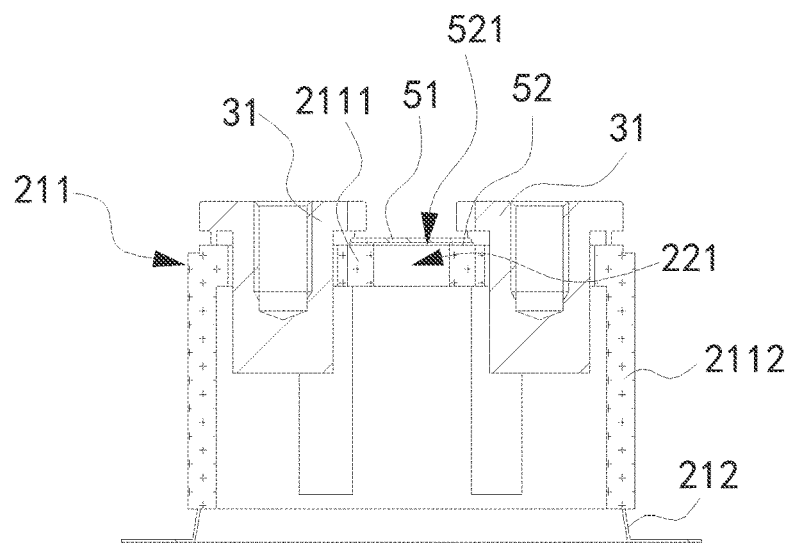
FIG. 29 is a sectional view of an insulation cover and a valve plate according to the second embodiment of the present disclosure after being assembled.

As shown in FIG. 29, it is a sectional view of an insulation cover 21 and a valve plate 51 according to the second embodiment of the present disclosure after being assembled. The same portions between the second embodiment and the above embodiments will not be repeated, but the difference therebetween is that the pressure relief valve assembly 5 further includes a transition part 52, and the valve plate 51 is connected to the ceramic cover 211 through the transition part 52.

In this embodiment, the transition part 52 may be a sheet.

The transition part 52 has a second perforation 521 provided in a thickness direction, and the second perforation 521 communicates with the pressure relief hole 221. The valve plate 51 is connected to the transition part 52 and covers the second perforation 521. In the normal working state, the valve plate 51 closes the second perforation 521 and the pressure relief hole 221, to maintain the sealed state of the contact chamber 27. In the abnormal working state, the valve plate 51 is broken by the gas, so that the contact chamber 27 communicates with the outside through the second perforation 521 and the pressure relief hole 221.

It can be understood that the valve plate 51 and the transition part 52 may be connected by laser welding, brazing, resistance welding, gluing, etc., and the transition part 52 and the ceramic cover 211 may be connected by laser welding, brazing, resistance welding, gluing, etc.

In this embodiment, both the valve plate 51 and the transition part 52 are arranged on the outer wall face of the ceramic cover 211. Of course, in other embodiments, the valve plate 51 and the transition part 52 may also be arranged at the inner wall face of the ceramic cover 211.

Figure 30:
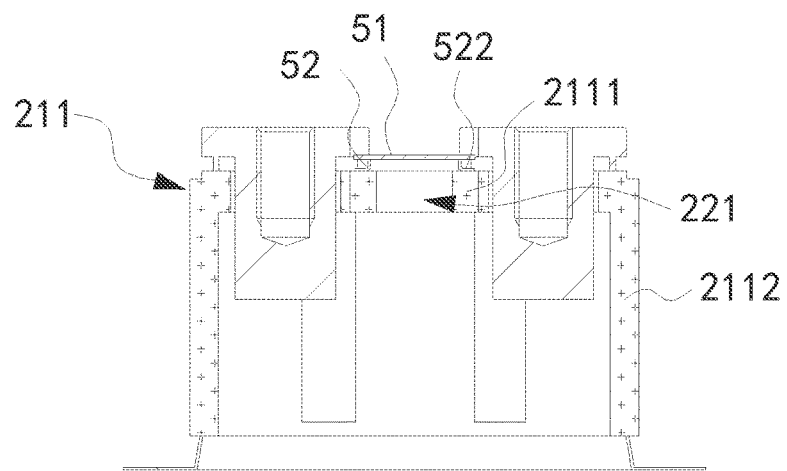
FIG. 30 is a sectional view of an insulation cover and a valve plate according to the third embodiment of the present disclosure after being assembled.
Figure 31:
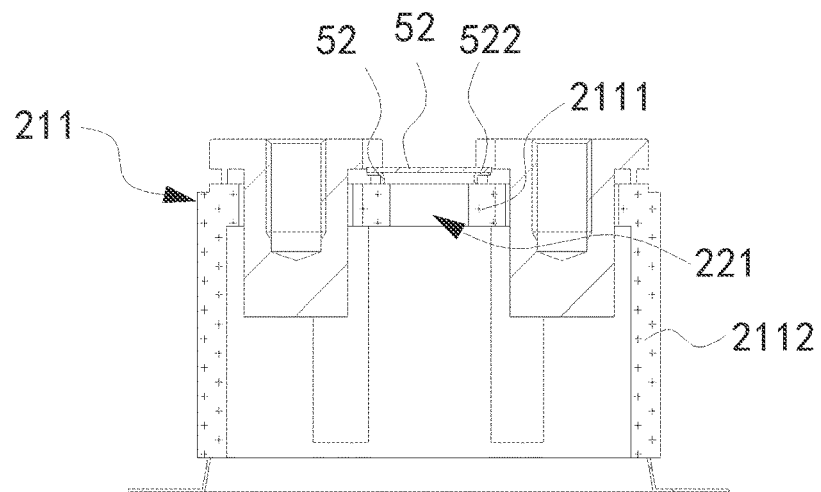
FIG. 31 is a sectional view of a relief valve assembly and a valve plate according to the fourth embodiment of the present disclosure after being assembled.
Figure 32:
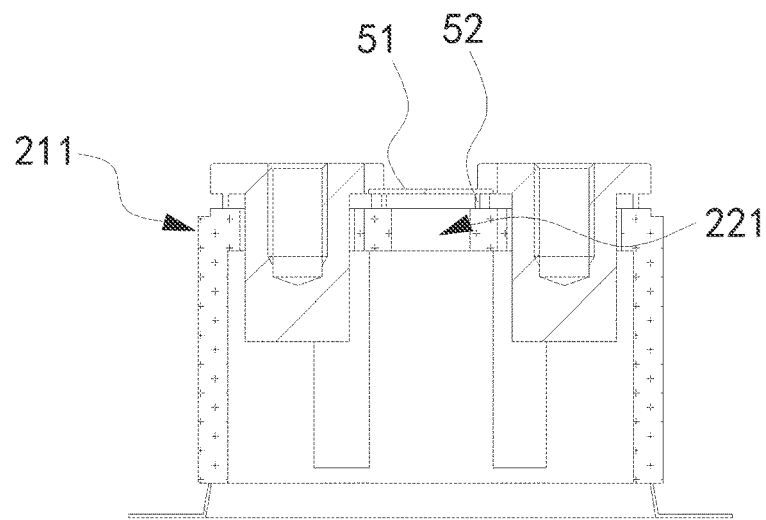
FIG. 32 is a sectional view of an insulation cover and a valve plate according to the fifth embodiment of the present disclosure after being assembled.

As shown in FIGS. 30 to 32, FIG. 30 shows a sectional view of an insulation cover 21 and a valve plate 51 according to the third embodiment of the present disclosure after being assembled. FIG. 31 shows a sectional view of an insulation cover 21 and a valve plate 51 according to the fourth embodiment of the present disclosure after being assembled. FIG. 32 shows a sectional view of an insulation cover 21 and a valve plate 51 according to the fifth embodiment of the present disclosure after being assembled.

The same portions between the third to fifth embodiments and the second embodiment will not be repeated, but the difference therebetween lies in the shape of the transition part 52.

Specifically, the transition part 52 of the third embodiment is generally tubular, for example cylindrical. One end of the transition part 52 is provided with a flange 522 which is protruding outward in a radial direction, and is connected with the first yoke plate 22 through the flange 522, the other end of the transition part 52 is connected with the valve plate 51.

The transition part 52 of the fourth embodiment is generally tubular, wherein one end of the transition part 52 is connected with the valve plate 51 through a flange 522, and the other end thereof is connected with the ceramic cover 211.

The transition part 52 of the fifth embodiment is tubular, for example, a straight tube structure, without flange. Both ends of the transition part 52 with a straight tube structure are respectively connected with the ceramic cover 211 and the valve plate 51.

Figure 33:
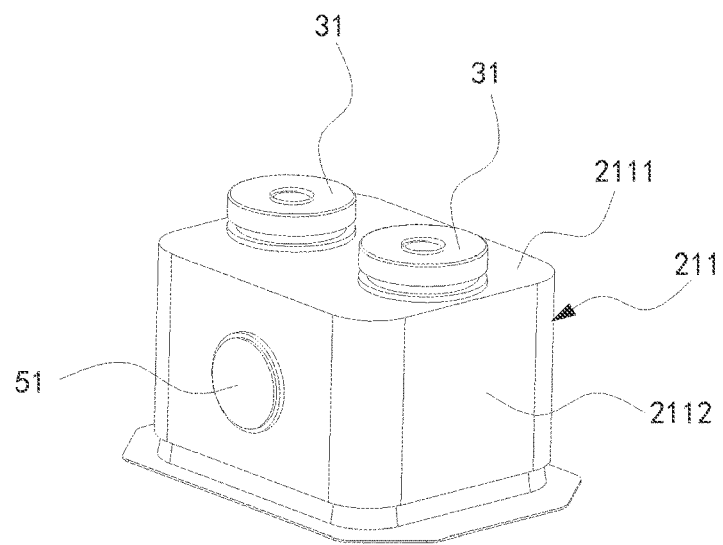
FIG. 33 is a perspective view of an insulation cover and a valve plate according to the sixth embodiment of the present disclosure after being assembled.
Figure 34:
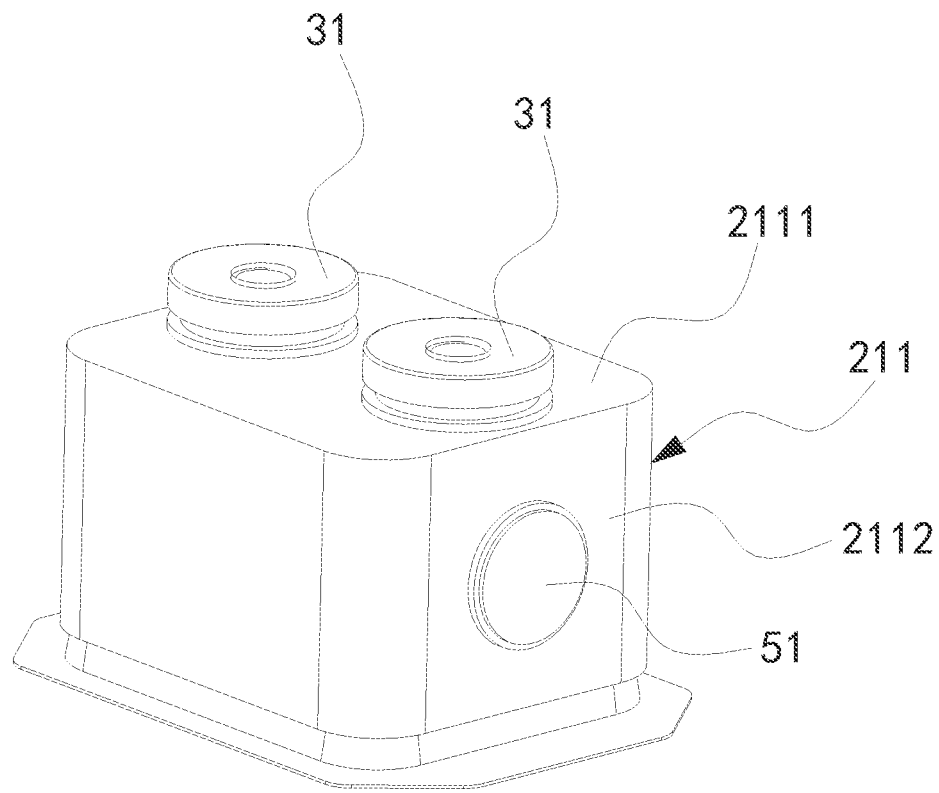
FIG. 34 is a perspective view of an insulation cover and a valve plate according to the seventh embodiment of the present disclosure after being assembled.

As shown in FIG. 33 and FIG. 34, FIG. 33 is a perspective view of an insulation cover 21 and a valve plate 51 according to the sixth embodiment of the present disclosure after being assembled. FIG. 34 is a perspective view of an insulation cover 21 and a valve plate 51 according to the seventh embodiment of the present disclosure after being assembled. The same portions between the sixth and seventh embodiments will not be repeated, but the difference therebetween is that the pressure relief valve assembly 5 is arranged on the first side wall 2112 of the ceramic cover 211.

In this embodiment, the first side wall 2112 of the ceramic cover 211 generally forms a rectangular structure. The pressure relief valve assembly 5 may be arranged on a long side of the rectangular structure (as shown in FIG. 33) and arranged on a wide side of the rectangular structure (as shown in FIG. 34).

Figure 35:
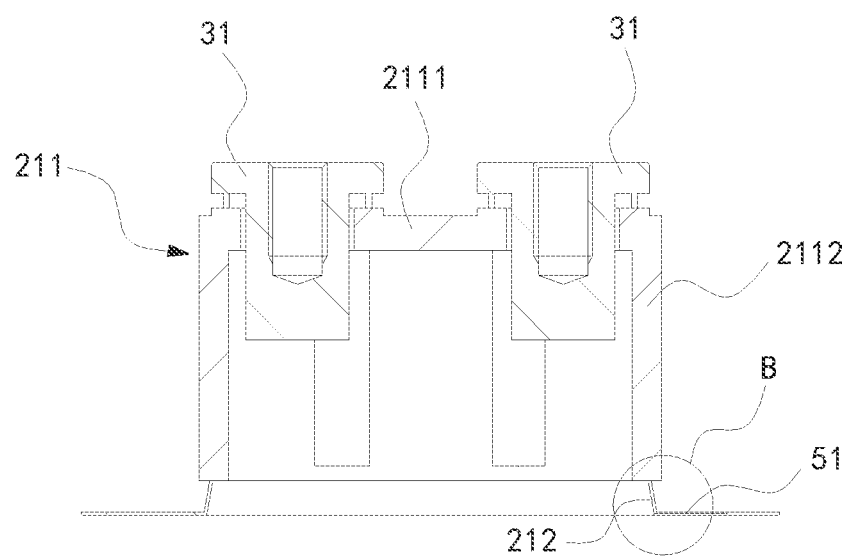
FIG. 35 is a sectional view of an insulation cover and a valve plate according to the eighth embodiment of the present disclosure after being assembled.
Figure 36:
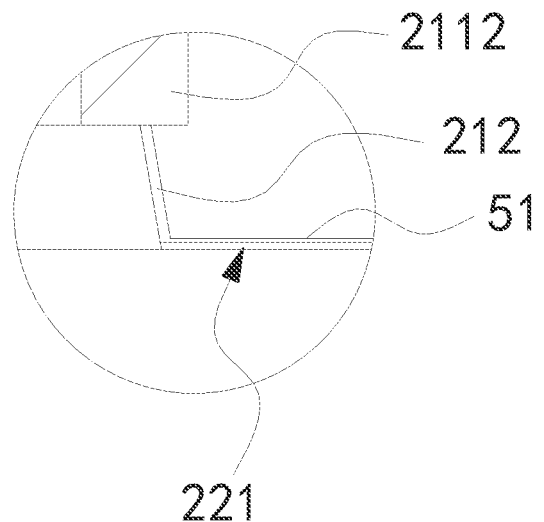
FIG. 36 is a partial enlarged view at B in FIG. 35.

As shown in FIG. 35 and FIG. 36, FIG. 35 shows a sectional view of an insulation cover 21 and a valve plate 51 according to the eighth embodiment of the present disclosure after being assembled. FIG. 36 shows a partial enlarged view at B in FIG. 35. The same portions between the eighth embodiment and the above embodiments will not be repeated, but the difference therebetween is that the pressure relief valve assembly 5 is arranged on the connector 212.

Specifically, the connector 212 is provided with a pressure relief hole 221. The pressure relief valve assembly 5 includes a valve plate 51. The valve plate 51 may be integrally arranged at the pressure relief hole 221 of the connector 212 for closing or opening the pressure relief hole 221.

Figure 37:
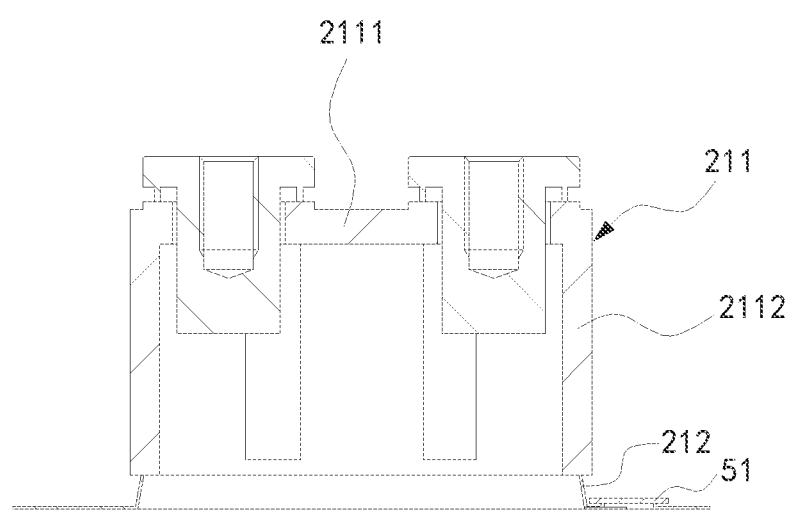
FIG. 37 is a sectional view of an insulation cover and a valve plate according to the ninth embodiment of the present disclosure after being assembled.

As shown in FIG. 37, FIG. 37 shows a sectional view of an insulation cover 21 and a valve plate 51 according to the ninth embodiment of the present disclosure after being assembled. The same portions between the ninth embodiment and the eighth embodiment will not be repeated, but the difference therebetween is that the valve plate 51 and the connector 212 are separately arranged and cover the pressure relief hole 221.

It can be understood that the valve plate 51 may be directly connected to the connector 212 or connected to the connector 212 through the transition part 52. The valve plate 51 may be arranged at the inner wall face of the connector 212 and arranged on the outer wall face of the connector 212.

In the following, different embodiments in which the pressure relief valve assembly 5 is arranged on the metal cover 23 will be described in detail with reference to FIGS. 38 to 44.

Figure 38:
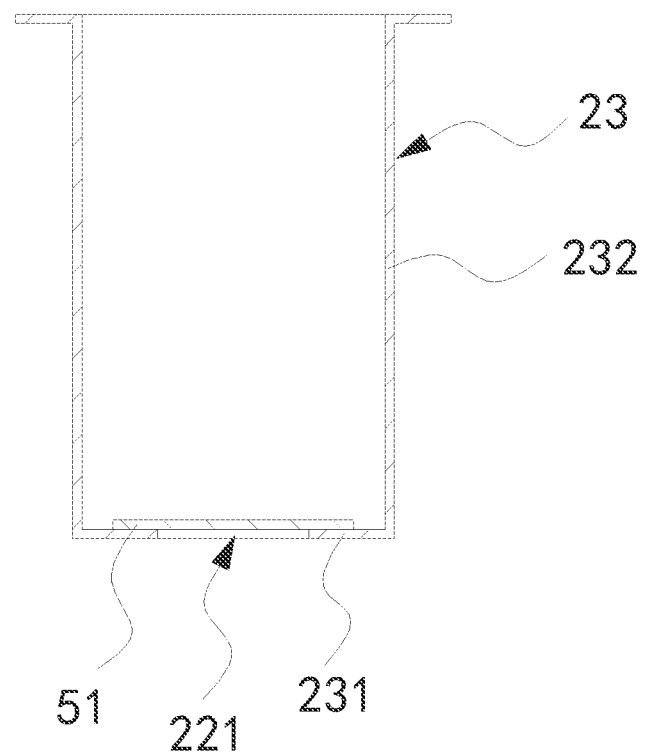
FIG. 38 is a sectional view of a first embodiment of a metal cover and a valve plate according to the present disclosure after being assembled.

As shown in FIG. 38, it is a sectional view of the first embodiment of the metal cover 23 and the valve plate 51 of the present disclosure after being assembled. The metal cover 23 includes a bottom wall 231 and a second side wall 232. One end of the second side wall 232 is connected to an edge of the bottom wall 231, and the other end of the second side wall 232 extends toward the first yoke plate 22, and the second side wall is connected to the second side surface 224 of the first yoke plate 22. The pressure relief valve assembly 5 is arranged on the bottom wall 231.

Specifically, a pressure relief hole 221 is arranged at the bottom wall 231 of the metal cover 23. The pressure relief valve assembly 5 includes a valve plate 51 that is connected to the bottom wall 231 and covers the pressure relief hole 221. When the valve plate 51 is not broken (that is, in a normal working state), the valve plate 51 plays a role in sealing. When the valve plate 51 is broken (i.e., in an abnormal working state), the gas in the driving chamber 24 may be exhausted through the pressure relief hole 221.

A structural strength of the valve plate 51 is less than that of the sealed container 2. When the contact assembly 3 is in the abnormal working state, the gas whose pressure rises sharply may first break through the valve plate 51 and be discharged from the pressure relief hole 221 of the sealed chamber, so that the gas pressure in the sealed chamber may not continue to rise, and thus protect the sealed chamber.

It can be understood that the valve plate 51 may be made of metallic materials or nonmetallic materials. The metal material may include, but not limited to, iron and nickel and their alloys, copper and its alloys, aluminum and its alloys, etc. the non-metallic material may include but not limited to ceramics, glass, carbon fiber, etc.

Referring to FIG. 38, the valve plate 51 is connected to an inner wall face of the bottom wall 231 and covers the pressure relief hole 221. The valve plate 51 may be connected to the inner wall face of the bottom wall 231 by laser welding, brazing, resistance welding, gluing, etc.

Figure 39:
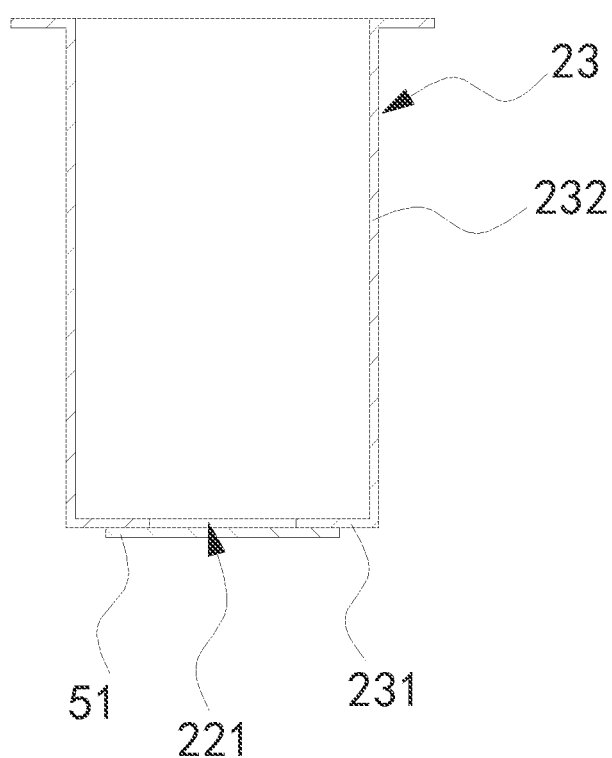
FIG. 39 is a sectional view of a second embodiment of a metal cover and a valve plate according to the present disclosure after being assembled.

As shown in FIG. 39, it is a sectional view of the second embodiment of the metal cover 23 and the valve plate 51 of the present disclosure after being assembled. The same portions between the second embodiment and the first embodiment will not be repeated, but the difference therebetween is that the valve plate 51 is connected to the outer wall face of the bottom wall 231 and covers the pressure relief hole 221.

Figure 40:
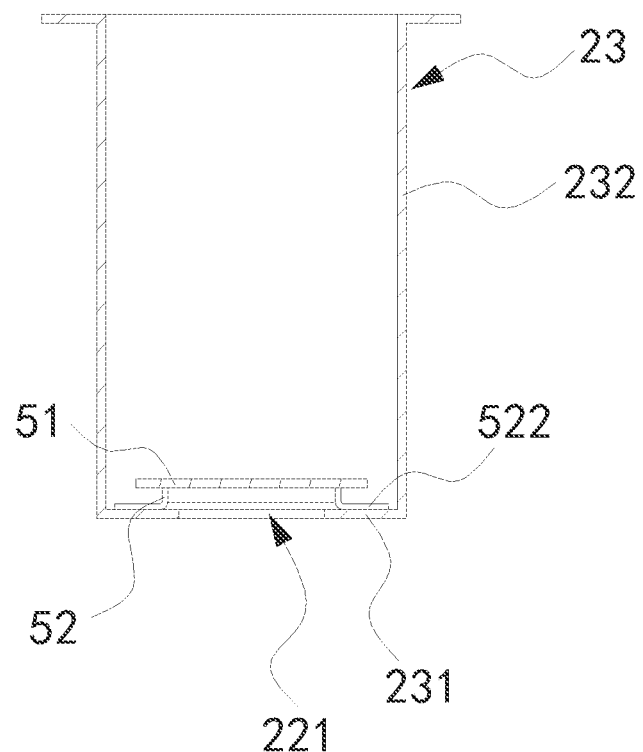
FIG. 40 is a sectional view of a third embodiment of a metal cover and a valve plate according to the present disclosure after being assembled.

As shown in FIG. 40, it is a sectional view of the third embodiment of the metal cover 23 and the valve plate 51 of the present disclosure after being assembled. The same portions between the third embodiment and the above embodiment will not be repeated, but the difference therebetween is that the valve plate 51 is connected to the inner wall face of the bottom wall 231 through the transition part 52.

Specifically, the transition part 52 is generally tubular, for example, cylindrical. One end of the transition part 52 is provided with a flange 522 protruding outward in a radial direction and is connected with the inner wall face of the bottom wall 231 through the flange 522, and the other end of the transition part 52 is connected with the valve plate 51.

Of course, it is possible that one end of the transition part 52 may be connected to the valve plate 51 through the flange 522, and the other end of the transition part may be connected to the inner wall face of the bottom wall 231. Alternatively, the transition part 52 has a straight tube structure without a flange. Two ends of the transition part 52 with the straight tube structure are respectively connected with the bottom wall 231 and the valve plate 51.

It can be understood that both the valve plate 51 and the transition part 52, and the transition part 52 and the bottom wall 231 may be connected by laser welding, brazing, resistance welding, gluing, etc.

Figure 41:
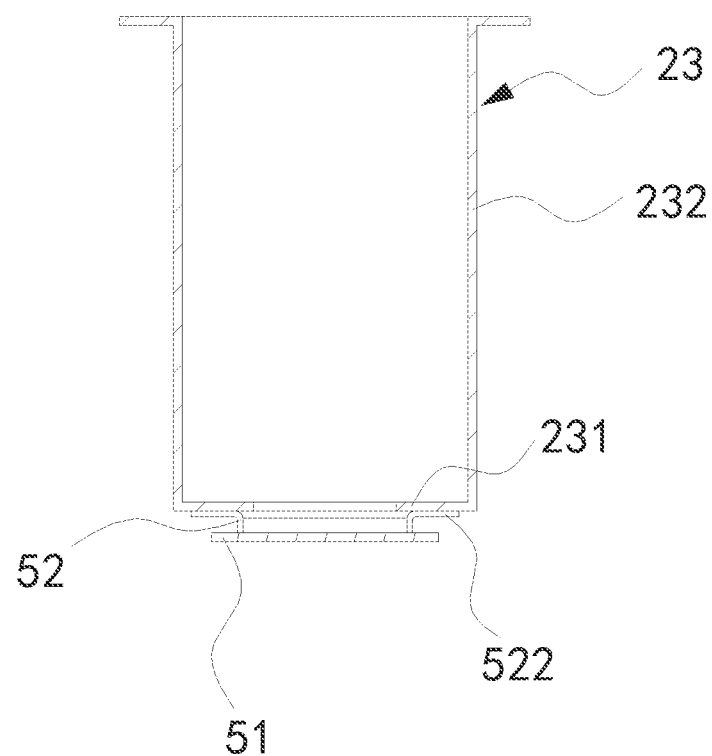
FIG. 41 is a sectional view of a fourth embodiment of a metal cover and a valve plate according to the present disclosure after being assembled.

As shown in FIG. 41, it shows a sectional view of the fourth embodiment of the metal cover 23 and the valve plate 51 of the present disclosure after being assembled. The same portions between the fourth embodiment and the third embodiment will not be repeated, but the difference therebetween is that the valve plate 51 is connected to the outer wall face of the bottom wall 231 through the transition part 52.

Figure 42:
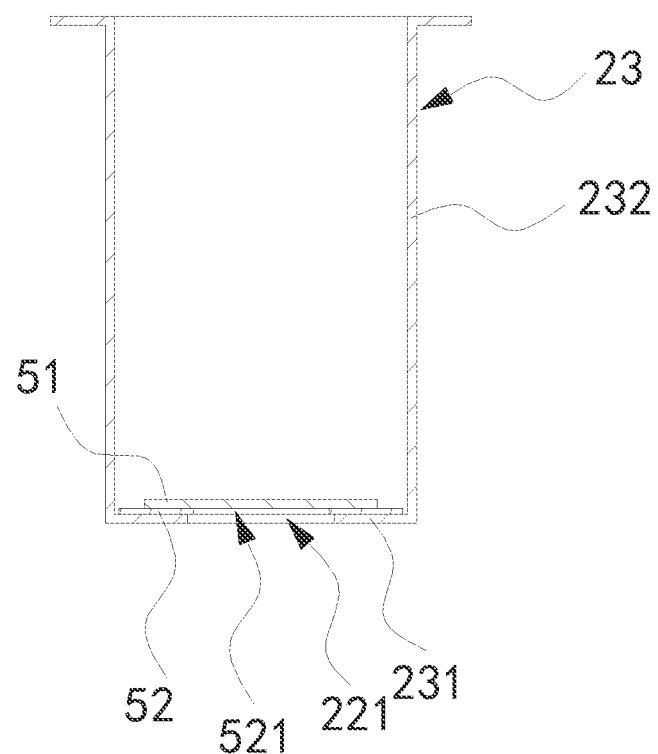
FIG. 42 is a sectional view of a fifth embodiment of a metal cover and a valve plate according to the present disclosure after being assembled.

As shown in FIG. 42, it shows a sectional view of the fifth embodiment of the metal cover 23 and the valve plate 51 of the present disclosure after being assembled. The same portions between the fifth embodiment and the third embodiment will not be repeated here, but the differences therebetween are that the transition part 52 is a sheet, and the transition part 52 has a second perforation 521 arranged corresponding to the pressure relief hole 221.

Figure 43:
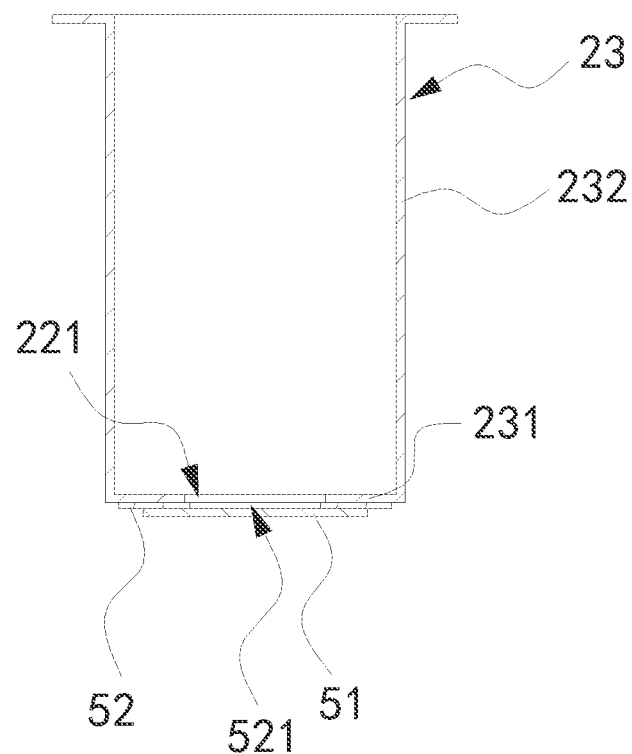
FIG. 43 is sectional view of a sixth embodiment of a metal cover and a valve plate according to the present disclosure after being assembled.

As shown in FIG. 43, it shows a sectional view of the sixth embodiment of the metal cover 23 and the valve plate 51 of the present disclosure after being assembled. The same portions between the sixth embodiment and the fifth embodiment will not be repeated, but the difference therebetween is that the valve plate 51 is connected to the outer wall face of the bottom wall 231 through the transition part 52.

It is worth mentioning that when the valve plate 51 and the bottom wall 231 of the metal cover 23 are separately arranged, the valve plate 51 may be arranged on the inner wall face or the outer wall face of the bottom wall 231. When the valve plate 51 is arranged on the inner wall face of the bottom wall 231, the bottom wall 231 may provide a supporting force for the valve plate 51, and a gas pressure in the sealed container 2 can act on the first side surface 511 of the valve plate 51 to press the valve plate 51 against the bottom wall 231. When the valve plate 51 is arranged on the outer wall face of the bottom wall 231, since the bottom wall 231 cannot provide a supporting force for the valve plate 51, there is a high requirement provided for the connection between the valve plate 51 and the bottom wall 231.

Figure 44:
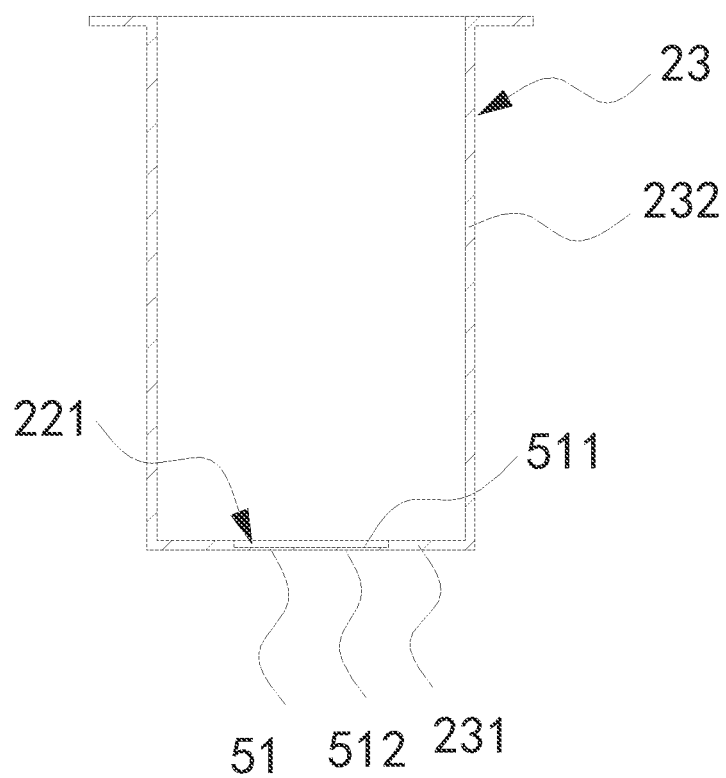
FIG. 44 is sectional view of a seventh embodiment of a metal cover and a valve plate according to the present disclosure after being assembled.

As shown in FIG. 44, it is a sectional view of the seventh embodiment of the metal cover 23 and the valve plate 51 of the present disclosure after being assembled. The same portions between the seventh embodiment and the above embodiments will not be repeated, but the difference therebetween is that the valve plate 51 is integrally arranged on the bottom wall 231 for closing or opening the pressure relief hole 221.

Specifically, the bottom wall 231 has an inner wall face and an outer wall face, and the valve plate 51 has a first side surface 511 and a second side surface 512 which are oppositely arranged. The first side surface 511 is connected to a wall of the pressure relief hole 221, and the second side surface 512 is flush with the outer wall face.

Of course, it can be understood that a positional relationship between the bottom wall 231 and the two side surfaces of the valve plate 21 may also be as follows: the first side surface 511 of the valve plate 51 is flush with the inner wall face of the bottom wall 231, and the second side surface 512 is connected with the wall of the pressure relief hole 221; alternatively, the first side surface 511 is spaced apart from the inner wall face of the bottom wall 231 by a certain distance, and the second side surface 512 is spaced apart from the outer wall face of the bottom wall 231 by a certain distance. That is to say, both side surfaces of the valve plate 51 are not aligned with the inner and outer wall faces of the bottom wall 231.

Figure 45:
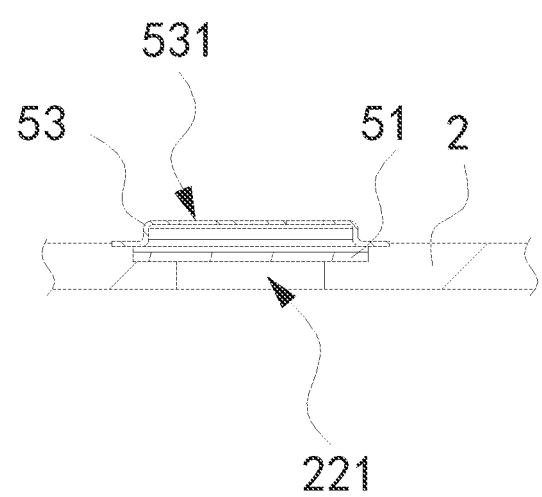
FIG. 45 shows a sectional view of a protective cover according to an embodiment of the present invention after being installed on a wall of a container.

As shown in FIG. 45, it shows a sectional view of the protective cover 53 according to the embodiment of the present disclosure being installed on a wall of the container. The pressure relief valve assembly 5 may further include a protective cover 53, which is connected to the wall of the sealed container 2 and is provided on the outer surface of the valve plate 51. The protective cover 53 is provided with a vent hole 531, through which the gas can act on the valve plate 51.

It can be understood that the protective cover 53 may be connected to the ceramic cover 211, the connector 212 or the metal cover 23. Moreover, the protective cover 53 may be provided on the outer wall face 282 of the sealed container 2.

In this embodiment, by providing the protective cover 53 additionally, the gas can break through the valve plate 51 in the abnormal working state, and the valve plate 51 can be protected during the transportation or installation of the sealed container 2 so as to prevent the valve plate 51 from being punctured by foreign objects.

It can be understood that the protective cover 53 may be made of metallic materials or nonmetallic materials. The metal materials include, but are not limited to iron and nickel and their alloys, copper and its alloys, aluminum and its alloys, etc. the non-metallic materials include, but are not limited to ceramics, glass, carbon fiber, plastics, etc.

The protective cover 53 may be connected to the sealed container 2 by laser welding, brazing, resistance welding, gluing, etc.

Figure 46:
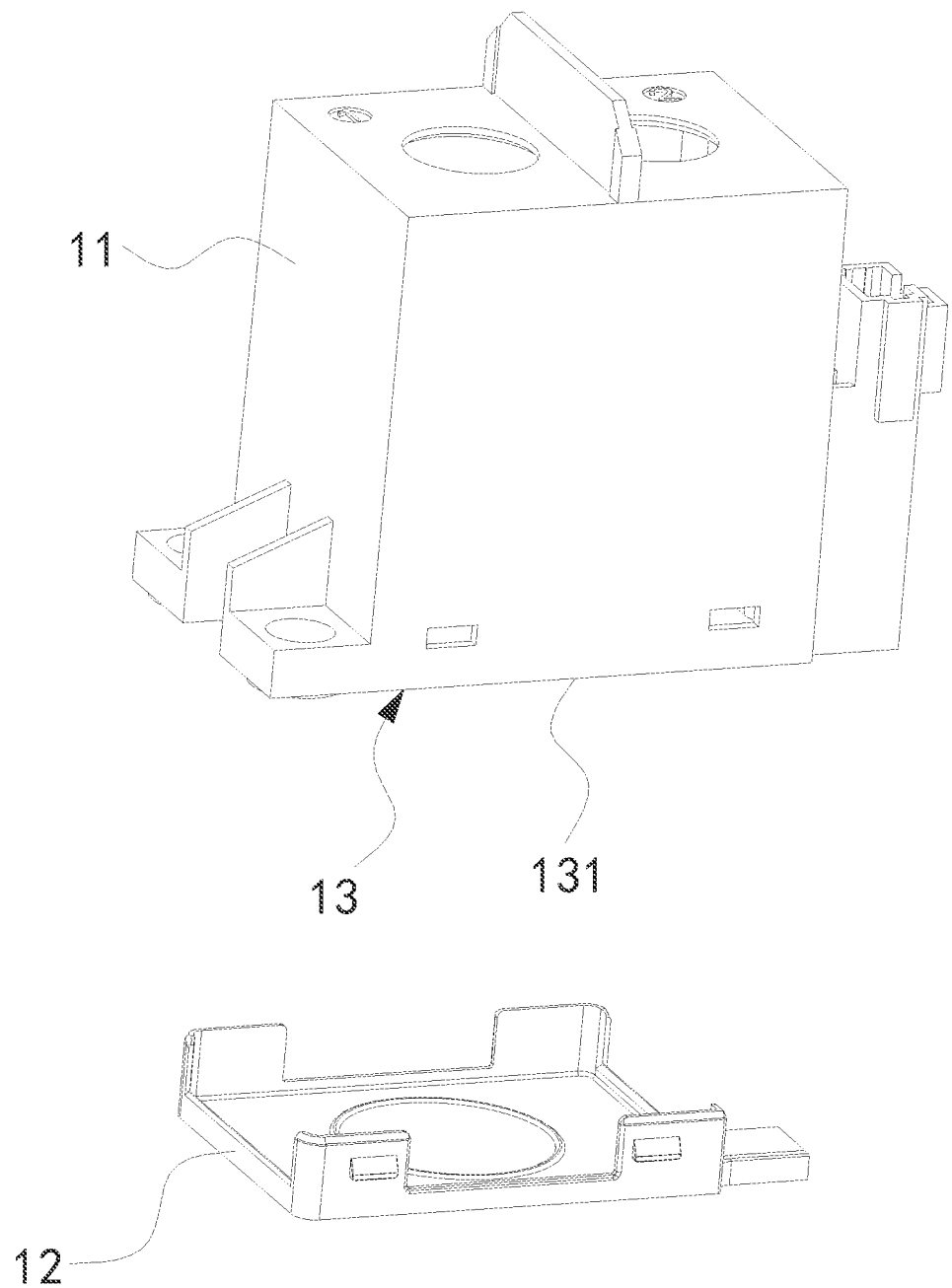
FIG. 46 is an exploded schematic view of a first embodiment of a shell in the present disclosure.

As shown in FIG. 46, it is an exploded view of a first embodiment of a shell 1 of the present disclosure. The shell 1 according to the embodiment of the present disclosure includes a first housing 11 and a second housing 12, and the second housing 12 is detachably connected with the first housing 11; the first housing 11 and/or the second housing 12 are provided with an exhaust structure 13 that is communicated with the hollow chamber 14.

The exhaust structure 13 is configured such that the shell 1 according to the embodiment of the present disclosure is an unsealed structure, in which the gas may be discharged from the inside of the contact chamber 27 through the pressure relief hole 221, and then enter the hollow chamber 14 of the shell 1, and finally discharged to the outside of the shell 1 through the exhaust structure 13.

In addition, the shell 1 according to the embodiment of the present disclosure may also prevent gas spatter generated in the contact chamber 27 from being directly discharged to the outside of the relay at the moment of being exhausted, so as to avoid polluting other electronic devices in the vicinity of the relay. The gas spatter is generated by the metal materials of the contact assembly 3 being ablated and volatilized at a high temperature by burning the arc.

Referring to FIG. 46, the exhaust structure 13 includes a gap 131 formed between the first housing 11 and the second housing 12. The gas is discharged from the relay through the gap 131 between the first housing 11 and the second housing 12.

In this embodiment, the gap 131 is located at the bottom of the shell 1.

Figure 47:
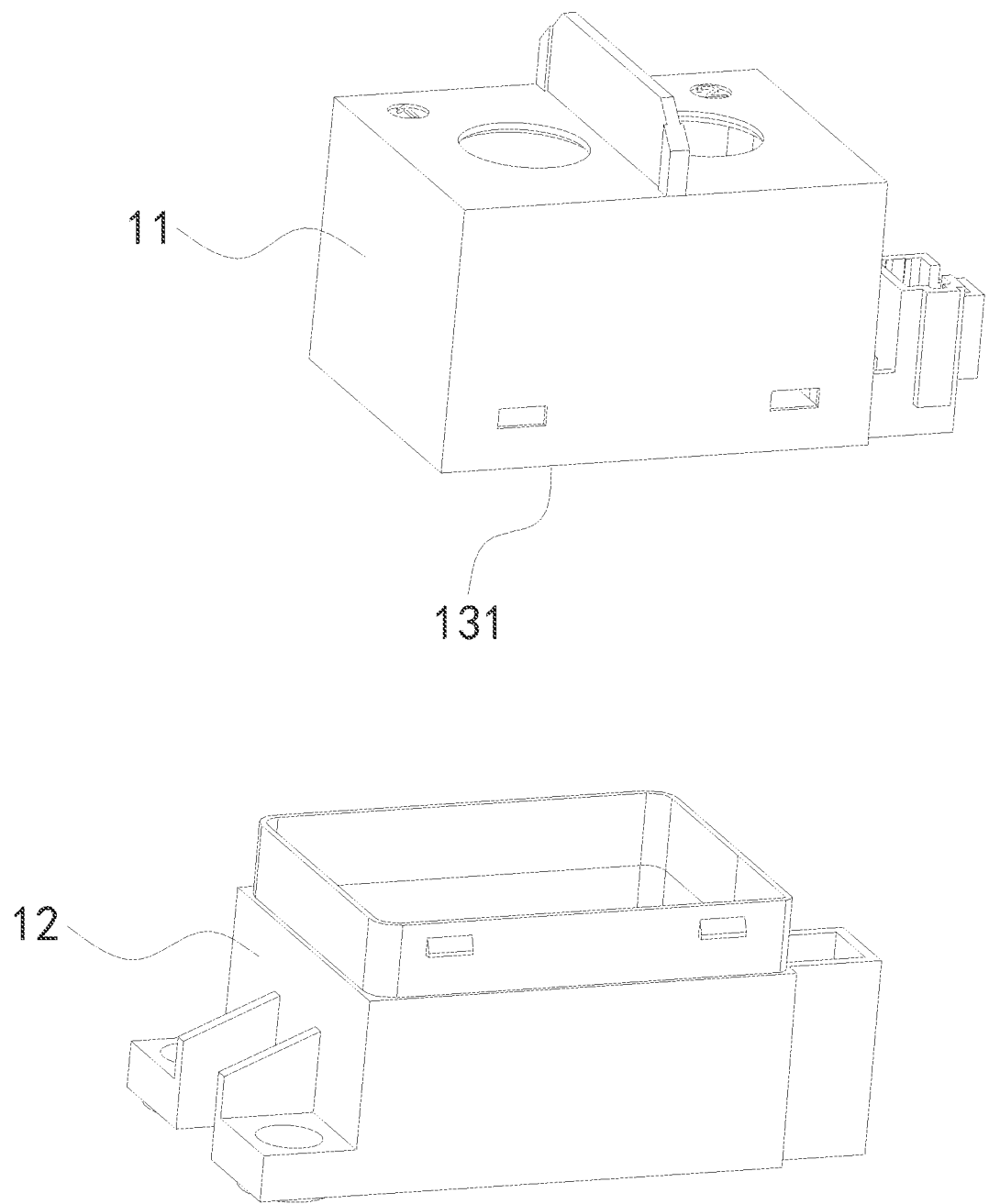
FIG. 47 is an exploded schematic view of a second embodiment of the shell in the present disclosure.

As shown in FIG. 47, it is an exploded schematic view of the second embodiment of the shell 1 of the present disclosure. The same portions between the shell 1 of the second embodiment and the shell 1 of the first embodiment will not be repeated here, but the difference thereof is that the gap 131 is located in a middle area of the shell 1 in a height direction.

Figure 48:
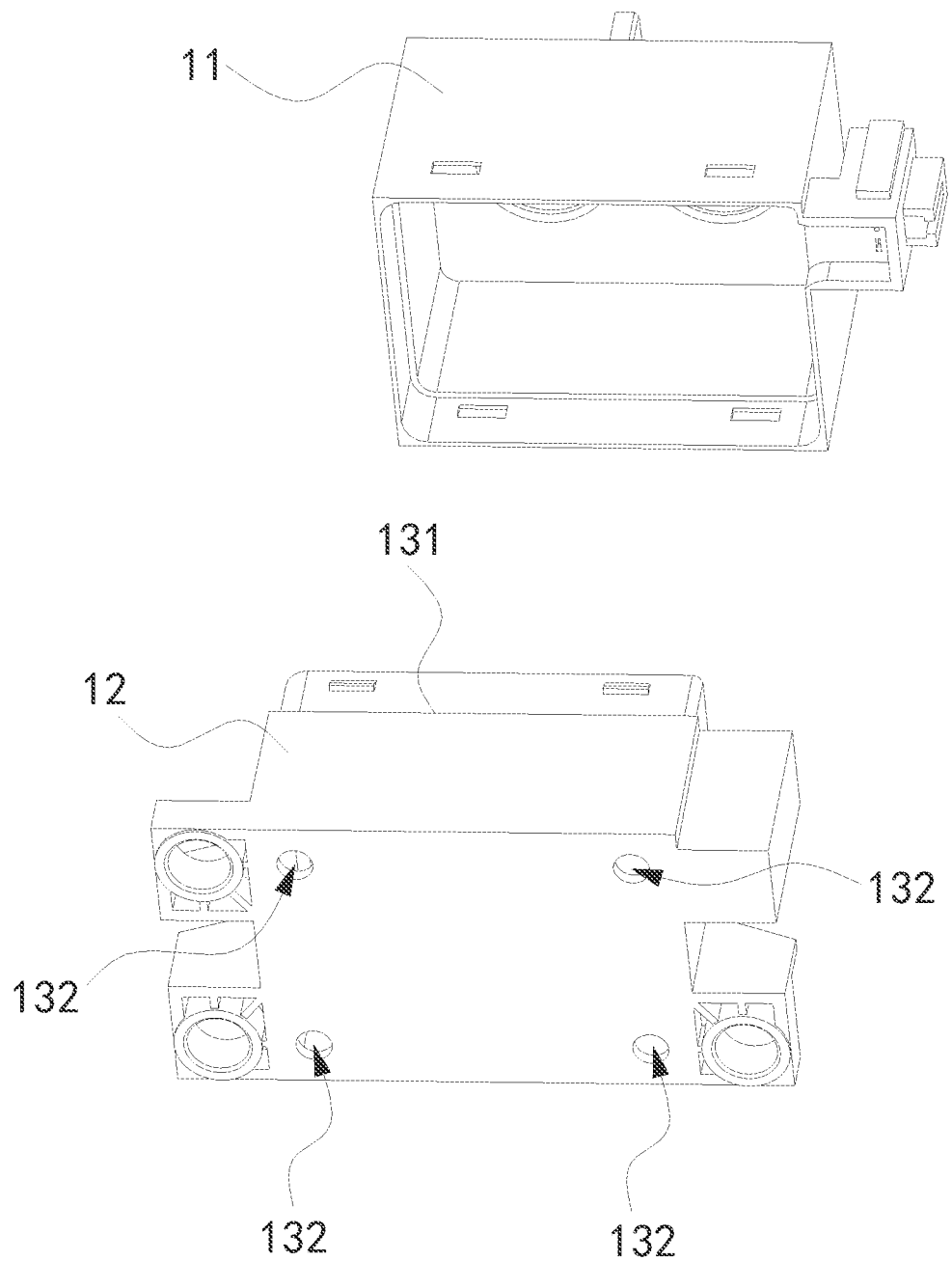
FIG. 48 is an exploded schematic view of a third embodiment of the shell in the present disclosure.

As shown in FIG. 48, it is an exploded schematic view of a third embodiment of the shell 1 of the present disclosure. The same portions between the shell 1 of the third embodiment and the shell 1 of the second embodiment will not be repeated, but the difference thereof is that the exhaust structure 13 includes a gap 131 and an exhaust hole 132, and the gap 131 is formed in the middle area of the shell 1 in the height direction, and the exhaust hole 132 is formed in the second housing 12. The gas may be discharged from the relay through the gap 131 and the exhaust hole 132. Of course, the exhaust hole 132 may also be arranged on the first housing 11.

Figure 49:
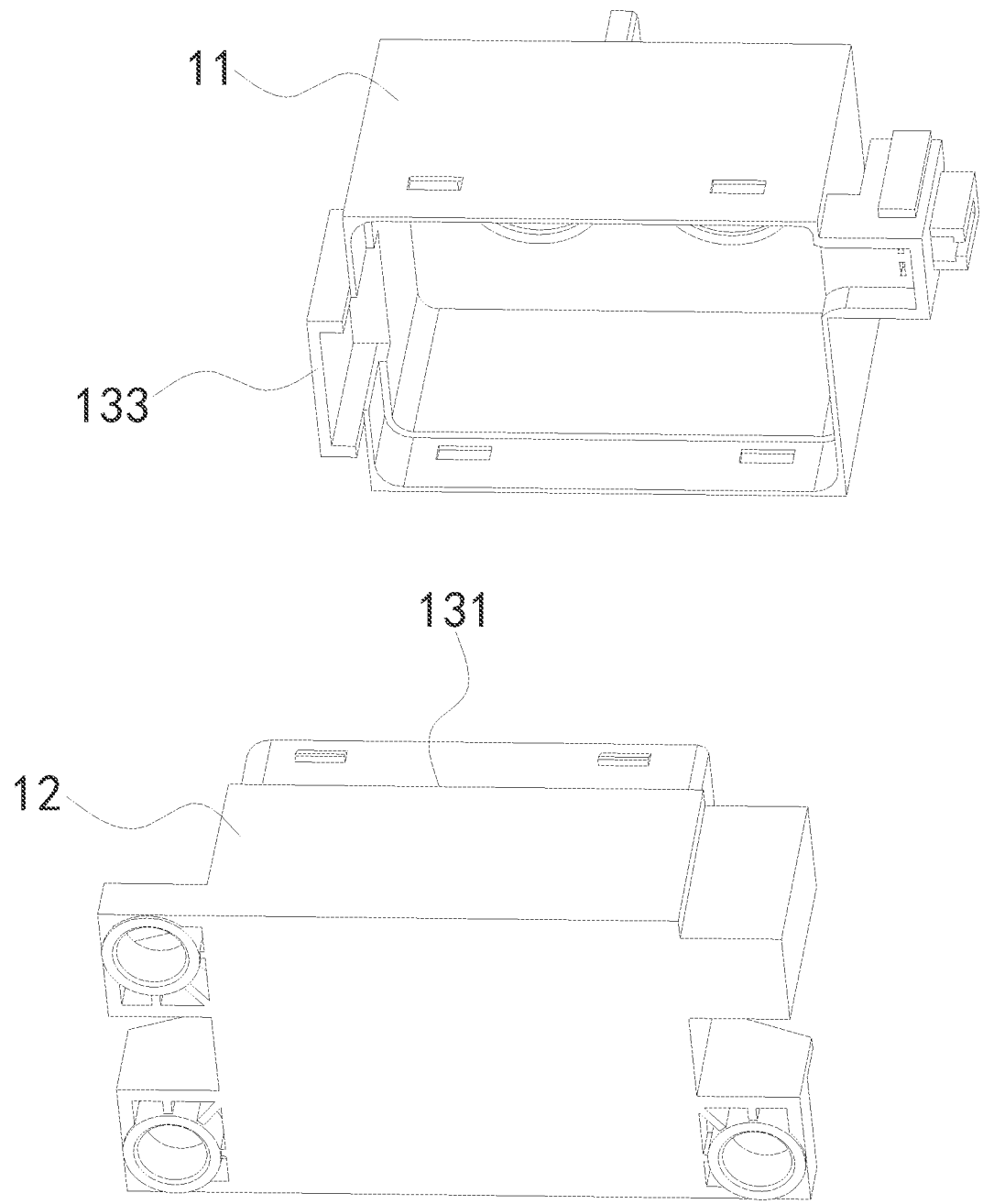
FIG. 49 is an exploded schematic view of a fourth embodiment of the shell in the present disclosure.

As shown in FIG. 49, it is an exploded schematic view of the fourth embodiment of the shell 1 of the present disclosure. The same portions between the shell 1 of the fourth embodiment and the shell 1 of the above-mentioned embodiments will not be repeated here, but the difference therebetween is that the exhaust structure 13 includes a gap 131 and an exhaust cover 133. The gap 131 is formed in the middle area of the shell 1 in the height direction, and the exhaust cover 133 is arranged on the first housing 11, and the opening of the exhaust cover 133 faces downward. In this way, the gas can be discharged from the relay through the gap 131 and the exhaust cover 133, and the gas discharged from the exhaust cover 133 is ejected downward without affecting other electronic devices in the vicinity of the relay.

Of course, the exhaust cover 133 may also be arranged on the second housing 12; alternatively, both the first housing 11 and the second housing 12 are provided with an exhaust cover 133.

Figure 50:
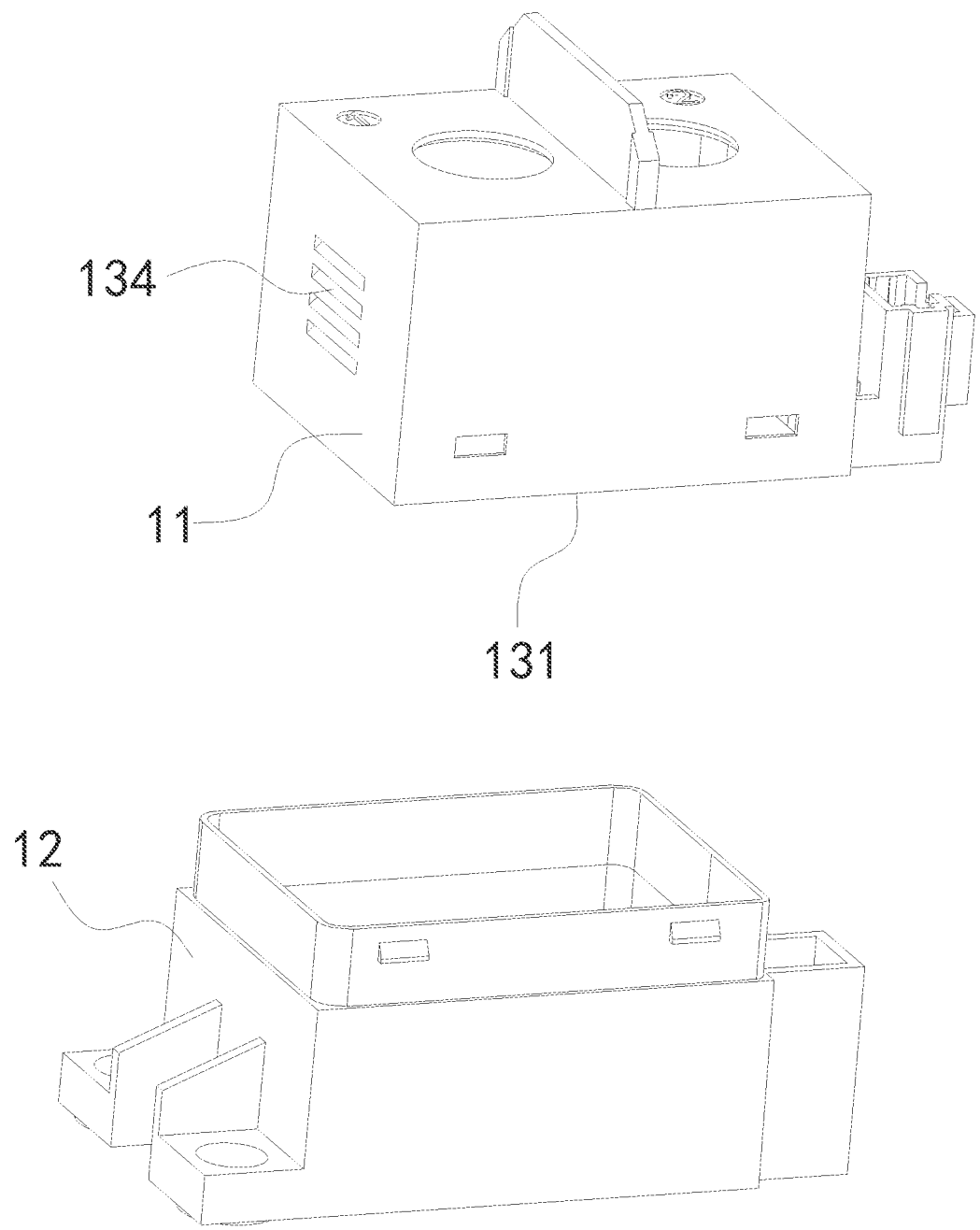
FIG. 50 is an exploded schematic view of a fifth embodiment of the shell in the present disclosure.

As shown in FIG. 50, it shows an exploded schematic view of a fifth embodiment of the shell 1 of the present disclosure. The same portions of the shell 1 of the fifth embodiment and the shell 1 of the above-mentioned embodiments will not be repeated here, but the difference thereof is that the exhaust structure 13 includes a gap 131 and an exhaust grid 134, and the gap 131 is formed in the middle area of the shell 1 in the height direction, and the exhaust grid 134 is arranged on the first housing 11. Of course, the exhaust grid 134 may also be arranged on the second housing 12, or both the first housing 11 and the second housing 12 are provided with the exhaust grid 134.

The gas may be discharged from the relay through the gap 131 and the exhaust grid 134. When the gas passes through the exhaust grid 134, the exhaust grid 134 can make the gas flow gentler, and prevent the discharged gas from affecting other electronic devices in the vicinity of the relay.

It can be understood that various embodiments/implementations provided by the present disclosure can be combined with each other without contradiction, and will not be exemplified here.

As above described, the relay according to the embodiment of the present disclosure at least include following advantages and beneficial effects.

According to the relay of the embodiment of the present disclosure, the pressure relief valve assembly 5 is arranged on the sealed container 2 to release overpressure gas, so as to ensure that the contact assembly 3 cannot explode and disintegrate the chamber due to rapid expansion of the gas caused by the high temperature in the chamber in the abnormal working states such as short circuit and overload breaking, and thereby increasing the reliability of the products.

In addition, the shell 1 of the relay according to the embodiment of the present disclosure is designed to have a non-sealed structure, which can not only discharge the exhausted gas timely, but also prevent exhausted substances from polluting the other electronic devices.

Referring to FIGS. 51-61, embodiments of the present disclosure further provide a relay capable of improving safety, to solve a problem of easy explosion in the related art.

The relay according to the embodiment of the present disclosure includes a contact container, a contact assembly, and a pressure relief valve assembly. The contact container includes a ceramic cover, a connector and a first yoke plate, and the ceramic cover is connected to the first yoke plate through the connector, and the ceramic cover, the connector and the first yoke plate enclose a contact chamber, and the connector is provided with a pressure relief hole that is communicated with the contact chamber. The contact assembly includes a pair of stationary contact leading-out terminals and a movable contact piece, and the stationary contact leading-out terminals are arranged on the ceramic cover, one end of each of the stationary contact leading-out terminals protrudes into the contact chamber, and the movable contact piece is arranged in the contact chamber and configured to be driven to respectively contact with or separate from the pair of stationary contact leading-out terminals. The pressure relief valve assembly is arranged on the connector and configured to close the pressure relief hole when a gas pressure in the contact chamber is less than a threshold and configured to be broken to open the pressure relief hole when the gas pressure in the contact chamber is greater than or equal to the threshold.

According to some embodiments of the present disclosure, the pressure relief valve assembly includes a valve plate that is integrally arranged at the connector for closing or opening the pressure relief hole.

According to some embodiments of the present disclosure, the pressure relief valve assembly includes a valve plate that is separately arranged from the connector and arranged at the pressure relief hole for closing or opening the pressure relief hole.

According to some embodiments of the present disclosure, the connector has an inner wall face and an outer wall face, and the valve plate is arranged at the inner wall face and/or the outer wall face.

According to some embodiments of the present disclosure, the pressure relief valve assembly further includes a transition part, through which the valve plate is connected to the connector.

According to some embodiments of the present disclosure, the pressure relief valve assembly further includes a protective cover which is connected to the connector and is arranged at an outer surface of the valve plate; and the protective cover is provided with a vent hole.

According to some embodiments of the present disclosure, the relay further includes a shell with a hollow chamber;
the contact container and the pressure relief valve assembly are arranged in the hollow chamber.

According to some embodiments of the present disclosure, the shell includes:
a first housing; and
a second housing detachably connected with the first housing, wherein the first housing and/or the second housing are provided with an exhaust structure, and the exhaust structure is communicated with the hollow chamber.

According to some embodiments of the present disclosure, the exhaust structure includes a gap formed between the first housing and the second housing.

According to some embodiments of the present disclosure, the exhaust structure includes an exhaust hole and/or an exhaust cover and/or an exhaust grid.

According to some embodiments of the present disclosure, the hollow chamber is communicated with an outside of the housing.

According to some embodiments of the present disclosure, a structural strength of the pressure relief valve assembly is less than that of the contact container.

One of the above embodiments of the present disclosure has at least the following advantages or beneficial effects:

In the relay according to the embodiment of the present disclosure, the pressure relief valve assembly is arranged on the connector to release overpressure gas, so as to ensure that the relay cannot explode and disintegrate the chamber due to the rapid expansion of the gas caused by a high temperature in the chamber in the abnormal working states such as short circuit and overload breaking, and thus the reliability of the products can be increased.

In addition, the shell of the relay according to the embodiment of the present disclosure is designed to have a non-sealed structure, which can discharge the exhaust gas timely, but also prevent the discharged substances from polluting the other electronic devices.

As described in the background, there is a security risk that the contact sealed cavity is prone to explode when the contact system of the relay in the related art is at a moment of large current short circuit or overload break. In the research, an inventor of the present disclosure found that an intense arcing of the contact in the sealed cavity high temperature occurs such that a high temperature is generated instantly in the sealed cavity, and then gas pressure in the sealed cavity of the contact suddenly rises, and once the gas pressure intensity in the sealed cavity of the contact is greater than a strength of the components or the strength at a joint of the sealed cavity of the contact, the sealed cavity of the contact of the relay can easily explode.

Figure 51:
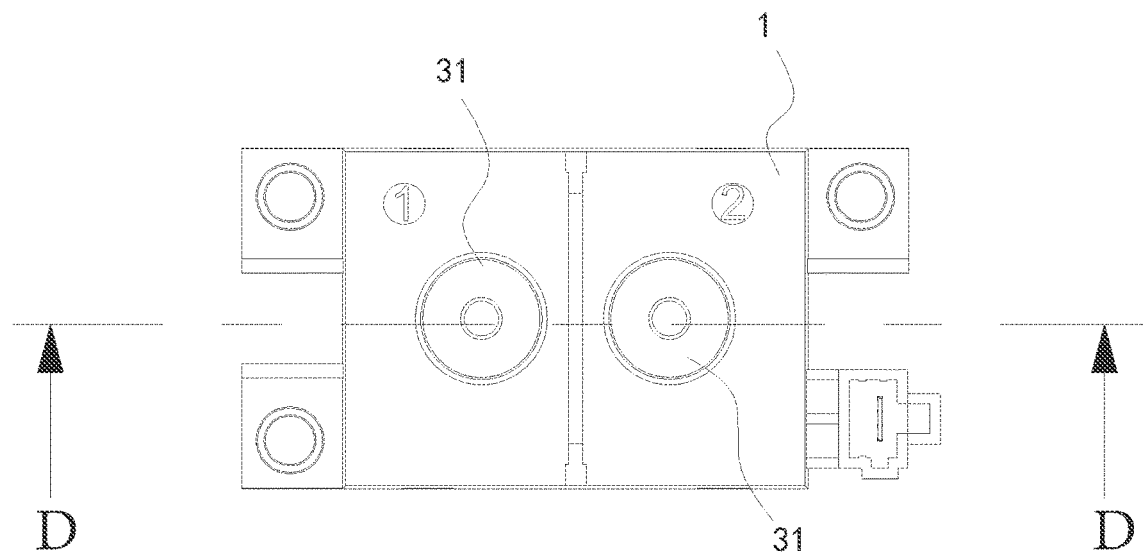
FIG. 51 shows a top view of a relay according to an embodiment of the present disclosure.
Figure 52:
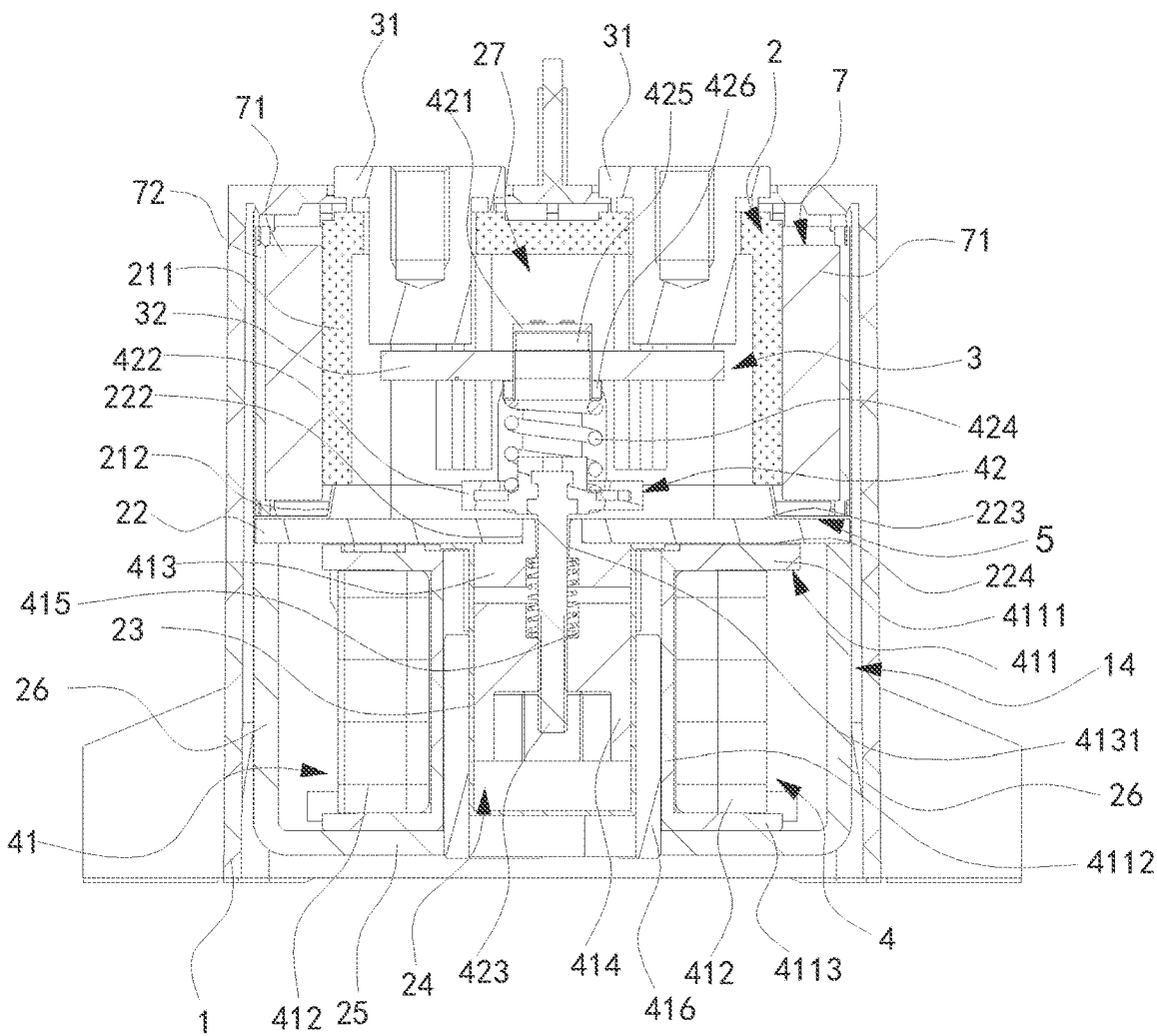
FIG. 52 shows a sectional view taken along line D-D in FIG. 51.

As shown in FIGS. 51 and 52, FIG. 51 shows a top view of a relay according to an embodiment of the present disclosure. FIG. 52 shows a sectional view taken along a line D-D in FIG. 51. The relay according to the embodiment of the present disclosure includes a shell 1, a contact container 2, a contact assembly 3, a driving assembly 4 and a pressure relief valve assembly 5. The shell 1 has a hollow chamber 14 which communicates with an outside of the shell 1. The contact container 2 is arranged in the hollow chamber 14, and the contact container 2 includes a ceramic cover 211, a connector 212 and a first yoke plate 22. The ceramic cover 211 is connected to the first yoke plate 22 through the connector 212, and the ceramic cover 211, the connector 212 and the first yoke plate 22 enclose a contact chamber 27. The connector 212 has a pressure relief hole 221 which is communicated with the contact chamber 27 and the hollow chamber 14, respectively. The contact assembly 3 includes a pair of stationary contact leading-out terminals 31 and one movable contact piece 32. The stationary contact leading-out terminals 31 are arranged on the ceramic cover 211. Each of the stationary contact leading-out terminals 31 has one end extending into the contact chamber 27, and the other end exposed to an outer surface of the shell 1. The movable contact piece 32 is arranged in the contact chamber 27 and configured to be driven to contact with or separate from the stationary contact leading-out terminals 31, respectively. The driving assembly 4 is arranged in the hollow chamber 14, and is connected with the movable contact piece 32 for driving the movable contact piece 32 move, so that both ends of the movable contact piece 32 are respectively contacted with or separated from the pair of stationary contact leading-out terminal 31. The pressure relief valve assembly 5 is arranged on the connector 212 to close the pressure relief hole 221 when a gas pressure in the contact chamber 27 is less than a threshold, and the pressure relief valve assembly is broken to open the pressure relief hole 221 when the gas pressure in the contact chamber 27 is greater than or equal to a threshold. A structural strength of the pressure relief valve assembly 5 is less than that of the contact container 2; in a normal working state, the maximum value of the gas pressure intensity in the contact chamber 27 is less than the structural strength of the pressure relief valve assembly 5; in an abnormal working state, the maximum value of the gas pressure intensity in the contact chamber 27 is greater than the structural strength of the pressure relief valve assembly 5. It can be understood that when the pressure relief valve assembly 5 closes the pressure relief hole 221, the airtightness of the contact chamber 27 can be maintained and the normal operation of the relay can be ensured. Of course, in other embodiments, when the pressure relief valve assembly 5 closes the pressure relief hole 221, the contact chamber 27 is not completely sealed, as long as it is guaranteed the relay can work normally.

In the relay according to the embodiment of the present disclosure, a pressure relief valve assembly 5 is arranged on the connector 212 to close or open the pressure relief hole 221. When the contact assembly 3 is in a normal working state, a gas pressure intensity in the contact chamber 27 is less than the threshold, so that the pressure relief valve assembly 5 is not broken by the gas pressure in the contact chamber 27, and is maintained in a state which the pressure relief hole 221 is closed such that the relay can still work normally. When the contact assembly 3 is in an abnormal working state, the gas pressure intensity in the contact chamber 27 is greater than or equal to the threshold, so that the pressure relief valve assembly 5 is broken by the gas pressure in the contact chamber 27, and thus the contact chamber 27 communicates with the hollow chamber 14 of the shell 1 through the pressure relief hole 221, and then the gas pressure in the contact chamber 27 can be released to the hollow chamber 14 through the pressure relief hole 221, and finally released to the outside of the shell 1. That is to say, in the abnormal working state, during the process that the gas pressure intensity in the contact chamber 27 gradually rises, the gas pressure may first break through the pressure relief valve assembly 5, and then the rapidly increased gas pressure may be released through the pressure relief hole 221, so that the gas pressure in the contact chamber 27 cannot continue to rise, and the gas pressure cannot reach a structural strength of the contact container 2, and thereby avoiding the explosion of the contact container 2. In the normal working state, the gas pressure in the contact chamber 27 may not break through the pressure relief valve assembly 5, so the pressure relief valve assembly 5 can perform a function of sealing the pressure relief hole 221.

It could be understood that a term "normal working state" refers to that the current of the relay is under a rated working condition, and the term "abnormal working state" refers to that the contact assembly 3 is at a moment of a large current short circuit or at a moment of an overload breaking. In addition, the pressure as represented by the term "threshold" is slightly greater than the gas pressure intensity in the contact container 2 when the relay is in the normal working state. The threshold can also be adjusted according to different types of the relays, but cannot be greater than the structural strength of the contact container 2.

That is to say, when the relay is in a normal working state, the gas pressure in the contact container 2 cannot reach the threshold, so that the pressure relief valve assembly 5 cannot be broken. When the relay is in an abnormal working state, the gas pressure in the contact container 2 is greater than or equal to the threshold, and the pressure relief valve assembly 5 is broken by the gas.

In one embodiment, the structural strength of the pressure relief valve assembly 5 is less than that of the contact container 2. As such, when the relay is in an abnormal working state and the pressure of the gas in the contact container 2 rises gradually, the pressure relief valve assembly 5 can be broken by the gas prior to the contact container 2.

It can be understood that the structural strength of the pressure relief valve assembly 5 is less than that of the contact container 2, which can be achieved by different materials and/or different structures. For example, when the pressure relief valve assembly 5 and the wall of the contact container 2 have the same material, the thickness of the pressure relief valve assembly 5 may be designed to be thin and smaller than the wall of the contact container 2, so that the gas with gradually rising temperature may preferentially break through the pressure relief valve assembly 5. Of course, in the case that the pressure relief valve assembly 5 and the wall of the contact container 2 have the same thickness, the pressure relief valve assembly 5 may be made of ceramic, and the contact container 2 may be made of metal, so that the pressure relief valve assembly 5 may be broken first. Alternatively, the pressure relief valve assembly 5 is thin and made of ceramic, and the wall of the contact container 2 is thick and made of metal. Of course, it is possible that the structural strength of the pressure relief valve assembly 5 is less than that of the contact container 2 in other suitable ways, which will not be listed here.

It can be understood that terms "include" and "have" in the embodiment of the present disclosure and any variations thereof are intended to be included non-exclusively. For example, process, method, system, product or equipment that includes a series of steps or units is not limited to the steps or units that have been listed, but optionally steps or units that are not listed are also included, or optionally other steps or components inherent to these processes, methods, products or equipment are also included.

It should be noted that the relay according to the embodiment of the present disclosure may not include the shell 1, but the contact container 2, the contact assembly 3, the driving assembly 4 and the pressure relief valve assembly 5 are assembled and then directly installed in application products, such as battery packs and electrical control boxes.

Further referring to FIGS. 51 and 52. In this embodiment, the contact assembly 3 includes two stationary contact leading-out terminals 31 respectively for current inflow and current outflow, and one movable contact piece 32. The movable contact piece 32 may be in a straight piece shape. Both ends of the movable contact piece 32 in the length direction may be in contact with the two stationary contact leading-out terminals 31 respectively under the action of the driving assembly 4 so as to realize the connected load. The bottoms of the stationary contact leading-out terminals 31 serves as the stationary contacts, and both ends of the movable contact piece 32 in the length direction may serve as the movable contacts. The movable contacts at both ends of the movable contact piece 32 may protrude from other portions of the movable contact piece 32 or may be flush with other portions.

It can be understood that the stationary contacts may be integrally or separately arranged at the bottom of the stationary contact leading-out terminals 31, and the movable contact can be integrally or separately arranged at both ends of the movable contact piece 32 in the length direction.

Two stationary contact leading-out terminals 31 are arranged on the ceramic cover 211, for example, at the top of the ceramic cover 211. And, one end of each of the stationary contact leading-out terminals 31 extends into the interior of the contact chamber 27, and the other end thereof is exposed to the outer surface of the shell 1. One end of the stationary contact leading-out terminal 31 extending into the interior of the contact chamber 27 is used for contacting with the movable contact piece 32.

The relay also includes an arc extinguishing unit 7 that is arranged in the hollow chamber 14 of the shell 1, for extinguishing the arc of the contact assembly 3.

In this embodiment, the arc extinguishing unit 7 includes two arc-extinguishing magnets 71. The arc-extinguishing magnets 71 may be permanent magnets, and each of the arc-extinguishing magnets 71 may be a substantially rectangular shape. The two arc-extinguishing magnets 71 are respectively arranged on both sides of the ceramic cover 211 and are oppositely arranged along a length direction of the movable contact piece 32.

As shown in FIG. 52, two arc-extinguishing magnets 71 are located on left and right sides of the ceramic cover 211. In this embodiment, polarities of the mutually facing surfaces of the two arc-extinguishing magnets 71 are opposite to one another. That is, a left face of the arc-extinguishing magnet 71 located on the left side of the ceramic cover 211 is S pole and the right face thereof is N pole, and a left face of the arc-extinguishing magnet 71 located on the right side of the ceramic cover 211 is S pole and the right face thereof is N pole.

Of course, the polarities of the mutually facing surfaces of the two arc-extinguishing magnets 71 may also be designed to be the same, for example, the left face of the arc-extinguishing magnet 71 located on the left side of the ceramic cover 211 is S pole and the right face thereof is N pole, and the left face of the arc-extinguishing magnet 71 located on the right side of the ceramic cover 211 is N pole and the right face thereof is S pole.

As such, the two arc-extinguishing magnets 71 opposite to each other are arranged such that a magnetic field may be formed around the contact assembly 3. Therefore, an arc is generated between the stationary contact leading-out terminal 31 and the movable contact piece 32, may be elongated in a direction away from each other under the action of the magnetic field, thereby realizing the arc extinction.

The arc extinguishing unit 7 also includes two yoke clamps 72 arranged corresponding to the two arc-extinguishing magnets 71. Furthermore, the two yoke clamps 72 surround the ceramic cover 211 and two arc-extinguishing magnets 71. Through the design that the yoke clamp 72 surrounds the arc-extinguishing magnet 71, it may be avoided that the magnetic field generated by the arc-extinguishing magnet 71 spreads outward, and affects the arc-extinguishing effect. The yoke clamp 72 is made of a soft magnetic material that may include, but are not limited to, iron, cobalt, nickel, and alloys thereof.

The first yoke plate 22 is arranged in the hollow chamber 14, and includes a first side surface 223 and a second side surface 224 which are oppositely arranged, and a through hole 222 which penetrates through the first side surface 223 and the second side surface 224.

The ceramic cover 211 is connected with the first side surface 223 of the first yoke plate 22 through the connector 212 and covers the through hole 222. The ceramic cover 211, the connector 212 and the first yoke plate 22 together enclose the contact chamber 27. The contact chamber 27 is communicated with the through hole 222, and the contact chamber 27 is configured to accommodate the stationary contact leading-out terminals 31 and the movable contact piece 32.

The metal cover 23 is connected with the second side surface 224 of the first yoke plate 22 and covers the through hole 222. The metal cover 23 and the first yoke plate 22 enclose a driving chamber 24. The driving chamber 24 is communicated with the through hole 222, and is configure to accommodate a static iron core 413 and a movable iron core 414, which will be described in detail below. The contact chamber 27 is communicated with the driving chamber 24 through the through hole 222. In this embodiment, the contact chamber 27 is communicated with the driving chamber 24 to form a sealed chamber.

The ceramic cover 211 is connected with the first yoke plate 22 through the connector 212. Specifically, the connector 212 may have an annular structure. One end of the connector 212 is connected to an opening edge of the ceramic cover 211, for example, by laser welding, brazing, resistance welding, gluing, etc., and the other end of the connector 212 is connected to the first side surface of the first yoke plate 22, by the same way of laser welding, brazing, resistance welding or gluing. A connector 212 is provided between the ceramic cover 211 and the first yoke plate 22, which can facilitate the connection between the ceramic cover 211 and the first yoke plate 22.

Further referring to FIG. 52, the driving assembly 4 includes an electromagnet unit 41 and a pushing unit 42. The electromagnet unit 41 is arranged on a side of the first yoke plate 22 facing away from the ceramic cover 211. The pushing unit 42 is connected with the electromagnet unit 41 actuated. The pushing unit 42 is movably arranged in the driving chamber 24 and is connected with the movable contact piece 32 through the through hole 222.

When the electromagnet unit 41 is powered on, it may drive the pushing unit 42 move, and then drive the movable contact piece 32 move to contact with or separate from the stationary contact leading-out terminal 31.

The electromagnet unit 41 includes a bobbin 411, a coil 412, a static iron core 413 and a movable iron core 414. The bobbin 411 has a hollow cylindrical shape and is formed of an insulating material. The metal cover 23 is configured to be set inside the bobbin 411. The coil surrounds the bobbin 411. The static iron core 413 is fixedly arranged in the metal cover 23, and a portion of the static iron core 413 may protrude into the through hole 222. The static iron core 413 has a first perforation 4131 which is arranged corresponding to the through hole 222, and penetrated for the pushing unit 42. The movable iron core 414 is movably arranged in the metal cover 23 and opposite to the static iron core 413. The movable iron core 414 is connected with the pushing unit 42 to be attracted by the static iron core 413 when the coil is powered on. The movable iron core 414 and the pushing unit 42 may be connected by screwing, riveting, welding or other ways.

In this embodiment, the bobbin 411 is made of a resin material and includes a first flange part 4111, a hollow cylindrical part 4112 and a second flange part 4113. The first flange part 4111 and the second flange part 4113 are respectively arranged at both ends of the hollow cylindrical part 4112. An outer periphery of the hollow cylindrical part 4112 surrounds the coil 412. The metal cover 23 is set inside the hollow cylindrical part 4112.

The electromagnet unit 41 further includes a first elastic member 415. The first elastic member 415 is located inside the metal cover 23 and arranged between the static iron core 413 and the movable iron core 414, for resetting the movable iron core 414 when the coil is powered off. The first elastic member 415 may be a spring and sleeved outside the pushing unit 42.

The relay further includes a second yoke plate 25 and a pair of third yoke plates 26. The second yoke plate 25 is arranged opposite to the first yoke plate 22, and the bobbin 411 is interposed between the first yoke plate 22 and the second yoke plate 25, that is, the first yoke plate 22 is connected to the first flange part 4111 of the bobbin 411, and the second yoke plate 25 is connected to the second flange part 4113 of the bobbin 411.

The pair of third yoke plates 26 are respectively arranged at both ends of the second yoke plate 25 along a length direction of the movable contact piece 32, and extend toward the first yoke plate 22, and are connected to both ends of the first yoke plate 22 along the length direction of the movable contact piece 32.

As such, the first yoke plate 22, the second yoke plate 25 and the pair of third yoke plates 26 surround the coil 412.

It can be understood that the second yoke plate 25 and the pair of third yoke plates 26 may be an integral structure, for example, molded by bending them. The first yoke plate 22, the second yoke plate 25 and the pair of third yoke plates 26 which are integrally formed may be a separated structure.

The relay further includes a magnetic bush 416. The magnetic sleeve 416 may be made of a soft magnetic material which may include but not limited to iron, cobalt, nickel, and alloys thereof. The magnetic sleeve 416 is arranged in a gap formed between an inner circumferential surface of the lower end of the hollow cylindrical part 4112 of the bobbin 411 and an outer circumferential surface of the metal cover 23, so that the first yoke plate 22, the second yoke plate 25, the pair of third yoke plates 26, the static iron core 413, the movable iron core 414 and the magnetic sleeve 416 a magnetic circuit together form.

The pushing unit 42 includes a U-shaped bracket 421, a base 422, a fixed piece, a push rod 423, a second elastic member 424, a first magnet 425 and a second magnet 426. The first magnet 425 is fixedly connected with the U-shaped bracket 421, and the first magnet 425 is arranged on an inner side surface of the U-shaped bracket 421. The second magnet 426 is fixedly connected with the movable contact piece 32. The base 422, the fixed piece and the upper part of the push rod 423 may be formed by integrated injection molding.

The bottom of the U-shaped bracket 421 is fixedly connected with the fixed piece. The U-shaped bracket 421 and the base 422 form a frame structure, and the movable contact piece 32, the first magnet 425 and the second magnet 426 are installed in the frame structure surrounded by the U-shaped bracket 421 and the base 422. Moreover, the second elastic member 424 is also arranged in the frame structure surrounded by the U-shaped bracket 421 and the base 422. One end of the second elastic member 424 abuts against the base 422, and the other end of the second elastic member abuts against the movable contact piece 32. The second elastic member 424 may provide an elastic force, such that the movable contact piece 32 and the second magnetizer 426 have a trend far away from the base 422 and close to the first magnet 425. The push rod 423 passes through the through hole 222 of the first yoke plate 22 and the first perforation 4131 of the static iron core 413, and one end of the push rod 423 is fixedly connected with the base 422, and the other end of the push rod 423 is fixedly connected with the movable iron core 414.

It can be understood that the second elastic member 424 may be a spring. The first magnet 425 and the second magnet 426 may be made of soft magnetic materials, such as iron, cobalt, nickel, and alloys thereof.

When the push rod 423 does not move upward, a top face of the movable contact piece 32 abuts against the first magnet 425 under the action of the second elastic member 424. When the coil 412 is energized to drive the push rod 423 to move upward, the two ends of the movable contact piece 32 are respectively in contact with the two stationary contact leading-out terminals 31. Subsequently, the push rod 423 continues to move upward, and the first magnet 425 also continues to move upward along with the push rod 423. However, the movable contact piece 32 has been in contact with the two stationary contact leading-out terminals 31, so that the movable contact piece 32 may not continue to move upward for the over-travel of the contacts. The second elastic member 424 provides an elastic force, such that a certain gap is formed between the bottom face of the first magnet 425 and the top face of the movable contact piece 32, so that there is a magnetic gap between the first magnet 425 and the second magnet 426.

Figure 53:
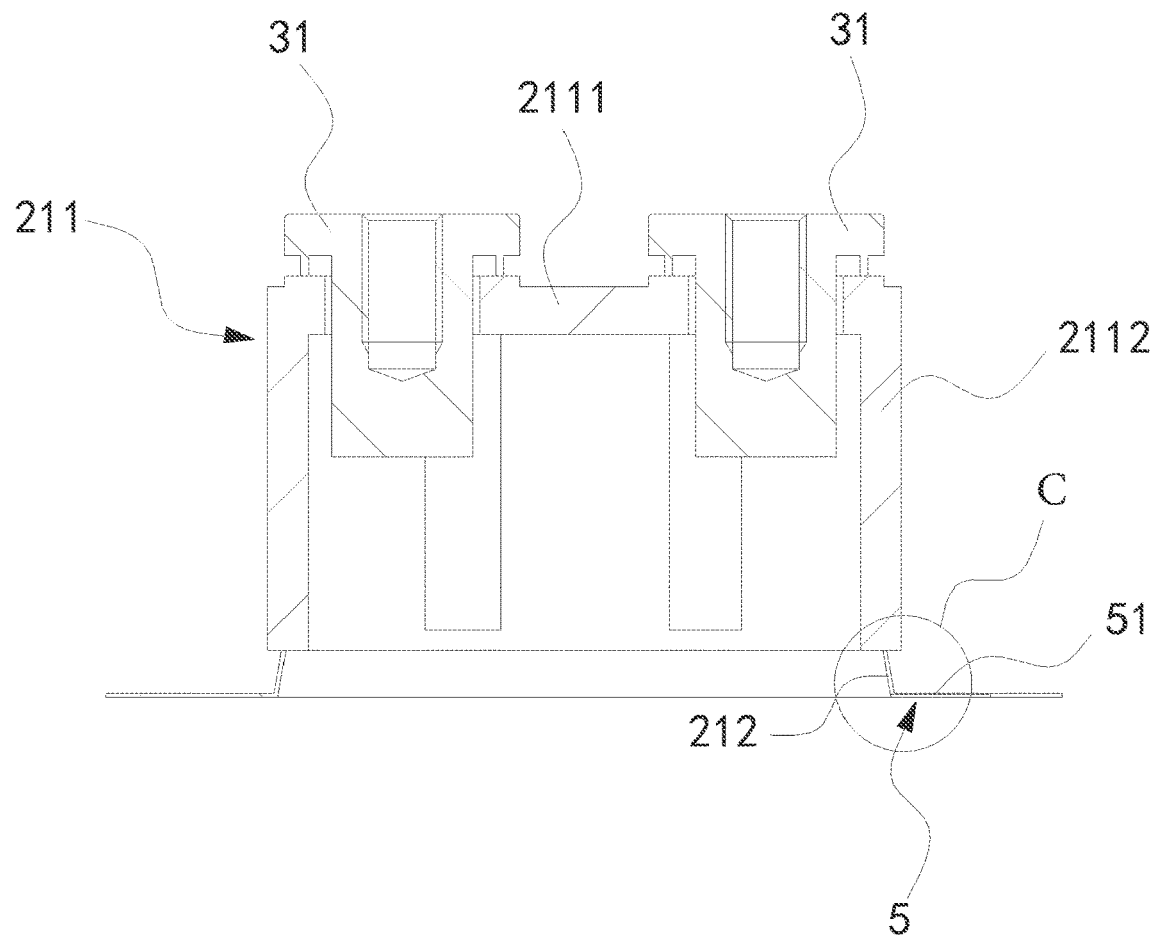
FIG. 53 is a sectional view of a connector and a valve plate according to the first embodiment of the present disclosure after being assembled.
Figure 54:
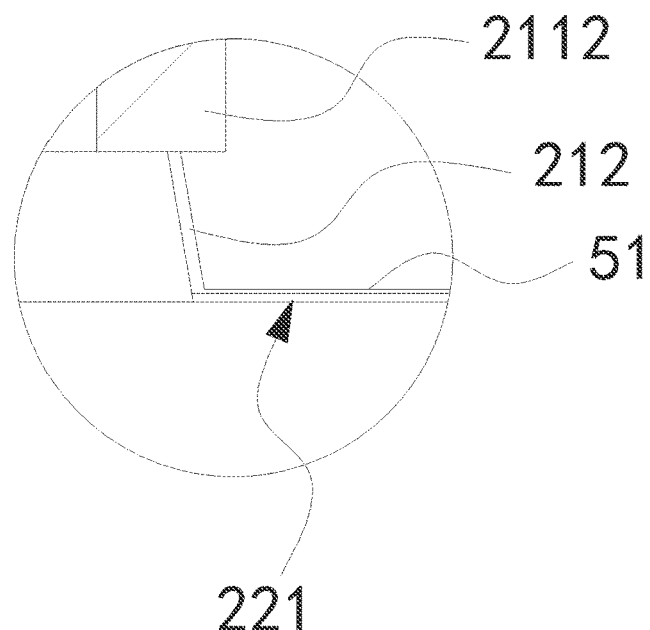
FIG. 54 shows a partial enlarged view of C in FIG. 53.

As shown in FIGS. 53 and 54, FIG. 53 is a sectional view of the connector and valve plate according to the first embodiment of the present invention after being assembled. FIG. 54 is a partial enlarged view at C in FIG. 53. The ceramic cover 211 includes a top wall 2111 and a side wall 2112, and the stationary contact leading-out terminals 31 are arranged on the top wall 2111. The side wall 2112 surrounds an edge of the top wall 2111, extends toward the first yoke plate 22, and is connected with the connector 212. The connector 212 is connected with the first yoke plate 22. The connector 212 is provided with the pressure relief hole 221. The pressure relief valve assembly 5 includes a valve plate 51. The valve plate 51 may be integrally arranged at the pressure relief hole 221 of the connector 212 for closing or opening the pressure relief hole 221.

It can be understood that the side surface of the valve plate 51 may be flush with an inner wall face or an outer wall face of the connector 212. Of course, the two opposite side surfaces of the valve plate 51 may not be flush with the inner wall face and the outer wall face of the connector 212. When the valve plate 51 and the connector 212 are an integrated structure, the valve plate 51 and the connector 212 are made of the same materials.

Figure 55:
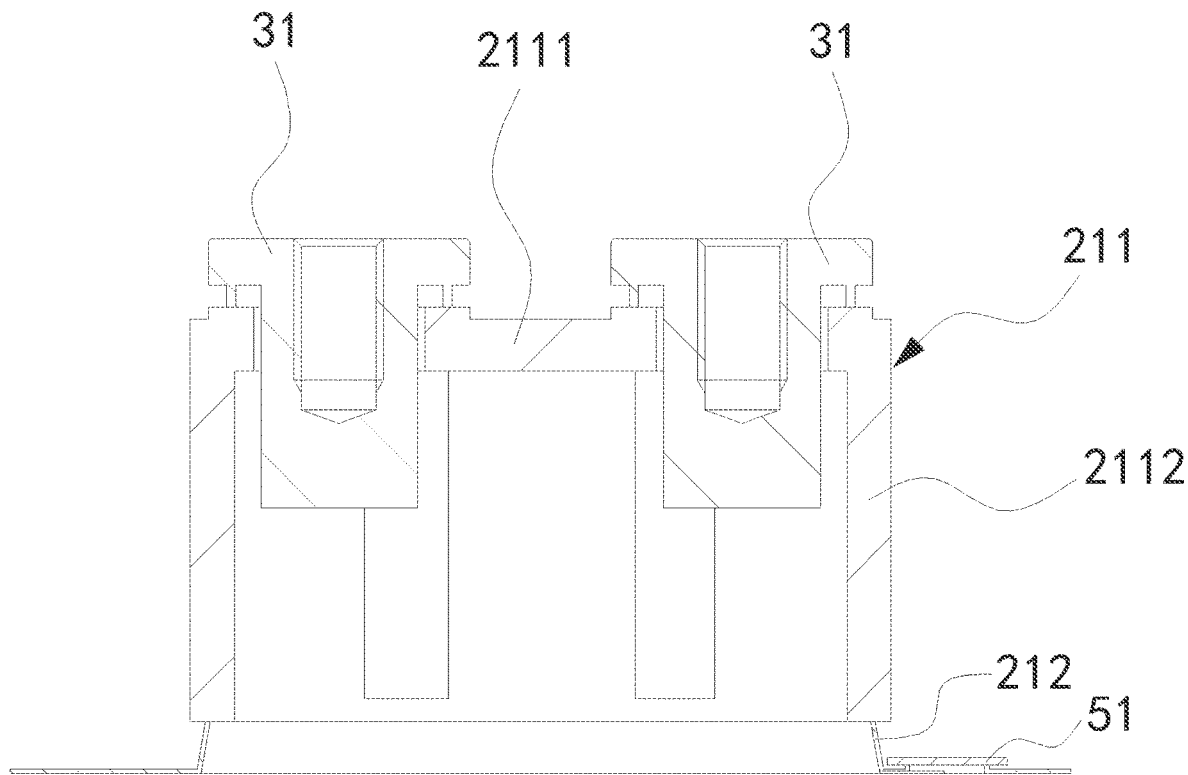
FIG. 55 is a sectional view of a connector and a valve plate according to the second embodiment of the present disclosure after being assembled.

As shown in FIG. 55, it is a sectional view of a connector and a valve plate according to the second embodiment of the present disclosure after being assembled. The same portions between the second embodiment and the first embodiment will not be repeated here, but the difference therebetween is that the valve plate 51 and the connector 212 are separately arranged and cover the pressure relief hole 221.

It can be understood that the valve plate 51 may be directly connected to the connector 212 or connected to the connector 212 through a transition part. The valve plate 51 may be arranged on the inner wall face of the connector 212 or on the outer wall face of the connector 212.

It can be understood that the valve plate 51 may be made of metallic materials or nonmetallic materials. The metal materials include, but are not limited to iron and nickel and their alloys, copper and its alloys, aluminum and its alloys, etc. The non-metallic materials include, but are not limited to ceramics, glass, and carbon fiber, etc.

Figure 56:
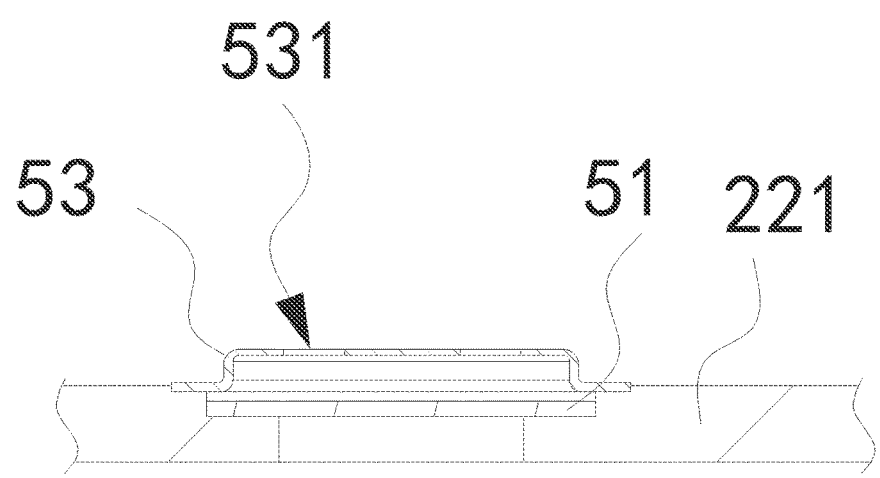
FIG. 56 is a sectional view of a protective cover being installed to the connector according to an embodiment of the present disclosure.

As shown in FIG. 56, it is a sectional view of a protective cover 52 is installed to the connector according to the embodiment of the present disclosure. The pressure relief valve assembly 5 further includes a protective cover 53, which is connected to the connector 212 and arranged above the valve plate 51. The protective cover 53 has a vent hole 531 through which the gas in the contact chamber 27 may act on the valve plate 51.

It can be understood that the protective cover 53 may be arranged at the outer wall face of the connector 212.

In this embodiment, by providing the protective cover 53 additionally, the gas can break through the valve plate 51 in the abnormal working state, and the valve plate 51 can be protected during the transportation or installation of the connector 212 so as to prevent the valve plate 51 from being punctured by foreign objects.

It can be understood that the protective cover 53 may be made of metallic materials or nonmetallic materials. The metal materials include, but are not limited to iron and nickel and their alloys, copper and its alloys, aluminum and its alloys, etc. the non-metallic materials include, but are not limited to ceramics, glass, carbon fiber, plastics, etc.

The protective cover 53 may be connected to the connector 212 by laser welding, brazing, resistance welding, and gluing, etc.

Figure 57:
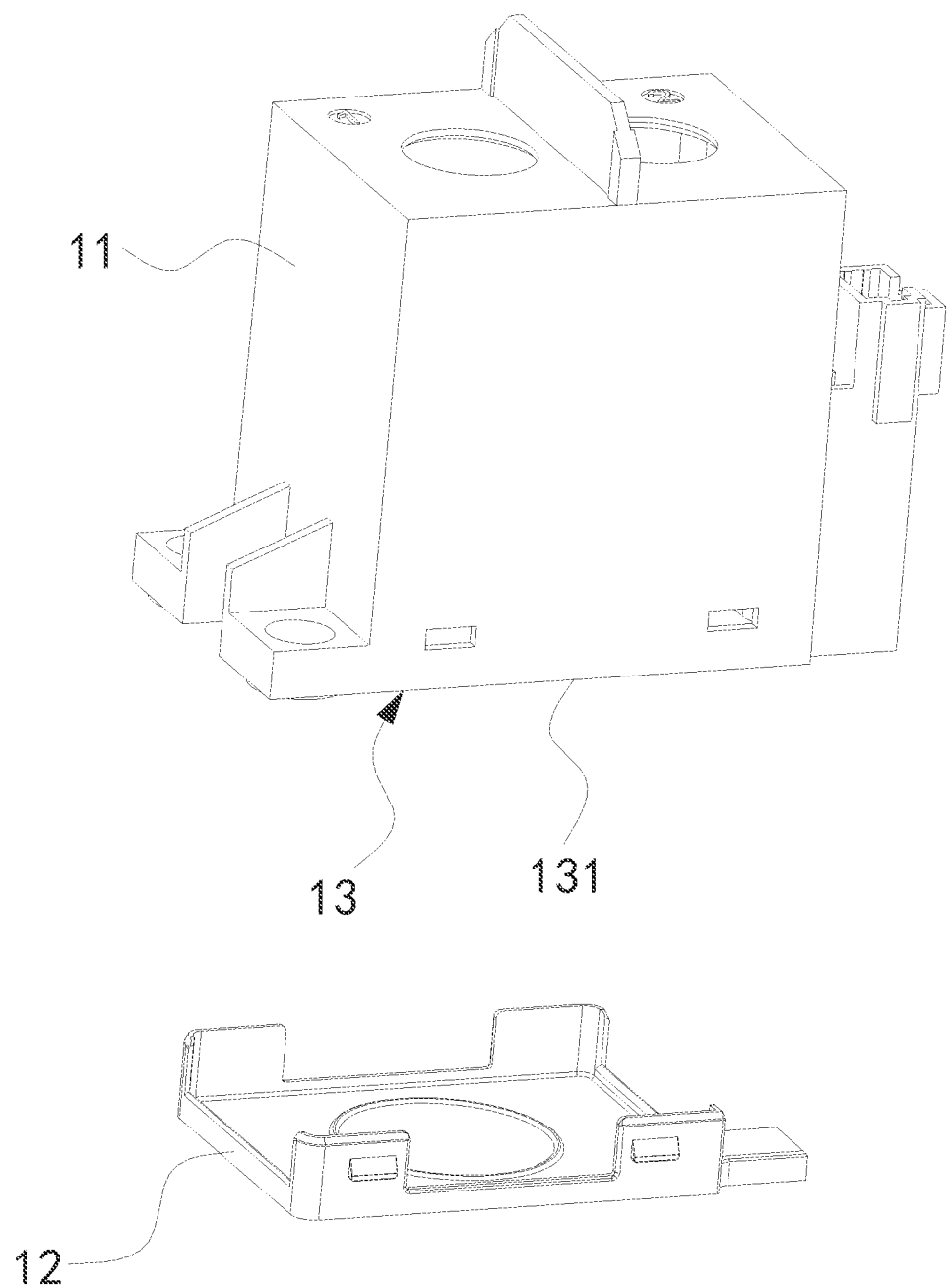
FIG. 57 is an exploded schematic view of a first embodiment of a shell of the present disclosure.

As shown in FIG. 57, it is an exploded schematic view of the first embodiment of the shell 1 of the present disclosure. The shell 1 according to the embodiment of the present disclosure includes a first housing 11 and a second housing 12, and the second housing 12 is detachably connected with the first housing 11; the first housing 11 and/or the second housing 12 are provided with an exhaust structure 13 that is communicated with the hollow chamber 14.

The exhaust structure 13 is configured such that the shell 1 according to the embodiment of the present disclosure is an unsealed structure, in which the gas may be discharged from the inside of the contact chamber 27 through the pressure relief hole 221, and then enter the hollow chamber 14 of the shell 1, and finally discharged to the outside of the shell 1 through the exhaust structure 13.

In addition, the shell 1 according to the embodiment of the present disclosure may also prevent gas spatter generated in the contact chamber 27 from being directly discharged to the outside of the relay at the moment of being exhausted, so as to avoid polluting other electronic devices in the vicinity of the relay. The gas spatter is generated by the metal materials of the contact assembly 3 being ablated and volatilized at a high temperature by burning the arc.

Referring to FIG. 57, the exhaust structure 13 includes a gap 131 formed between the first housing 11 and the second housing 12. The gas is discharged from the relay through the gap 131 between the first housing 11 and the second housing 12.

In this embodiment, the gap 131 is located at the bottom of the shell 1.

Figure 58:
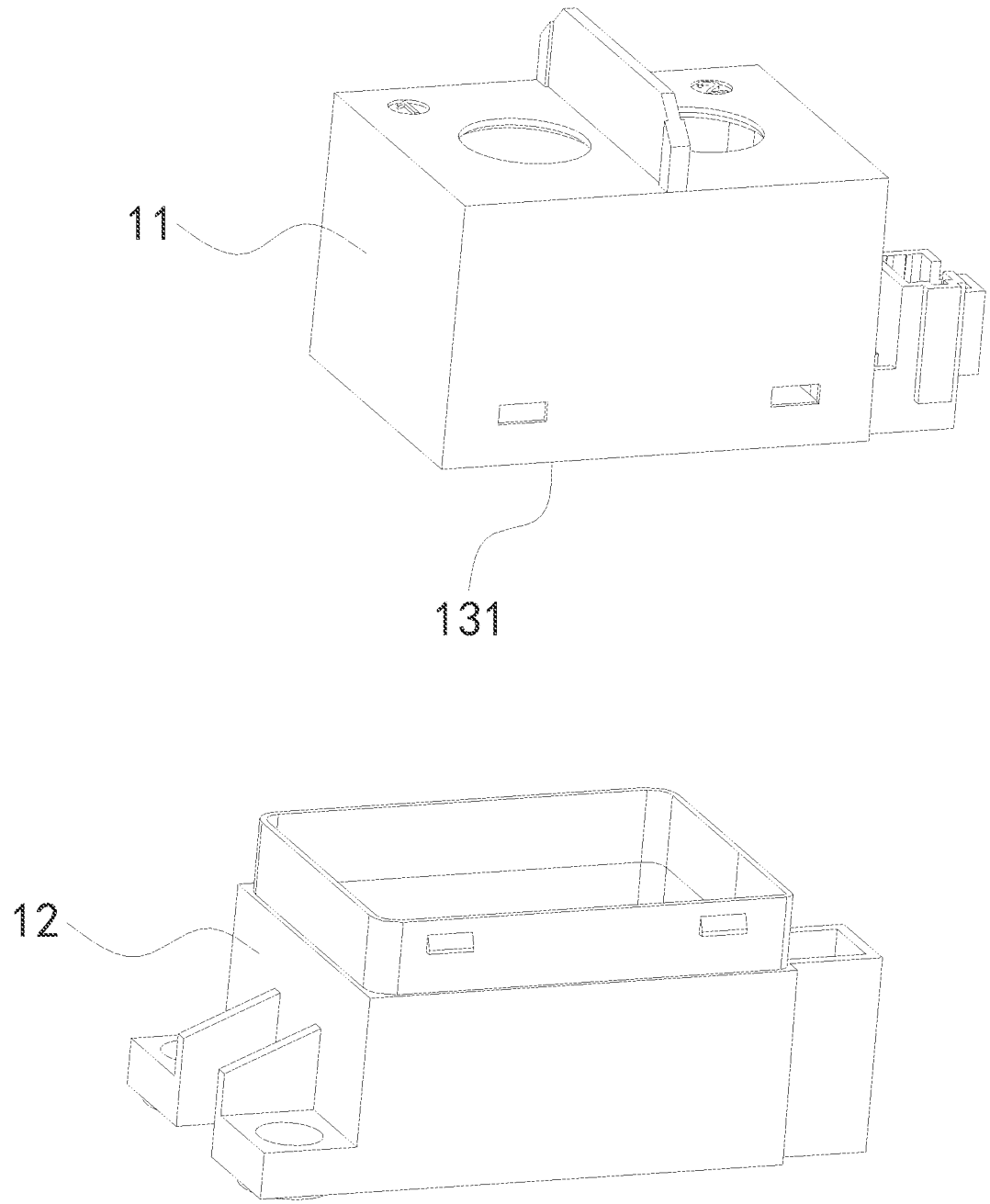
FIG. 58 is an exploded schematic view of a second embodiment of the shell of the present disclosure.

As shown in FIG. 58, it shows an exploded schematic view of the second embodiment of the shell 1 of the present disclosure. The same portions between the shell 1 of the second embodiment and the shell 1 of the first embodiment will not be repeated here, but the difference thereof is that the gap 131 is located in a middle area of the shell 1 in a height direction.

Figure 59:
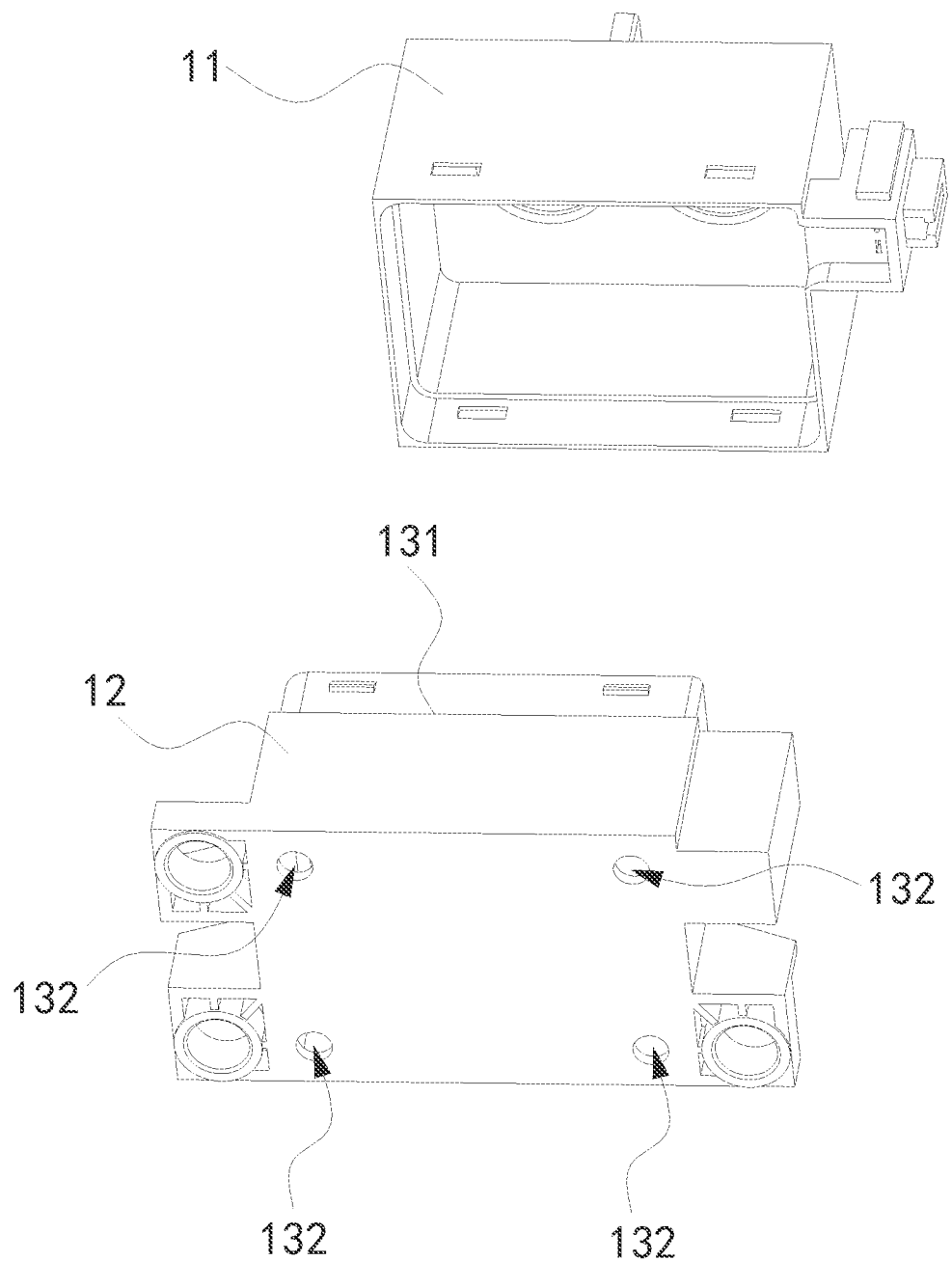
FIG. 59 is an exploded schematic view of a third embodiment of the shell of the present disclosure.

As shown in FIG. 59, it shows an exploded schematic view of a third embodiment of the shell 1 of the present disclosure. The same portions between the shell 1 of the third embodiment and the shell 1 of the second embodiment will not be repeated, but the difference thereof is that the exhaust structure 13 includes a gap 131 and an exhaust hole 132, and the gap 131 is formed in the middle area of the shell 1 in the height direction, and the exhaust hole 132 is formed in the second housing 12. The gas may be discharged from the relay through the gap 131 and the exhaust hole 132. Of course, the exhaust hole 132 may also be arranged on the first housing 11.

Figure 60:
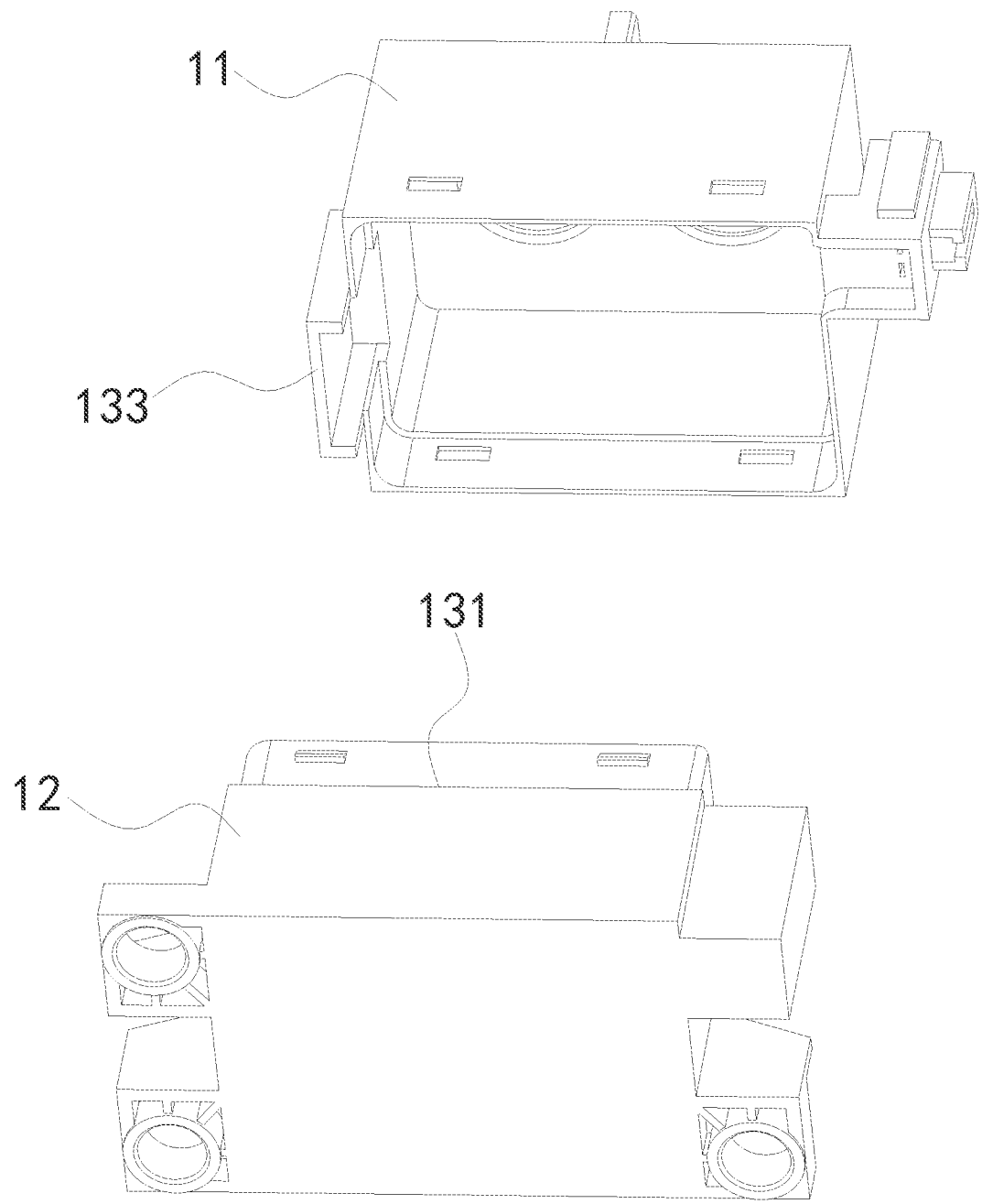
FIG. 60 is an exploded schematic view of a fourth embodiment of the shell of the present disclosure.

As shown in FIG. 60, it is an exploded schematic view of the fourth embodiment of the shell 1 of the present disclosure. The same portions between the shell 1 of the fourth embodiment and the shell 1 of the above-mentioned embodiments will not be repeated here, but the difference therebetween is that the exhaust structure 13 includes a gap 131 and an exhaust cover 133. The gap 131 is formed in the middle area of the shell 1 in the height direction, and the exhaust cover 133 is arranged on the first housing 11, and the opening of the exhaust cover 133 faces downward. In this way, the gas can be discharged from the relay through the gap 131 and the exhaust cover 133, and the gas discharged from the exhaust cover 133 is ejected downward without affecting other electronic devices in the vicinity of the relay.

Of course, the exhaust cover 133 may also be arranged on the second housing 12; alternatively, both the first housing 11 and the second housing 12 are provided with an exhaust cover 133.

Figure 61:
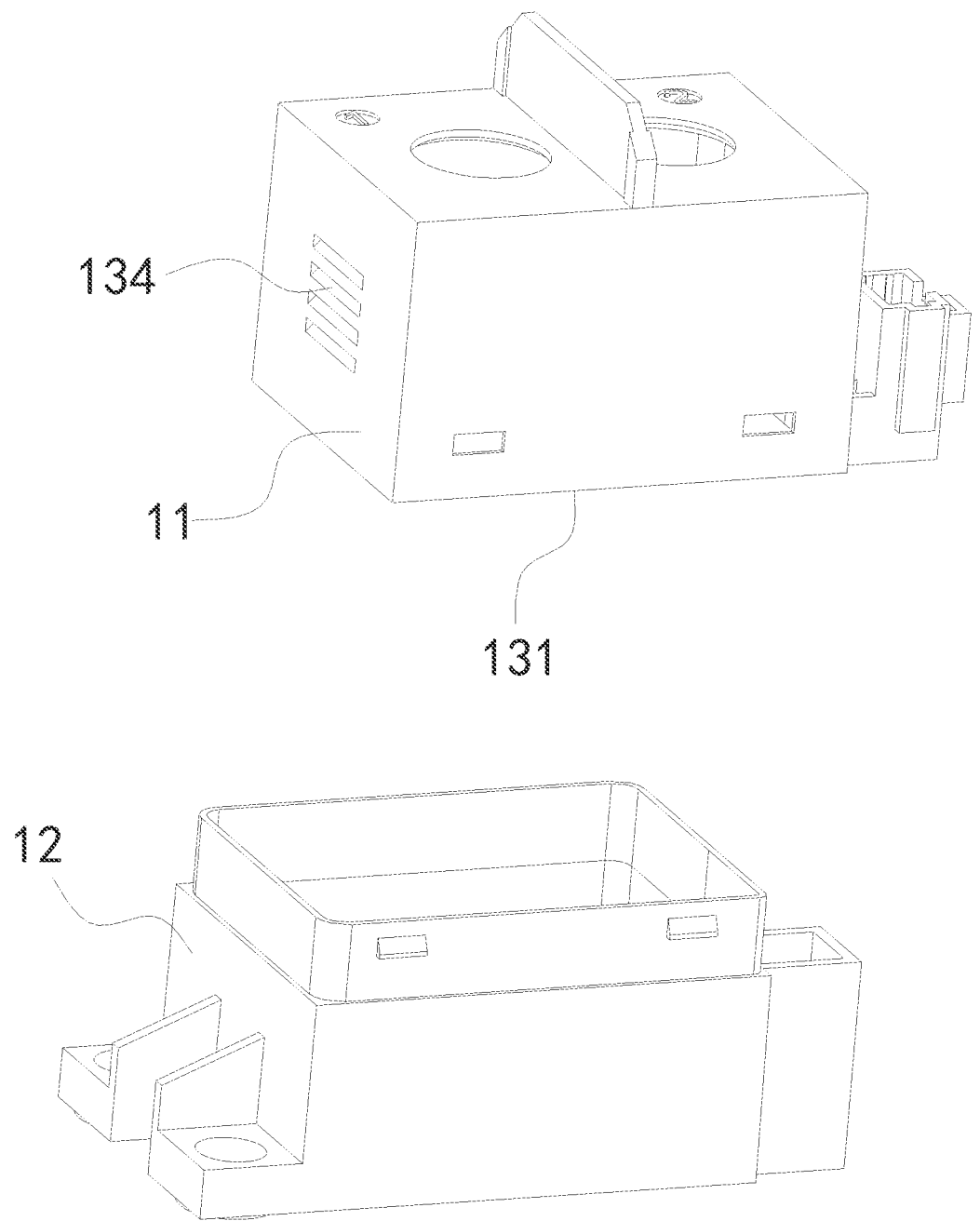
FIG. 61 is an exploded schematic view of a fifth embodiment of the shell of the present disclosure.

As shown in FIG. 61, it shows an exploded schematic view of a fifth embodiment of the shell 1 of the present disclosure. The same portions of the shell 1 of the fifth embodiment and the shell 1 of the above-mentioned embodiments will not be repeated here, but the difference thereof is that the exhaust structure 13 includes a gap 131 and an exhaust grid 134, and the gap 131 is formed in the middle area of the shell 1 in the height direction, and the exhaust grid 134 is arranged on the first housing 11. Of course, the exhaust grid 134 may also be arranged on the second housing 12, or both the first housing 11 and the second housing 12 are provided with the exhaust grid 134.

The gas may be discharged from the relay through the gap 131 and the exhaust grid 134. When the gas passes through the exhaust grid 134, the exhaust grid 134 can make the gas flow gentler, and prevent the discharged gas from affecting other electronic devices in the vicinity of the relay.

It can be understood that various embodiments/implementations provided by the present disclosure can be combined with each other without contradiction, and will not be exemplified here.

As above described, the relay according to the embodiment of the present disclosure at least include following advantages and beneficial effects.

According to the relay of the embodiment of the present disclosure, the pressure relief valve assembly 5 is arranged on the connector 212 to release overpressure gas, so as to ensure that the relay cannot explode and disintegrate the chamber due to rapid expansion of the gas caused by the high temperature in the chamber in the abnormal working states such as short circuit and overload breaking, and thereby increasing the reliability of the products.

In addition, the shell 1 of the relay according to the embodiment of the present disclosure is designed to have a non-sealed structure, which can not only discharge the exhausted gas timely, but also prevent exhausted substances from polluting the other electronic devices.

Referring to FIGS. 62-76, embodiments of the present disclosure further provide a relay capable of improving safety, to solve a problem of easy explosion in the related art.

The relay according to the embodiment of the present disclosure includes a container, a contact assembly, a driving assembly and a metal cover. The container includes an insulation cover, a first yoke plate and a metal cover. The insulation cover and the first yoke plate are connected and form a contact chamber, the metal cover and the first yoke plate are connected and form a driving chamber. The first yoke plate is provided with a through hole, through which the contact chamber is communicated with the driving chamber. The metal cover is provided with a pressure relief hole that is communicated with the driving chamber. The contact assembly includes a pair of stationary contact leading-out terminals and a movable contact piece, and the stationary contact leading-out terminals are arranged on the insulation cover, one end of each of the stationary contact leading-out terminals protrudes into the contact chamber, and the movable contact piece is arranged in the contact chamber and configured to be driven to contact with or separate from the pair of stationary contact leading-out terminals, respectively. The driving assembly includes a pushing unit. The pushing unit may movably pass through the through hole. The pushing unit has one end protruding into the contact chamber and connected with the movable contact piece and the other end protruding into the driving chamber. The pressure relief valve assembly is arranged at the metal cover and configured to close the pressure relief hole when a gas pressure in the container is less than a threshold and configured to be broken to open the pressure relief hole when the gas pressure in the container is greater than or equal to the threshold.

According to some embodiments of the present disclosure, the pressure relief valve assembly includes a valve plate that is integrally arranged at the metal cover for closing or opening the pressure relief hole.

According to some embodiments of the present disclosure, the pressure relief valve assembly includes a valve plate that is separately arranged from the metal cover and arranged at the pressure relief hole for closing or opening the pressure relief hole.

According to some embodiments of the present disclosure, the metal cover has an inner wall face and an outer wall face, and the valve plate is arranged on the inner wall face and/or the outer wall face.

According to some embodiments of the present disclosure, the pressure relief valve assembly further includes a transition part, through which the valve plate is connected to the metal cover.

According to some embodiments of the present disclosure, the pressure relief valve assembly further includes a protective cover which is connected to the metal cover and is arranged at an outer surface of the valve plate; and the protective cover is provided with a vent hole.

According to some embodiments of the present disclosure, the metal cover includes:
a bottom wall provided with a pressure relief hole;
a side wall surrounding an edge of the bottom and extending to a direction of the first yoke plate, and connected with the first yoke plate.

According to some embodiments of the present disclosure, the driving assembly includes:
an electromagnet unit arranged at a first yoke plate side away from the insulation cover; and a pushing unit connected with the electromagnet unit actuated.

According to some embodiments of the present disclosure, the electromagnet unit includes:
a bobbin in a hollow tubular shape and into which the metal cover is set; and
a coil surrounding the bobbin;
a static iron core fixedly arranged in the metal cover, and a portion of the static iron core protrudes into the through hole, wherein the static iron core is provided with a first perforation, and the first perforation is arranged corresponding to the through hole, into which the pushing unit passes through;
a movable iron core movably arranged in the metal cover and arranged opposite to the static iron core, wherein the movable iron core is connected with the pushing unit to be attracted by the static iron core when the coil is powered on; and
a first elastic member arranged between the static iron core and the movable iron core, and is configured for resetting the movable iron core when the coil is powered off.

According to some embodiments of the present disclosure, the relay further includes a shell with a hollow chamber;
the container, the driving assembly and the pressure relief valve assembly are all located in the hollow chamber.

According to some embodiments of the present disclosure, the shell includes:
a first housing; and
a second housing detachably connected with the first housing, wherein the first housing and/or the second housing are provided with an exhaust structure, and the exhaust structure is communicated with the hollow chamber.

According to some embodiments of the present disclosure, the exhaust structure includes a gap formed between the first housing and the second housing.

According to some embodiments of the present disclosure, the exhaust structure includes an exhaust hole and/or an exhaust cover and/or an exhaust grid.

According to some embodiments of the present disclosure, the hollow chamber is communicated with an outside of the housing.

According to some embodiments of the present disclosure, a structural strength of the pressure relief valve assembly is less than that of the container.

According to some embodiments of the present disclosure, the insulation cover includes:
a ceramic cover, on which the stationary contact leading-out terminals are arranged; and
a connector, one end of which is connected with an opening edge of the ceramic cover, and the other end of which is connected with the first yoke plate.

One of the above embodiments of the present disclosure has at least the following advantages or beneficial effects:

In the relay according to the embodiment of the present disclosure, the pressure relief valve assembly is arranged on the metal cover to release overpressure gas, so as to ensure that the relay cannot explode and disintegrate the chamber due to the rapid expansion of the gas caused by a high temperature in the chamber in the abnormal working states such as short circuit and overload breaking, and thus the reliability of the products can be increased.

In addition, the shell of the relay according to the embodiment of the present disclosure is designed to have a non-sealed structure, which can discharge the exhaust gas timely, but also prevent the discharged substances from polluting the other electronic devices.

As described in the background, there is a security risk that the contact sealed cavity is prone to explode when the contact system of the relay in the related art is at a moment of large current short circuit or overload break. In the research, an inventor of the present disclosure found that an intense arcing of the contact in the sealed cavity high temperature occurs such that a high temperature is generated instantly in the sealed cavity, and then gas pressure in the sealed cavity of the contact suddenly rises, and once the gas pressure intensity in the sealed cavity of the contact is greater than a strength of the components or the strength at a joint of the sealed cavity of the contact, the sealed cavity of the contact of the relay can easily explode.

Figure 62:
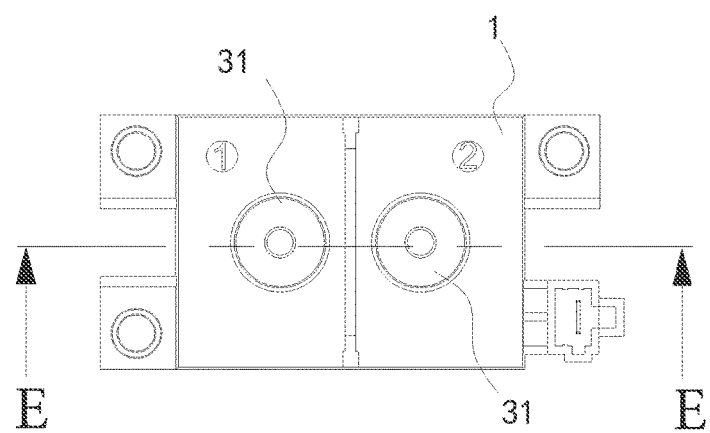
FIG. 62 shows a top view of a relay according to an embodiment of the present disclosure.
Figure 63:
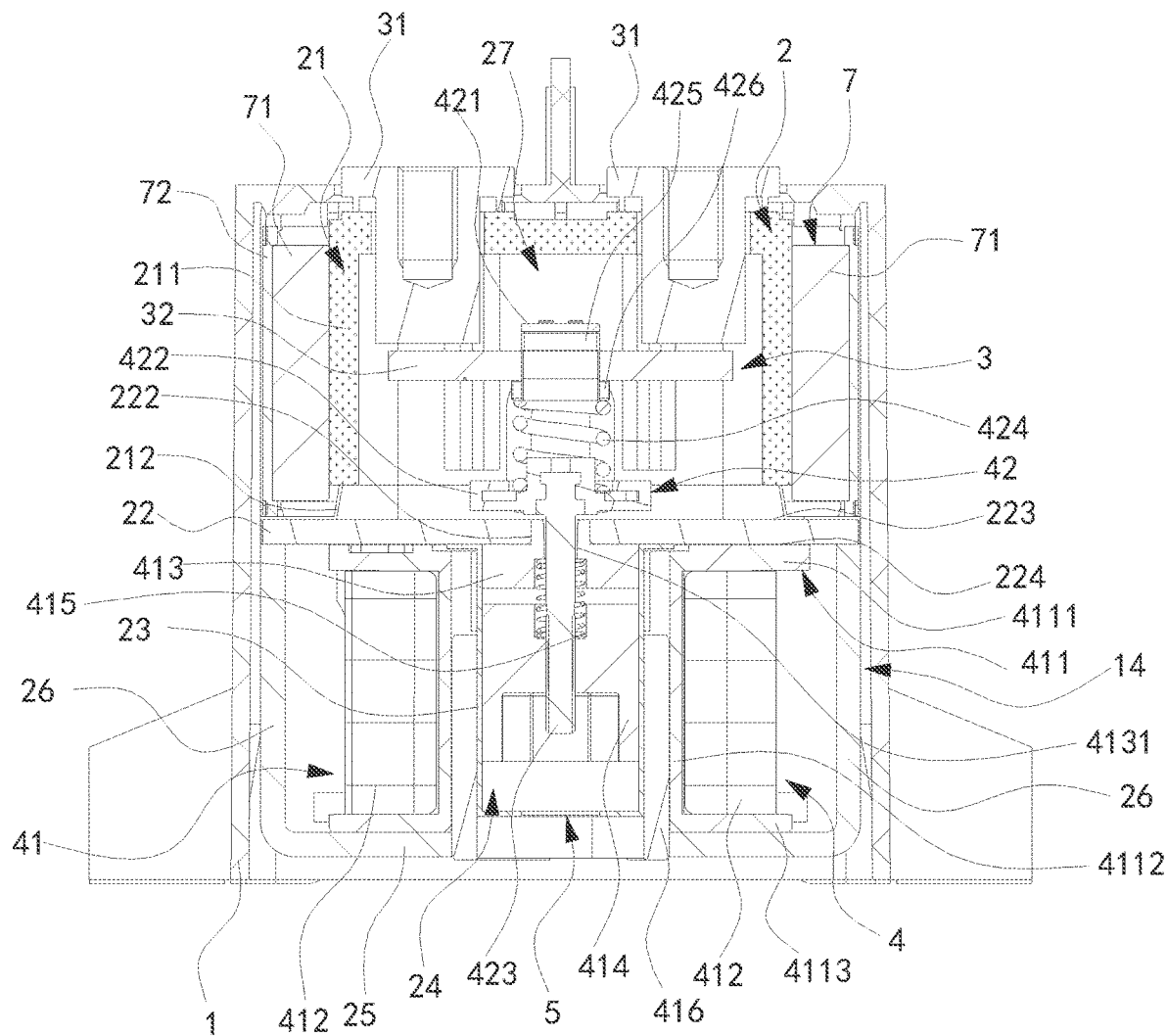
FIG. 63 shows a sectional view taken along line E-E in FIG. 62.

As shown in FIGS. 62 and 63, FIG. 62 shows a top view of a relay according to an embodiment of the present disclosure. FIG. 63 shows a sectional view taken along a line E-E in FIG. 62. The relay according to the embodiment of the present disclosure includes a shell 1, a container 2, a contact assembly 3, a driving assembly 4 and a pressure relief valve assembly 5. The shell 1 has a hollow chamber 14 which communicates with an outside of the shell 1. The container 2 is arranged in the hollow chamber 14 and includes an insulation cover 21, a first yoke plate 22 and a metal cover 23. The insulation cover 21 is connected with the first yoke plate 22 and forms a contact chamber 27, and the metal cover 23 is connected with the first yoke plate 22 and forms a driving chamber 24. The first yoke plate 22 has a through hole 222, through which the contact chamber 27 is communicated with the driving chamber 24. The metal cover 23 has a pressure relief hole 221 which penetrates through a wall of the metal cover 23 and is communicated with the driving chamber 4 and the hollow chamber 14. The contact assembly 3 includes a pair of stationary contact leading-out terminal 31 and a movable contact piece 32. The stationary contact leading-out terminals 31 are arranged on the insulation cover 21. Each of the stationary contact leading-out terminal 31 has one end extending into the contact chamber 27, and the other end exposed to an outer surface of the shell 1. The movable contact piece 32 is arranged in the contact chamber 27. The driving assembly 4 is arranged in the hollow chamber 14, and the driving assembly includes a pushing unit 42, the pushing unit passes movably through the through hole 222. One end of the pushing unit 42 protrudes into the contact chamber 27 and is connected with the movable contact piece 32, and the other end of the pushing unit protrudes into the driving chamber 24. The pressure relief valve assembly 5 is arranged on the metal cover 23 to close the pressure relief hole 221 when a gas pressure in the container 2 is less than a threshold, and the pressure relief valve assembly is broken to open the pressure relief hole 221 when the gas pressure in the container 2 is greater than or equal to a threshold. A structural strength of the pressure relief valve assembly 5 is less than that of the container 2; in the normal working state, the maximum value of the gas pressure intensity in the container 2 is less than the structural strength of the pressure relief valve assembly 5; in the abnormal working state, the maximum value of the gas pressure intensity in the container 2 is greater than the structural strength of the pressure relief valve assembly 5. It can be understood that when the pressure relief valve assembly 5 closes the pressure relief hole 221, the airtightness of the container 2 can be maintained and the normal operation of the relay can be ensured. Of course, in other embodiments, when the pressure relief valve assembly 5 closes the pressure relief hole 221, the container 2 is not completely sealed, as long as it is guaranteed the relay can work normally.

In the relay according to the embodiment of the present disclosure, a pressure relief valve assembly 5 is arranged on the metal cover 23 to close or open the pressure relief hole 221. When the contact assembly 3 is in a normal working state, a gas pressure intensity in the container 2 is less than the threshold, so that the pressure relief valve assembly 5 is not broken by the gas pressure in the container 2, and is maintained in a state which the pressure relief hole 221 is closed such that the repay can work normally. When the contact assembly 3 is in an abnormal working state, the gas pressure intensity in the container 2 is greater than or equal to the threshold, so that the pressure relief valve assembly 5 is broken by the gas pressure in the container 2, and thus the container 2 communicates with the hollow chamber 14 of the shell 1 through the pressure relief hole 221, and then the gas pressure in the container 2 can be released to the hollow chamber 14 through the pressure relief hole 221, and finally released to the outside of the shell 1. That is to say, in the abnormal working state, during the process that the gas pressure intensity in the container 2 gradually rises, the gas pressure may first break through the pressure relief valve assembly 5, and then the rapidly increased gas pressure may be released through the pressure relief hole 221, so that the gas pressure in the container 2 cannot continue to rise, and cannot reach a structural strength of the container 2, and thereby avoiding the explosion of the container 2. In the normal working state, the gas pressure in the container 2 may not break through the pressure relief valve assembly 5, so the pressure relief valve assembly 5 can perform a function of sealing the pressure relief hole 221.

It could be understood that a term "normal working state" refers to that the current of the relay is under a rated working condition, and the term "abnormal working state" refers to that the contact assembly 3 is at a moment of a large current short circuit or at a moment of an overload breaking. In addition, the pressure as represented by the term "threshold" is slightly greater than the gas pressure intensity in the container 2 when the relay is in the normal working state. The threshold can also be adjusted according to different types of the relays, but cannot be greater than the structural strength of the container 2.

That is to say, when the relay is in a normal working state, the pressure in the container 2 cannot reach the threshold, so that the pressure relief valve assembly 5 cannot be broken. When the relay is in an abnormal working state, the pressure in the container 2 is greater than or equal to the threshold, and the pressure relief valve assembly 5 is broken by the gas.

In one embodiment, the structural strength of the pressure relief valve assembly 5 is less than that of the container 2. As such, when the relay is in an abnormal working state and the pressure of the gas in the container 2 rises gradually, the pressure relief valve assembly 5 can be broken by the gas prior to the container 2.

It can be understood that the structural strength of the pressure relief valve assembly 5 is less than that of the container 2, which can be achieved by different materials and/or different structures. For example, when the pressure relief valve assembly 5 and the wall of the container 2 have the same material, the thickness of the pressure relief valve assembly 5 may be designed to be thin and smaller than the wall of the container 2, so that the gas with gradually rising temperature may preferentially break through the pressure relief valve assembly 5. Of course, in the case that the pressure relief valve assembly 5 and the wall of the container 2 have the same thickness, the pressure relief valve assembly 5 may be made of ceramic, and the container 2 may be made of metal, so that the pressure relief valve assembly 5 may be broken first. Alternatively, the pressure relief valve assembly 5 is thin and made of ceramic, and the wall of the container 2 is thick and made of metal. Of course, it is possible that the structural strength of the pressure relief valve assembly 5 is less than that of the container 2 in other suitable ways, which will not be listed here.

In this embodiment, a thickness of the pressure relief valve assembly 5 may be less than a thickness of the wall of the metal cover 23, alternatively, the pressure relief valve assembly 5 may be made of ceramics, and the metal cover 23 may be made of metal.

It can be understood that terms "include" and "have" in the embodiment of the present disclosure and any variations thereof are intended to be included non-exclusively. For example, process, method, system, product or equipment that includes a series of steps or units is not limited to the steps or units that have been listed, but optionally steps or units that are not listed are also included, or optionally other steps or components inherent to these processes, methods, products or equipment are also included.

It should be noted that the relay according to the embodiment of the present disclosure may not include the shell 1, but the container 2, the contact assembly 3, the driving assembly 4 and the pressure relief valve assembly 5 are assembled and then directly installed in application products, such as battery packs and electrical control boxes.

Further referring to FIGS. 62 and 63. In this embodiment, the contact assembly 3 includes two stationary contact leading-out terminals 31 respectively for current inflow and current outflow, and one movable contact piece 32. The movable contact piece 32 may be in a straight piece shape. Both ends of the movable contact piece 32 in the length direction may be in contact with the two stationary contact leading-out terminals 31 respectively under the action of the driving assembly 4 so as to realize the connected load. The bottoms of the stationary contact leading-out terminals 31 serves as the stationary contacts, and both ends of the movable contact piece 32 in the length direction may serve as the movable contacts. The movable contacts at both ends of the movable contact piece 32 may protrude from other portions of the movable contact piece 32 or may be flush with other portions.

It can be understood that the stationary contacts may be integrally or separately arranged at the bottom of the stationary contact leading-out terminals 31, and the movable contact can be integrally or separately arranged at both ends of the movable contact piece 32 in the length direction.

Two stationary contact leading-out terminals 31 are arranged on the insulation cover 21, for example, at the top of the insulation cover 21. And, one end of each of the stationary contact leading-out terminals 31 extends into the interior of the contact chamber 27, and the other end thereof is exposed to the outer surface of the shell 1. One end of the stationary contact leading-out terminal 31 extending into the interior of the contact chamber 27 is used for contacting with the movable contact piece 32.

The relay also includes an arc extinguishing unit 7 that is arranged in the hollow chamber 14 of the shell 1, for extinguishing the arc of the contact assembly 3.

In this embodiment, the arc extinguishing unit 7 includes two arc-extinguishing magnets 71. The arc-extinguishing magnets 71 may be permanent magnets, and each of the arc-extinguishing magnets 71 may be a substantially rectangular shape. The two arc-extinguishing magnets 71 are respectively arranged on both sides of the insulation cover 21 and are oppositely arranged along a length direction of the movable contact piece 32.

As shown in FIG. 63, two arc-extinguishing magnets 71 are located on left and right sides of the insulation cover 21. In this embodiment, polarities of the mutually facing surfaces of the two arc-extinguishing magnets 71 are opposite to one another. That is, a left face of the arc-extinguishing magnet 71 located on the left side of the insulation cover 21 is S pole and the right face thereof is N pole, and a left face of the arc-extinguishing magnet 71 located on the right side of the insulation cover 21 is S pole and the right face thereof is N pole.

Of course, the polarities of the mutually facing surfaces of the two arc-extinguishing magnets 71 may also be designed to be the same, for example, the left face of the arc-extinguishing magnet 71 located on the left side of the insulation cover 21 is S pole and the right face thereof is N pole, and the left face of the arc-extinguishing magnet 71 located on the right side of the insulation cover 21 is N pole and the right face thereof is S pole.

As such, the two arc-extinguishing magnets 71 opposite to each other are arranged such that a magnetic field may be formed around the contact assembly 3. Therefore, an arc is generated between the stationary contact leading-out terminal 31 and the movable contact piece 32, may be elongated in a direction away from each other under the action of the magnetic field, thereby realizing the arc extinction.

The arc extinguishing unit 7 also includes two yoke clamps 72 arranged corresponding to the two arc-extinguishing magnets 71. Furthermore, the two yoke clamps 72 surround the insulation cover 21 and two arc-extinguishing magnets 71. Through the design that the yoke clamp 72 surrounds the arc-extinguishing magnet 71, it may be avoided that the magnetic field generated by the arc-extinguishing magnet 71 spreads outward, and affects the arc-extinguishing effect. The yoke clamp 72 is made of a soft magnetic material that may include, but are not limited to, iron, cobalt, nickel, and alloys thereof.

The container 2 includes a first yoke plate 22, an insulation cover 21 and a metal cover 23. The first yoke plate 22 is arranged in the hollow chamber 14. The first yoke plate 22 includes a first side surface 223 and a second side surface 224 which are oppositely arranged, and a through hole 222 which penetrates through the first side surface 223 and the second side surface 224.

The insulation cover 21 is connected to the first side surface 223 and covers the through hole 222. The insulation cover 21 and the first yoke plate 22 enclose a contact chamber 27. The contact chamber 27 communicates with the through hole 222 and is configured to accommodate the stationary contact leading-out terminals 31 and the movable contact piece 32.

The metal cover 23 is connected to the second side surface 224 and covers the through hole 222. The metal cover 23 and the first yoke plate 22 enclose the driving chamber 24 that is communicated with the through hole 222. The driving chamber 24 is configured to accommodate the static iron core 413 and the movable iron core 414, which will be described in detail below. The contact chamber 27 is communicated with the driving chamber 24 through the through hole 222. In this embodiment, the contact chamber 27 is communicated with the driving chamber 24 to form a sealed chamber.

The insulation cover 21 may include a ceramic cover 211 and a connector 212, and two stationary contact leading-out terminals 31 are arranged on the ceramic cover 211. The ceramic cover 211 is connected with the first yoke plate 22 through the connector 212. Specifically, the connector 212 may be an annular structure. One end of the connector 212 is connected to an opening edge of the ceramic cover 211, for example, by laser welding, brazing, resistance welding, gluing, etc., and the other end of the connector 212 is connected to the first side surface 223 of the first yoke plate 22, by the same way of laser welding, brazing, resistance welding or gluing. A connector 212 is provided between the ceramic cover 211 and the first yoke plate 22, which can facilitate the connection between the ceramic cover 211 and the first yoke plate 22.

Further referring to FIG. 63, the driving assembly 4 includes an electromagnet unit 41 and a pushing unit 42. The electromagnet unit 41 is arranged on a side of the first yoke plate 22 facing away from the insulation cover 21. The pushing unit 42 is connected with the electromagnet unit 41 actuated. The pushing unit 42 is movably arranged in the driving chamber 24 and is connected with the movable contact piece 32 through the through hole 222.

When the electromagnet unit 41 is powered on, it may drive the pushing unit 42 move, and then drive the movable contact piece 32 move to contact with or separate from the stationary contact leading-out terminal 31.

The electromagnet unit 41 includes a bobbin 411, a coil 412, a static iron core 413 and a movable iron core 414. The bobbin 411 has a hollow cylindrical shape and is formed of an insulating material. The metal cover 23 is configured to be set inside the bobbin 411. The coil 412 surrounds the bobbin 411. The static iron core 413 is fixedly arranged in the metal cover 23, and a portion of the static iron core 413 may protrude into the through hole 222. The static iron core 413 has a first perforation 4131 which is arranged corresponding to the through hole 222, and penetrated for the pushing unit 42. The movable iron core 414 is movably arranged in the metal cover 23 and opposite to the static iron core 413. The movable iron core 414 is connected with the pushing unit 42 to be attracted by the static iron core 413 when the coil 412 is powered on. The movable iron core 414 and the pushing unit 42 may be connected by screwing, riveting, welding or other ways.

In this embodiment, the bobbin 411 is made of a resin material and includes a first flange part 4111, a hollow cylindrical part 4112 and a second flange part 4113. The first flange part 4111 and the second flange part 4113 are respectively arranged at both ends of the hollow cylindrical part 4112. An outer periphery of the hollow cylindrical part 4112 surrounds the coil 412. The metal cover 23 is set inside the hollow cylindrical part 4112.

The electromagnet unit 41 further includes a first elastic member 415. The first elastic member 415 is located inside the metal cover 23 and arranged between the static iron core 413 and the movable iron core 414, for resetting the movable iron core 414 when the coil 412 is powered off. The first elastic member 415 may be a spring and sleeved outside the pushing unit 42.

The relay further includes a second yoke plate 25 and a pair of third yoke plates 26. The second yoke plate 25 is arranged opposite to the first yoke plate 22, and the bobbin 411 is interposed between the first yoke plate 22 and the second yoke plate 25, that is, the first yoke plate 22 is connected to the first flange part 4111 of the bobbin 411, and the second yoke plate 25 is connected to the second flange part 4113 of the bobbin 411.

The pair of third yoke plates 26 are respectively arranged at both ends of the second yoke plate 25 along a length direction of the movable contact piece 32, and extend toward the first yoke plate 22, and are connected to both ends of the first yoke plate 22 along the length direction of the movable contact piece 32.

As such, the first yoke plate 22, the second yoke plate 25 and the pair of third yoke plates 26 surround the coil 412.

It can be understood that the second yoke plate 25 and the pair of third yoke plates 26 may be an integral structure, for example, molded by bending them. The first yoke plate 22, the second yoke plate 25 and the pair of third yoke plates 26 which are integrally formed may be a separated structure.

The relay further includes a magnetic bush 416. The magnetic sleeve 416 may be made of a soft magnetic material which may include but not limited to iron, cobalt, nickel, and alloys thereof. The magnetic sleeve 416 is arranged in a gap formed between an inner circumferential surface of the lower end of the hollow cylindrical part 4112 of the bobbin 411 and an outer circumferential surface of the metal cover 23, so that the first yoke plate 22, the second yoke plate 25, the pair of third yoke plates 26, the static iron core 413, the movable iron core 414 and the magnetic sleeve 416 form a magnetic circuit together.

The pushing unit 42 includes a U-shaped bracket 421, a base 422, a fixed piece, a push rod 423, a second elastic member 424, a first magnet 425 and a second magnet 426. The first magnet 425 is fixedly connected with the U-shaped bracket 421, and the first magnet 425 is arranged on an inner side surface of the U-shaped bracket 421. The second magnet 426 is fixedly connected with the movable contact piece 32. The base 422, the fixed piece and the upper part of the push rod 423 may be formed by integrated injection molding.

The bottom of the U-shaped bracket 421 is fixedly connected with the fixed piece. The U-shaped bracket 421 and the base 422 form a frame structure, and the movable contact piece 32, the first magnet 425 and the second magnet 426 are installed in the frame structure surrounded by the U-shaped bracket 421 and the base 422. Moreover, the second elastic member 424 is also arranged in the frame structure surrounded by the U-shaped bracket 421 and the base 422. One end of the second elastic member 424 abuts against the base 422, and the other end of the second elastic member abuts against the movable contact piece 32. The second elastic member 424 may provide an elastic force, such that the movable contact piece 32 and the second magnetizer 426 have a trend far away from the base 422 and close to the first magnet 425. The push rod 423 passes through the through hole 222 of the first yoke plate 22 and the first perforation 4131 of the static iron core 413, and one end of the push rod 423 is fixedly connected with the base 422, and the other end of the push rod 423 is fixedly connected with the movable iron core 414.

It can be understood that the second elastic member 424 may be a spring. The first magnet 425 and the second magnet 426 may be made of soft magnetic materials, such as iron, cobalt, nickel, and alloys thereof.

When the push rod 423 does not move upward, a top face of the movable contact piece 32 abuts against the first magnet 425 under the action of the second elastic member 424. When the coil 412 is energized to drive the push rod 423 to move upward, the two ends of the movable contact piece 32 are respectively in contact with the two stationary contact leading-out terminals 31. Subsequently, the push rod 423 continues to move upward, and the first magnet 425 also continues to move upward along with the push rod 423. However, the movable contact piece 32 has been in contact with the two stationary contact leading-out terminals 31, so that the movable contact piece 32 may not continue to move upward for the over-travel of the contacts. Since the second elastic member 424 provides an elastic force, a certain gap is formed between the bottom face of the first magnet 425 and the top face of the movable contact piece 32, so that there is a magnetic gap between the first magnet 425 and the second magnet 426.

Hereinafter, different embodiments in which the pressure relief valve assembly 5 is arranged on the metal cover 23 will be described in detail with reference to FIGS. 64 to 70.

Figure 64:
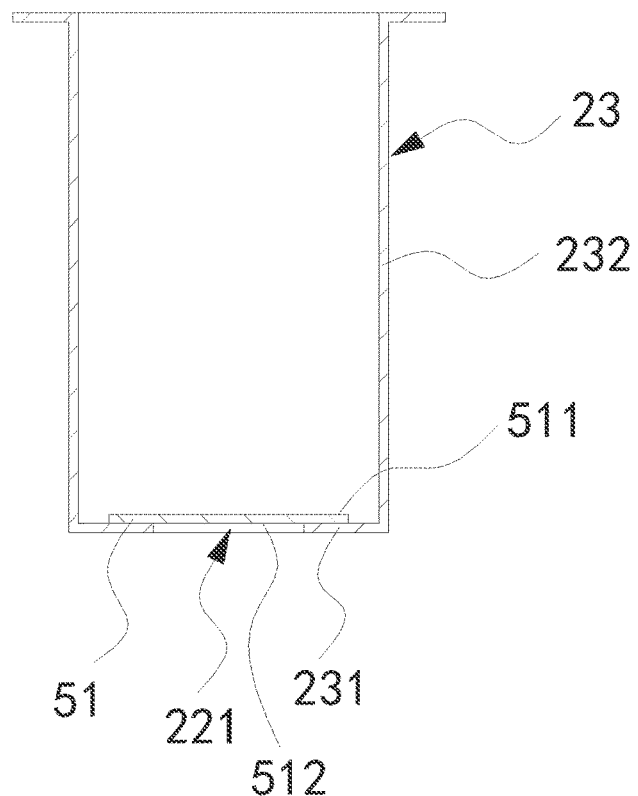
FIG. 64 is a sectional view of a metal cover and a valve plate according to the first embodiment of the present disclosure after being assembled.

As shown in FIG. 64, it shows a sectional view of a metal cover 23 and a valve plate 51 according to the first embodiment of the present disclosure after being assembled. The metal cover 23 includes a bottom wall 231 and a side wall 232. The side wall 232 surrounds an edge of the bottom wall 231, and the other end extends to a direction of the first yoke plate 22 and is connected to the second side surface 224 of the first yoke plate 22. The pressure relief valve assembly 5 is arranged on the bottom wall 231.

Specifically, the bottom wall 231 of the metal cover 23 is provided with a pressure relief hole 221. The pressure relief valve assembly 5 includes a valve plate 51. The valve plate 51 is separated from the metal cover 23 and connected to the bottom wall 231 of the metal cover 23 and covers the pressure relief hole 221. When the valve plate 51 is not broken (i.e., in a normal working state), the valve plate 51 blocks the pressure relief hole 221 and plays a role in sealing. When the valve plate 51 is broken (i.e., in an abnormal working state), the gas in the driving chamber 24 may exhausted through the pressure relief hole 221.

A structural strength of the valve plate 51 is less than that of the container 2. When the contact assembly 3 is in an abnormal working state, the gas whose pressure rises sharply can first break through the valve plate 51 and then discharged from the pressure relief hole 221 of the metal cover 23, so that the gas pressure in the container 2 cannot continue to rise, and thus protect the container 2.

As an example, the structural strength of the valve plate 51 is less than the structural strength of the metal cover 23.

It can be understood that the valve plate 51 may be made of metallic materials or nonmetallic materials. The metal materials include, but are not limited to iron and nickel and their alloys, copper and its alloys, aluminum and its alloys, etc. The non-metallic materials include, but are not limited to ceramics, glass, and carbon fiber, etc.

Further referring to FIG. 64, the valve plate 51 is connected to an inner wall face of the bottom wall 231, and covers the pressure relief hole 221. The valve plate 51 may be connected with the inner wall face of the bottom wall 231 by laser welding, brazing, resistance welding, gluing, etc.

Figure 65:
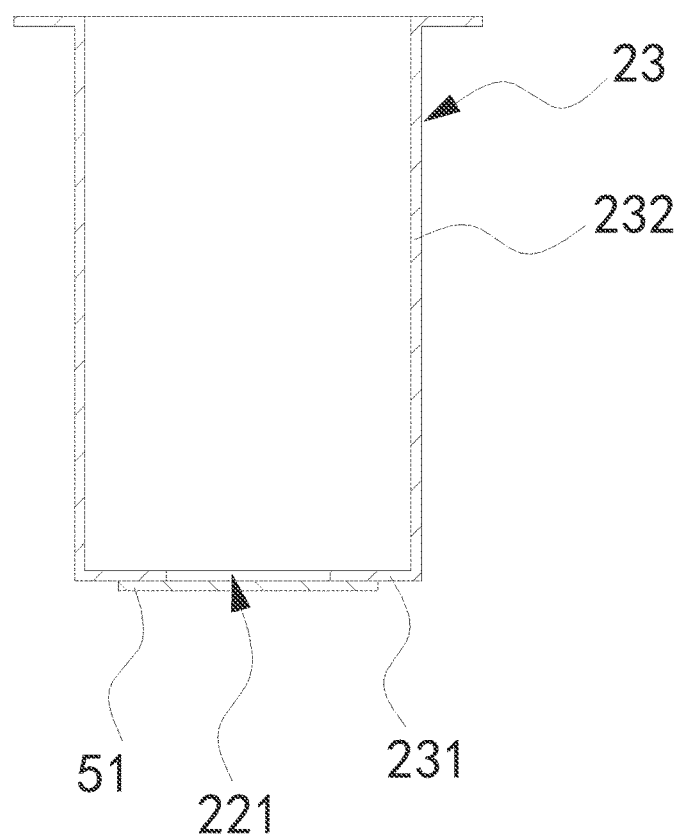
FIG. 65 is a sectional view of a metal cover and a valve plate according to the second embodiment of the present disclosure after being assembled.

As shown in FIG. 65, it shows a sectional view of a metal cover 23 and a valve plate 51 according to the second embodiment after being assembled. The same portions between the second embodiment and the first embodiment will not be repeated, but the difference therebetween is that the valve plate 51 is connected to an outer wall face of the bottom wall 231 and covers the pressure relief hole 221.

It can be understood that both the inner wall face and the outer wall face of the bottom wall 231 may be provided with the valve plate 51.

Figure 66:
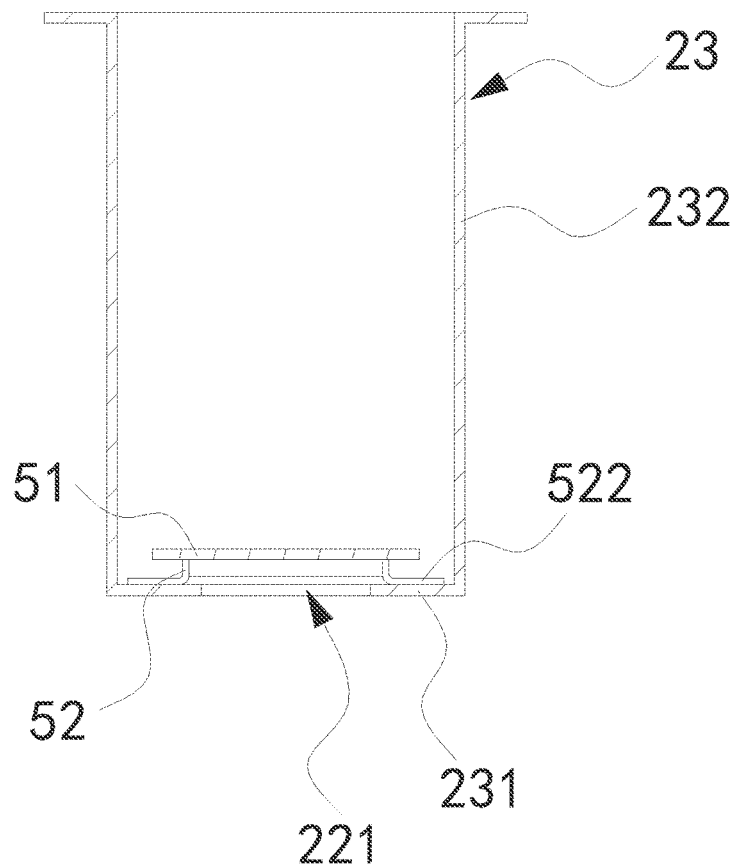
FIG. 66 is a sectional view of a metal cover and a valve plate according to the third embodiment of the present disclosure after being assembled.

As shown in FIG. 66, it is a sectional view of a metal cover 23 and a valve plate 51 according to the third embodiment of the present disclosure after being assembled. The same portions between the third embodiment and the above embodiments will not be repeated, but the difference therebetween is that the valve plate 51 is connected to the inner wall face through a transition part 52.

Specifically, the transition part 52 is generally cylindrical. One end of the transition part 52 is provided with a flange 522 which is protruding outward in a radial direction, and is connected with the first yoke plate 22 through the flange 522, the other end of the transition part 52 is connected with the valve plate 51.

Of course, it is possible that one end of the transition part 52 may be connected to the valve plate 51 through the flange 522, and the other end of the transition part may be connected to the inner wall surface of the bottom wall 231. Alternatively, the transition part 52 has a straight tube structure without a flange. Two ends of the transition part 52 with the straight tube structure are respectively connected with the bottom wall 231 and the valve plate 51.

It can be understood that both the valve plate 51 and the transition part 52, and the transition part 52 and the bottom wall 231 may be connected by laser welding, brazing, resistance welding, gluing, etc.

Figure 67:
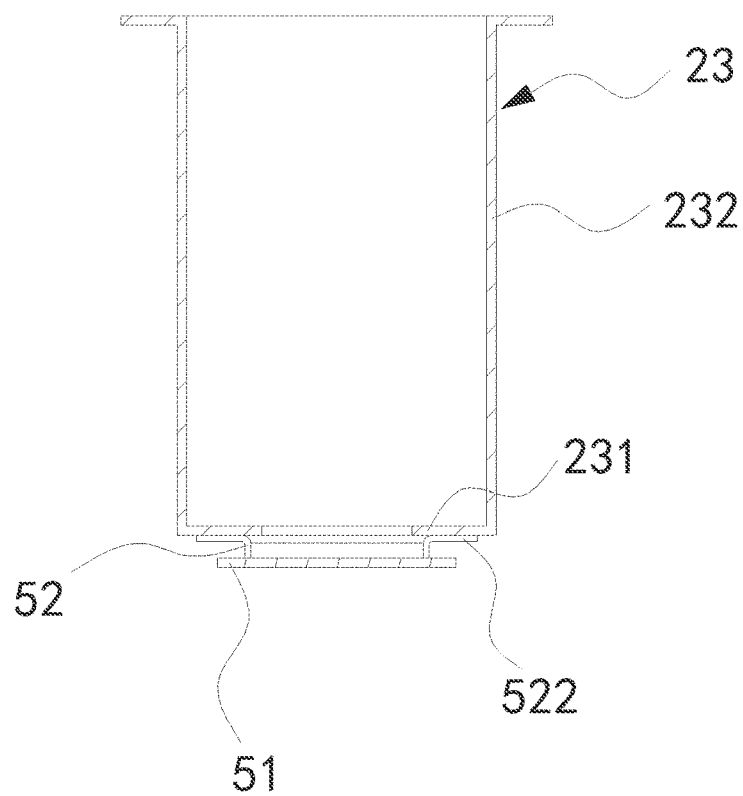
FIG. 67 is a sectional view of a relief valve assembly and a valve plate according to the fourth embodiment of the present disclosure after being assembled.

As shown in FIG. 67, it is a sectional view of a fourth embodiment of the metal cover 23 and the valve plate 51 according to the present disclosure after being assembled. The same portions between the fourth embodiment and the third embodiment will not be repeated, but the difference is that the valve plate 51 is connected to the outer wall face of the bottom wall 231 through the transition part 52.

Figure 68:
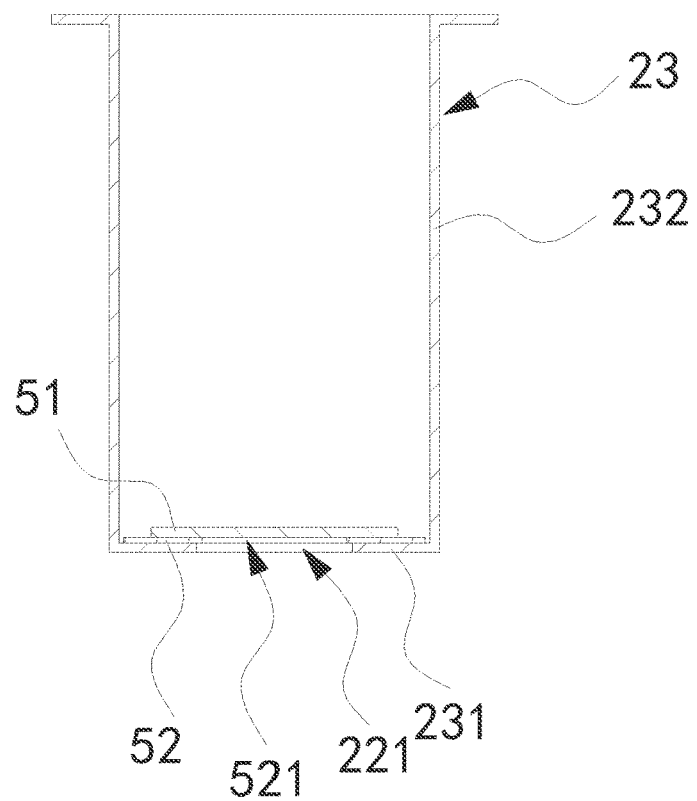
FIG. 68 is a sectional view of a metal cover and a valve plate according to the fifth embodiment of the present disclosure after being assembled.

As shown in FIG. 68, it is a sectional view of the fifth embodiment of the metal cover 23 and the valve plate 51 according to the present disclosure after being assembled. The same portions between the fifth embodiment and the third embodiment will not be repeated here, but the differences therebetween are that the transition part 52 is a sheet, and the transition part 52 has a second perforation 521 that is arranged corresponding to the pressure relief hole 221.

Figure 69:
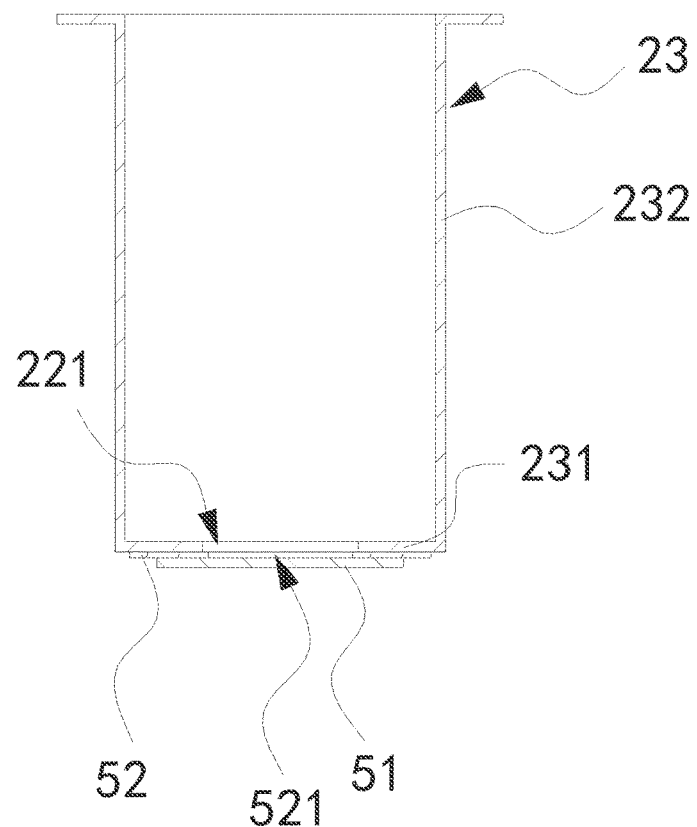
FIG. 69 is an exploded schematic view of a metal cover and a valve plate according to the sixth embodiment of the present disclosure after being assembled.

As shown in FIG. 69, it is a sectional view of the sixth embodiment of the metal cover 23 and the valve plate 51 according to the present disclosure after being assembled. The same portions between the sixth embodiment and the fifth embodiment will not be repeated, but the difference therebetween is that the valve plate 51 is connected to the outer wall face of the bottom wall 231 through the transition part 52.

It is worth mentioning that when the valve plate 51 and the bottom wall 231 of the metal cover 23 are separately arranged, the valve plate 51 may be arranged on the inner wall face or the bottom wall 231 or arranged on the outer wall face of the bottom wall 231. When the valve plate 51 is arranged on the inner wall face of the bottom wall 231, the bottom wall 231 can provide a supporting force for the valve plate 51, and the gas pressure in the container 2 can act on the first side surface 511 of the valve plate 51 to press the valve plate 51 against the bottom wall 231. When the valve plate 51 is arranged on the outer wall face of the bottom wall 231, since the bottom wall 231 cannot provide a supporting force for the valve plate 51, there is a high requirement for the connection between the valve plate 51 and the bottom wall 231.

Figure 70:
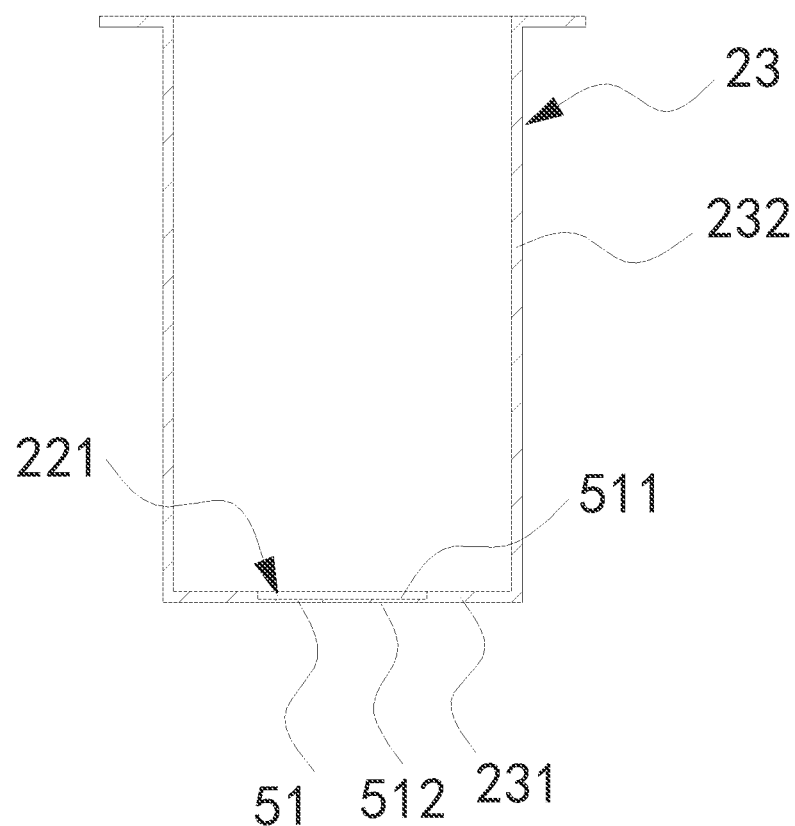
FIG. 70 is a sectional view of a metal cover and a valve plate according to the seventh embodiment of the present disclosure after being assembled.

As shown in FIG. 70, it is a sectional view of the seventh embodiment of the metal cover 23 and the valve plate 51 according to the present disclosure after being assembled. The same portions between the seventh embodiment and the above embodiments will not be repeated, but the difference therebetween is that the valve plate 51 is integrally arranged on the bottom wall 231 for closing or opening the pressure relief hole 221.

Specifically, the bottom wall 231 has an inner wall face and an outer wall face, and the valve plate 51 has a first side surface 511 and a second side surface 512 which are oppositely arranged. The first side surface 511 is connected to a wall of the pressure relief hole 221, and the second side surface 512 is flush with the outer wall face of the bottom wall 231.

Of course, it can be understood that the positional relationship between the bottom wall 231 and the two side surfaces of the valve plate 21 may also be as follows: the first side surface 511 of the valve plate 51 is flush with the inner wall face of the bottom wall 231, and the second side surface 512 is connected with the wall of the pressure relief hole 221; alternatively, the first side surface 511 is spaced apart from the inner wall face of the bottom wall 231 by a certain distance, and the second side surface 512 is spaced apart from the outer wall surface of the bottom wall 231 by a certain distance. That is, both side surfaces of the valve plate 51 are not aligned with the inner and outer wall surfaces of the bottom wall 231.

Figure 71:
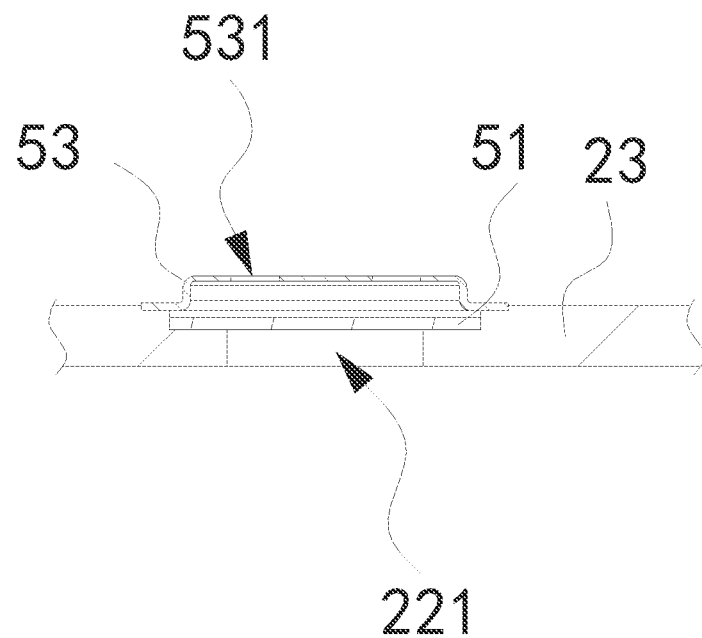
FIG. 71 is a sectional view of the protective cover being installed to a metal cover according to an embodiment of the present disclosure.

As shown in FIG. 71, it is a sectional view of a protective cover 53 being installed on a metal cover according to an embodiment of the present disclosure. The pressure relief valve assembly 5 may further include a protective cover 53 that is connected to the metal cover 23 and arranged on the outer surface of the valve plate 51. The protective cover 53 has a vent hole 531 through which the gas can act on the valve plate 51.

It can be understood that the protective cover 53 may be arranged on the outer wall face of the metal cover 23.

In this embodiment, by providing the protective cover 53 additionally, the gas can break through the valve plate 51 in the abnormal working state, and the valve plate 51 can be protected during the transportation or installation of the metal cover 23 so as to prevent the valve plate 51 from being punctured by foreign objects.

It can be understood that the protective cover 53 may be made of metallic materials or nonmetallic materials. The metal materials include, but are not limited to iron and nickel and their alloys, copper and its alloys, aluminum and its alloys, etc. the non-metallic materials include, but are not limited to ceramics, glass, carbon fiber, plastics, etc.

The protective cover 53 may be connected to the metal cover 23 by laser welding, brazing, resistance welding, gluing, etc.

Figure 72:
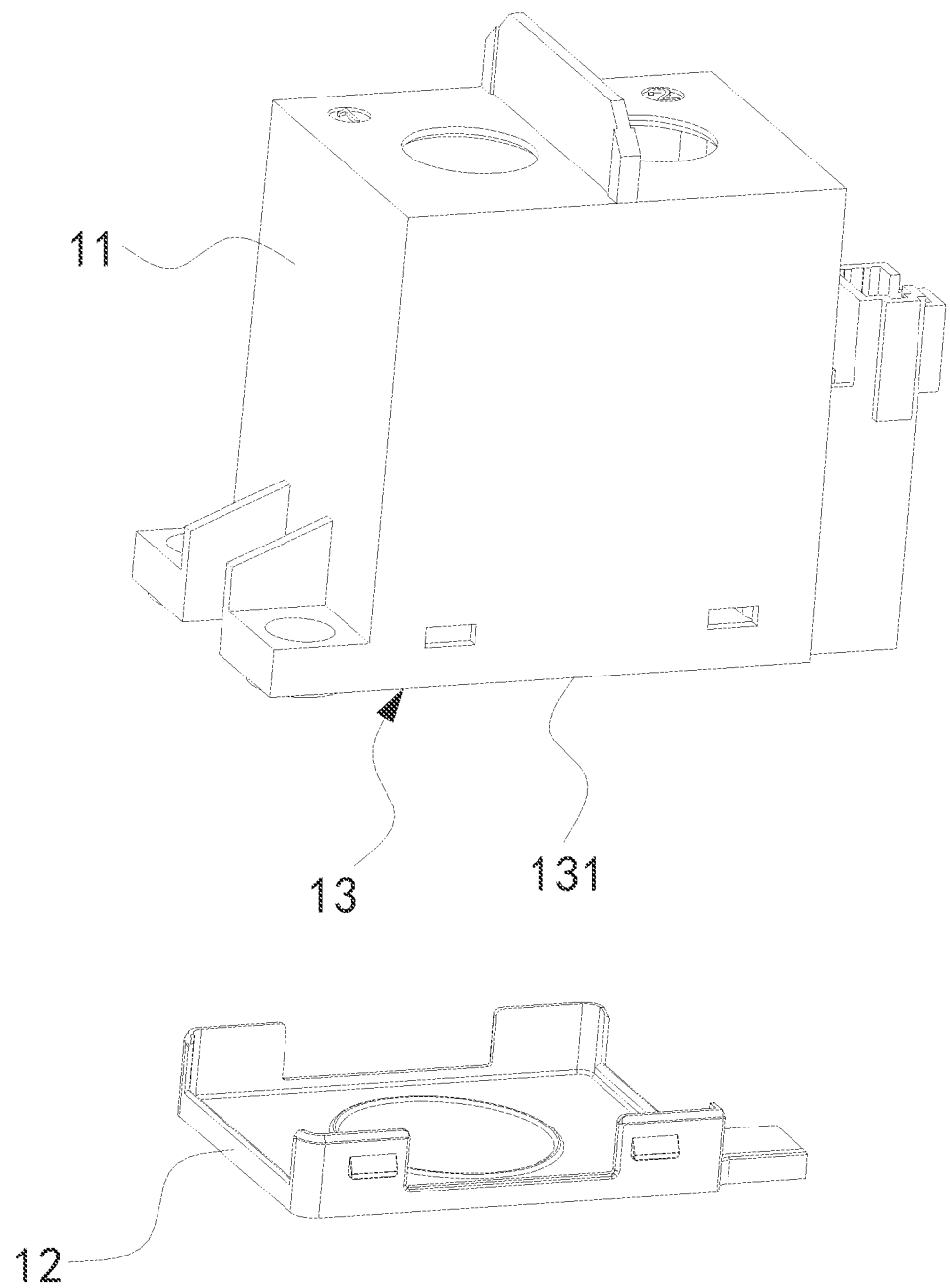
FIG. 72 is an exploded schematic view of a first embodiment of a shell of the present disclosure.

As shown in FIG. 72, it is an exploded schematic view of the first embodiment of the shell 1 of the present disclosure. The shell 1 according to the embodiment of the present disclosure includes a first housing 11 and a second housing 12, and the second housing 12 is detachably connected with the first housing 11; the first housing 11 and/or the second housing 12 are provided with an exhaust structure 13 that is communicated with the hollow chamber 14.

The exhaust structure 13 is configured such that the shell 1 according to the embodiment of the present disclosure is an unsealed structure, in which the gas may be discharged from the inside of the contact chamber 27 through the pressure relief hole 221, and then enter the hollow chamber 14 of the shell 1, and finally discharged to the outside of the shell 1 through the exhaust structure 13.

In addition, the shell 1 according to the embodiment of the present disclosure may also prevent gas spatter generated in the contact chamber 27 from being directly discharged to the outside of the relay at the moment of being exhausted, so as to avoid polluting other electronic devices in the vicinity of the relay. The gas spatter is generated by the metal materials of the contact assembly 3 being ablated and volatilized at a high temperature by burning the arc.

Referring to FIG. 72, the exhaust structure 13 includes a gap 131 formed between the first housing 11 and the second housing 12. The gas is discharged from the relay through the gap 131 between the first housing 11 and the second housing 12.

In this embodiment, the gap 131 is located at the bottom of the shell 1.

Figure 73:
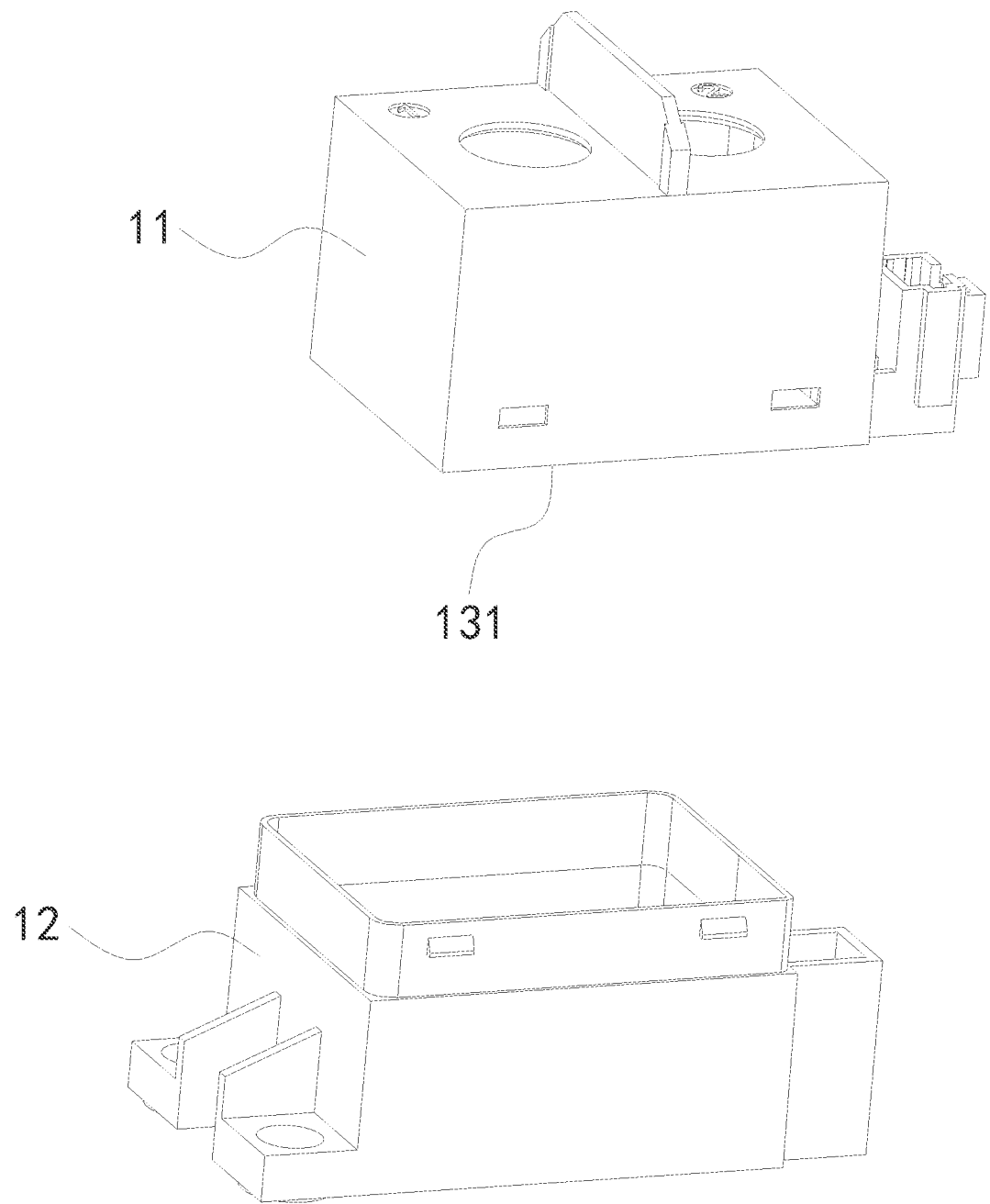
FIG. 73 is an exploded schematic view of a second embodiment of the shell of the present disclosure.

As shown in FIG. 73, it shows an exploded schematic view of the second embodiment of the shell 1 of the present disclosure. The same portions between the shell 1 of the second embodiment and the shell 1 of the first embodiment will not be repeated here, but the difference thereof is that the gap 131 is located in a middle area of the shell 1 in a height direction.

Figure 74:
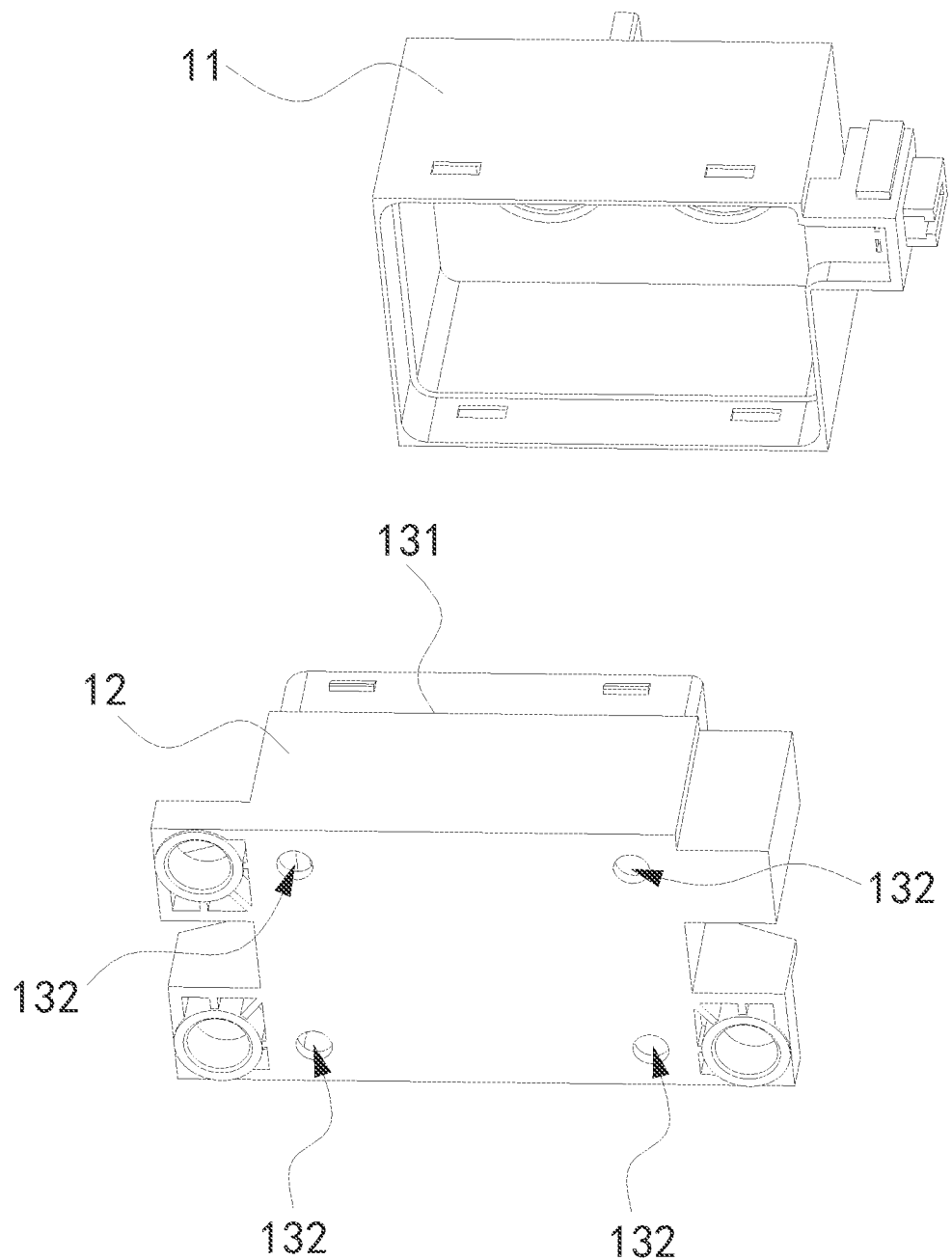
FIG. 74 is an exploded schematic view of a third embodiment of the shell of the present disclosure.

As shown in FIG. 74, it shows an exploded schematic view of a third embodiment of the shell 1 of the present disclosure. The same portions between the shell 1 of the third embodiment and the shell 1 of the second embodiment will not be repeated, but the difference thereof is that the exhaust structure 13 includes a gap 131 and an exhaust hole 132, and the gap 131 is formed in the middle area of the shell 1 in the height direction, and the exhaust hole 132 is formed in the second housing 12. The gas may be discharged from the relay through the gap 131 and the exhaust hole 132. Of course, the exhaust hole 132 may also be arranged on the first housing 11.

Figure 75:
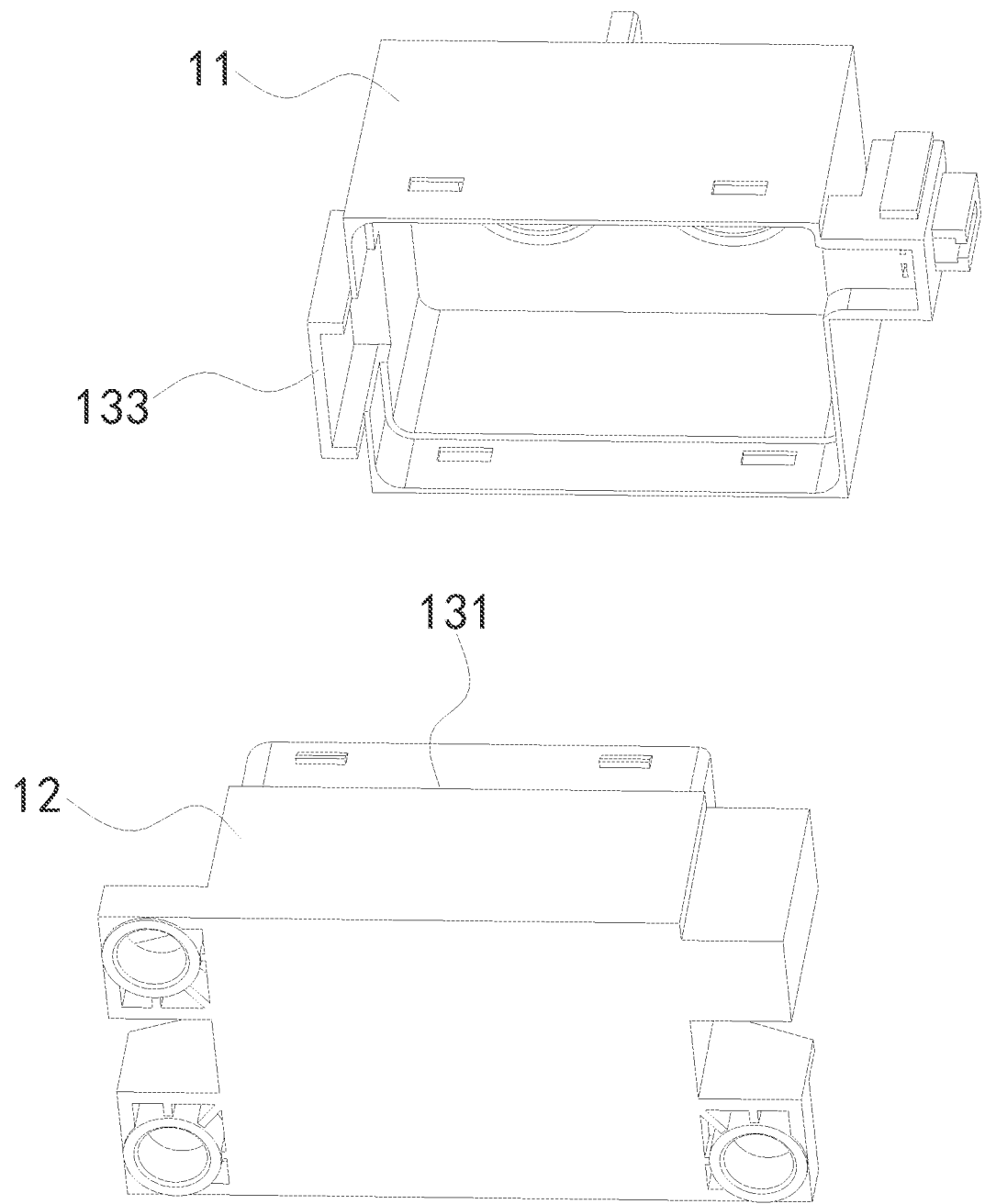
FIG. 75 is an exploded schematic view of a fourth embodiment of the shell of the present disclosure.

As shown in FIG. 75, it is an exploded schematic view of the fourth embodiment of the shell 1 of the present disclosure. The same portions between the shell 1 of the fourth embodiment and the shell 1 of the above-mentioned embodiments will not be repeated here, but the difference therebetween is that the exhaust structure 13 includes a gap 131 and an exhaust cover 133. The gap 131 is formed in the middle area of the shell 1 in the height direction, and the exhaust cover 133 is arranged on the first housing 11, and the opening of the exhaust cover 133 faces downward. In this way, the gas can be discharged from the relay through the gap 131 and the exhaust cover 133, and the gas discharged from the exhaust cover 133 is ejected downward without affecting other electronic devices in the vicinity of the relay.

Of course, the exhaust cover 133 may also be arranged on the second housing 12; alternatively, both the first housing 11 and the second housing 12 are provided with an exhaust cover 133.

Figure 76:
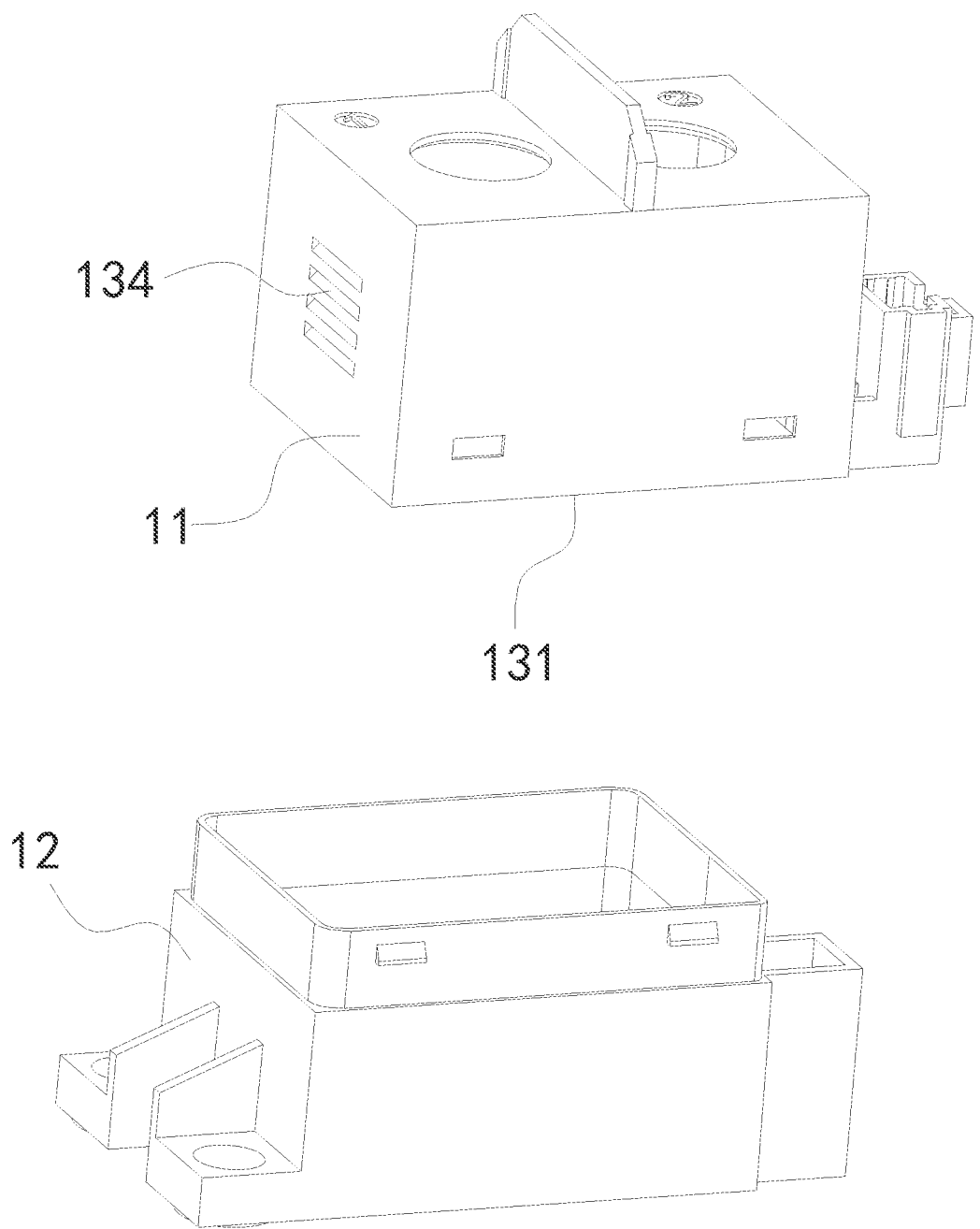
FIG. 76 is an exploded schematic view of a fifth embodiment of the shell of the present disclosure.

As shown in FIG. 76, it shows an exploded schematic view of a fifth embodiment of the shell 1 of the present disclosure. The same portions of the shell 1 of the fifth embodiment and the shell 1 of the above-mentioned embodiments will not be repeated here, but the difference thereof is that the exhaust structure 13 includes a gap 131 and an exhaust grid 134, and the gap 131 is formed in the middle area of the shell 1 in the height direction, and the exhaust grid 134 is arranged on the first housing 11. Of course, the exhaust grid 134 may also be arranged on the second housing 12, or both the first housing 11 and the second housing 12 are provided with the exhaust grid 134.

The gas may be discharged from the relay through the gap 131 and the exhaust grid 134. When the gas passes through the exhaust grid 134, the exhaust grid 134 can make the gas flow gentler, and prevent the discharged gas from affecting other electronic devices in the vicinity of the relay.

It can be understood that various embodiments/implementations provided by the present disclosure can be combined with each other without contradiction, and will not be exemplified here.

As above described, the relay according to the embodiment of the present disclosure at least include following advantages and beneficial effects.

According to the relay of the embodiment of the present disclosure, the pressure relief valve assembly 5 is arranged on the metal cover 23 to release overpressure gas, so as to ensure that the relay cannot explode and disintegrate the chamber due to rapid expansion of the gas caused by the high temperature in the chamber in the abnormal working states such as short circuit and overload breaking, and thereby increasing the reliability of the products.

In addition, the shell 1 of the relay according to the embodiment of the present disclosure is designed to have a non-sealed structure, which can not only discharge the exhausted gas timely, but also prevent exhausted substances from polluting the other electronic devices.

Referring to FIGS. 77-92, embodiments of the present disclosure provide a relay capable of improving safety, to solve a problem of easy explosion in the related art.

The relay according to the embodiment of the present disclosure includes a contact container, a contact assembly, and a ceramic cover. The contact container includes a ceramic cover and a first yoke plate, and the ceramic cover and the first yoke plate encloses a contact chamber; the ceramic cover is provided with a pressure relief hole that is communicated with the contact chamber. The contact assembly includes a pair of stationary contact leading-out terminals and a movable contact piece, and the stationary contact leading-out terminals are arranged on the ceramic cover, one end of each of the stationary contact leading-out terminals protrudes into the contact chamber, and the movable contact piece is located in the contact chamber to be driven so as to respectively contact with or separate from the pair of stationary contact leading-out terminals. The ceramic cover is arranged on the ceramic cover and configured to close the pressure relief hole when a gas pressure in the contact chamber is less than a threshold and configured to be broken to open the pressure relief hole when the gas pressure in the contact chamber is greater than or equal to the threshold.

According to some embodiments of the present disclosure, the ceramic cover includes a valve plate that is integrally arranged at the ceramic cover for closing or opening the pressure relief hole.

According to some embodiments of the present disclosure, the ceramic cover includes a valve plate that is separately arranged from the ceramic cover and arranged at the pressure relief hole for closing or opening the pressure relief hole.

According to some embodiments of the present disclosure, the ceramic cover has an inner wall face and an outer wall face, and the valve plate is arranged at the inner wall face and/or the outer wall face.

According to some embodiments of the present disclosure, the ceramic cover further includes a transition part, through which the valve plate is connected to the ceramic cover.

According to some embodiments of the present disclosure, the ceramic cover further includes a protective cover which is connected to the ceramic cover and is arranged at an outer surface of the valve plate; and the protective cover is provided with a vent hole.

According to some embodiments of the present disclosure, the ceramic cover includes:
- a top wall on which the stationary contact leading-out terminals are arranged;
- side walls arranged around an edge of the top wall and extending to a direction of the first yoke plate, and connected with the first yoke plate;
- wherein, the pressure relief hole is arranged on the top wall and/or the side walls.

According to some embodiments of the present disclosure, the relay further includes a shell with a hollow chamber;
- the contact container and the pressure relief valve assembly are all located in the hollow chamber.

According to some embodiments of the present disclosure, the shell includes:
- a first housing; and
- a second housing detachably connected with the first housing, wherein the first housing and/or the second housing are provided with an exhaust structure, and the exhaust structure is communicated with the hollow chamber.

According to some embodiments of the present disclosure, the exhaust structure includes a gap formed between the first housing and the second housing.

According to some embodiments of the present disclosure, the exhaust structure includes an exhaust hole and/or an exhaust cover and/or an exhaust grid.

According to some embodiments of the present disclosure, the hollow chamber is communicated with an outside of the housing.

According to some embodiments of the present disclosure, the structural strength of the pressure relief valve assembly is less than that of the contact container.

According to some embodiments of the present disclosure, the contact container further includes a connector, and the ceramic cover is connected with the first yoke plate through the connector.

One of the above embodiments of the present disclosure has at least the following advantages or beneficial effects:

In the relay according to the embodiment of the present disclosure, the ceramic cover is arranged on the ceramic cover to release overpressure gas, so as to ensure that the relay cannot explode and disintegrate the chamber due to the rapid expansion of the gas caused by a high temperature in the contact cavity in the abnormal working states such as short circuit and overload breaking, and thus the reliability of the products can be increased. In addition, the advantage of that the pressure relief valve assembly is arranged on the ceramic cover is that the ceramic has the characteristics of high strength and hardness, which provides a stable and reliable base for the pressure relief valve assembly, so that the pressure relief valve assembly cannot be easily strained due to the deformation of the ceramic cover, and the failure in advance of the pressure relief valve assembly can be avoid.

In addition, the shell of the relay according to the embodiment of the present disclosure is designed to have a non-sealed structure, which can release the exhaust gas timely, but also prevent the discharged substances from polluting the other electronic devices.

As described in the background, there is a security risk that the contact sealed cavity is prone to explode when the contact system of the relay in the related art is at a moment of large current short circuit or overload break. In the research, an inventor of the present disclosure found that an intense arcing of the contact in the sealed cavity high temperature occurs such that a high temperature is generated instantly in the sealed cavity, and then gas pressure in the sealed cavity of the contact suddenly rises, and once the gas pressure intensity in the sealed cavity of the contact is greater than a strength of the components or the strength at a joint of the sealed cavity of the contact, the sealed cavity of the contact of the relay can easily explode.

Figure 77:
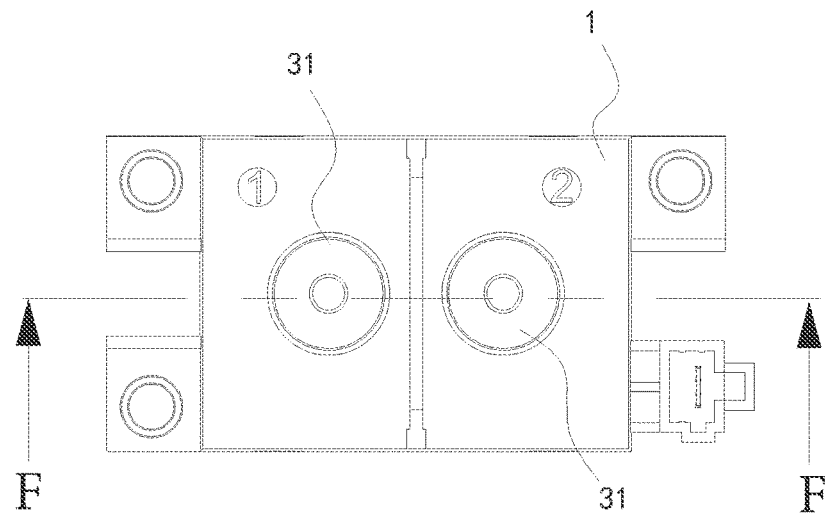
FIG. 77 shows a top view of a relay according to an embodiment of the present disclosure.
Figure 78:
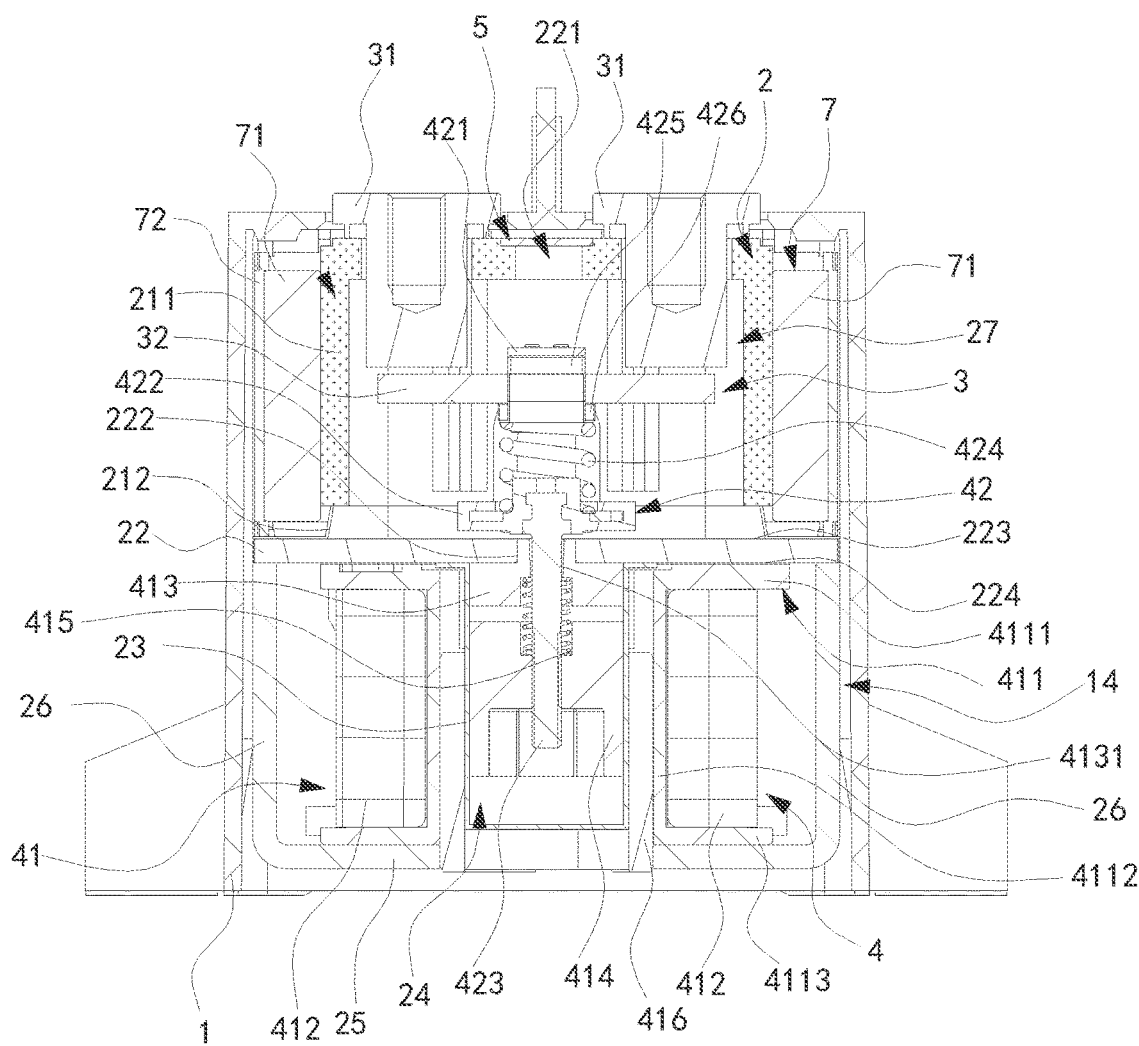
FIG. 78 shows a sectional view taken along line F-F in FIG. 77.

As shown in FIGS. 77 and 78, FIG. 77 shows a top view of a relay according to an embodiment of the present disclosure. FIG. 78 shows a sectional view taken along a line F-F in FIG. 77. The relay according to the embodiment of the present disclosure includes a shell 1, a contact container 2, a contact assembly 3, a driving assembly 4 and a ceramic cover 5. The shell 1 has a hollow chamber 14 which communicates with an outside of the shell 1. The contact container 2 is arranged in the hollow chamber 14. The contact container 2 includes a ceramic cover 211 and a first yoke plate 22, which enclose a contact chamber 27. The ceramic cover 211 is provided with a pressure relief hole 221 which is communicated with the contact chamber 27 and the hollow chamber 14. The contact assembly 3 includes a pair of stationary contact leading-out terminals 31 and a movable contact piece 32. The stationary contact leading-out terminals 31 are arranged on the ceramic cover 211. The stationary contact leading-out terminal 31 has one end extending into the contact chamber 27, and the other end exposed to an outer surface of the shell 1. The movable contact piece 32 is arranged in the contact chamber 27 to be driven so as to contact with or separate from the pair of stationary contact leading-out terminals 31. The driving assembly 4 is arranged in the hollow chamber 14, and is connected with the movable contact piece 32 for driving the movable contact piece 32 move, so that both ends of the movable contact piece 32 are respectively contacted with or separated from the pair of stationary contact leading-out terminals 31. The ceramic cover 5 is arranged on the ceramic cover 211 to close the pressure relief hole 221 when a gas pressure in the contact chamber 27 is less than a threshold, and the ceramic cover is broken to open the pressure relief hole 221 when the gas pressure in the contact chamber 27 is greater than or equal to a threshold. A structural strength of the pressure relief valve assembly 5 is less than that of the contact container 2; in the normal working state, the maximum value of the gas pressure intensity in the contact chamber 27 is less than the structural strength of the pressure relief valve assembly 5; in the abnormal working state, the maximum value of the gas pressure intensity in the contact chamber 27 is greater than the structural strength of the pressure relief valve assembly 5. It can be understood that in an embodiment, when the ceramic cover 5 closes the pressure relief hole 221, the airtightness of the contact chamber can be maintained and the normal operation of the relay can be ensured. Of course, in other embodiments, when the ceramic cover 5 closes the pressure relief hole 221, the contact chamber 27 is not completely sealed, as long as it is guaranteed the relay can work normally.

In the relay according to the embodiment of the present disclosure, a ceramic cover 5 is arranged on the ceramic cover 211 to close or open the pressure relief hole 221. When the contact assembly 3 is in a normal working state, a gas pressure intensity in the contact chamber 27 is less than the threshold, so that the ceramic cover 5 is not broken by the gas pressure in the contact chamber, and is maintained in a state which the pressure relief hole 221 is closed such that the relay can work normally. When the contact assembly 3 is in an abnormal working state, the gas pressure intensity in the contact chamber is greater than or equal to the threshold, so that the ceramic cover 5 is broken by the gas pressure in the contact chamber, and thus the contact chamber communicates with the hollow chamber 14 of the shell 1 through the pressure relief hole 221, and then the gas pressure in the contact chamber 27 can be released to the hollow chamber 14 through the pressure relief hole 221, and finally released to the outside of the shell 1. That is to say, in the abnormal working state, during the process that the gas pressure intensity in the contact chamber gradually rises, the gas pressure may first break through the ceramic cover 5, and then the rapidly increased gas pressure may be released through the pressure relief hole 221, so that the gas pressure in the contact chamber 27 cannot continue to rise, and cannot reach a structural strength of the contact container 2, and thereby avoiding the explosion of the contact chamber 27. In the normal working state, the gas pressure in the contact chamber 27 may not break through the ceramic cover 5, so the ceramic cover 5 can perform a function of sealing the pressure relief hole 221.

It could be understood that a term "normal working state" refers to that the current of the relay is under a rated working condition, and the term "abnormal working state" refers to that the contact assembly 3 is at a moment of a large current short circuit or at a moment of an overload breaking. In addition, the pressure as represented by the term "threshold" is slightly greater than the gas pressure intensity in the contact container 2 when the relay is in the normal working state. The threshold can also be adjusted according to different types of the relays, but cannot be greater than the structural strength of the contact container 2.

That is to say, when the relay is in a normal working state, the gas pressure in the contact container 2 cannot reach the threshold, so that the ceramic cover 5 cannot be broken. When the relay is in an abnormal working state, the gas pressure in the contact container 2 is greater than or equal to the threshold, and the ceramic cover 5 is broken by the gas.

In one embodiment, the structural strength of the ceramic cover 5 is less than that of the contact container 2. As such, when the relay is in an abnormal working state and the pressure of the gas in the contact container 2 rises gradually, the ceramic cover 5 can be broken by the gas prior to the contact container 2.

It can be understood that the structural strength of the ceramic cover 5 is less than that of the contact container 2, which can be achieved by different materials and/or different structures. For example, when the ceramic cover 5 and the wall of the contact chamber 27 have the same material, the thickness of the ceramic cover 5 may be designed to be thin and smaller than the wall of the contact container 2, so that the gas with gradually rising temperature may preferentially break through the ceramic cover 5. Of course, in the case that the ceramic cover 5 and the wall of the contact container 2 have the same thickness, the ceramic cover 5 may be made of ceramic, and the contact container 2 may be made of metal, so that the ceramic cover 5 may be broken first. Alternatively, the ceramic cover 5 is thin and made of ceramic, and the wall of the contact container 2 is thick and made of metal. Of course, it is possible that the structural strength of the ceramic cover 5 is less than that of the contact container 2 in other suitable ways, which will not be listed here.

It can be understood that terms "include" and "have" in the embodiment of the present disclosure and any variations thereof are intended to be included non-exclusively. For example, process, method, system, product or equipment that includes a series of steps or units is not limited to the steps or units that have been listed, but optionally steps or units that are not listed are also included, or optionally other steps or components inherent to these processes, methods, products or equipment are also included.

It should be noted that the relay according to the embodiment of the present disclosure may not include the shell 1, but the contact container 2, the contact assembly 3, the driving assembly 4 and the ceramic cover 5 are assembled and then directly installed in application products, such as battery packs and electrical control boxes.

Further referring to FIGS. 77 and 78. In this embodiment, the contact assembly 3 includes two stationary contact leading-out terminals 31 respectively for current inflow and current outflow, and one movable contact piece 32. The movable contact piece 32 may be in a straight piece shape. Both ends of the movable contact piece 32 in the length direction may be in contact with the two stationary contact leading-out terminals 31 respectively under the action of the driving assembly 4, so as to realize the connected load. The bottoms of the stationary contact leading-out terminals 31 serves as the stationary contacts, and both ends of the movable contact piece 32 in the length direction may serve as the movable contacts. The movable contacts at both ends of the movable contact piece 32 may protrude from other portions of the movable contact piece 32 or may be flush with other portions.

It can be understood that the stationary contacts may be integrally or separately arranged at the bottom of the stationary contact leading-out terminals 31, and the movable contact can be integrally or separately arranged at both ends of the movable contact piece 32 in the length direction.

Two stationary contact leading-out terminals 31 are arranged on the ceramic cover 211, for example, at the top of the ceramic cover 211. And, one end of each of the stationary contact leading-out terminals 31 extends into the interior of the contact chamber 27, and the other end thereof is exposed to the outer surface of the shell 1. One end of the stationary contact leading-out terminal 31 extending into the interior of the contact chamber 27 is used for contacting with the movable contact piece 32.

The relay also includes an arc extinguishing unit 7 that is arranged in the hollow chamber 14 of the shell 1, for extinguishing the arc of the contact assembly 3.

In this embodiment, the arc extinguishing unit 7 includes two arc-extinguishing magnets 71. The arc-extinguishing magnets 71 may be permanent magnets, and each of the arc-extinguishing magnets 71 may be a substantially rectangular shape. The two arc-extinguishing magnets 71 are respectively arranged on both sides of the contact container 2 and are oppositely arranged along a length direction of the movable contact piece 32.

As shown in FIG. 78, two arc-extinguishing magnets 71 are located on left and right sides of the contact container 2. In this embodiment, polarities of the mutually facing surfaces of the two arc-extinguishing magnets 71 are opposite to one another. That is, a left face of the arc-extinguishing magnet 71 located on the left side of the contact container 2 is S pole and the right face thereof is N pole, and a left face of the arc-extinguishing magnet 71 located on the right side of the contact container 2 is S pole and the right face thereof is N pole.

Of course, the polarities of the mutually facing surfaces of the two arc-extinguishing magnets 71 may also be designed to be the same, for example, the left face of the arc-extinguishing magnet 71 located on the left side of the ceramic cover 211 is S pole and the right face thereof is N pole, and the left face of the arc-extinguishing magnet 71 located on the right side of the ceramic cover 211 is N pole and the right face thereof is S pole.

As such, the two arc-extinguishing magnets 71 opposite to each other are arranged such that a magnetic field may be formed around the contact assembly 3. Therefore, an arc is generated between the stationary contact leading-out terminal 31 and the movable contact piece 32, may be elongated in a direction away from each other under the action of the magnetic field, thereby realizing the arc extinction.

The arc extinguishing unit 7 also includes two yoke clamps 72 arranged corresponding to the two arc-extinguishing magnets 71. Furthermore, the two yoke clamps 72 surround the contact container 2 and two arc-extinguishing magnets 71. Through the design that the yoke clamp 72 surrounds the arc-extinguishing magnet 71, it may be avoided that the magnetic field generated by the arc-extinguishing magnet 71 spreads outward, and affects the arc-extinguishing effect. The yoke clamp 72 is made of a soft magnetic material that may include, but are not limited to, iron, cobalt, nickel, and alloys thereof.

The contact container 2 includes a first yoke plate 22, a ceramic cover 211 and a connector 212. The first yoke plate 22 is arranged in the hollow chamber 14, and includes a first side surface 223 and a second side surface 224 which are oppositely arranged, and a through hole 222 which penetrates through the first side surface 223 and the second side surface 224.

The ceramic cover 211 is connected with the first side surface 223 of the first yoke plate 22 through the connector 212, and the ceramic cover 211 covers the through hole 222. The ceramic cover 211, the connector 212 and the first yoke plate 22 together enclose the contact chamber 27. The contact chamber 27 is communicated with the through hole 222 and is configured to accommodate part of the stationary contact leading-out terminals 31 and the movable contact piece 32.

The relay also includes a metal cover 23 that is connected to a second side surface 224 of the first yoke plate 22 and covers the through hole 222. The metal cover 23 and the first yoke plate 22 enclose a driving chamber 24. The driving chamber 24 is communicated with the through hole 222 and configured to accommodate a static iron core 413 and a movable iron core 414, which will be described in detail below. The contact chamber 27 is communicated with the driving chamber 24 through the through hole 222. In this embodiment, the contact chamber 27 is communicated with the driving chamber 24 to form a sealed chamber.

The ceramic cover 211 is connected with the first yoke plate 22 through the connector 212. Specifically, the connector 212 may be an annular structure. One end of the connector 212 is connected to an opening edge of the ceramic cover 211, for example, by laser welding, brazing, resistance welding, gluing, etc., and the other end of the connector 212 is connected to the first side surface 223 of the first yoke plate 22, by the same way of laser welding, brazing, resistance welding or gluing. A connector 212 is provided between the ceramic cover 211 and the first yoke plate 22, which can facilitate the connection between the ceramic cover 211 and the first yoke plate 22.

Further referring to FIG. 78, the driving assembly 4 includes an electromagnet unit 41 and a pushing unit 42. The electromagnet unit 41 is arranged on a side of the ceramic cover 211 facing away from the insulating cover 21. The pushing unit 42 is connected with the electromagnet unit 41 actuated. The pushing unit 42 is movably arranged in the driving chamber 24 and is connected with the movable contact piece 32 through the through hole 222.

When the electromagnet unit 41 is powered on, it may drive the pushing unit 42 move, and then drive the movable contact piece 32 move to contact with or separate from the stationary contact leading-out terminal 31.

The electromagnet unit 41 includes a bobbin 411, a coil 412, a static iron core 413 and a movable iron core 414. The bobbin 411 has a hollow cylindrical shape and is formed of an insulating material. The metal cover 23 is configured to be set inside the bobbin 411. The coil surrounds the bobbin 411. The static iron core 413 is fixedly arranged in the metal cover 23, and a portion of the static iron core 413 may protrude into the through hole 222. The static iron core 413 has a first perforation 4131 which is arranged corresponding to the through hole 222, and penetrated for the pushing unit 42. The movable iron core 414 is movably arranged in the metal cover 23 and opposite to the static iron core 413. The movable iron core 414 is connected with the pushing unit 42 to be attracted by the static iron core 413 when the coil is powered on. The movable iron core 414 and the pushing unit 42 may be connected by screwing, riveting, welding or other ways.

The electromagnet unit 41 further includes a first elastic member 415. The first elastic member 415 is located inside the metal cover 23 and arranged between the static iron core 413 and the movable iron core 414, for resetting the movable iron core 414 when the coil 412 is powered off. The first elastic member 415 may be a spring and sleeved outside the pushing unit 42.

The relay further includes a second yoke plate 25 and a pair of third yoke plates 26. The second yoke plate 25 is arranged opposite to the first yoke plate 22, and the bobbin 411 is interposed between the first yoke plate 22 and the second yoke plate 25, that is, the first yoke plate 22 is connected to the first flange part 4111 of the bobbin 411, and the second yoke plate 25 is connected to the second flange part 4113 of the bobbin 411.

The pair of third yoke plates 26 are respectively arranged at both ends of the second yoke plate 25 along a length direction of the movable contact piece 32, and extend toward the first yoke plate 22, and are connected to both ends of the first yoke plate 22 along the length direction of the movable contact piece 32.

As such, the first yoke plate 22, the second yoke plate 25 and the pair of third yoke plates 26 surround the coil 412.

It can be understood that the second yoke plate 25 and the pair of third yoke plates 26 may be an integral structure, for example, molded by bending them. The first yoke plate 22, the second yoke plate 25 and the pair of third yoke plates 26 which are integrally formed may be a separated structure.

The relay further includes a magnetic bush 416. The magnetic sleeve 416 may be made of a soft magnetic material which may include but not limited to iron, cobalt, nickel, and alloys thereof. The magnetic sleeve 416 is arranged in a gap formed between an inner circumferential surface of the lower end of the hollow cylindrical part 4112 of the bobbin 411 and an outer circumferential surface of the metal cover 23, so that the first yoke plate 22, the second yoke plate 25, the pair of third yoke plates 26, the static iron core 413, the movable iron core 414 and the magnetic sleeve 416 form a magnetic circuit together.

The pushing unit 42 includes a U-shaped bracket 421, a base 422, a fixed piece, a push rod 423, a second elastic member 424, a first magnet 425 and a second magnet 426. The first magnet 425 is fixedly connected with the U-shaped bracket 421, and the first magnet 425 is arranged on an inner side surface of the U-shaped bracket 421. The second magnet 426 is fixedly connected with the movable contact piece 32. The base 422, the fixed piece and the upper part of the push rod 423 may be formed by integrated injection molding.

The bottom of the U-shaped bracket 421 is fixedly connected with the fixed piece. The U-shaped bracket 421 and the base 422 form a frame structure, and the movable contact piece 32, the first magnet 425 and the second magnet 426 are installed in the frame structure surrounded by the U-shaped bracket 421 and the base 422. Moreover, the second elastic member 424 is also arranged in the frame structure surrounded by the U-shaped bracket 421 and the base 422. One end of the second elastic member 424 abuts against the base 422, and the other end of the second elastic member abuts against the movable contact piece 32. The second elastic member 424 may provide an elastic force, such that the movable contact piece 32 and the second magnetizer 426 have a trend far away from the base 422 and close to the first magnet 425. The push rod 423 passes through the through hole 222 of the first yoke plate 22 and the first perforation 4131 of the static iron core 413, and one end of the push rod 423 is fixedly connected with the base 422, and the other end of the push rod 423 is fixedly connected with the movable iron core 414.

It can be understood that the second elastic member 424 may be a spring. The first magnet 425 and the second magnet 426 may be made of soft magnetic materials, such as iron, cobalt, nickel, and alloys thereof.

When the push rod 423 does not move upward, a top face of the movable contact piece 32 abuts against the first magnet 425 under the action of the second elastic member 424. When the coil 412 is energized to drive the push rod 423 to move upward, the two ends of the movable contact piece 32 are respectively in contact with the two stationary contact leading-out terminals 31. Subsequently, the push rod 423 continues to move upward, and the first magnet 425 also continues to move upward along with the push rod 423. However, the movable contact piece 32 has been in contact with the two stationary contact leading-out terminals 31, so that the movable contact piece 32 may not continue to move upward for the over-travel of the contacts. Since the second elastic member 424 provides an elastic force, a certain gap is formed between the bottom face of the first magnet 425 and the top face of the movable contact piece 32, so that there is a magnetic gap between the first magnet 425 and the second magnet 426.

Figure 79:
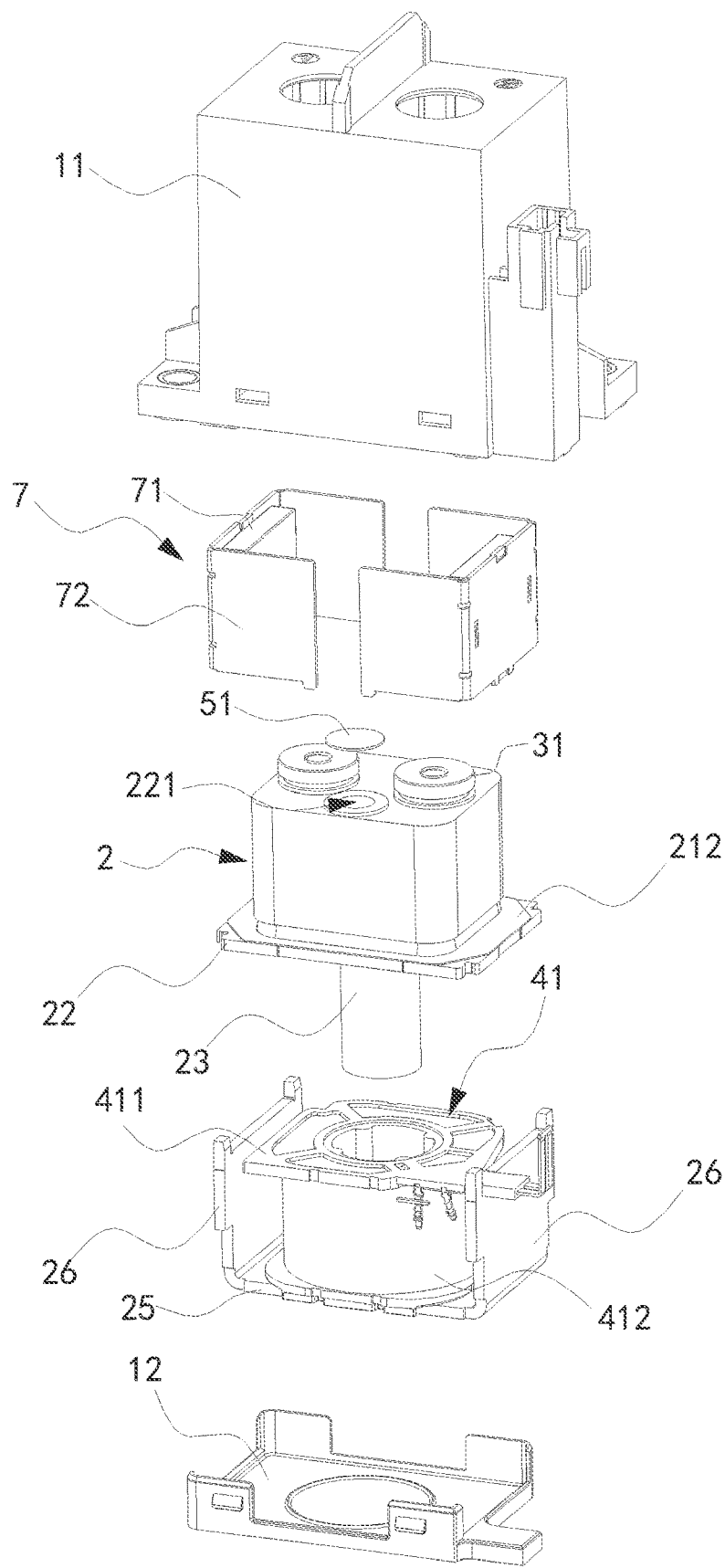
FIG. 79 is an exploded schematic view of the relay according to the embodiment of the present disclosure.

As shown in FIG. 79, it shows an exploded view of a relay according to the embodiment of the present disclosure. In this embodiment, the pressure relief valve assembly is arranged on the ceramic cover 211.

In an embodiment, the pressure relief valve assembly 5 includes a valve plate. The valve plate 51 is separated from the ceramic cover 211 for closing or opening the pressure relief hole 221.

A structural strength of the valve plate 51 is less than that of the contact container 2. When the contact assembly 3 is in an abnormal working state, the gas whose pressure rises sharply can first break through the valve plate 51 and then discharged from the pressure relief hole 221 of the ceramic cover 211, so that the gas pressure in the contact container 2 cannot continue to rise, and thus protect the contact container 2.

It can be understood that the valve plate 51 may be made of metallic materials or nonmetallic materials. The metal materials include, but are not limited to iron and nickel and their alloys, copper and its alloys, aluminum and its alloys, etc. The non-metallic materials include, but are not limited to ceramics, glass, and carbon fiber, etc.

Of course, the valve plate 51 may also be integrally arranged on the ceramic cover 211 to close or open the pressure relief hole 221. When the valve plate 51 and the ceramic cover 211 are an integrated structure, both the valve plate 51 and the ceramic cover 211 are made of ceramic materials.

Figure 80:
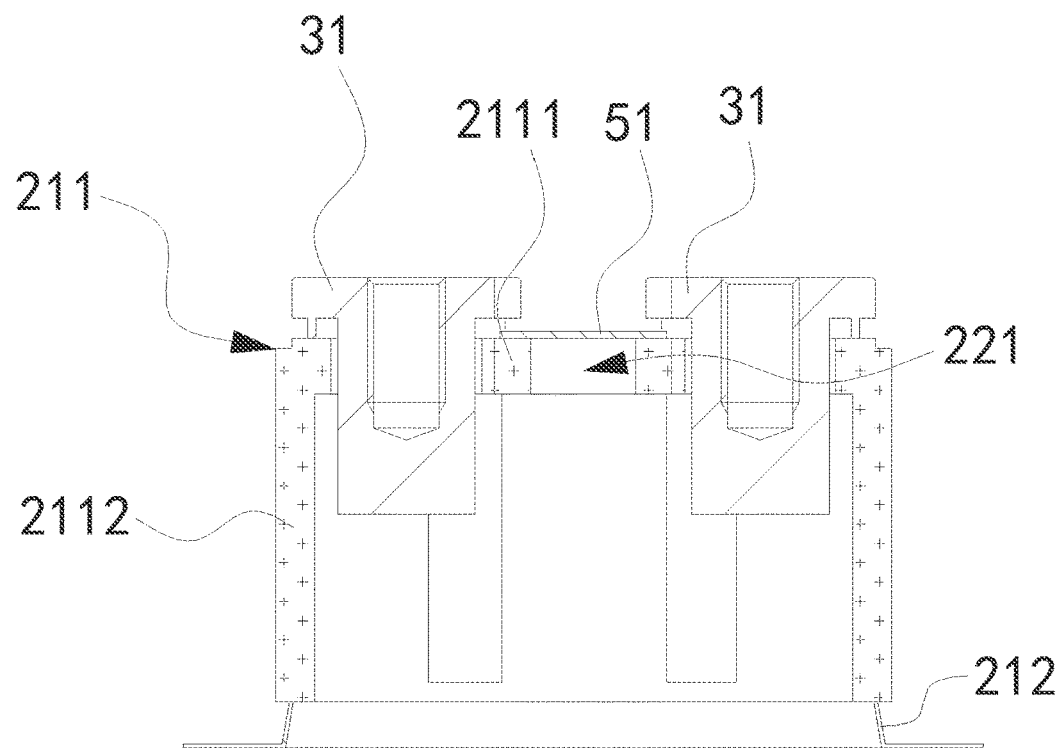
FIG. 80 is a sectional view of a ceramic cover and a valve plate according to the first embodiment of the present disclosure after being assembled.

As shown in FIG. 80, it is a sectional view of the ceramic cover 211 and the valve plate 51 according to the first embodiment of the present disclosure after being assembled. In this embodiment, the ceramic cover 211 includes a top wall 2111 and side walls 2112, the stationary contact leading-out terminals 31 are arranged on the top wall 2111, and the pressure relief hole 221 is arranged on the top wall 2111. The side walls 2112 surround an edge of the top wall 2111, extend toward a direction of the first yoke plate 22 and is connected with the connector 212. The valve plate 51 is arranged on the top wall 2111 and covers the pressure relief hole 221.

It can be understood that the valve plate 51 may be arranged on the inner wall face of the ceramic cover 211 or on the outer wall face of the ceramic cover 211.

It can be understood that the valve plate 51 may be connected with the top wall 2111 of the ceramic cover 211 by laser welding, brazing, resistance welding, gluing, etc.

Figure 81:
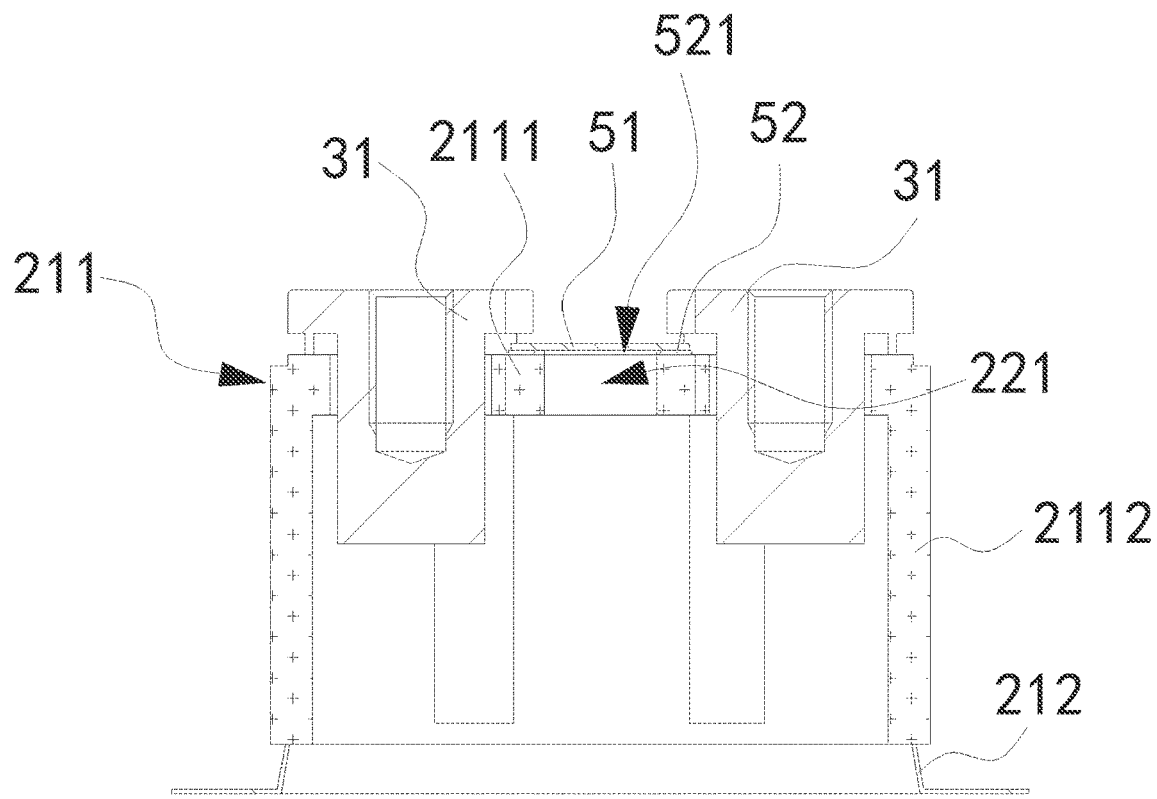
FIG. 81 is a sectional view of a ceramic cover and a valve plate according to the second embodiment of the present disclosure after being assembled.

As shown in FIG. 81, it is a sectional view of a ceramic cover 211 and a valve plate 51 according to the second embodiment of the present disclosure after being assembled. The same portions between the second embodiment and the above embodiments will not be repeated, but the difference therebetween is that the ceramic cover 5 further includes a transition part 52, and the valve plate 51 is connected to the ceramic cover 211 through the transition part 52.

In this embodiment, the transition part 52 may be a sheet.

The transition part 52 has a second perforation 521 provided in a thickness direction, and the second perforation 521 communicates with the pressure relief hole 221. The valve plate 51 is connected to the transition part 52 and covers the second perforation 521. In the normal working state, the valve plate 51 closes the second perforation 521 and the pressure relief hole 221, to maintain the sealed state of the contact chamber 27. In the abnormal working state, the valve plate 51 is broken by the gas, so that the contact chamber 27 communicates with the outside through the second perforation 521 and the pressure relief hole 221.

It can be understood that the valve plate 51 and the transition part 52 may be connected by laser welding, brazing, resistance welding, gluing, etc., and the transition part 52 and the ceramic cover 211 may be connected by laser welding, brazing, resistance welding, gluing, etc.

In this embodiment, both the valve plate 51 and the transition part 52 are arranged on the outer wall face of the ceramic cover 211. Of course, in other embodiments, the valve plate 51 and the transition part 52 may also be arranged on the inner wall face of the ceramic cover 211.

Figure 82:
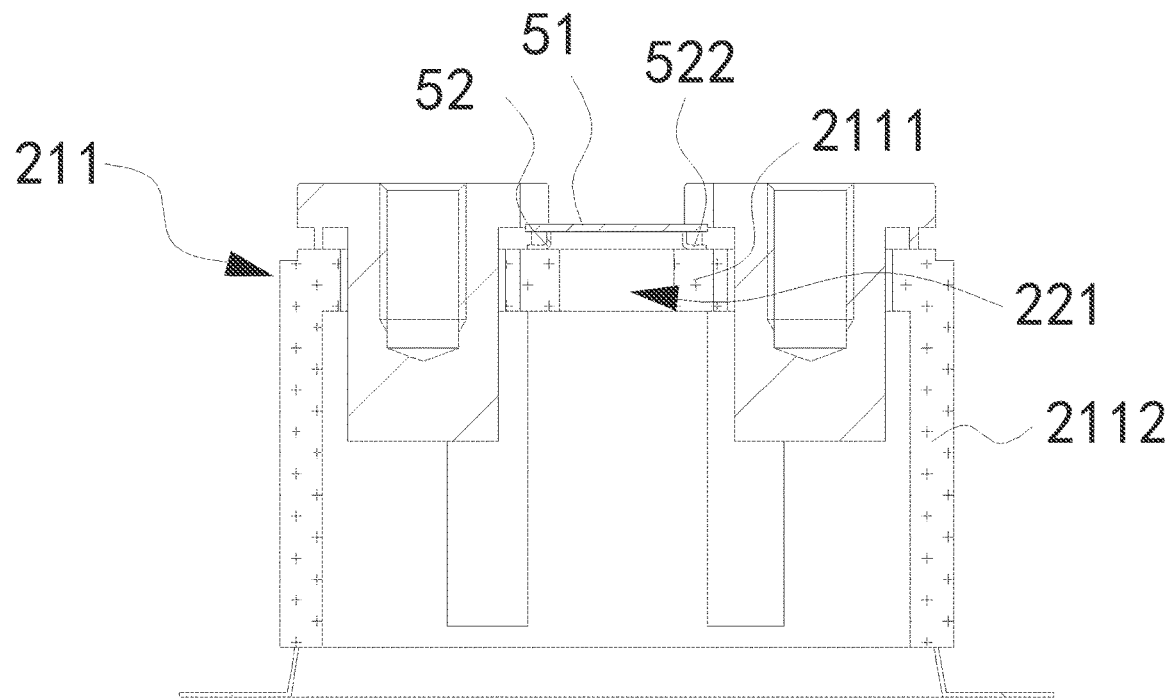
FIG. 82 is a sectional view of a ceramic cover and a valve plate according to the third embodiment of the present disclosure after being assembled.
Figure 83:
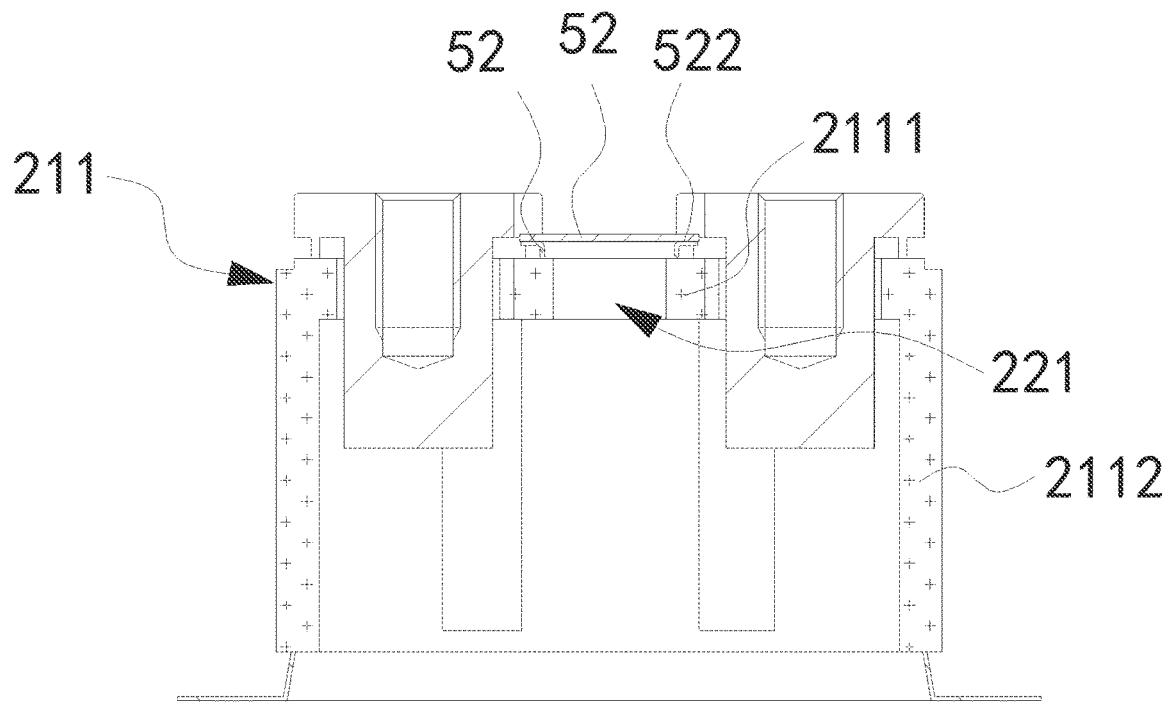
FIG. 83 is a sectional view of a relief valve assembly and a valve plate according to the fourth embodiment of the present disclosure after being assembled.
Figure 84:
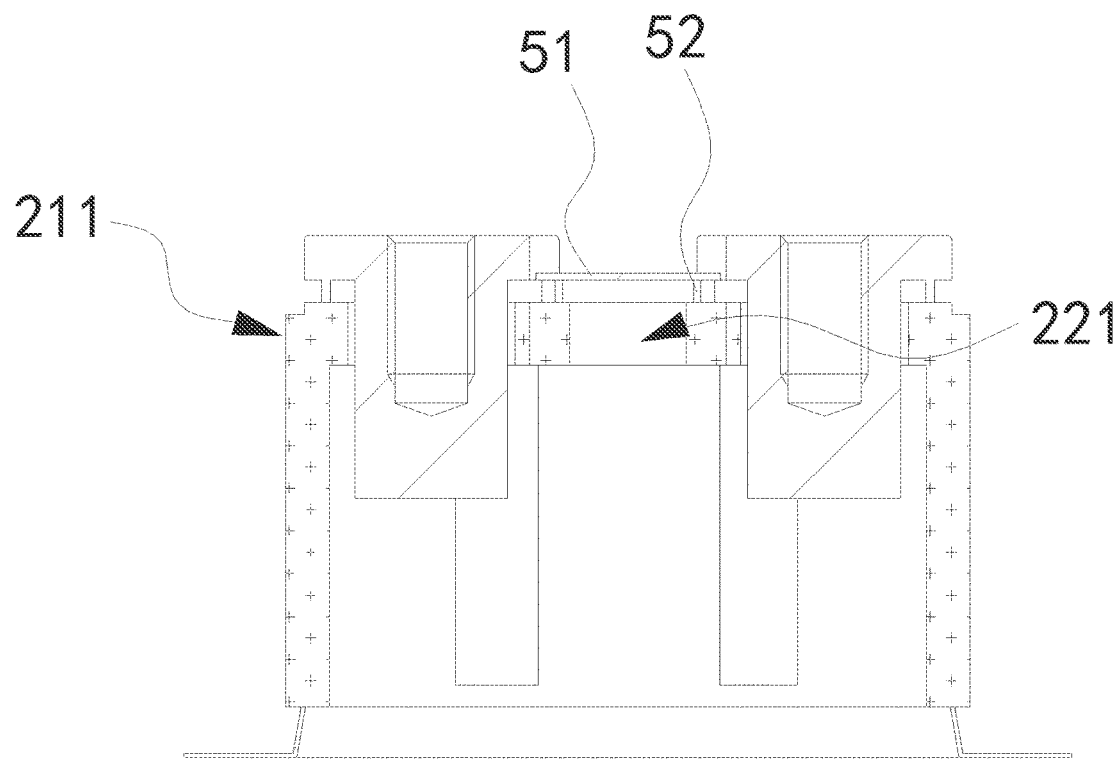
FIG. 84 is a sectional view of a ceramic cover and a valve plate according to the fifth embodiment of the present disclosure after being assembled.

As shown in FIG. 82 to FIG. 84, FIG. 82 is a sectional view of the ceramic cover 211 and the valve plate 51 according to the third embodiment of the present disclosure after being assembled. FIG. 83 is a sectional view of the ceramic cover 211 and the valve plate 51 according to the fourth embodiment of the present disclosure after being assembled. FIG. 84 is a sectional view of the ceramic cover 211 and the valve plate 51 according to the fifth embodiment of the present disclosure after being assembled.

The same portions between the third to fifth embodiments and the second embodiment will not be repeated here, but the difference therebetween is the shape of the transition part 52.

Specifically, as shown in FIG. 82, the transition part 52 of the third embodiment is generally tubular, for example, cylindrical. One end of the transition part 52 is provided with a flange 522 protruding outward in a radial direction, one end of the transition part 52 is connected with the ceramic cover 211 through the flange 522, and the other end of the transition part 52 is connected with the valve plate 51.

As shown in FIG. 83, the transition part 52 of the fourth embodiment is generally tubular, wherein one end of the transition part 52 is connected with the valve plate 51 through a flange 522, and the other end of the transition part is connected with the ceramic cover 211.

As shown in FIG. 84, the transition part 52 of the fifth embodiment has a tubular shape, for example, a straight tubular structure without a flange. Both ends of the transition part 52 with the straight tubular structure are connected with the ceramic cover 211 and the valve plate 51, respectively.

Figure 85:
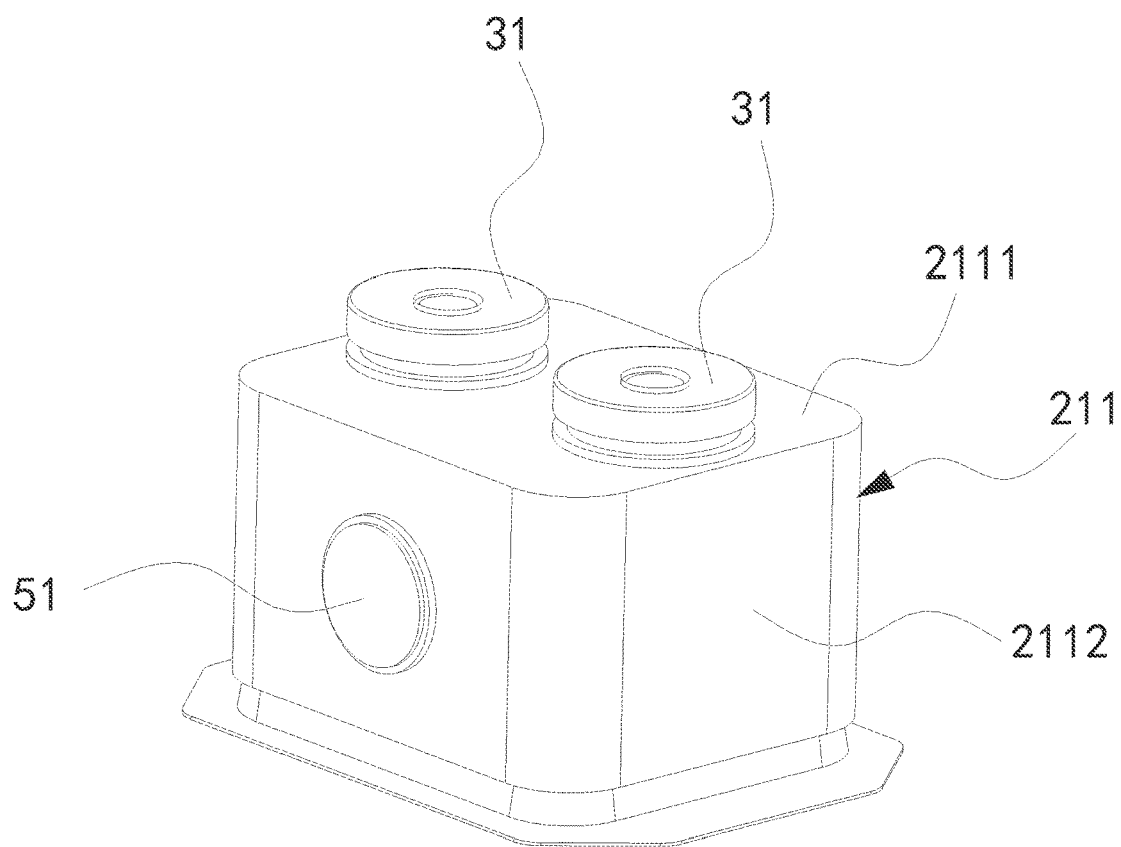
FIG. 85 is a perspective view of a ceramic cover and a valve plate according to the sixth embodiment of the present disclosure after being assembled.
Figure 86:
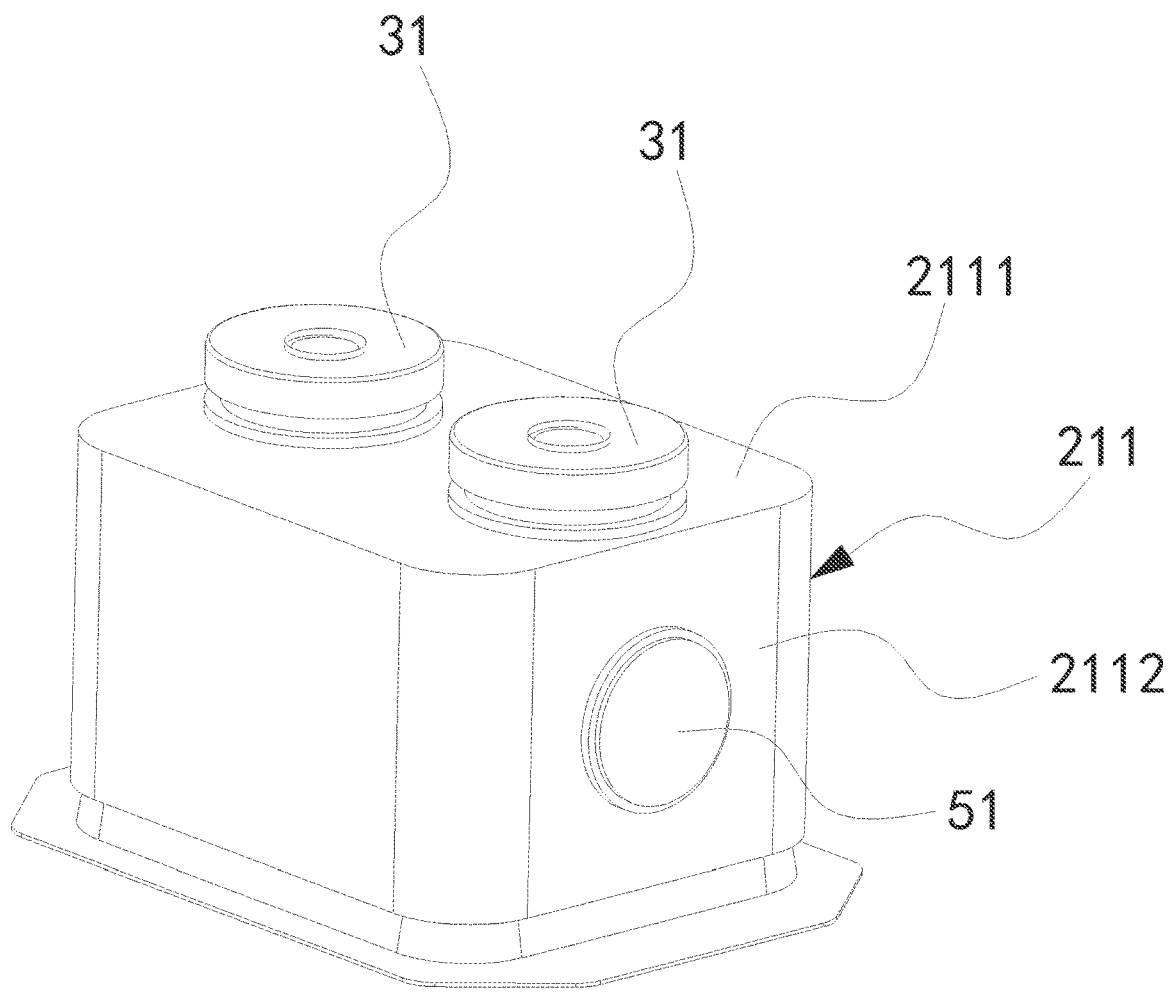
FIG. 86 is a perspective view of a ceramic cover and a valve plate according to the seventh embodiment of the present disclosure after being assembled.

As shown in FIG. 85 and FIG. 86, FIG. 85 is a perspective view of the ceramic cover 211 and the valve plate 51 according to the sixth embodiment of the present disclosure after being assembled. FIG. 86 is a perspective view of the ceramic cover 211 and the valve plate 51 according to the seventh embodiment of the present disclosure after being assembled. The same portions between the sixth and seventh embodiments and the above embodiments will not be repeated, but the difference therebetween is that the pressure relief valve assembly 5 is arranged on the side wall 2112 of the ceramic cover 211.

In this embodiment, the side wall 2112 of the ceramic cover 211 forms a rectangular structure. The pressure relief valve assembly 5 may be arranged on a long side of the rectangular structure (as shown in FIG. 85) or on a wide side of the rectangular structure (as shown in FIG. 86).

Figure 87:
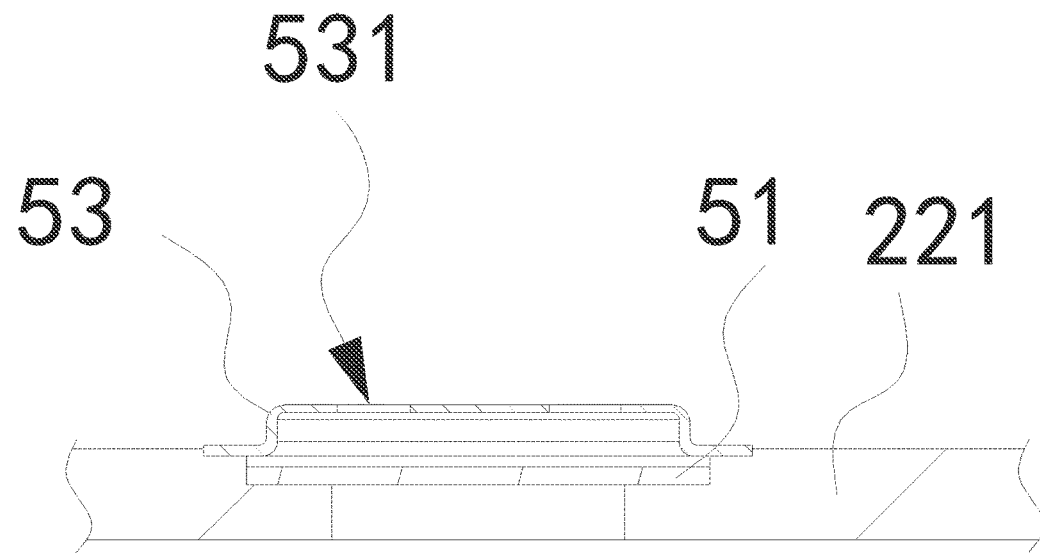
FIG. 87 is a sectional view of a protective cover according to the embodiment of the present disclosure being installed on the ceramic cover.

As shown in FIG. 87, it is a sectional view of the protective cover 53 being installed on the ceramic cover according to the embodiment of the present disclosure. The pressure relief valve assembly 5 may further include a protective cover 53. The protective cover 53 is connected to the ceramic cover 211 and arranged on an outer surface of the valve plate 51. The protective cover 53 has a vent hole 531, through which the gas can act on the valve plate 51.

It can be understood that the protective cover 53 may be arranged on the outer wall face of the ceramic cover 211.

In this embodiment, by providing the protective cover 53 additionally, the gas can break through the valve plate 51 in the abnormal working state, and the valve plate 51 can be protected during the transportation or assembling of the ceramic cover 211 so as to prevent the valve plate 51 from being punctured by foreign objects.

It can be understood that the protective cover 53 may be made of metallic materials or nonmetallic materials. The metal materials include, but are not limited to iron and nickel and their alloys, copper and its alloys, aluminum and its alloys, etc. the non-metallic materials include, but are not limited to ceramics, glass, carbon fiber, plastics, etc.

The protective cover 53 may be connected to the ceramic cover 211 by laser welding, brazing, resistance welding, and gluing, etc.

Figure 88:
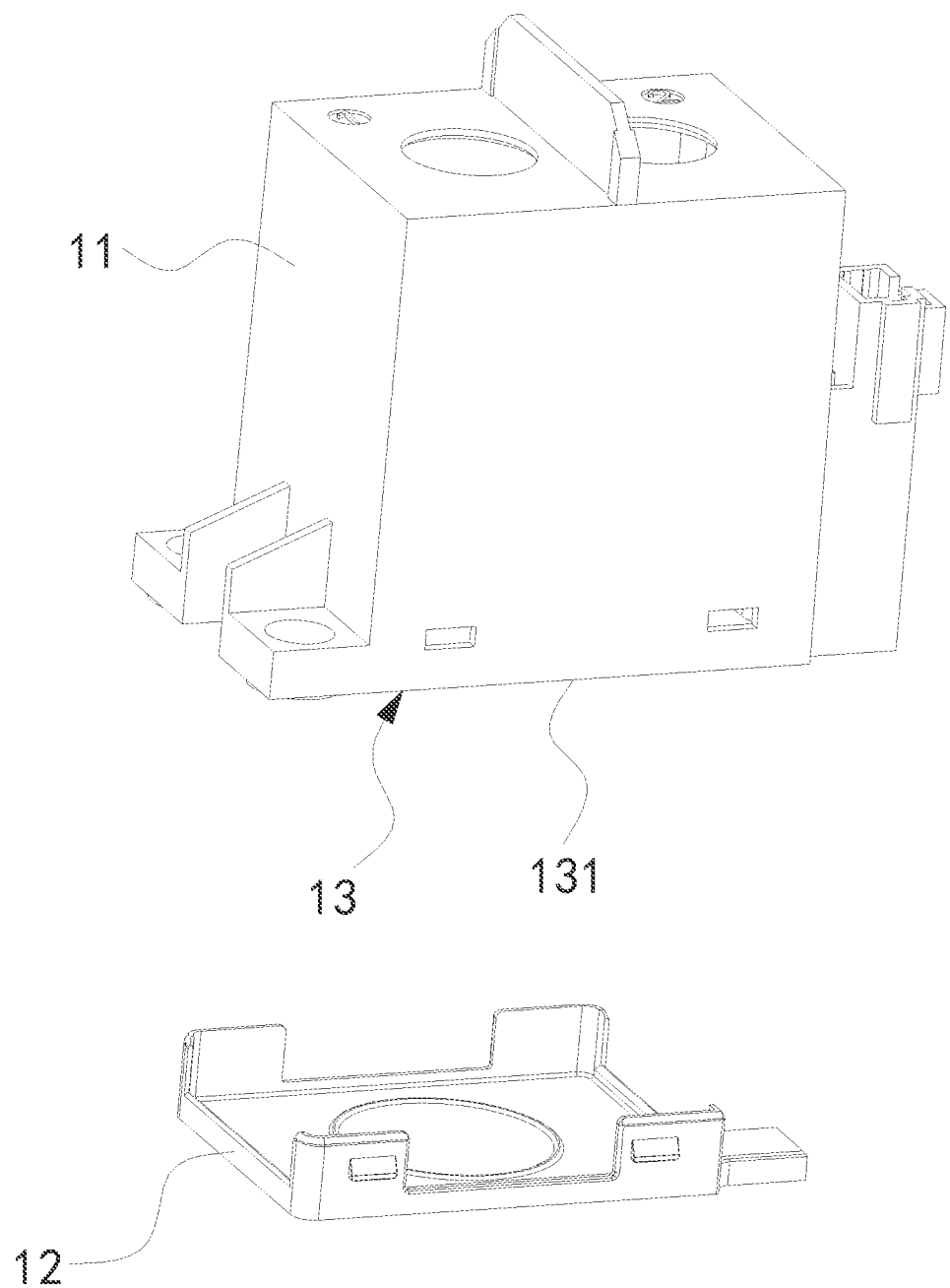
FIG. 88 is an exploded schematic view of a first embodiment of a shell of the present disclosure.

As shown in FIG. 88, it is an exploded schematic view of the first embodiment of the shell 1 of the present disclosure. The shell 1 according to the embodiment of the present disclosure includes a first housing 11 and a second housing 12, and the second housing 12 is detachably connected with the first housing 11; the first housing 11 and/or the second housing 12 are provided with an exhaust structure 13 that is communicated with the hollow chamber 14.

The exhaust structure 13 is configured such that the shell 1 according to the embodiment of the present disclosure is an unsealed structure, in which the gas may be discharged from the inside of the contact chamber 27 through the pressure relief hole 221, and then enter the hollow chamber 14 of the shell 1, and finally discharged to the outside of the shell 1 through the exhaust structure 13.

In addition, the shell 1 according to the embodiment of the present disclosure may also prevent gas spatter generated in the contact chamber 27 from being directly discharged to the outside of the relay at the moment of being exhausted, so as to avoid polluting other electronic devices in the vicinity of the relay. The gas spatter is generated by the metal materials of the contact assembly 3 being ablated and volatilized at a high temperature by burning the arc.

Referring to FIG. 88, the exhaust structure 13 includes a gap 131 formed between the first housing 11 and the second housing 12. The gas is discharged from the relay through the gap 131 between the first housing 11 and the second housing 12.

In this embodiment, the gap 131 is located at the bottom of the shell 1.

Figure 89:
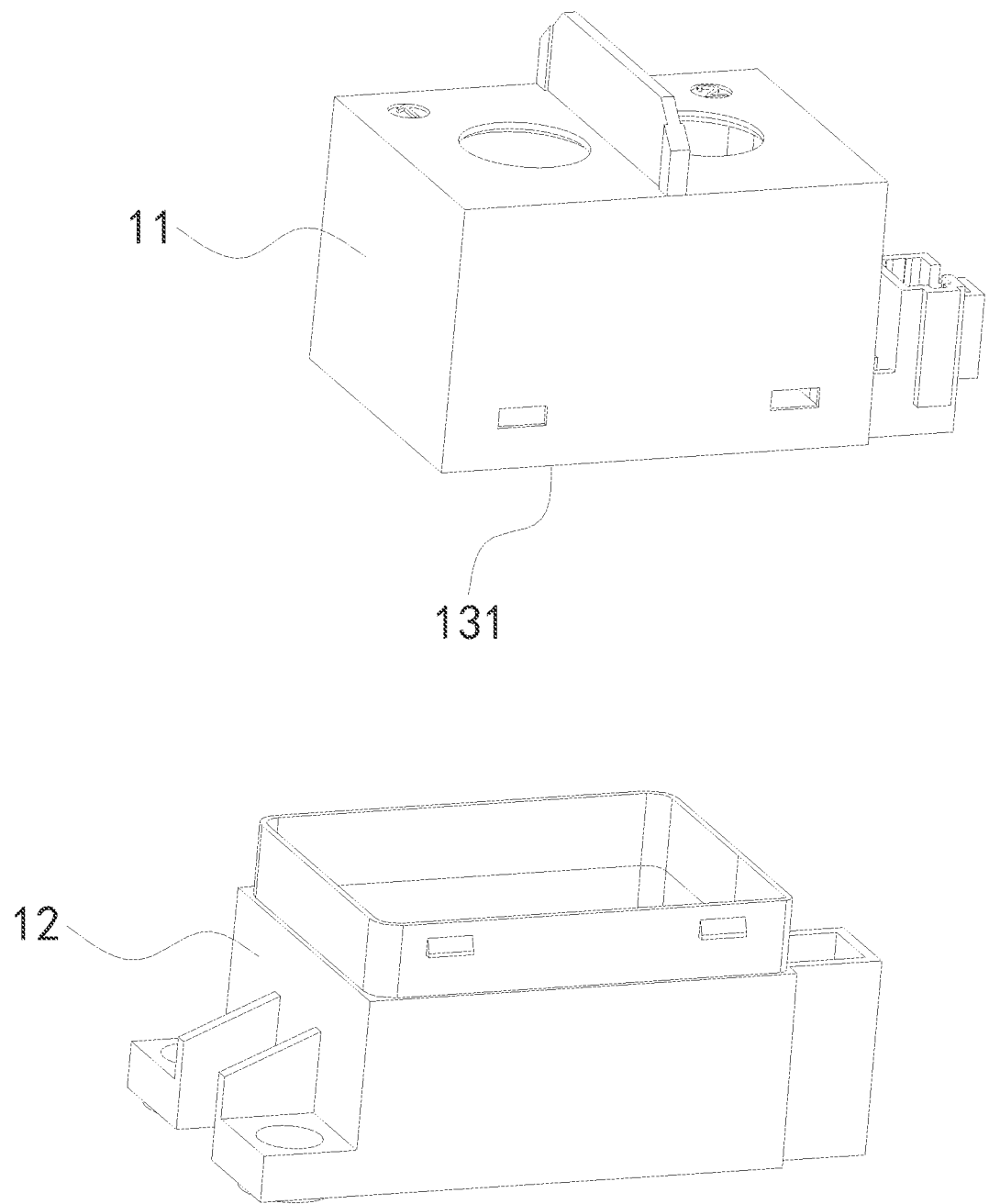
FIG. 89 is an exploded schematic view of a second embodiment of the shell of the present disclosure.

As shown in FIG. 89, it shows an exploded schematic view of the second embodiment of the shell 1 of the present disclosure. The same portions between the shell 1 of the second embodiment and the shell 1 of the first embodiment will not be repeated here, but the difference thereof is that the gap 131 is located in a middle area of the shell 1 in a height direction.

Figure 90:
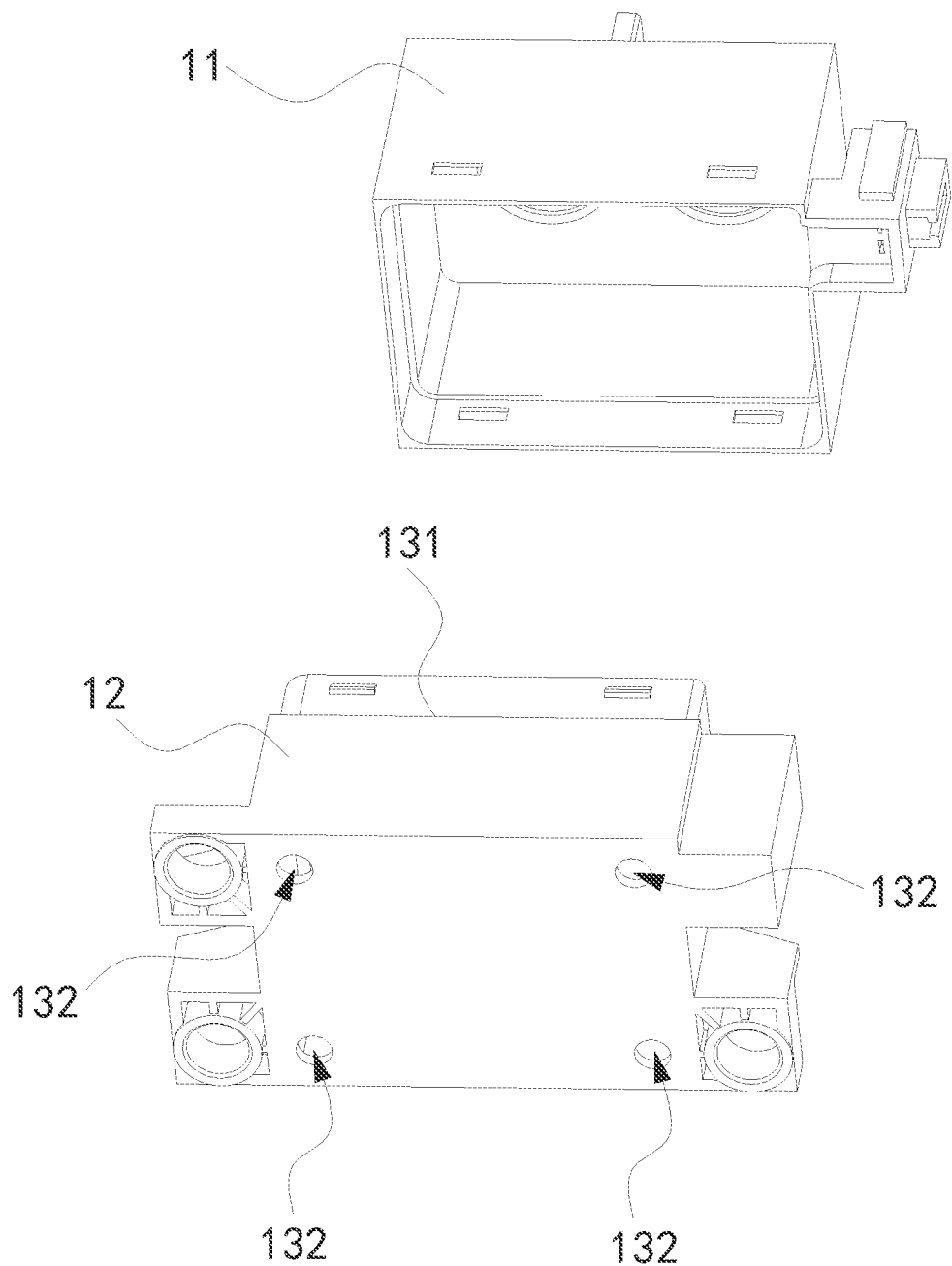
FIG. 90 is an exploded schematic view of a third embodiment of the shell of the present disclosure.

As shown in FIG. 90, it shows an exploded schematic view of a third embodiment of the shell 1 of the present disclosure. The same portions between the shell 1 of the third embodiment and the shell 1 of the second embodiment will not be repeated, but the difference thereof is that the exhaust structure 13 includes a gap 131 and an exhaust hole 132, and the gap 131 is formed in the middle area of the shell 1 in the height direction, and the exhaust hole 132 is formed in the second housing 12. The gas may be discharged from the relay through the gap 131 and the exhaust hole 132. Of course, the exhaust hole 132 may also be arranged on the first housing 11.

Figure 91:
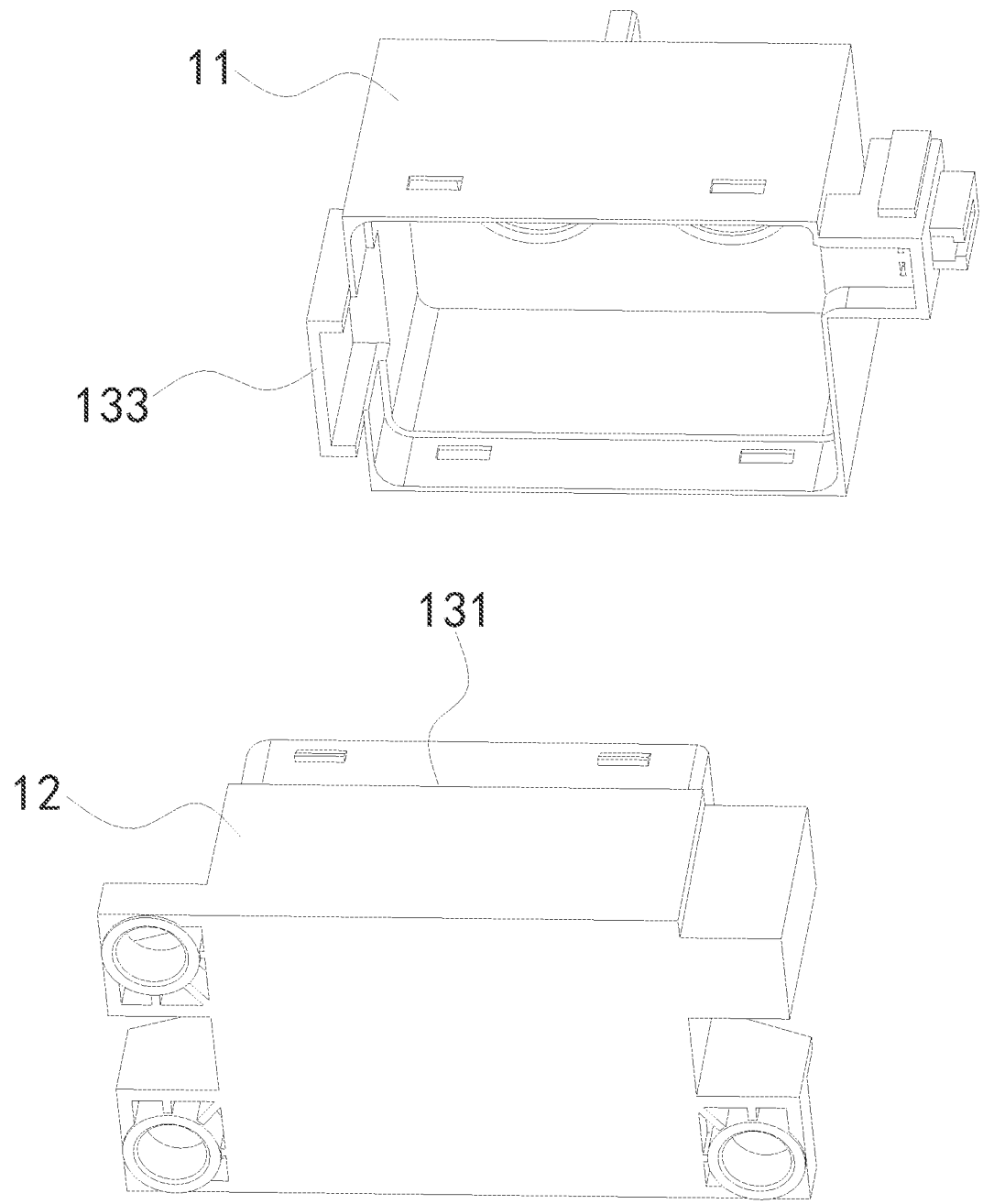
FIG. 91 is an exploded schematic view of a fourth embodiment of the shell of the present disclosure.

As shown in FIG. 91, it is an exploded schematic view of the fourth embodiment of the shell 1 of the present disclosure. The same portions between the shell 1 of the fourth embodiment and the shell 1 of the above-mentioned embodiments will not be repeated here, but the difference therebetween is that the exhaust structure 13 includes a gap 131 and an exhaust cover 133. The gap 131 is formed in the middle area of the shell 1 in the height direction, and the exhaust cover 133 is arranged on the first housing 11, and the opening of the exhaust cover 133 faces downward. In this way, the gas can be discharged from the relay through the gap 131 and the exhaust cover 133, and the gas discharged from the exhaust cover 133 is ejected downward without affecting other electronic devices in the vicinity of the relay.

Of course, the exhaust cover 133 may also be arranged on the second housing 12; alternatively, both the first housing 11 and the second housing 12 are provided with an exhaust cover 133.

Figure 92:
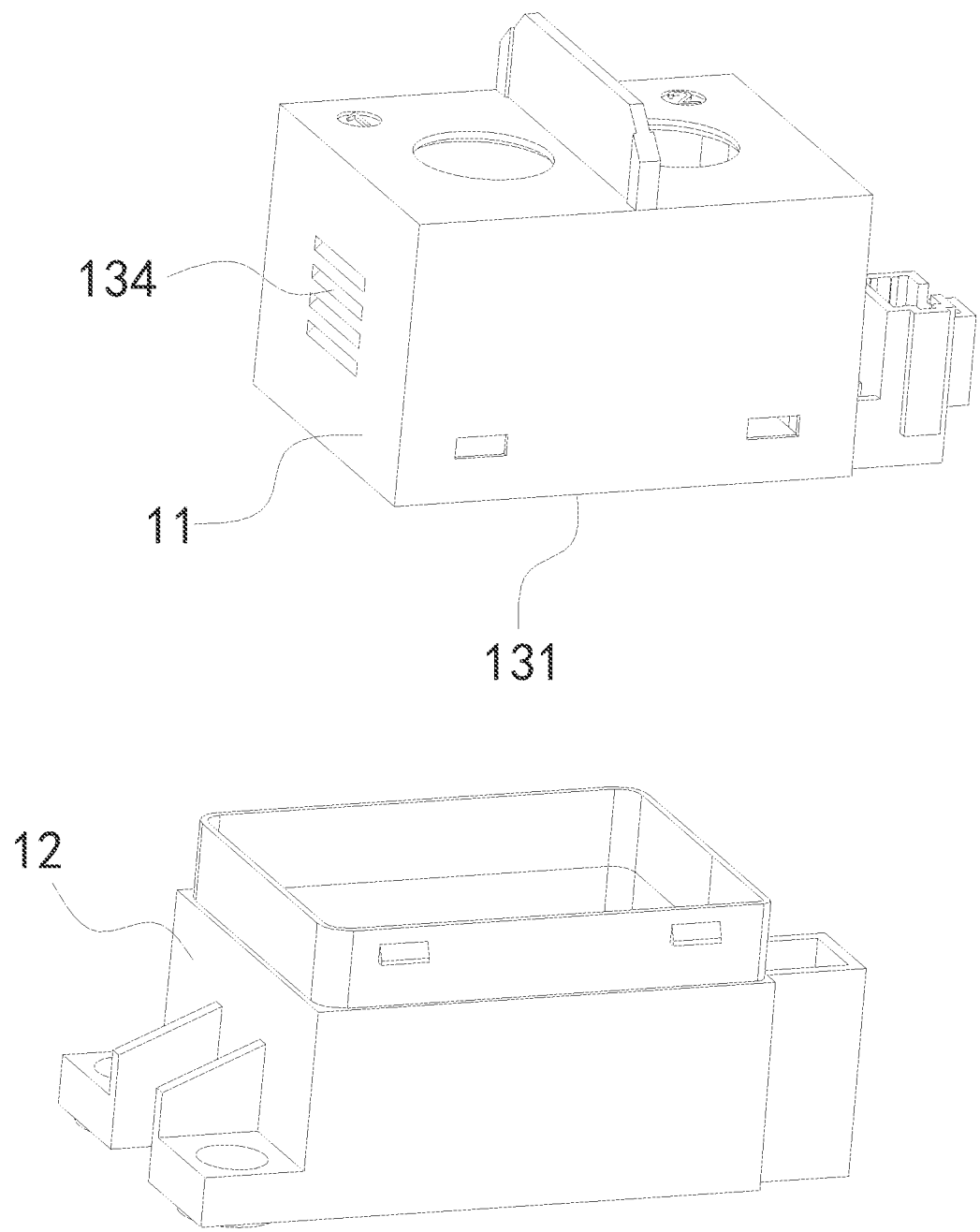
FIG. 92 is an exploded schematic view of a fifth embodiment of the shell of the present disclosure.

As shown in FIG. 92, it shows an exploded schematic view of a fifth embodiment of the shell 1 of the present disclosure. The same portions of the shell 1 of the fifth embodiment and the shell 1 of the above-mentioned embodiments will not be repeated here, but the difference thereof is that the exhaust structure 13 includes a gap 131 and an exhaust grid 134, and the gap 131 is formed in the middle area of the shell 1 in the height direction, and the exhaust grid 134 is arranged on the first housing 11. Of course, the exhaust grid 134 may also be arranged on the second housing 12, or both the first housing 11 and the second housing 12 are provided with the exhaust grid 134.

The gas may be discharged from the relay through the gap 131 and the exhaust grid 134. When the gas passes through the exhaust grid 134, the exhaust grid 134 can make the gas flow gentler, and prevent the discharged gas from affecting other electronic devices in the vicinity of the relay.

It can be understood that various embodiments/implementations provided by the present disclosure can be combined with each other without contradiction, and will not be exemplified here.

As above described, the relay according to the embodiment of the present disclosure at least include following advantages and beneficial effects.

According to the relay of the embodiment of the present disclosure, the pressure relief valve assembly 5 is arranged on the ceramic cover 211 to release overpressure gas, so as to ensure that the relay cannot explode and disintegrate the chamber due to rapid expansion of the gas caused by the high temperature in the contact chamber in the abnormal working states such as short circuit and overload breaking, and thereby increasing the reliability of the products.

In addition, the shell 1 of the relay according to the embodiment of the present disclosure is designed to have a non-sealed structure, which can not only discharge the exhausted gas timely, but also prevent exhausted substances from polluting the other electronic devices.

In the embodiments of the present disclosure, the terms "first", "second" and "third" are only used for descriptive purposes and cannot be understood to indicate or imply relative importance; the terms such as "install", "connect with", "connect to" and "fix" should be interpreted broadly, for example, "connect to" may refer to fixed connection, detachable connection or integral connection; "connect with" may refer to direct connection or indirect connected through an intermediate medium. For a person skilled in the art, the specific meanings of the above terms in the embodiments of the present disclosure may be understood according to specific situations.

In the description of the embodiment of the present disclosure, it should be understood that orientation or position relationship as indicated by the terms "upper", "lower", "left", "right", "front" and "rear" depend on the orientation or position relationship as shown in the drawings, only for the convenience of describing the embodiment of the present disclosure and simplifying the description, rather than for indicating or implying that the device or the unit must have a specific direction and can be constructed and operated in a specific orientation, and thus cannot be construed as limiting the embodiments of the present disclosure.

In this specification, the descriptions of the terms "one embodiment", "some embodiments" and "specific embodiments" mean that specific features, structures, materials or characteristics described in connection with the embodiment or example are included in at least one of the embodiments or examples of the present disclosure. In this specification, it is not necessary that the exemplary expressions of the above terms refer to the same embodiment or example. Moreover, the specific features, structures, materials or characteristics may be combined in any one or more embodiments or examples in a suitable manner.

The above embodiments are only the preferred embodiments of the present disclosure, but not limit to the present disclosure. For the person skilled in the art, the embodiments may be modified and varied. Any modifications, equivalent substitutions, improvements, etc. made within the spirit and principle of the embodiments of the present disclosure should be included in the protection scope of the embodiments of the present discourse.

What is claimed is:
1. A relay comprising:
an insulation cover;
a first yoke plate connected with the insulation cover and encloses a contact chamber with the insulation cover; the first yoke plate having a pressure relief hole; the pressure relief hole penetrating through two opposite side surfaces of the first yoke plate along a thickness direction and being communicated with the contact chamber;
a contact assembly comprising a pair of stationary contact leading-out terminals, each of the pair of stationary contact leading-out terminals being arranged on the insulation cover and having an end protruding into an inside of the contact chamber, and a movable contact piece located in the contact chamber;
a driving assembly connected with the movable contact piece and configured to drive movement of the movable contact piece such that two ends of the movable contact piece are respectively contacted with or separated from the pair of stationary contact leading-out terminals; and
a pressure relief valve assembly arranged on the first yoke plate and configured to close the pressure relief hole when a gas pressure in the contact chamber is less than a threshold, and configured to be broken to open the pressure relief hole when the gas pressure in the contact chamber is greater than or equal to the threshold.

2. The relay according to claim 1, wherein the pressure relief valve assembly comprises a valve plate integrally formed at the first yoke plate and arranged at the pressure relief hole for closing or opening the pressure relief hole.

3. The relay according to claim 2, wherein the first yoke plate has a first side surface and a second side surface arranged opposite to each other, and the valve plate has a first side surface and a second side surface arranged opposite to each other;
the first side surface of the first yoke plate is connected with the insulation cover, the first side surface of the valve plate is connected with a wall of the pressure relief hole, and the second side surface of the valve plate is flush with the second side surface of the first yoke plate.

4. The relay according to claim 2, wherein the pressure relief valve assembly further comprises a protective cover; the protective cover is connected to the first yoke plate and covers a surface of the valve plate; the protective cover is provided with a vent hole.

5. The relay according to claim 1, wherein the pressure relief valve assembly comprises a valve plate separately arranged from the first yoke plate and arranged at the pressure relief hole for closing or opening the pressure relief hole.

6. The relay according to claim 5, wherein the first yoke plate has a first side surface, the first side surface of the first yoke plate is connected with the insulation cover and is provided with a sink, the sink is communicated with the pressure relief hole;
the valve plate has a first side surface and is arranged in the sink, and the first side surface of the valve plate is flush with the first side surface of the first yoke plate.

7. The relay according to claim 5, wherein the pressure relief valve assembly further comprises a transition part, and the valve plate is connected to the first yoke plate through the transition part.

8. The relay according to claim 5, wherein the pressure relief valve assembly further comprises a protective cover; the protective cover is connected to the first yoke plate and covers a surface of the valve plate; the protective cover is provided with a vent hole.

9. The relay according to claim 1, wherein an exhaust passage is further arranged between the driving assembly and the first yoke plate, and the exhaust passage is communicated with the pressure relief hole.

10. The relay according to claim 9, wherein the driving assembly comprises:
an electromagnet unit arranged at a first yoke plate side away from the insulation cover, and the electromagnet unit and the first yoke plate form the exhaust passage; and
a pushing unit connected with the electromagnet unit actuated.

11. The relay according to claim 10, wherein the electromagnet unit comprises:
a bobbin in a hollow tubular shape and forming the exhaust passage with the first yoke plate; and
a coil surrounding the bobbin.

12. The relay according to claim 11, wherein the exhaust passage is arranged on the first yoke plate and/or the bobbin.

13. The relay according to claim 11, further comprising a metal cover, wherein the metal cover is connected to the first yoke plate and encloses a driving chamber with the first yoke plate; and the first yoke plate has a through hole, the contact chamber is communicated with the driving chamber via the through hole; and
the metal cover is set inside the bobbin, and the pushing unit is movably arranged in the driving chamber and connected with the movable contact piece through the through hole.

14. The relay according to claim 13, wherein the electromagnet unit further comprises:
a static iron core fixedly arranged in the metal cover, and a portion of the static iron core protruding into the through hole; the static iron core having a first perforation; and the first perforation being arranged corresponding to the through hole, the pushing unit passes through the through hole;
a movable iron core movably arranged in the metal cover and arranged opposite to the static iron core, and the movable iron core being connected with the pushing unit to be attracted by the static iron core when the coil is powered on; and
a first elastic member arranged between the static iron core and the movable iron core, for resetting the movable iron core when the coil is powered off.

15. The relay according to claim 9, wherein a gas flow direction of the exhaust passage is perpendicular to an axis of the pressure relief hole.

16. The relay according to claim 1, further comprising a shell with a hollow chamber, the hollow chamber is communicated with an outside of the shell;
the insulation cover, the first yoke plate, the driving assembly and the pressure relief valve assembly are all located in the hollow chamber.

17. The relay according to claim 16, wherein the shell comprises:
a first housing; and
a second housing detachably connected with the first housing; the first housing and/or the second housing being provided with an exhaust structure, the exhaust structure is communicated with the hollow chamber.

18. The relay according to claim 16, wherein the exhaust structure comprises a gap formed between the first housing and the second housing; and/or
the exhaust structure comprises an exhaust holes and/or an exhaust cover and/or an exhaust grid.

19. The relay according to claim 1, wherein the insulation cover comprises:
a ceramic cover, the stationary contact leading-out terminals are arranged on the ceramic cover; and
a connector having one end connected with an opening edge of the ceramic cover and the other end connected with the first yoke plate.

20. The relay according to claim 1, wherein the pressure relief valve assembly comprises a valve plate for closing or opening the pressure relief hole.

21. The relay according to claim 19, wherein the pressure relief valve assembly comprises a valve plate, and the valve plate is made of ceramic, a thickness of the valve plate is less than a thickness of a wall of the ceramic cover.

22. The relay according to claim 1, wherein a structural strength of the pressure relief valve assembly is less than a structural strength of the contact chamber.

23. The relay according to claim 1, wherein the pressure relief valve assembly and the contact chamber are respectively made of different materials and/or different structures.

* * * * *